United States Patent [19]

Shinoda et al.

[11] 4,304,472
[45] Dec. 8, 1981

[54] CAMERA SYSTEM

[75] Inventors: Nobuhiko Shinoda, Tokyo; Nobuaki Sakurada, Yokohama; Masaharu Kamamura, Hino; Tadashi Ito; Fumio Ito, both of Yokohama; Hiroyashu Murakami, Tokyo, all of Japan

[73] Assignee: Canon Kabushiki Kaisha, Tokyo, Japan

[21] Appl. No.: 737,771

[22] Filed: Nov. 1, 1976

[30] Foreign Application Priority Data

Nov. 8, 1975 [JP] Japan .................................. 50-134391

[51] Int. Cl.³ ........................ G03B 7/091; G03B 17/18
[52] U.S. Cl. ................................ 354/23 D; 354/60 L
[58] Field of Search ............. 354/23 D, 50, 51, 60 R, 354/60 A, 289; 307/244; 328/153

[56] References Cited

U.S. PATENT DOCUMENTS

| | | | |
|---|---|---|---|
| 3,135,948 | 6/1964 | Ashley | 307/244 X |
| 3,258,607 | 6/1966 | Wright et al. | 307/244 X |
| 3,928,858 | 12/1975 | Sakurada et al. | 354/23 D |
| 4,037,233 | 7/1977 | Shinoda et al. | 354/23 D |
| 4,051,489 | 9/1977 | Saito et al. | 354/23 D |
| 4,079,386 | 3/1978 | Murakami et al. | 354/23 D |
| 4,079,387 | 3/1978 | Kawamura et al. | 354/23 D |
| 4,149,795 | 4/1979 | Sakurada et al. | 354/23 D |

FOREIGN PATENT DOCUMENTS

| | | | |
|---|---|---|---|
| 2434152 | 2/1975 | Fed. Rep. of Germany | 354/23 D |
| 2451676 | 9/1975 | Fed. Rep. of Germany | 354/23 D |
| 2525857 | 1/1976 | Fed. Rep. of Germany | 354/23 D |

Primary Examiner—Michael L. Gellner
Attorney, Agent, or Firm—Toren, McGeady & Stanger

[57] ABSTRACT

In the disclosed photographic exposure control system, an exposure mechanism generates at least one controllable exposure parameter for regulating the exposure of a photosensitive material. A coding circuit is set to produce digital signals corresponding to at least one photographic value. A control device between the coding circuit and the exposure mechanism calculates the exposure parameter and controls the coding circuit. The coded values are then suitably displayed to the photographer.

2 Claims, 123 Drawing Figures

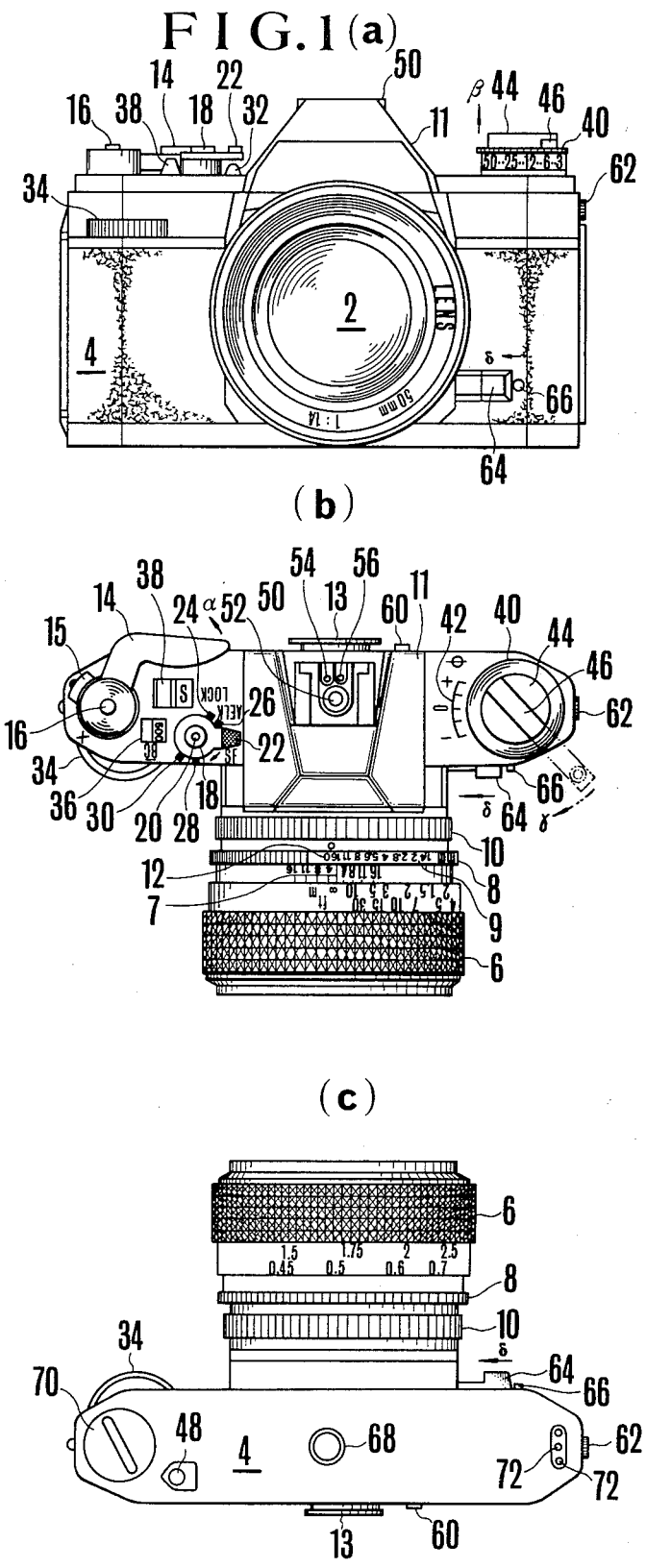

FIG. 1(d)
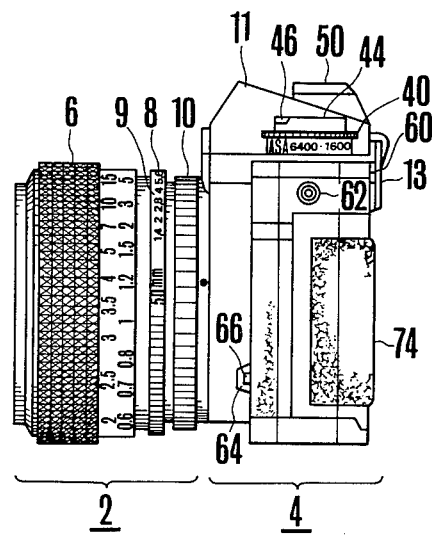
(e)
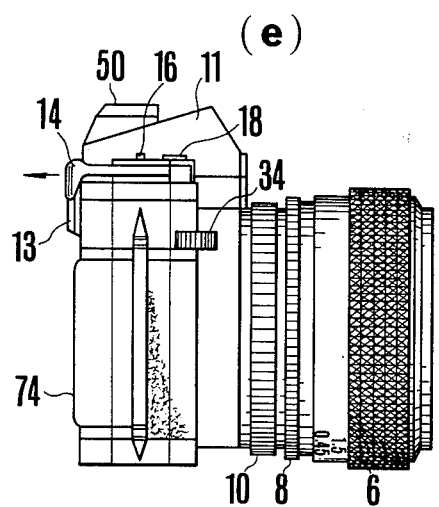
(f)
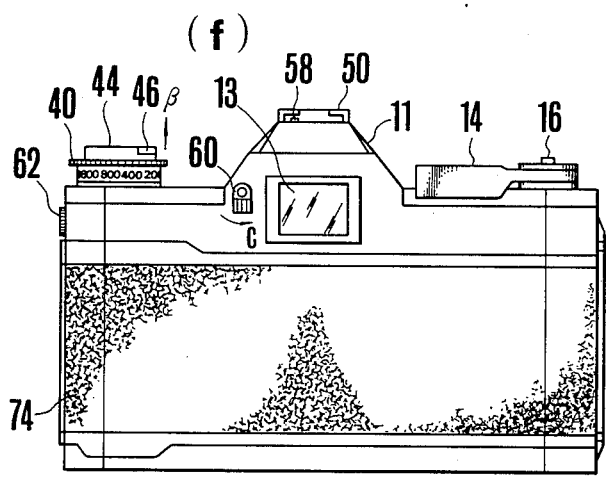

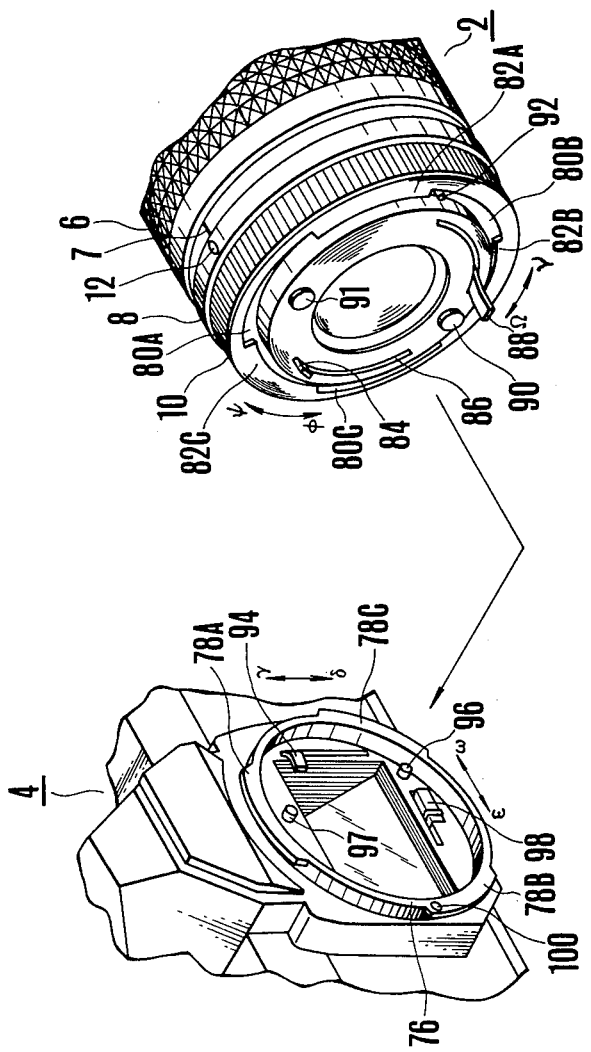

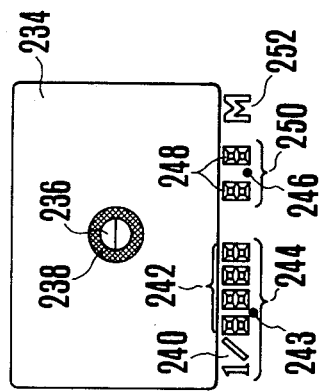
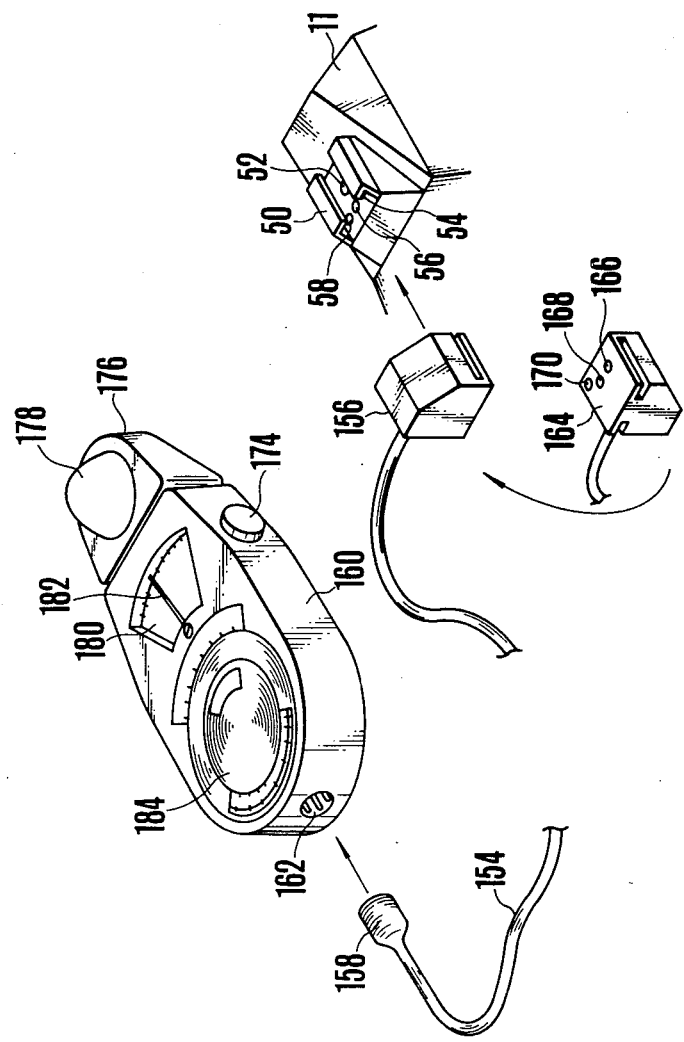

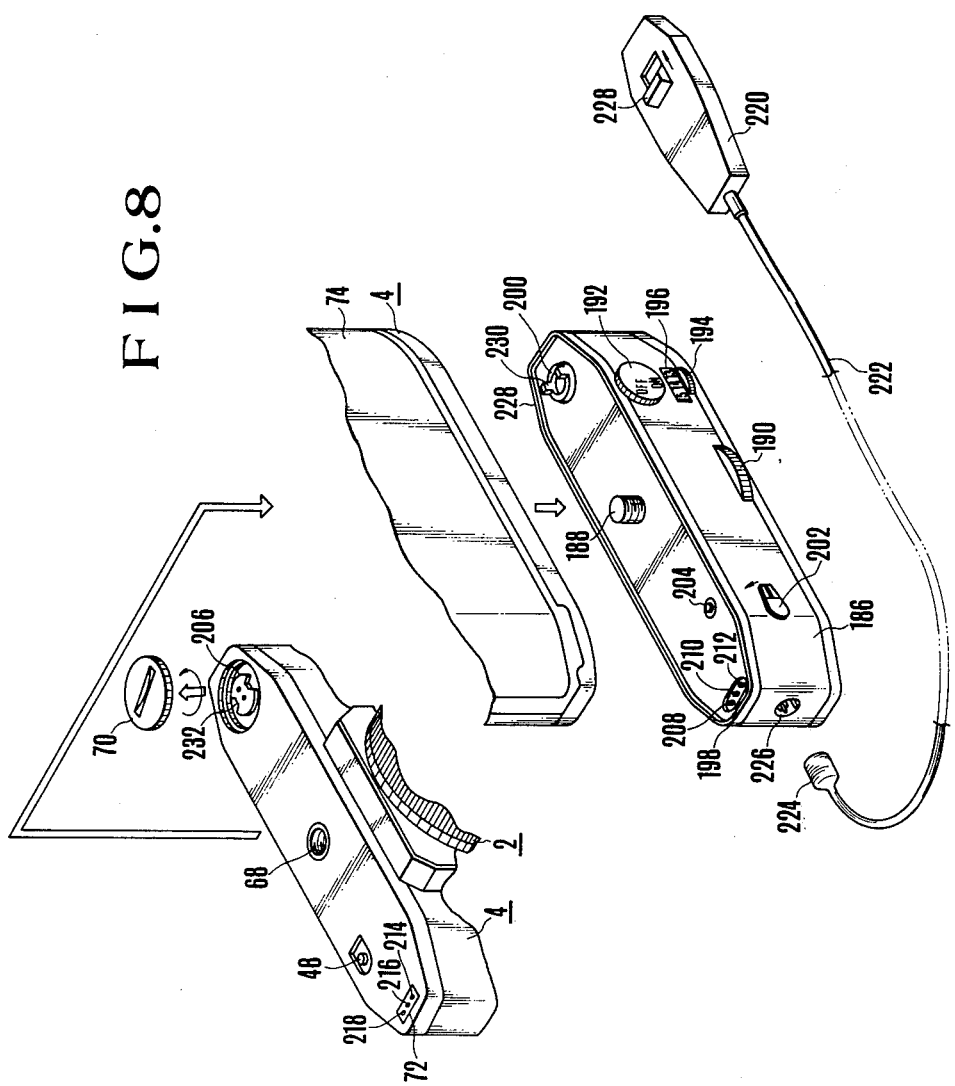

FIG.10(a)

| | ORDINARY DISPLAY | LOW BRIGHTNESS ALARM CLOCK | HIGH BRIGHTNESS ALARM CLOCK |
|---|---|---|---|
| AE PHOTOGRAPHY WITH PRIORITY ON SHUTTER TIME (I) | 1/2000 5.6 | 1/1000 -8.4- | 1/15 -22- |
| AE PHOTOGRAPHY WITH PRIORITY ON APERTURE VALUE (II) | 1/90 8.0 | -60- 5.7 | -1/2000- 3.5 |
| TOTALLY OPENED LIGHT MEASURING, MANUAL EXPOSURE ADJUSTMENT PHOTOGRAPHY (III) | 30 9.0 M | 1/250 -8.2-M | - -8.9-M |
| CLOSED DIAPHRAGM LIGHT MEASURING, AE PHOTOGRAPHY WITH PRIORITY ON APERTURE VALUE (IV) | 1/350 | -60- B M | -1/2000- 4.0 M |
| CLOSED DIAPHRAGM LIGHT MEASURING, MANUAL EXPOSURE ADJUSTMENT PHOTOGRAPHY (V) | 1/500 □□M | 1/9500 -0.P-M | 1/5 -8.7-M |

\* -8.8- TWINKLING DISPLAY

F I G.10 (b)

| BULB | MARK SELECTED (I) | bulb  1.8 |
|---|---|---|
|  | APERTURE MANUAL (II) | bulb  M |

F I G.10 (c)

| SPEED LIGHT DEVICE IN AUTOMATIC LIGHT ADJUSTING MODE | | | | |
|---|---|---|---|---|
| FULL-AUTOMATIC | SHUTTER TIME | MARK SELECTED (I) | 1/60EF | 2.8 |
| | | APERTURE MANUAL (II) | 1/60EF | 4.0 M |
| | BULB | MARK SELECTED (III) | b EF | 5.6 |
| | | APERTURE MANUAL (VI) | b EF | 5.6 M |
| SEMI-AUTOMATIC | SHUTTER TIME | MARK SELECTED (V) | 1/15EF | 2.8 |
| | | APERTURE MANUAL (VI) | 1/15EF | 4.0 M |
| | BULB | MARK SELECTED (VII) | b EF | 5.6 |
| | | APERTURE MANUAL (VIII) | b EF | 5.6 M |

\*  TWINKLING DISPLAY

F I G.10(d)

| | | | | |
|---|---|---|---|---|
| SPEED LIGHT DEVICE IN TOTAL LIGHT AMOUNT ISSUING MODE | FULL-AUTOMATIC | SHUTTER TIME | MARK SELECTED (I) | 1/60EF |
| | | | APERTURE MANUAL (II) | 1/60EF M |
| | | BULB | MARK SELECTED (III) | b EF |
| | | | APERTURE MANUAL (IV) | b EF M |
| | SEMI-AUTOMATIC | SHUTTER TIME | MARK SELECTED (V) | 1/15EF |
| | | | APERTURE MANUAL (VI) | 1/15EF M |
| | | BULB | MARK SELECTED (VII) | b EF |
| | | | APERTURE MANUAL (VIII) | b EF M |

F I G.10(e)

| | | | |
|---|---|---|---|
| APERTURE MISSETTING | SCALE OUT AT SMALLEST APERTURE VALUE SIDE (I) | 1/250 | 1.8⌐ |
| | SCALE OUT AT LARGEST APERTURE VALUE SIDE (II) | 1/60 | 16⌐ |

F I G.10(f)

| ALARM LOCK | 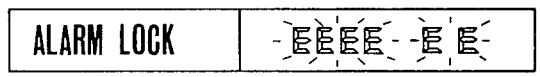 |
|---|---|

FIG.11(A)

| APERTURE SETTING DIAL 108 OF SPEED LIGHT DEVICE 384 | APERTURE SETTING RING 8 OF LENS DEVICE | EXCHANGE SWITCH 146 OF SPEED LIGHT DEVICE 384 | MODE SELECTOR ON CAMERA BODY 4 | PHOTOGRAPHIC MODE — MODE | PHOTOGRAPHIC MODE — OPERATION |
|---|---|---|---|---|---|
| APERTURE VALUE SELECTED (SPEED LIGHT DEVICE PRODUCING AUTOMATICALLY-ADJUSTED LIGHT AMOUNT) | MARK 12 | FULL-AUTOMATIC | PRIORITY ON SHUTTER TIME | FULL-AUTOMATIC, AUTOMATIC LIGHT ADJUSTING, AUTOMATIC MODE | ○ SHUTTER TIME-SPEED LIGHT SYNCHRONIZATION TIME<br>○ SPEED LIGHT DEVICE-AUTOMATIC LIGHT ADJUSTING<br>○ APERTURE VALUE-AUTOMATIC CONTROL |
| APERTURE VALUE SELECTED (SPEED LIGHT DEVICE PRODUCING AUTOMATICALLY-ADJUSTED LIGHT AMOUNT) | MARK 12 | SEMI-AUTOMATIC | PRIORITY ON APERTURE VALUE | SEMI-AUTOMATIC, AUTOMATIC LIGHT ADJUSTING, AUTOMATIC MODE | ○ SHUTTER TIME-SPEED LIGHT SYNCHRONIZATION TIME OR LONGER<br>○ SPEED LIGHT DEVICE-AUTOMATIC LIGHT ADJUSTING<br>○ APERTURE VALUE-AUTOMATIC CONTROL |
| APERTURE VALUE SELECTED (SPEED LIGHT DEVICE PRODUCING AUTOMATICALLY-ADJUSTED LIGHT AMOUNT) | APERTURE VALUE SET | FULL-AUTOMATIC | PRIORITY ON SHUTTER TIME | FULL-AUTOMATIC, AUTOMATIC LIGHT ADJUSTING, MANUAL MODE | ○ SHUTTER TIME-SPEED LIGHT SYNCHRONIZATION TIME<br>○ SPEED LIGHT DEVICE-AUTOMATIC LIGHT ADJUSTING<br>○ APERTURE VALUE-MANUALLY SET AT THE SIDE OF THE LENS DEVICE |
| APERTURE VALUE SELECTED (SPEED LIGHT DEVICE PRODUCING AUTOMATICALLY-ADJUSTED LIGHT AMOUNT) | APERTURE VALUE SET | SEMI-AUTOMATIC | PRIORITY ON APERTURE VALUE | SEMI-AUTOMATIC, AUTOMATIC LIGHT ADJUSTING, MANUAL MODE | ○ SHUTTER TIME-SPEED LIGHT SYNCHRONIZATION TIME OR LONGER<br>○ SPEED LIGHT DEVICE-AUTOMATIC LIGHT ADJUSTING<br>○ APERTURE VALUE-MANUALLY SET AT THE SIDE OF THE LENS DEVICE |
| MANUAL SET (SPEED LIGHT DEVICE PRODUCING TOTAL LIGHT AMOUNT) | MARK 12 | FULL-AUTOMATIC | PRIORITY ON SHUTTER TIME | FULL-AUTOMATIC, TOTAL LIGHT AMOUNT, SMALLEST APERTURE MODE | ○ SHUTTER TIME-SPEED LIGHT SYNCHRONIZATION TIME<br>○ SPEED LIGHT DEVICE-TOTAL LIGHT AMOUNT<br>○ APERTURE VALUE-CONTROLLED TO THE SMALLEST APERTURE VALUE |
| MANUAL SET (SPEED LIGHT DEVICE PRODUCING TOTAL LIGHT AMOUNT) | MARK 12 | SEMI-AUTOMATIC | PRIORITY ON APERTURE VALUE | SEMI-AUTOMATIC, TOTAL LIGHT AMOUNT, SMALLEST APERTURE MODE | ○ SHUTTER TIME-SPEED LIGHT SYNCHRONIZATION TIME OR LONGER<br>○ SPEED LIGHT DEVICE-TOTAL LIGHT AMOUNT<br>○ APERTURE VALUE-CONTROLLED TO THE SMALLEST APERTURE VALUE |
| MANUAL SET (SPEED LIGHT DEVICE PRODUCING TOTAL LIGHT AMOUNT) | APERTURE VALUE SET | FULL-AUTOMATIC | PRIORITY ON SHUTTER TIME | FULL-AUTOMATIC, TOTAL LIGHT AMOUNT, MANUAL MODE | ○ SHUTTER TIME-SPEED LIGHT SYNCHRONIZATION TIME<br>○ SPEED LIGHT DEVICE-TOTAL LIGHT AMOUNT<br>○ APERTURE VALUE-MANUALLY SET AT THE SIDE OF THE LENS DEVICE |
| MANUAL SET (SPEED LIGHT DEVICE PRODUCING TOTAL LIGHT AMOUNT) | APERTURE VALUE SET | SEMI-AUTOMATIC | PRIORITY ON APERTURE VALUE | SEMI-AUTOMATIC, TOTAL LIGHT AMOUNT, MANUAL MODE | ○ SHUTTER TIME-SPEED LIGHT SYNCHRONIZATION TIME OR LONGER<br>○ SPEED LIGHT DEVICE-TOTAL LIGHT AMOUNT<br>○ APERTURE VALUE-MANUALLY SET AT THE SIDE OF THE LENS DEVICE |

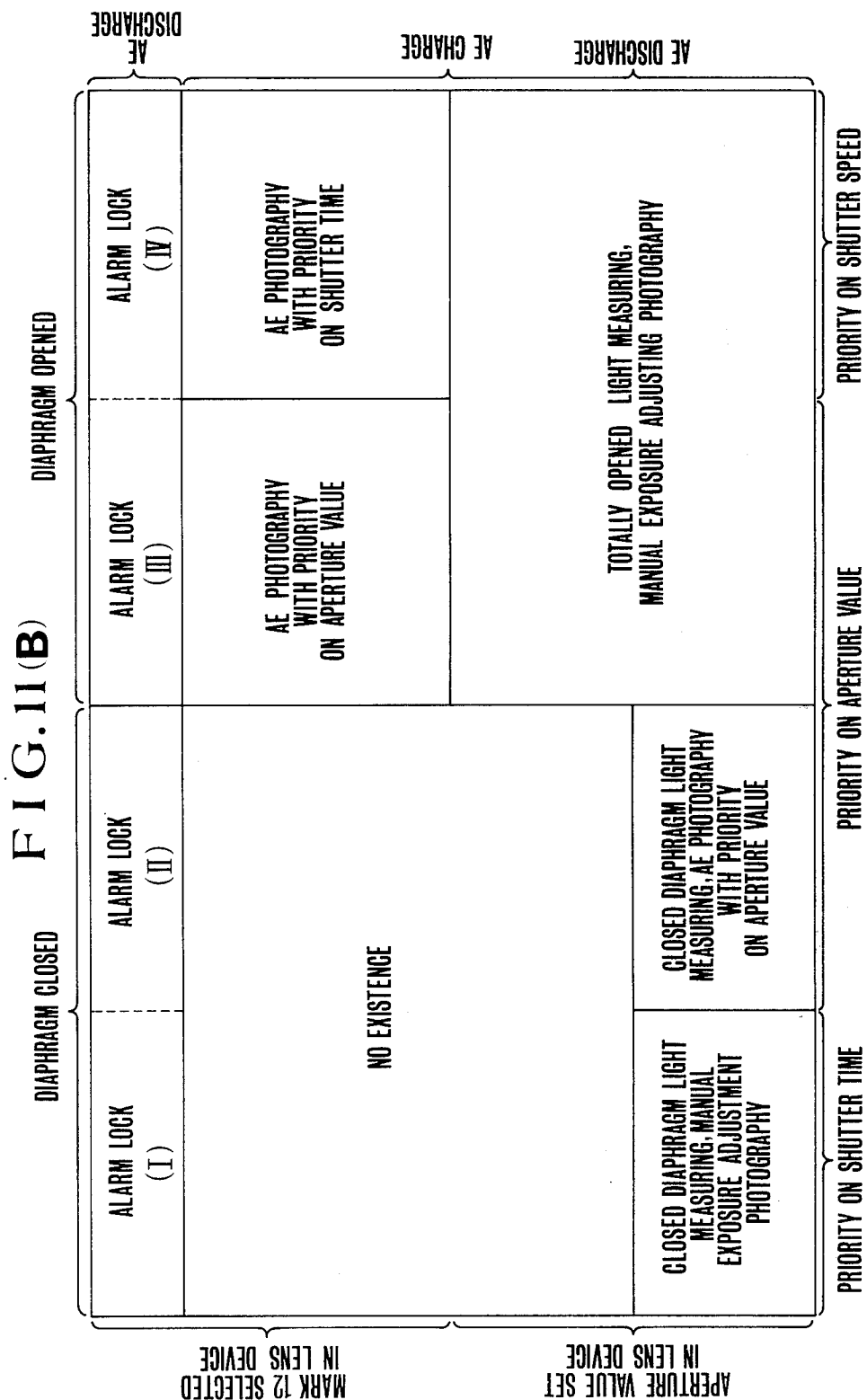

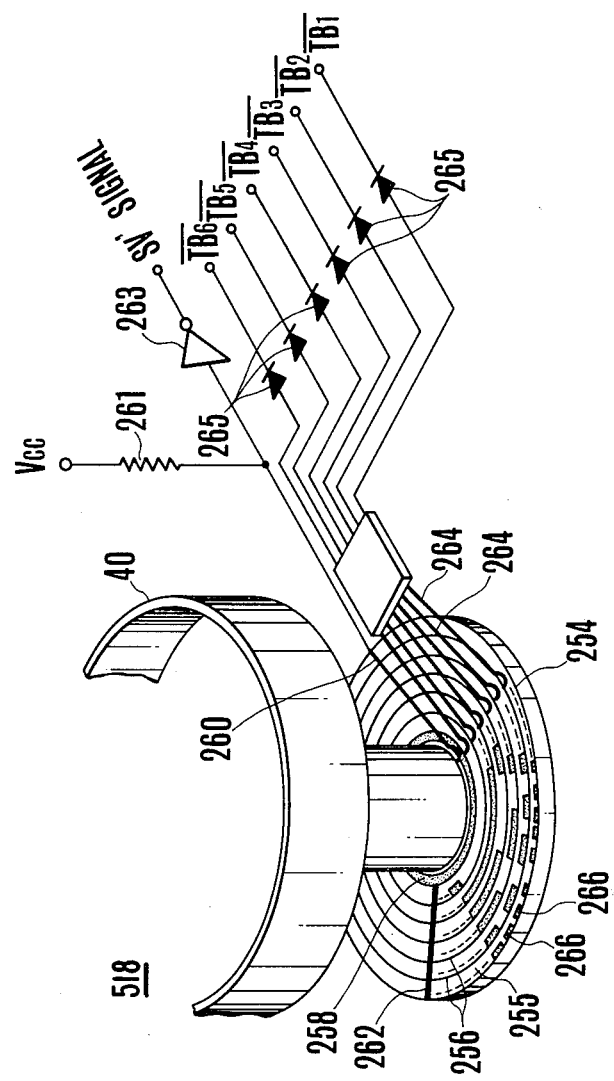

| DECIMAL | GREY CODE | | | | BINARY CODE | | | |
|---|---|---|---|---|---|---|---|---|
| 0  | 0 | 0 | 0 | 0 | 0 | 0 | 0 | 0 |
| 1  | 0 | 0 | 0 | 1 | 0 | 0 | 0 | 1 |
| 2  | 0 | 0 | 1 | 1 | 0 | 0 | 1 | 0 |
| 3  | 0 | 0 | 1 | 0 | 0 | 0 | 1 | 1 |
| 4  | 0 | 1 | 1 | 0 | 0 | 1 | 0 | 0 |
| 5  | 0 | 1 | 1 | 1 | 0 | 1 | 0 | 1 |
| 6  | 0 | 1 | 0 | 1 | 0 | 1 | 1 | 0 |
| 7  | 0 | 1 | 0 | 0 | 0 | 1 | 1 | 1 |
| 8  | 1 | 1 | 0 | 0 | 1 | 0 | 0 | 0 |
| 9  | 1 | 1 | 0 | 1 | 1 | 0 | 0 | 1 |
| 10 | 1 | 1 | 1 | 1 | 1 | 0 | 1 | 0 |
| 11 | 1 | 1 | 1 | 0 | 1 | 0 | 1 | 1 |
| 12 | 1 | 0 | 1 | 0 | 1 | 1 | 0 | 0 |
| 13 | 1 | 0 | 1 | 1 | 1 | 1 | 0 | 1 |
| 14 | 1 | 0 | 0 | 1 | 1 | 1 | 1 | 0 |
| 15 | 1 | 0 | 0 | 0 | 1 | 1 | 1 | 1 |

FIG.17
| J | K | Q |
|---|---|---|
| 1 | 1 | $\bar{Q}$ |
| 0 | 0 | Q |
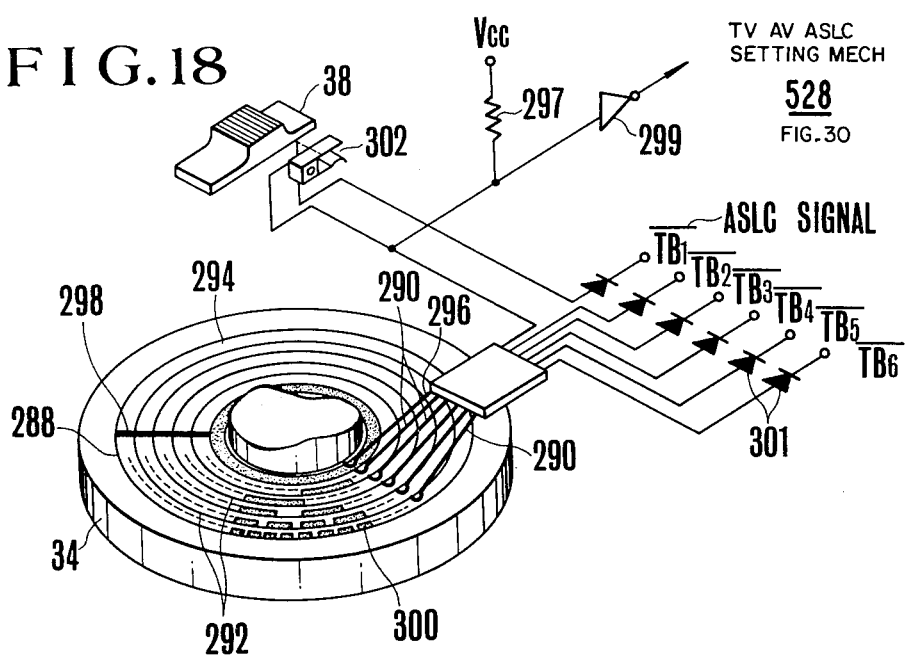
FIG.18
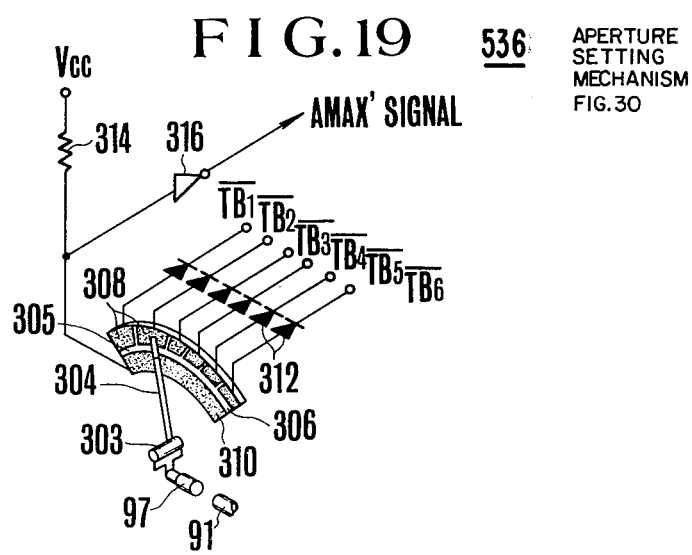
FIG.19

FIG.20
| TIMING PULSE / INVERTER | TB0 | TB1 | TB2 | TB3 | TB4 | TB5 | TB6 | TB7 |
|---|---|---|---|---|---|---|---|---|
| 263 | | $SV\frac{1}{4}$ | $SV\frac{1}{2}$ | SV1 (GREY CORD) | SV2 (GREY CORD) | SV4 (GREY CORD) | SV8 (GREY CORD) | |
| 279 | | MNAL | SPDW | AV04GC | AV02GC | AV01GC | $AV0\frac{1}{2}GC$ | |
| 299 | | ASLC | $TV1\atop AV\frac{1}{2}$ | TV2 AV1 | TV4 AV2 | TV8 AV4 | TV16 AV8 | |
| 316 | | AMAX(F11) | AMAX(F16) | AMAX(F22) | AMAX(F32) | AMAX(F45) | AMAX(F46) | |
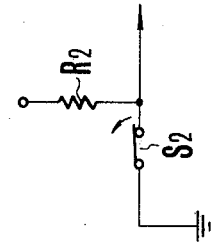
FIG.21
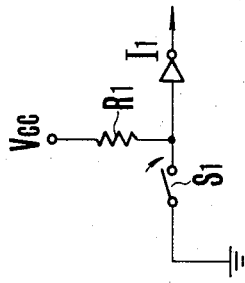
FIG.22

FIG. 29

| MODE SELECTOR | APERTURE SETTING OF LENS DEVICE 8 | DIAPHRAGM CLOSING LEVER 64 | LIGHT MEASUREMENT | PHOTOGRAPHIC MODE | OPERATION | ROUTINE |
|---|---|---|---|---|---|---|
| PRIORITY ON APERTURE VALUE | MARK 12 SELECTED | OPENED | TTL | AE PHOTOGRAPHIC MODE WITH PRIORITY ON APERTURE VALUE | BVO+SV+AVO+AVC-AV→TV | |
| | | CLOSED | EXTERNAL | ALARM LOCK DUE TO THE MISOPERATION | | |
| | APERTURE SET | OPENED | TTL | TOTALLY OPENED TTL LIGHT MEASURING, MANUAL EXPOSURE ADJUSTMENT PHOTOGRAPHIC MODE (APERTURE PRIORITY AE MODE POSSIBLE) | BVO+SV+AVO+AVC-AV→TV | FIRST ROUTINE |
| | | | EXTERNAL | EXTERNAL LIGHT MEASURING, MANUAL EXPOSURE ADJUSTMENT PHOTOGRAPHIC MODE (APERTURE PRIORITY AE MODE POSSIBLE) | BV+SV-AV→TV | |
| | | CLOSED | TTL | CLOSED DIAPHRAGM LIGHT MEASURING AE PHOTOGRAPHIC MODE WITH PRIORITY ON APERTURE VALUE | BVC+SV→TV | SECOND ROUTINE |
| PRIORITY ON SHUTTER TIME | MARK 12 SELECTED | OPENED | TTL | AE PHOTOGRAPHIC MODE WITH PRIORITY ON SHUTTER TIME | BVO+SV+AVO+AVC-TV→AV | |
| | | CLOSED | EXTERNAL | ALARM LOCK DEU TO THE MISOPERATION | | |
| | APERTURE SET | OPENED | TTL | TOTALLY OPENED TTL LIGHT MEASURING, MANUAL EXPOSURE ADJUSTMENT PHOTOGRAPHIC MODE (APERTURE PRIORITY AE MODE POSSIBLE) | BVO+SV+AVO+AVC-TV→AV | THIRD ROUTINE |
| | | | EXTERNAL | EXTERNAL LIGHT MEASURING, MANUAL EXPOSURE ADJUSTMENT PHOTOGRAPHIC MODE (APERTURE PRIORITY AE MODE POSSIBLE) | BV+SV-TV→AV | |
| | | CLOSED | TTL | CLOSED DIAPHRATH LIGHT MEASURING, MANUAL EXPOSURE ADJUSTMENT PHOTOGRAPHIC MODE | BVC+SV-TV | FOURTH ROUTINE |

F I G. 31
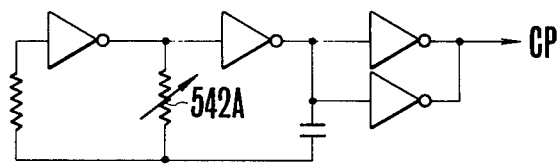
F I G. 32
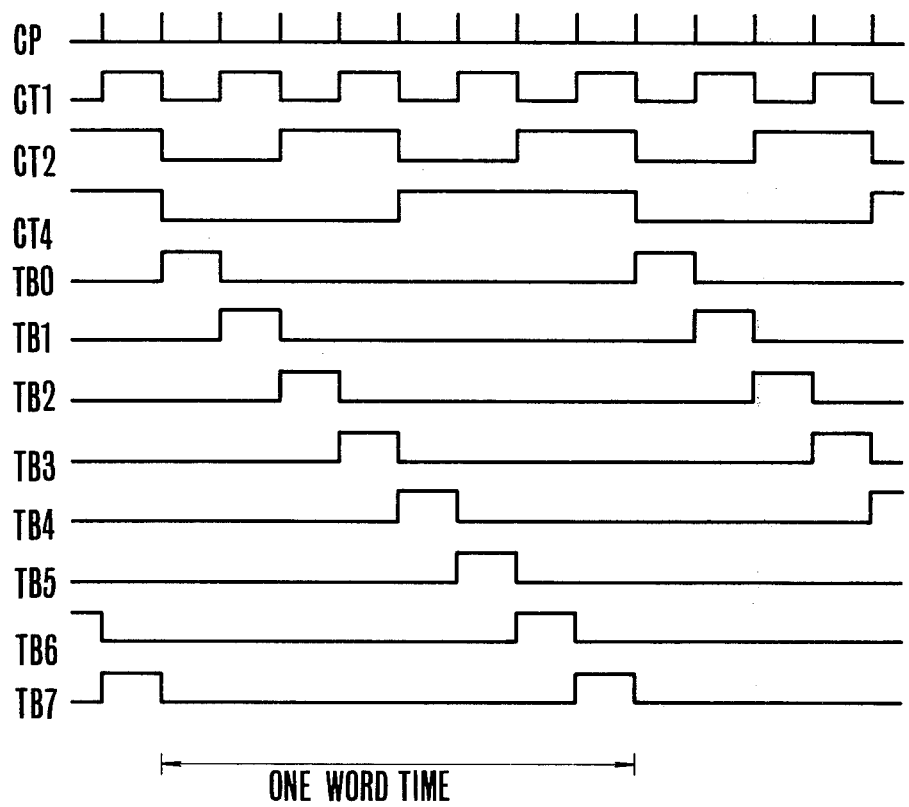

FIG. 47

| CU | A0 | MEASURING | |
|----|----|-----------|---|
| 0 | 0 | LIGHT MEASURING PHOTOGRAPHY | TTL LIGHT MEASUREMENT |
| 0 | 1 | LIGHT MEASURING PHOTOGRAPHY | EXTERNAL LIGHT MEASUREMENT |
| 1 | 0 | SPEED LIGHT PHOTOGRAPHY | SEMI-AUTOMATIC |
| 1 | 1 | SPEED LIGHT PHOTOGRAPHY | FULL-AUTOMATIC |

FIG.49 (DETAILS OF MC 14520 IN FIG.51 TWO MC 14520'S FORM 557,558,560,562 IN FIG.48)
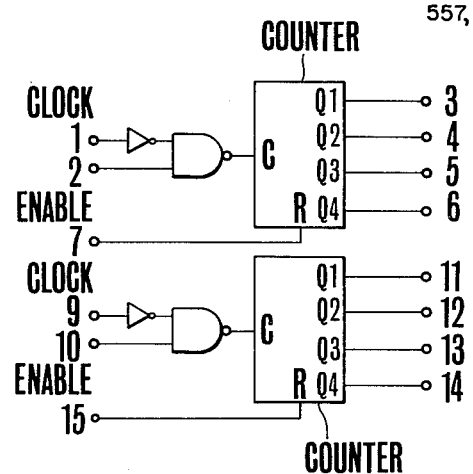
FIG.50
(DETAILS OF COUNTERS IN FIG.49)
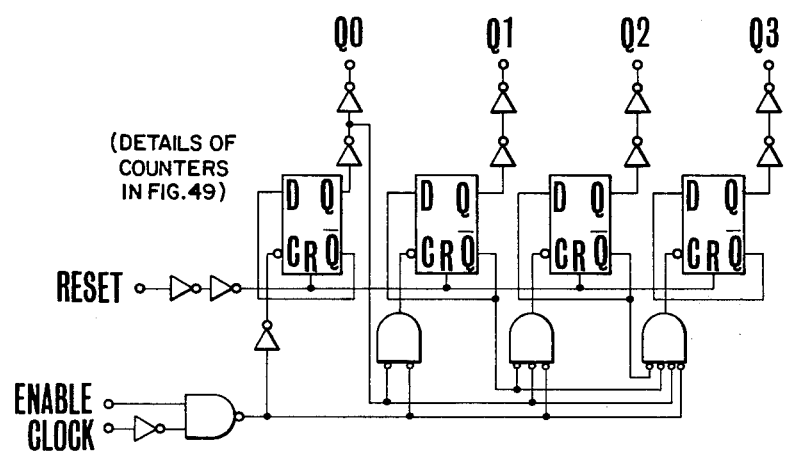

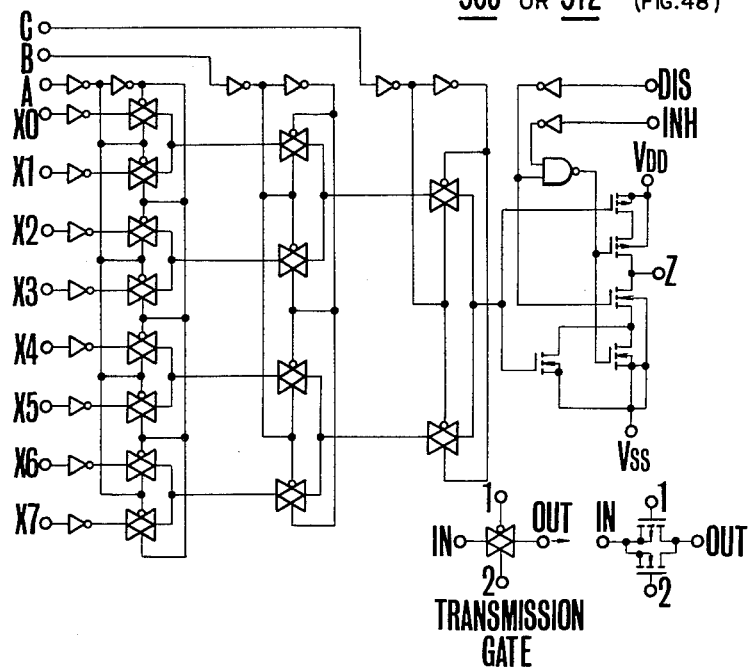

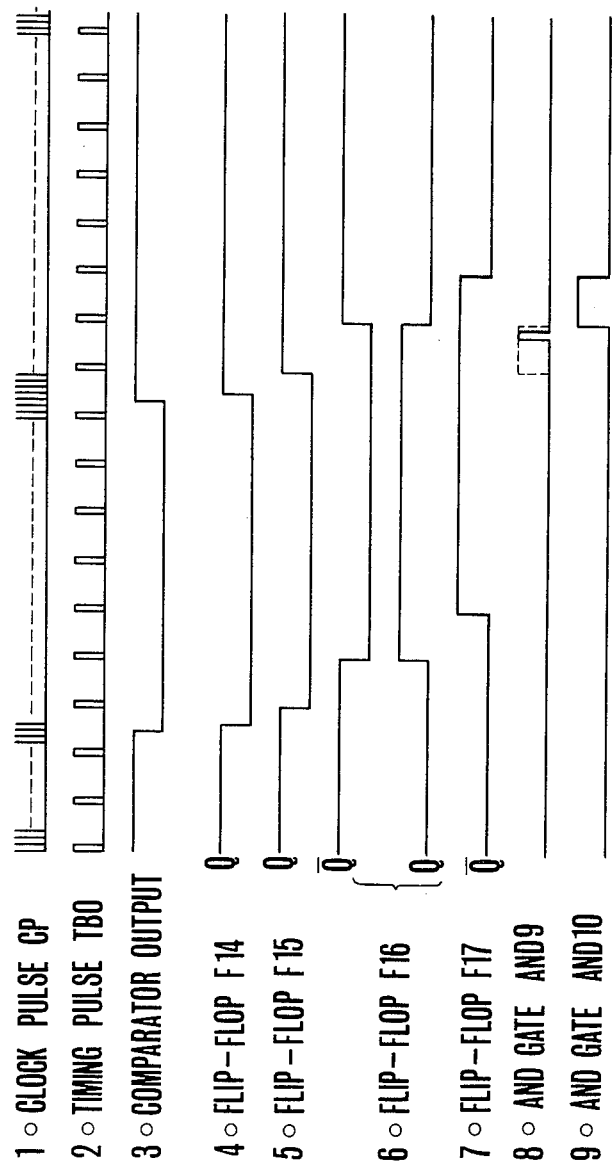

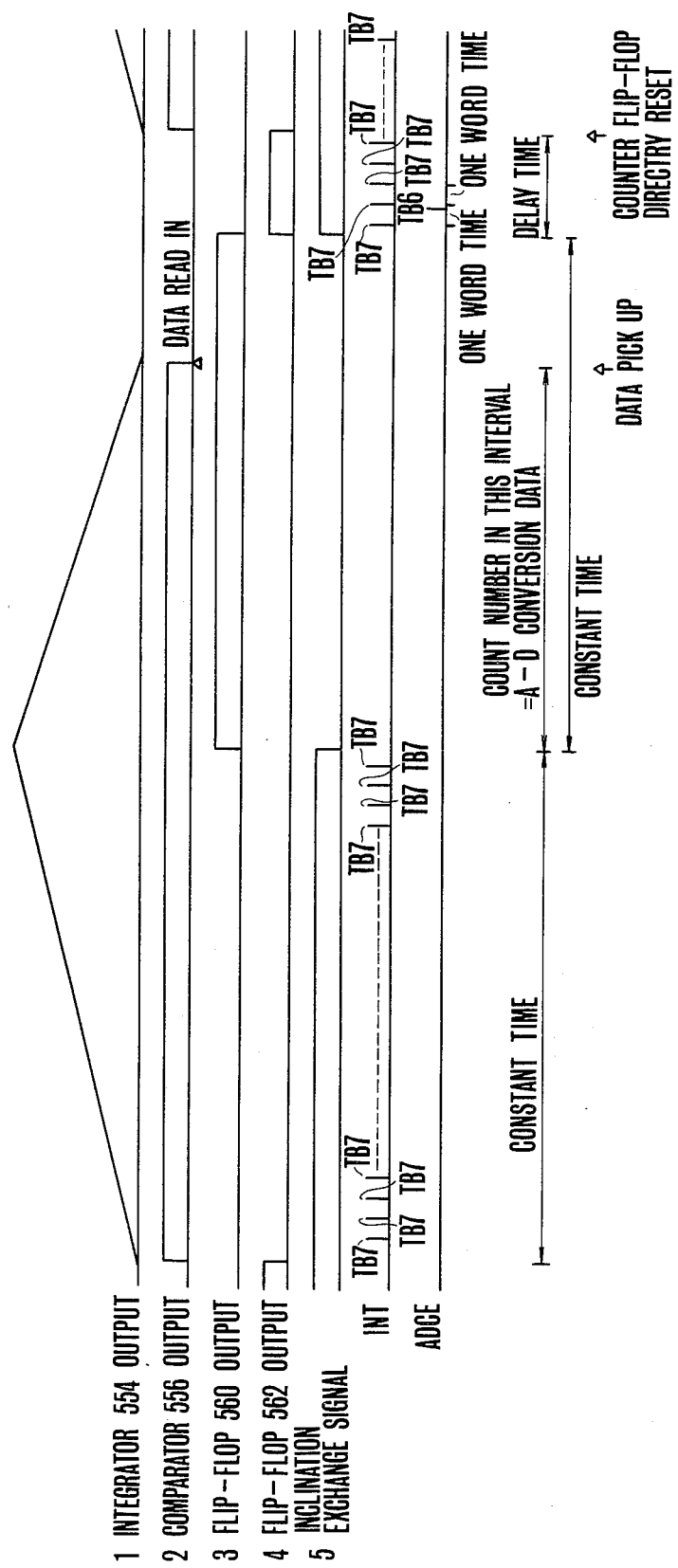

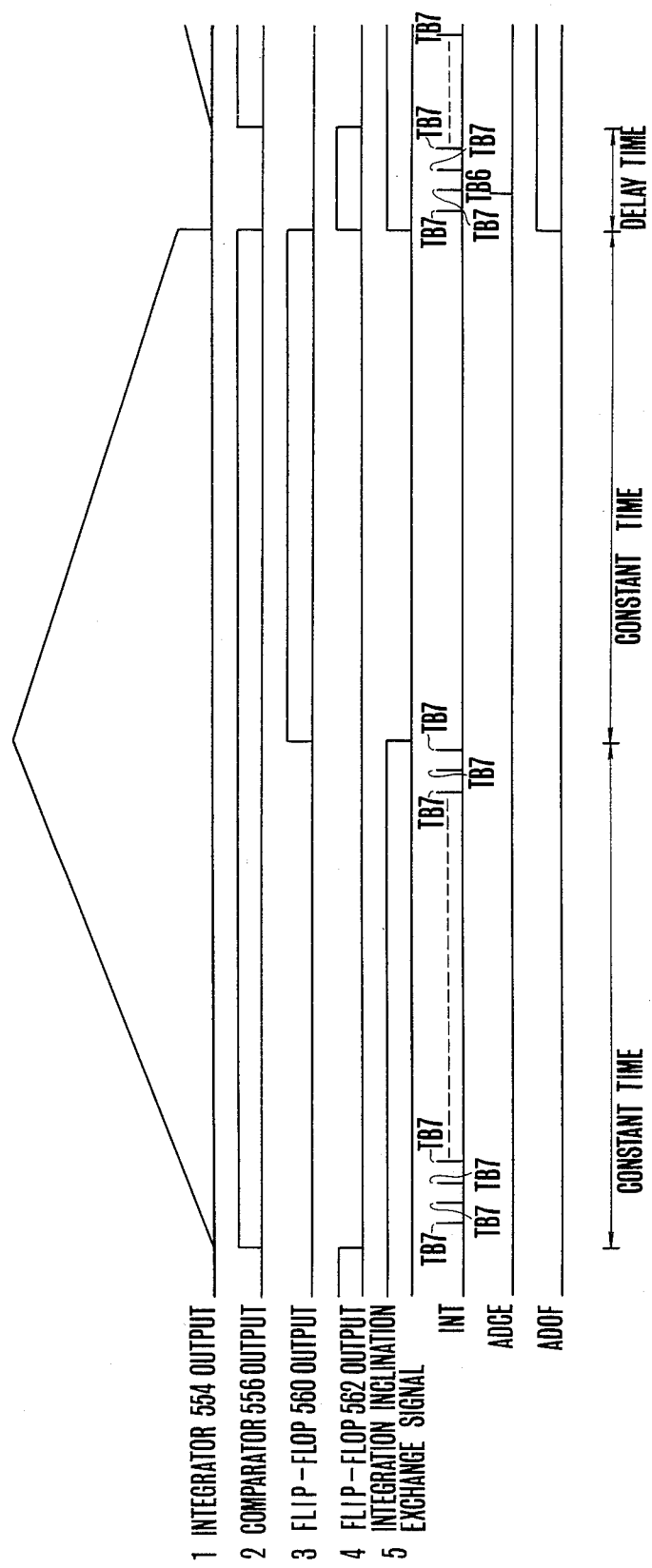

BAS SELECTOR 578 (FIG.30)

OPERATION OF FIG.58

FIG.69A

| | INSTRUCTION CODE (ROM 504, FIGS. 65, 68) | | INSTRUCTION | MEASURING |
|---|---|---|---|---|
| OP7 | OP6 | OP5 | | |
| 0 OPERATION | 0 ADDITION | 0 A REGISTER OFF | NOOP | NOTHING DONE INCLUDING CARRY RESET |
| 0 OPERATION | 0 ADDITION | 1 A REGISTER ON | ADD | RESULT OF ADDITION FORWARDED TO A REGISTER |
| 0 OPERATION | 1 SUBTRACTION | 0 A REGISTER OFF | LT | SUBTRACTION AND CARRY OBSERVED |
| 0 OPERATION | 1 SUBTRACTION | 1 A REGISTER ON | SUB | SUBTRACTION RESULT FORWARDED TO A REGISTER |
| 1 DATA EXCHANGE | 0 INVALID BY CARRY OFF | 0 INVALID BY CARRY ON | NOOP2 | CARRY RESET BUT NOTHING DONE |
| 1 DATA EXCHANGE | 0 INVALID BY CARRY OFF | 1 VALID BY CARRY ON | SWC | DATA EXCHANGE IN PRESENCE OF CARRY |
| 1 DATA EXCHANGE | 1 VALID BY CARRY OFF | 0 INVALID BY CARRY ON | SWN | DATA EXCHANGE IN ABSENCE OF CARRY |
| 1 DATA EXCHANGE | 1 VALID BY CARRY OFF | 1 VALID BY CARRY ON | SWU | DATA EXCHANGE BOTH IN PRESENCE AND ABSENCE OF CARRY |

FIG.69B (ROM 504, FIGS. 65, 68) OPERAND CODE

| OP4 | OP3 | | OP2 | OP1 | OP0 | OPERAND | MEASURING |
|---|---|---|---|---|---|---|---|
| 0 | 0 | FIXED DATA (I) | 0 | 0 | 0 | CST0 | ALL BITS "0" |
| | | | 0 | 0 | 1 | CSTC | "11100000" |
| | | | 0 | 1 | 0 | CSTD | "11010000" |
| | | | 0 | 1 | 1 | CSTE | "00011111" |
| | | | 1 | 0 | 0 | CSTF | ALL BITS "1" |
| | 1 | FIXED DATA (II) | 0 | 0 | 1 | TMIN | MINIMUM SHUTTER TIME |
| | | | 0 | 1 | 0 | TMAX | MAXIMUM SHUTTER TIME |
| | | | 0 | 1 | 1 | AMAX | MAX. APERTURE VALUE |
| | | | 1 | 0 | 0 | TSYN | SPEED LIGHT SYNCHRONIZATION SHUTTER TIME |
| | | | 1 | 0 | 1 | CST1 | CONSTANT 1 (ALL BITS "0") |
| | | | 1 | 1 | 0 | CST2 | CONSTANT 2 (ALL BITS "0") |
| 1 | 1 | INPUT DATA & REGISTER | 0 | 0 | 0 | DR | CONTENT OF D REGISTER |
| | | | 0 | 0 | 1 | DTSV | FILM SENSITIVITY |
| | | | 0 | 1 | 0 | DTTV | SHUTTER TIME |
| | | | 0 | 1 | 1 | DTAV | APERTURE VALUE |
| | | | 1 | 0 | 0 | DTA0 | APERTURE VALUE AT TOTALLY OPENED DIAPHRAGM |
| | | | 1 | 0 | 1 | DTAC | VIGNETTING ERROR |
| | | | 1 | 1 | 0 | BR | CONTENT OF B REGISTER |
| | | | 1 | 1 | 1 | CR | CONTENT OF C REGISTER |

(Leftmost: OP4=0 FIXED DATA; OP4=1 VARIABLE DATA)

FIG. 70a

| ROM ADDRESS | INPUT | | | | | | | | | OUTPUT | | | | | | | | | | | | |
|---|---|---|---|---|---|---|---|---|---|---|---|---|---|---|---|---|---|---|---|---|---|---|
| | PROGRAM CODE | ADDRESS CODE | | | | | | PROGRAM | ADDRESS | INSTRUCTION CODE | | | | OPERAND CODE | | | | | CONTENT | |
| | A7 A6 A5 | A4 | A3 | A2 | A1 | A0 | OCTOMAL | DUOTRIDECIMAL | OP7 | OP6 | OP5 | OP4 | OP3 | OP2 | OP1 | OP0 | INSTRUCTION | OPERAND |
| 0 | 0 0 0 | 0 | 0 | 0 | 0 | 0 | 0 | 0 | 1 | 1 | 0 | 1 | 1 | 1 | 0 | 0 | SWJ | DTV |
| 1 | | | | | | 1 | | 1 | 0 | 0 | 0 | 0 | 0 | 0 | 1 | 0 | NOOP | * |
| 2 | | | | | 1 | 0 | | 2 | 0 | 0 | 0 | 0 | 0 | 1 | 0 | 0 | NOOP | * |
| 3 | | | | | 1 | 1 | | 3 | 0 | 0 | 0 | 0 | 0 | 1 | 1 | 0 | NOOP | * |
| 4 | | | 1 | 0 | 0 | 0 | | 4 | 0 | 0 | 0 | 0 | 1 | 0 | 0 | 0 | NOOP | * |
| 5 | | | | | 0 | 1 | | 5 | 1 | 1 | 0 | 1 | 0 | 0 | 0 | 1 | SWU | BR |
| 6 | | | | | 1 | 0 | | 6 | 1 | 1 | 0 | 1 | 0 | 0 | 1 | 1 | SWU | DR |
| 7 | | | | | 1 | 1 | | 7 | 0 | 0 | 1 | 1 | 1 | 0 | 0 | 1 | ADD | DTSV |
| 8 | | 0 | 0 | 0 | 0 | 0 | | 8 | 0 | 0 | 1 | 1 | 1 | 1 | 0 | 1 | ADD | DTAO |
| 9 | | | | | 0 | 1 | | 9 | 0 | 0 | 1 | 1 | 1 | 1 | 1 | 1 | ADD | DTAC |
| 10 | | | | | 1 | 0 | | A | 0 | 0 | 0 | 0 | 1 | 0 | 1 | 0 | NOOP | * |
| 11 | | | | | 1 | 1 | | B | 1 | 0 | 0 | 1 | 0 | 1 | 1 | 0 | SWG | CSTF |
| 12 | | | | 1 | 0 | 0 | | C | 0 | 1 | 0 | 0 | 0 | 0 | 0 | 1 | SUB | BR |
| 13 | | | | | 0 | 1 | | D | 0 | 1 | 1 | 0 | 1 | 1 | 0 | 1 | LT | DTAO |
| 14 | | | | | 1 | 0 | | E | 1 | 0 | 1 | 1 | 1 | 1 | 0 | 1 | SWC | DTAO |
| 15 | | | | | 1 | 1 | | F | 0 | 1 | 1 | 0 | 1 | 1 | 1 | 1 | LT | AMAX |
| 16 | | | 1 | 0 | 0 | 0 | | G | 1 | 1 | 1 | 0 | 1 | 1 | 1 | 1 | SWN | AMAX |
| 17 | | | | | 0 | 1 | | H | 0 | 0 | 0 | 0 | 1 | 0 | 0 | 0 | NOOP | * |
| 18 | | | | | 1 | 0 | | I | 0 | 1 | 0 | 0 | 1 | 1 | 0 | 1 | SUB | DTAO |
| 19 | | | | | 1 | 1 | | J | 1 | 1 | 0 | 1 | 1 | 0 | 0 | 1 | SWU | CR |
| 20 | | | | 1 | 0 | 0 | | K | 1 | 1 | 0 | 1 | 1 | 1 | 0 | 1 | SWU | DTAO |
| 21 | | | | | 0 | 1 | | L | 0 | 0 | 1 | 1 | 1 | 0 | 0 | 1 | ADD | CR |
| 22 | | | | | 1 | 0 | | M | 0 | 0 | 0 | 0 | 0 | 0 | 0 | 0 | NOOP | * |
| 23 | | | | | 1 | 1 | | N | 0 | 0 | 0 | 0 | 0 | 0 | 0 | 0 | NOOP | * |
| 24 | | 1 | 0 | 0 | 0 | 0 | | O | 0 | 0 | 0 | 0 | 0 | 0 | 0 | 0 | NOOP | * |
| 25 | | | | | 0 | 1 | | P | 0 | 0 | 0 | 0 | 0 | 0 | 0 | 0 | NOOP | * |
| 26 | | | | | 1 | 0 | | Q | 0 | 0 | 0 | 0 | 0 | 0 | 0 | 0 | NOOP | * |
| 27 | | | | | 1 | 1 | | R | 0 | 0 | 0 | 0 | 0 | 0 | 0 | 0 | NOOP | * |
| 28 | | | | 1 | 0 | 0 | | S | 0 | 0 | 0 | 0 | 0 | 0 | 0 | 0 | NOOP | * |
| 29 | | | | | 0 | 1 | | T | 0 | 0 | 0 | 0 | 0 | 0 | 0 | 0 | NOOP | * |
| 30 | | | | | 1 | 0 | | U | 0 | 0 | 0 | 0 | 0 | 0 | 0 | 0 | NOOP | * |
| 31 | | | | | 1 | 1 | | V | 0 | 0 | 0 | 0 | 0 | 0 | 0 | 0 | NOOP | * |

FIG.70b

| ROM ADDRESS | INPUT ||||||||| OUTPUT ||||||||||||
|---|---|---|---|---|---|---|---|---|---|---|---|---|---|---|---|---|---|---|---|---|
| | PROGRAM CODE ||| ADDRESS CODE |||| PROGRAM | ADDRESS | INSTRUCTION CODE ||| OPERAND CODE ||||| CONTENT ||
| | A7 | A6 | A5 | A4 | A3 | A2 | A1 | A0 | OCTOMAL | DUOTRIDECIMAL | OP7 | OP6 | OP5 | OP4 | OP3 | OP2 | OP1 | OP0 | INSTRUCTION | OPERAND |
| 32 | 0 | 0 | 1 | 0 | 0 | 0 | 0 | 0 | 1 | 0 | 1 | 0 | 1 | 1 | 1 | 0 | 1 | 1 | SWU | DTAV |
| 33 | | | | | | | | 1 | | 1 | 0 | 1 | 1 | 1 | 1 | 0 | 0 | 1 | LT | DTAO |
| 34 | | | | | | | 1 | 0 | | 2 | 1 | 0 | 0 | 1 | 1 | 0 | 0 | 0 | SWG | DTAO |
| 35 | | | | | | | 1 | 1 | | 3 | 1 | 1 | 0 | 0 | 1 | 1 | 1 | 0 | LT | AMAX |
| 36 | | | | | | 1 | 0 | 0 | | 4 | 0 | 1 | 1 | 1 | 1 | 0 | 1 | 0 | SWN | AMAX |
| 37 | | | | | | 1 | 0 | 1 | | 5 | 1 | 1 | 1 | 1 | 1 | 0 | 1 | 0 | SWU | BR |
| 38 | | | | | | 1 | 1 | 0 | | 6 | 0 | 0 | 0 | 1 | 0 | 0 | 0 | 1 | ADD | OR |
| 39 | | | | | | 1 | 1 | 1 | | 7 | 0 | 0 | 0 | 1 | 1 | 0 | 0 | 0 | ADD | DTSV |
| 40 | | | | | 1 | 0 | 0 | 0 | | 8 | 0 | 0 | 0 | 1 | 1 | 0 | 1 | 0 | ADD | DTAO |
| 41 | | | | | 1 | 0 | 0 | 1 | | 9 | 0 | 1 | 0 | 1 | 0 | 1 | 1 | 0 | NOOP | DTAC |
| 42 | | | | | 1 | 0 | 1 | 0 | | A | 0 | 0 | 0 | 0 | 0 | 0 | 0 | 1 | NOOP | * |
| 43 | | | | | 1 | 0 | 1 | 1 | | B | 1 | 0 | 1 | 0 | 0 | 1 | 1 | 1 | SWG | CSTF |
| 44 | | | | | 1 | 1 | 0 | 0 | | C | 0 | 1 | 1 | 0 | 1 | 0 | 1 | 0 | SUB | BR |
| 45 | | | | | 1 | 1 | 0 | 1 | | D | 1 | 0 | 1 | 1 | 0 | 1 | 1 | 0 | LT | TMIN |
| 46 | | | | | 1 | 1 | 1 | 0 | | E | 1 | 0 | 0 | 1 | 1 | 0 | 0 | 0 | SWG | TMIN |
| 47 | | | | | 1 | 1 | 1 | 1 | | F | 0 | 1 | 1 | 1 | 1 | 0 | 0 | 1 | LT | TMAX |
| 48 | | | | 1 | 0 | 0 | 0 | 0 | | G | 1 | 1 | 1 | 1 | 1 | 0 | 0 | 0 | SWN | TMAX |
| 49 | | | | 1 | 0 | 0 | 0 | 1 | | H | 1 | 1 | 1 | 1 | 1 | 0 | 1 | 0 | SWU | BR |
| 50 | | | | 1 | 0 | 0 | 1 | 0 | | I | 0 | 0 | 0 | 1 | 1 | 0 | 1 | 0 | SUB | DTAO |
| 51 | | | | 1 | 0 | 0 | 1 | 1 | | J | 1 | 0 | 0 | 1 | 1 | 1 | 1 | 0 | SWU | CR |
| 52 | | | | 1 | 0 | 1 | 0 | 0 | | K | 0 | 0 | 0 | 1 | 1 | 0 | 1 | 0 | ADD | DTAO |
| 53 | | | | 1 | 0 | 1 | 0 | 1 | | L | 0 | 0 | 0 | 1 | 1 | 1 | 1 | 0 | ADD | CR |
| 54 | | | | 1 | 0 | 1 | 1 | 0 | | M | 0 | 0 | 0 | 0 | 0 | 0 | 0 | 0 | NOOP | * |
| 55 | | | | 1 | 0 | 1 | 1 | 1 | | N | 0 | 0 | 0 | 0 | 0 | 0 | 0 | 0 | NOOP | * |
| 56 | | | | 1 | 1 | 0 | 0 | 0 | | O | 0 | 0 | 0 | 0 | 0 | 0 | 0 | 0 | NOOP | * |
| 57 | | | | 1 | 1 | 0 | 0 | 1 | | P | 0 | 0 | 0 | 0 | 0 | 0 | 0 | 0 | NOOP | * |
| 58 | | | | 1 | 1 | 0 | 1 | 0 | | Q | 0 | 0 | 0 | 0 | 0 | 0 | 0 | 0 | NOOP | * |
| 59 | | | | 1 | 1 | 0 | 1 | 1 | | R | 0 | 0 | 0 | 0 | 0 | 0 | 0 | 0 | NOOP | * |
| 60 | | | | 1 | 1 | 1 | 0 | 0 | | S | 0 | 0 | 0 | 0 | 0 | 0 | 0 | 0 | NOOP | * |
| 61 | | | | 1 | 1 | 1 | 0 | 1 | | T | 0 | 0 | 0 | 0 | 0 | 0 | 0 | 0 | NOOP | * |
| 62 | | | | 1 | 1 | 1 | 1 | 0 | | U | 0 | 0 | 0 | 0 | 0 | 0 | 0 | 0 | NOOP | * |
| 63 | | | | 1 | 1 | 1 | 1 | 1 | | V | 0 | 0 | 0 | 0 | 0 | 0 | 0 | 0 | NOOP | * |

FIG.7Oc

| ROM ADDRESS | INPUT ADDRESS (DUOTRIDECIMAL) | OUTPUT INSTRUCTION | OUTPUT OPERAND |
|---|---|---|---|
| 64 | 0 | SWU | DTTV |
| 65 | 1 | NOOP | * |
| 66 | 2 | NOOP | * |
| 67 | 3 | NOOP | * |
| 68 | 4 | NOOP | * |
| 69 | 5 | SWU | BR |
| 70 | 6 | SWU | DR |
| 71 | 7 | SWU | CTSV |
| 72 | 8 | ADD | CSTG |
| 73 | 9 | NOOP | * |
| 74 | A | NOOP | * |
| 75 | B | SWG | CSTF |
| 76 | C | SUB | BR |
| 77 | D | NOOP | * |
| 78 | E | SWG | CSTO |
| 79 | F | LT | CSTO |
| 80 | G | SWH | CSTE |
| 81 | H | NOOP | * |
| 82 | I | SUB | DTAO |
| 83 | J | SWU | CR |
| 84 | K | SWU | DTAO |
| 85 | L | ADD | CR |
| 86 | M | NOOP | * |
| 87 | N | NOOP | * |
| 88 | X | NOOP | * |
| 89 | P | NOOP | * |
| 90 | Q | NOOP | * |
| 91 | R | NOOP | * |
| 92 | S | NOOP | * |
| 93 | T | NOOP | * |
| 94 | U | NOOP | * |
| 95 | V | NOOP | * |

Program code (A7 A6 A5) = 0 1 0 (OCTOMAL = 2) for all rows.

FIG.7Od

| ROM ADDRESS | INPUT | | | | | | | | | | | | OUTPUT | | | | | | | | | | |
|---|---|---|---|---|---|---|---|---|---|---|---|---|---|---|---|---|---|---|---|---|---|---|---|
| | PROGRAM CODE | | ADDRESS CODE | | | | | PROGRAM | ADDRESS | INSTRUCTION CODE | | | OPERAND CODE | | | | | CONTENT | |
| | A7 | A6 | A5 | A4 | A3 | A2 | A1 | A0 | OCTOMAL | DUOTRIDECIMAL | OP7 | OP6 | OP5 | OP4 | OP3 | OP2 | OP1 | OP0 | INSTRUCTION | OPERAND |
| 96 | 0 | 1 | 1 | 0 | 0 | 0 | 0 | 0 | 3 | 0 | 1 | 1 | 1 | 1 | 0 | 0 | 0 | 1 | SWU | CSTF |
| 97 | | | | | | | | 1 | | 1 | 0 | 0 | 0 | 0 | 0 | 0 | 0 | 1 | NOOP | * |
| 98 | | | | | | | 1 | 0 | | 2 | 0 | 0 | 0 | 0 | 0 | 0 | 0 | 1 | NOOP | * |
| 99 | | | | | | | 1 | 1 | | 3 | 0 | 0 | 0 | 0 | 0 | 0 | 0 | 1 | NOOP | * |
| 100 | | | | | | 1 | 0 | 0 | | 4 | 1 | 1 | 1 | 1 | 1 | 1 | 0 | 0 | NOOP | * |
| 101 | | | | | | 1 | 0 | 1 | | 5 | 0 | 0 | 0 | 0 | 1 | 1 | 0 | 0 | SWU | BR |
| 102 | | | | | | 1 | 1 | 0 | | 6 | 0 | 0 | 0 | 0 | 1 | 1 | 1 | 0 | SWU | DR |
| 103 | | | | | | 1 | 1 | 1 | | 7 | 0 | 0 | 0 | 1 | 1 | 1 | 0 | 1 | ADD | DTSV |
| 104 | | | | | 1 | 0 | 0 | 0 | | 8 | 0 | 0 | 0 | 0 | 0 | 0 | 0 | 0 | NOOP | * |
| 105 | | | | | 1 | 0 | 0 | 1 | | 9 | 0 | 0 | 0 | 0 | 0 | 0 | 0 | 0 | NOOP | * |
| 106 | | | | | 1 | 0 | 1 | 0 | | A | 0 | 0 | 0 | 0 | 0 | 0 | 0 | 0 | NOOP | * |
| 107 | | | | | 1 | 0 | 1 | 1 | | B | 0 | 1 | 1 | 1 | 0 | 0 | 0 | 1 | SWC | CSTF |
| 108 | | | | | 1 | 1 | 0 | 0 | | C | 0 | 0 | 0 | 0 | 0 | 0 | 0 | 1 | NOOP | * |
| 109 | | | | | 1 | 1 | 0 | 1 | | D | 1 | 0 | 0 | 0 | 1 | 0 | 1 | 0 | LT | TMIN |
| 110 | | | | | 1 | 1 | 1 | 0 | | E | 0 | 1 | 1 | 0 | 1 | 0 | 1 | 0 | SWC | TMIN |
| 111 | | | | | 1 | 1 | 1 | 1 | | F | 1 | 0 | 0 | 0 | 1 | 0 | 1 | 1 | LT | TMAX |
| 112 | | | | 1 | 0 | 0 | 0 | 0 | | G | 0 | 1 | 1 | 0 | 1 | 0 | 1 | 1 | SWN | TMAX |
| 113 | | | | 1 | 0 | 0 | 0 | 1 | | H | 0 | 1 | 0 | 1 | 1 | 1 | 0 | 0 | SWN | BR |
| 114 | | | | 1 | 0 | 0 | 1 | 0 | | I | 0 | 0 | 1 | 1 | 1 | 0 | 0 | 1 | SUB | DTAO |
| 115 | | | | 1 | 0 | 0 | 1 | 1 | | J | 0 | 1 | 1 | 1 | 1 | 1 | 1 | 0 | SWU | CR |
| 116 | | | | 1 | 0 | 1 | 0 | 0 | | K | 0 | 1 | 1 | 1 | 1 | 0 | 0 | 1 | SWU | DTAO |
| 117 | | | | 1 | 0 | 1 | 0 | 1 | | L | 0 | 0 | 0 | 1 | 1 | 1 | 1 | 0 | ADD | CR |
| 118 | | | | 1 | 0 | 1 | 1 | 0 | | M | 0 | 0 | 0 | 0 | 0 | 0 | 0 | 0 | NOOP | * |
| 119 | | | | 1 | 0 | 1 | 1 | 1 | | N | 0 | 0 | 0 | 0 | 0 | 0 | 0 | 0 | NOOP | * |
| 120 | | | | 1 | 1 | 0 | 0 | 0 | | X | 0 | 0 | 0 | 0 | 0 | 0 | 0 | 0 | NOOP | * |
| 121 | | | | 1 | 1 | 0 | 0 | 1 | | P | 0 | 0 | 0 | 0 | 0 | 0 | 0 | 0 | NOOP | * |
| 122 | | | | 1 | 1 | 0 | 1 | 0 | | Q | 0 | 0 | 0 | 0 | 0 | 0 | 0 | 0 | NOOP | * |
| 123 | | | | 1 | 1 | 0 | 1 | 1 | | R | 0 | 0 | 0 | 0 | 0 | 0 | 0 | 0 | NOOP | * |
| 124 | | | | 1 | 1 | 1 | 0 | 0 | | S | 0 | 0 | 0 | 0 | 0 | 0 | 0 | 0 | NOOP | * |
| 125 | | | | 1 | 1 | 1 | 0 | 1 | | T | 0 | 0 | 0 | 0 | 0 | 0 | 0 | 0 | NOOP | * |
| 126 | | | | 1 | 1 | 1 | 1 | 0 | | U | 0 | 0 | 0 | 0 | 0 | 0 | 0 | 0 | NOOP | * |
| 127 | | | | 1 | 1 | 1 | 1 | 1 | | V | 0 | 0 | 0 | 0 | 0 | 0 | 0 | 0 | NOOP | * |

FIG. 70e

| ROM ADDRESS | INPUT | | | | | | | | | | OUTPUT | | | | | | | | | | | | |
|---|---|---|---|---|---|---|---|---|---|---|---|---|---|---|---|---|---|---|---|---|---|---|---|
| | PROGRAM CODE | | ADDRESS CODE | | | | | PROGRAM OCTOMAL | ADDRESS DUOTRIDECIMAL | INSTRUCTION CODE | | | | OPERAND CODE | | | | | CONTENT | |
| | A7 | A6 | A5 | A4 | A3 | A2 | A1 | A0 | | | OP7 | OP6 | OP5 | OP4 | OP3 | OP2 | OP1 | OP0 | INSTRUCTION | OPERAND |
| 128 | 1 | 0 | 0 | 0 | 0 | 0 | 0 | 0 | 4 | 0 | 1 | 1 | 0 | 0 | 0 | 1 | 1 | 1 | SWU | TSYN |
| 129 | | | | | | | | 1 | | 1 | 0 | 1 | 1 | 1 | 0 | 0 | 1 | 0 | LT | DTTV |
| 130 | | | | | | | 1 | 0 | | 2 | 1 | 0 | 1 | 1 | 0 | 0 | 1 | 0 | SWC | DTTV |
| 131 | | | | | | | | 1 | | 3 | 0 | 0 | 0 | 0 | 0 | 0 | 0 | 0 | NOOP | * |
| 132 | | | | | | 1 | 0 | 0 | | 4 | 0 | 1 | 0 | 0 | 1 | 1 | 0 | 1 | NOOP | * |
| 133 | | | | | | | | 1 | | 5 | 1 | 1 | 1 | 1 | 1 | 1 | 0 | 0 | SWU | BR |
| 134 | | | | | | | 1 | 0 | | 6 | 0 | 0 | 0 | 1 | 1 | 1 | 1 | 0 | SWU | DR |
| 135 | | | | | | | | 1 | | 7 | 0 | 0 | 0 | 0 | 0 | 0 | 0 | 0 | NOOP | * |
| 136 | | | | 0 | 0 | 0 | 0 | 0 | | 8 | 0 | 0 | 0 | 0 | 0 | 0 | 0 | 0 | NOOP | * |
| 137 | | | | | | | | 1 | | 9 | 0 | 0 | 0 | 0 | 0 | 0 | 0 | 0 | NOOP | * |
| 138 | | | | | | | 1 | 0 | | A | 0 | 1 | 1 | 0 | 0 | 1 | 1 | 1 | SWC | CSTF |
| 139 | | | | | | | | 1 | | B | 1 | 0 | 1 | 0 | 1 | 1 | 1 | 1 | SUB | CSTZ |
| 140 | | | | | | 1 | 0 | 0 | | C | 1 | 1 | 0 | 0 | 1 | 1 | 0 | 0 | LT | DTAO |
| 141 | | | | | | | | 1 | | D | 0 | 0 | 0 | 1 | 1 | 1 | 0 | 0 | SWC | DTAO |
| 142 | | | | | | | 1 | 0 | | E | 1 | 0 | 1 | 0 | 1 | 1 | 0 | 1 | LT | AMAX |
| 143 | | | | | | | | 1 | | F | 0 | 0 | 0 | 1 | 1 | 1 | 0 | 1 | SWN | AMAX |
| 144 | | | 0 | 1 | 0 | 0 | 0 | 0 | | G | 0 | 0 | 0 | 0 | 0 | 0 | 0 | 0 | NOOP | * |
| 145 | | | | | | | | 1 | | H | 1 | 1 | 1 | 0 | 1 | 1 | 0 | 0 | SUB | DTAO |
| 146 | | | | | | | 1 | 0 | | I | 0 | 0 | 0 | 1 | 1 | 1 | 1 | 1 | SWU | CR |
| 147 | | | | | | | | 1 | | J | 1 | 1 | 0 | 1 | 1 | 1 | 0 | 0 | SWU | DTAO |
| 148 | | | | | | 1 | 0 | 0 | | K | 0 | 0 | 0 | 1 | 1 | 1 | 1 | 1 | ADD | CR |
| 149 | | | | | | | | 1 | | L | 0 | 0 | 0 | 0 | 0 | 0 | 0 | 0 | NOOP | * |
| 150 | | | | | | | 1 | 0 | | M | 0 | 0 | 0 | 0 | 0 | 0 | 0 | 0 | NOOP | * |
| 151 | | | | | | | | 1 | | N | 0 | 0 | 0 | 0 | 0 | 0 | 0 | 0 | NOOP | * |
| 152 | | | | | 1 | 0 | 0 | 0 | | O | 0 | 0 | 0 | 0 | 0 | 0 | 0 | 0 | NOOP | * |
| 153 | | | | | | | | 1 | | P | 0 | 0 | 0 | 0 | 0 | 0 | 0 | 0 | NOOP | * |
| 154 | | | | | | | 1 | 0 | | Q | 0 | 0 | 0 | 0 | 0 | 0 | 0 | 0 | NOOP | * |
| 155 | | | | | | | | 1 | | R | 0 | 0 | 0 | 0 | 0 | 0 | 0 | 0 | NOOP | * |
| 156 | | | | | | 1 | 0 | 0 | | S | 0 | 0 | 0 | 0 | 0 | 0 | 0 | 0 | NOOP | * |
| 157 | | | | | | | | 1 | | T | 0 | 0 | 0 | 0 | 0 | 0 | 0 | 0 | NOOP | * |
| 158 | | | | | | | 1 | 0 | | U | 0 | 0 | 0 | 0 | 0 | 0 | 0 | 0 | NOOP | * |
| 159 | | | | | | | | 1 | | V | 0 | 0 | 0 | 0 | 0 | 0 | 0 | 0 | NOOP | * |

FIG. 70f

| ROM ADDRESS | PROGRAM CODE A7 A6 A5 A4 | ADDRESS CODE A3 A2 A1 A0 | PROGRAM (OCTOMAL) | ADDRESS (DUOTRIDECIMAL) | OP7 | OP6 | OP5 | OP4 | OP3 | OP2 | OP1 | OP0 | INSTRUCTION | OPERAND |
|---|---|---|---|---|---|---|---|---|---|---|---|---|---|---|
| 160 | 1 0 1 0 | 0 0 0 0 | 5 | 0 | 1 | 1 | 0 | 0 | 1 | 0 | 1 | 1 | SWU | TSYN |
| 161 | | 0 0 0 1 | | 1 | 0 | 0 | 0 | 0 | 0 | 0 | 0 | 0 | NOOP | * |
| 162 | | 0 0 1 0 | | 2 | 0 | 0 | 0 | 0 | 0 | 0 | 0 | 0 | NOOP | * |
| 163 | | 0 0 1 1 | | 3 | 0 | 0 | 0 | 0 | 0 | 0 | 0 | 0 | NOOP | * |
| 164 | | 0 1 0 0 | | 4 | 1 | 1 | 0 | 0 | 1 | 1 | 0 | 0 | SWU | BR |
| 165 | | 0 1 0 1 | | 5 | 1 | 1 | 0 | 0 | 1 | 1 | 1 | 0 | SWU | DR |
| 166 | | 0 1 1 0 | | 6 | 0 | 0 | 0 | 0 | 0 | 0 | 0 | 0 | NOOP | * |
| 167 | | 0 1 1 1 | | 7 | 0 | 0 | 0 | 0 | 0 | 0 | 0 | 0 | NOOP | * |
| 168 | | 1 0 0 0 | | 8 | 0 | 0 | 0 | 0 | 0 | 0 | 0 | 0 | NOOP | * |
| 169 | | 1 0 0 1 | | 9 | 0 | 0 | 0 | 0 | 0 | 0 | 0 | 0 | NOOP | * |
| 170 | | 1 0 1 0 | | A | 1 | 0 | 1 | 0 | 1 | 1 | 1 | 1 | SWC | CSTF |
| 171 | | 1 0 1 1 | | B | 0 | 1 | 1 | 0 | 1 | 1 | 0 | 1 | SUB | CSTZ |
| 172 | | 1 1 0 0 | | C | 0 | 1 | 0 | 0 | 1 | 1 | 0 | 0 | LT | DTAO |
| 173 | | 1 1 0 1 | | D | 1 | 0 | 1 | 0 | 1 | 1 | 0 | 0 | SWC | DTAO |
| 174 | | 1 1 1 0 | | E | 0 | 1 | 0 | 0 | 0 | 0 | 1 | 1 | LT | AMAX |
| 175 | | 1 1 1 1 | | F | 1 | 1 | 0 | 1 | 0 | 0 | 1 | 1 | SWN | AMAX |
| 176 | | 0 0 0 0 | | G | 0 | 0 | 0 | 0 | 0 | 0 | 0 | 0 | NOOP | * |
| 177 | | 0 0 0 1 | | H | 0 | 1 | 1 | 0 | 1 | 1 | 0 | 0 | SUB | DTAO |
| 178 | | 0 0 1 0 | | I | 1 | 1 | 0 | 0 | 1 | 1 | 1 | 1 | SWU | CR |
| 179 | | 0 0 1 1 | | J | 1 | 1 | 0 | 0 | 1 | 1 | 0 | 0 | SWU | DTAO |
| 180 | | 0 1 0 0 | | K | 0 | 0 | 0 | 1 | 1 | 1 | 1 | 1 | ADD | CR |
| 181 | | 0 1 0 1 | | L | 0 | 0 | 0 | 0 | 0 | 0 | 0 | 0 | NOOP | * |
| 182 | | 0 1 1 0 | | M | 0 | 0 | 0 | 0 | 0 | 0 | 0 | 0 | NOOP | * |
| 183 | | 0 1 1 1 | | N | 0 | 0 | 0 | 0 | 0 | 0 | 0 | 0 | NOOP | * |
| 184 | | 1 0 0 0 | | O | 0 | 0 | 0 | 0 | 0 | 0 | 0 | 0 | NOOP | * |
| 185 | | 1 0 0 1 | | P | 0 | 0 | 0 | 0 | 0 | 0 | 0 | 0 | NOOP | * |
| 186 | | 1 0 1 0 | | Q | 0 | 0 | 0 | 0 | 0 | 0 | 0 | 0 | NOOP | * |
| 187 | | 1 0 1 1 | | R | 0 | 0 | 0 | 0 | 0 | 0 | 0 | 0 | NOOP | * |
| 188 | | 1 1 0 0 | | S | 0 | 0 | 0 | 0 | 0 | 0 | 0 | 0 | NOOP | * |
| 189 | | 1 1 0 1 | | T | 0 | 0 | 0 | 0 | 0 | 0 | 0 | 0 | NOOP | * |
| 190 | | 1 1 1 0 | | U | 0 | 0 | 0 | 0 | 0 | 0 | 0 | 0 | NOOP | * |
| 191 | | 1 1 1 1 | | V | 0 | 0 | 0 | 0 | 0 | 0 | 0 | 0 | NOOP | * |

FIG. 70g

| ROM ADDRESS | PROGRAM CODE A7 A6 A5 | ADDRESS CODE A4 A3 A2 A1 A0 | PROGRAM OCTOMAL | ADDRESS DUOTRIDECIMAL | INSTRUCTION CODE OP7 OP6 OP5 | OPERAND CODE OP4 OP3 OP2 OP1 OP0 | INSTRUCTION | OPERAND |
|---|---|---|---|---|---|---|---|---|
| 192 | 1 1 0 | 0 0 0 0 0 | 6 | 0 | 1 1 1 | 0 1 0 1 1 | SWU | TSYN |
| 193 | | 0 0 0 0 1 | | 1 | 0 1 1 | 1 1 0 1 1 | LT | DTTV |
| 194 | | 0 0 0 1 0 | | 2 | 1 0 0 | 1 0 1 0 0 | SWC | DTTV |
| 195 | | 0 0 0 1 1 | | 3 | 0 0 0 | 0 0 0 0 0 | NOOP | * |
| 196 | | 0 0 1 0 0 | | 4 | 0 0 0 | 0 0 0 0 0 | NOOP | * |
| 197 | | 0 0 1 0 1 | | 5 | 1 1 0 | 0 0 1 1 1 | SWU | BR |
| 198 | | 0 0 1 1 0 | | 6 | 1 1 1 | 1 0 0 0 1 | SWU | CSTF |
| 199 | | 0 0 1 1 1 | | 7 | 0 0 0 | 0 0 0 0 0 | NOOP | * |
| 200 | | 0 1 0 0 0 | | 8 | 0 0 0 | 0 0 0 0 0 | NOOP | * |
| 201 | | 0 1 0 0 1 | | 9 | 0 0 0 | 0 0 0 0 0 | NOOP | * |
| 202 | | 0 1 0 1 0 | | A | 0 0 0 | 0 0 0 0 0 | NOOP | * |
| 203 | | 0 1 0 1 1 | | B | 0 0 0 | 0 0 0 0 0 | NOOP | * |
| 204 | | 0 1 1 0 0 | | C | 0 0 0 | 0 0 0 0 0 | NOOP | * |
| 205 | | 0 1 1 0 1 | | D | 0 1 1 | 0 0 0 0 1 | LT | CSTO |
| 206 | | 0 1 1 1 0 | | E | 1 0 1 | 0 0 1 0 1 | SWN | AMAX |
| 207 | | 0 1 1 1 1 | | F | 0 0 0 | 0 0 0 0 0 | NOOP | * |
| 208 | | 1 0 0 0 0 | | G | 1 0 0 | 1 0 0 1 1 | SUB | DTAO |
| 209 | | 1 0 0 0 1 | | H | 1 1 0 | 0 1 0 1 1 | SWU | CR |
| 210 | | 1 0 0 1 0 | | I | 1 1 0 | 1 0 0 1 1 | SWU | DTAO |
| 211 | | 1 0 0 1 1 | | J | 0 1 0 | 0 1 0 1 1 | ADD | CR |
| 212 | | 1 0 1 0 0 | | K | 0 0 0 | 0 0 0 0 0 | NOOP | * |
| 213 | | 1 0 1 0 1 | | L | 0 0 0 | 0 0 0 0 0 | NOOP | * |
| 214 | | 1 0 1 1 0 | | M | 0 0 0 | 0 0 0 0 0 | NOOP | * |
| 215 | | 1 0 1 1 1 | | N | 0 0 0 | 0 0 0 0 0 | NOOP | * |
| 216 | | 1 1 0 0 0 | | X | 0 0 0 | 0 0 0 0 0 | NOOP | * |
| 217 | | 1 1 0 0 1 | | P | 0 0 0 | 0 0 0 0 0 | NOOP | * |
| 218 | | 1 1 0 1 0 | | Q | 0 0 0 | 0 0 0 0 0 | NOOP | * |
| 219 | | 1 1 0 1 1 | | R | 0 0 0 | 0 0 0 0 0 | NOOP | * |
| 220 | | 1 1 1 0 0 | | S | 0 0 0 | 0 0 0 0 0 | NOOP | * |
| 221 | | 1 1 1 0 1 | | T | 0 0 0 | 0 0 0 0 0 | NOOP | * |
| 222 | | 1 1 1 1 0 | | U | 0 0 0 | 0 0 0 0 0 | NOOP | * |
| 223 | | 1 1 1 1 1 | | V | 0 0 0 | 0 0 0 0 0 | NOOP | * |

FIG. 70h

| ROM ADDRESS | INPUT | | | | | | | | | | | | OUTPUT | | | | | | | | | | | | |
|---|---|---|---|---|---|---|---|---|---|---|---|---|---|---|---|---|---|---|---|---|---|---|---|---|---|
| | PROGRAM CODE | | ADDRESS CODE | | | | | PROGRAM | ADDRESS | INSTRUCTION CODE | | | | OPERAND CODE | | | | | CONTENT | | |
| | A7 | A6 | A5 | A4 | A3 | A2 | A1 | A0 | OCTOMAL | DUOTRIDECIMAL | OP7 | OP6 | OP5 | OP4 | OP3 | OP2 | OP1 | OP0 | INSTRUCTION | OPERAND |
| 224 | 1 | 1 | 1 | 0 | 0 | 0 | 0 | 0 | | 0 | 1 | 1 | 1 | 0 | 0 | 1 | 1 | 1 | SWU | TSYN |
| 225 | | | | | | | | 1 | | 1 | 0 | 0 | 0 | 0 | 0 | 0 | 1 | 0 | NOOP | * |
| 226 | | | | | | | 1 | 0 | | 2 | 0 | 0 | 0 | 0 | 0 | 1 | 0 | 0 | NOOP | * |
| 227 | | | | | | | | 1 | | 3 | 0 | 0 | 0 | 0 | 0 | 1 | 1 | 0 | NOOP | * |
| 228 | | | | | | 1 | 0 | 0 | | 4 | 1 | 0 | 0 | 0 | 1 | 0 | 0 | 0 | NOOP | * |
| 229 | | | | | | | | 1 | | 5 | 1 | 1 | 0 | 1 | 1 | 1 | 0 | 0 | SWU | BR |
| 230 | | | | | | | 1 | 0 | | 6 | 1 | 1 | 0 | 1 | 1 | 1 | 1 | 0 | SWU | GSTF |
| 231 | | | | | | | | 1 | | 7 | 0 | 0 | 0 | 0 | 0 | 0 | 0 | 0 | NOOP | * |
| 232 | | | | | 1 | 0 | 0 | 0 | | 8 | 0 | 0 | 0 | 0 | 0 | 0 | 0 | 0 | NOOP | * |
| 233 | | | | | | | | 1 | | 9 | 0 | 0 | 0 | 0 | 0 | 0 | 0 | 0 | NOOP | * |
| 234 | | | | | | | 1 | 0 | | A | 0 | 0 | 0 | 0 | 0 | 0 | 0 | 0 | NOOP | * |
| 235 | | | | | | | | 1 | | B | 0 | 0 | 0 | 0 | 0 | 0 | 0 | 0 | NOOP | * |
| 236 | | | | | | 1 | 0 | 0 | | C | 0 | 0 | 0 | 0 | 0 | 0 | 0 | 0 | NOOP | * |
| 237 | | | | | | | | 1 | | D | 0 | 0 | 0 | 0 | 0 | 0 | 0 | 0 | NOOP | * |
| 238 | | | | | | | 1 | 0 | | E | 0 | 0 | 0 | 0 | 0 | 0 | 0 | 0 | NOOP | * |
| 239 | | | | | | | | 1 | | F | 0 | 1 | 1 | 0 | 0 | 0 | 1 | 1 | LT | CSTO |
| 240 | | | | 1 | 0 | 0 | 0 | 0 | | G | 1 | 1 | 0 | 1 | 1 | 1 | 0 | 1 | SWN | AMAX |
| 241 | | | | | | | | 1 | | H | 0 | 0 | 0 | 0 | 0 | 0 | 0 | 0 | NOOP | * |
| 242 | | | | | | | 1 | 0 | | I | 1 | 0 | 1 | 1 | 1 | 1 | 0 | 1 | SUB | DTAO |
| 243 | | | | | | | | 1 | | J | 1 | 1 | 1 | 1 | 0 | 0 | 1 | 1 | SWU | CR |
| 244 | | | | | | 1 | 0 | 0 | | K | 1 | 1 | 0 | 1 | 1 | 1 | 0 | 1 | SWU | DTAO |
| 245 | | | | | | | | 1 | | L | 1 | 0 | 0 | 1 | 0 | 0 | 1 | 1 | ADD | CR |
| 246 | | | | | | | 1 | 0 | | M | 0 | 0 | 0 | 0 | 0 | 0 | 0 | 0 | NOOP | * |
| 247 | | | | | | | | 1 | | N | 0 | 0 | 0 | 0 | 0 | 0 | 0 | 0 | NOOP | * |
| 248 | | | | | 1 | 0 | 0 | 0 | | O | 0 | 0 | 0 | 0 | 0 | 0 | 0 | 0 | NOOP | * |
| 249 | | | | | | | | 1 | | P | 0 | 0 | 0 | 0 | 0 | 0 | 0 | 0 | NOOP | * |
| 250 | | | | | | | 1 | 0 | | Q | 0 | 0 | 0 | 0 | 0 | 0 | 0 | 0 | NOOP | * |
| 251 | | | | | | | | 1 | | R | 0 | 0 | 0 | 0 | 0 | 0 | 0 | 0 | NOOP | * |
| 252 | | | | | | 1 | 0 | 0 | | S | 0 | 0 | 0 | 0 | 0 | 0 | 0 | 0 | NOOP | * |
| 253 | | | | | | | | 1 | | T | 0 | 0 | 0 | 0 | 0 | 0 | 0 | 0 | NOOP | * |
| 254 | | | | | | | 1 | 0 | | U | 0 | 0 | 0 | 0 | 0 | 0 | 0 | 0 | NOOP | * |
| 255 | | | | | | | | 1 | | V | 0 | 0 | 0 | 0 | 0 | 0 | 0 | 0 | NOOP | * |

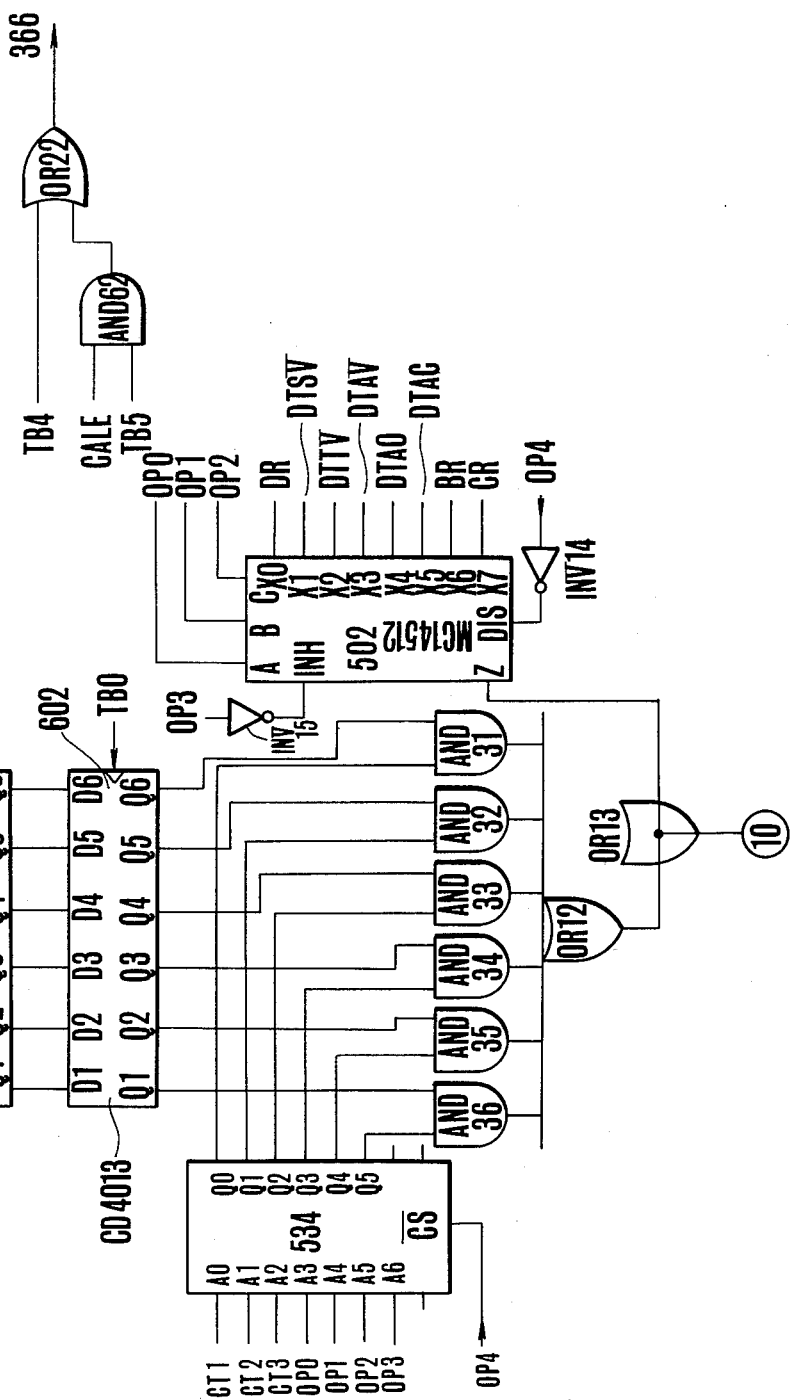

FIG.76
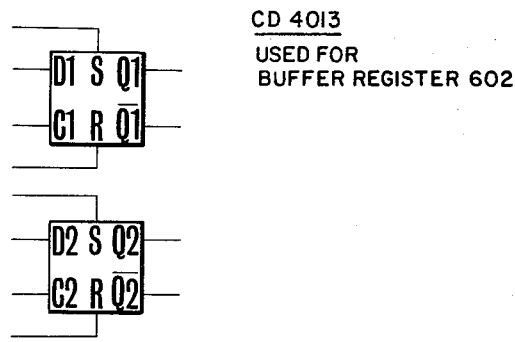
CD 4013
USED FOR
BUFFER REGISTER 602
FIG.77    LOGIC CIRCUIT 592
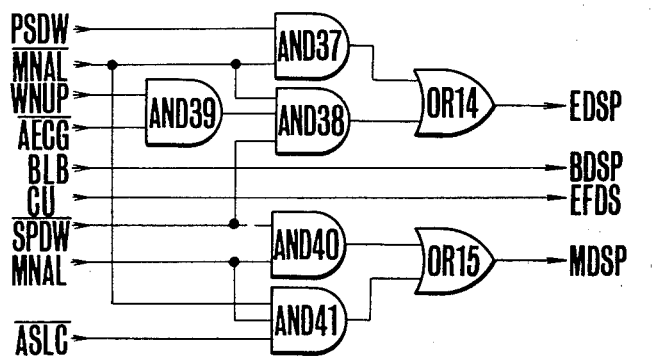
FIG.78
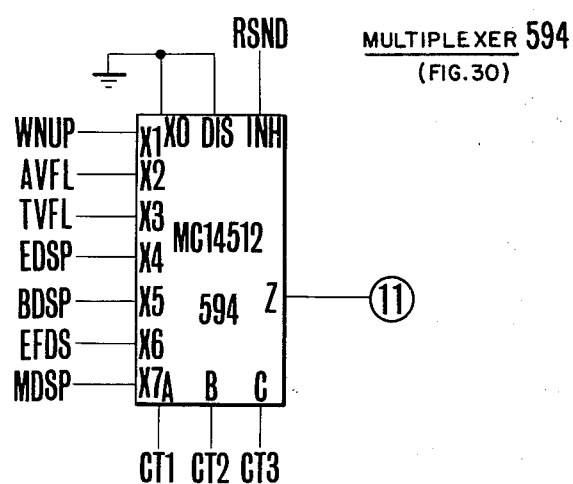
MULTIPLEXER 594
(FIG.30)

FIG. 79

OPERATION CIRCUIT 596 (FIG. 30)

PROGRAM COUNTER 582 Q5
DECODER 600 S11

| TIMING PULSE / BAS LINE | TB0 | TB1 | TB2 | TB3 | TB4 | TB5 | TB6 | TB7 |
|---|---|---|---|---|---|---|---|---|
| BAS LINE 366 | 0 | 0 | 0 | 0 | 1 | CALE | ADCE | INTG |
| INPUT BAS LINE 370 | — | ADOF | AELK | AECG | WNUP | AO | CU | — |
| OUTPUT BAS LINE 374 | — | WNUP | TVFL | AVFL | EDSP | BDSP | EFDS | MDSP |
| TV, AV, AV0, AVs, DD, | 1/8 | 1/4 | 1/2 | 1 | 2 | 4 | 8 | 16 |

FIG.99

| 16 | 8 | 4 | 2 | 1 | 1/2 | 1/4 | 1/8 | BV (APEX) | SV (ASA) | TV (SHUTTER) TIME | AV, AV₀ AMAX (F-NO.) | EV (APEX) | ADC INPUT (V) | APERTURE VALUE SET FROM SPEED LIGHT SIDE (F-NO.) |
|---|---|---|---|---|---|---|---|---|---|---|---|---|---|---|
| 0 | 0 | 0 | 0 | 0 | 0 |   |   |   | 12 | bulb | □P |   |   |   |
| 0 | 0 | 0 | 0 | 0 | 1 |   |   | -8 |   |   | □□ |   | 2.550 |   |
| 0 | 0 | 0 | 0 | 1 | 0 |   |   |   | 24 |   | □□ |   |   |   |
| 0 | 0 | 0 | 0 | 1 | 1 |   |   | -7 |   |   | □□ |   | 2.475 |   |
| 0 | 0 | 0 | 1 | 0 | 0 |   |   |   | 50 |   | 1.2 |   |   |   |
| 0 | 0 | 0 | 1 | 0 | 1 |   |   | -6 |   |   | 1.4 |   | 2.400 |   |
| 0 | 0 | 0 | 1 | 1 | 0 |   |   |   | 100 |   | 1.8 |   |   |   |
| 0 | 0 | 0 | 1 | 1 | 1 |   |   | -5 |   |   | 2.0 |   | 2.325 |   |
| 0 | 0 | 1 | 0 | 0 | 0 |   |   |   | 200 | 64 | 2.5 |   |   |   |
| 0 | 0 | 1 | 0 | 0 | 1 |   |   | -4 |   |   | 2.8 |   | 2.250 |   |
| 0 | 0 | 1 | 0 | 1 | 0 |   |   |   | 400 | 32 | 3.5 |   |   |   |
| 0 | 0 | 1 | 0 | 1 | 1 |   |   | -3 |   |   | 4.0 |   | 2.175 |   |
| 0 | 0 | 1 | 1 | 0 | 0 |   |   |   | 800 | 16 | 4.5 |   |   |   |
| 0 | 0 | 1 | 1 | 0 | 1 |   |   | -2 |   |   | 5.6 | -5 | 2.100 |   |
| 0 | 0 | 1 | 1 | 1 | 0 |   |   |   | 1600 | 8 | 6.3 |   |   |   |
| 0 | 0 | 1 | 1 | 1 | 1 |   |   | -1 |   |   | 8.0 | -4 | 2.025 |   |
| 0 | 1 | 0 | 0 | 0 | 0 |   |   |   | 3200 | 4 | 9.5 |   |   |   |
| 0 | 1 | 0 | 0 | 0 | 1 |   |   | 0 |   |   | 11 | -3 | 1.950 |   |
| 0 | 1 | 0 | 0 | 1 | 0 |   |   |   | 6400 | 2 | 13 |   |   |   |
| 0 | 1 | 0 | 0 | 1 | 1 |   |   | 1 |   |   | 16 | -2 | 1.875 |   |
| 0 | 1 | 0 | 1 | 0 | 0 |   |   |   | 12800 | 1 | 19 |   |   |   |
| 0 | 1 | 0 | 1 | 0 | 1 |   |   | 2 |   |   | 22 | -1 | 1.800 |   |
| 0 | 1 | 0 | 1 | 1 | 0 |   |   |   |   | 1/2 |   |   |   |   |
| 0 | 1 | 0 | 1 | 1 | 1 |   |   | 3 |   |   |   | 0 | 1.725 |   |
| 0 | 1 | 1 | 0 | 0 | 0 |   |   |   |   | 1/4 |   |   |   |   |
| 0 | 1 | 1 | 0 | 0 | 1 |   |   | 4 |   |   |   | 1 | 1.650 |   |
| 0 | 1 | 1 | 0 | 1 | 0 |   |   |   |   | 1/8 |   |   |   |   |
| 0 | 1 | 1 | 0 | 1 | 1 |   |   | 5 |   |   |   | 2 | 1.575 |   |
| 0 | 1 | 1 | 1 | 0 | 0 |   |   |   |   | 1/16 |   |   |   |   |
| 0 | 1 | 1 | 1 | 0 | 1 |   |   | 6 |   |   |   | 3 | 1.500 | 1.0 |
| 0 | 1 | 1 | 1 | 1 | 0 |   |   |   |   | 1/30 |   |   |   |   |
| 0 | 1 | 1 | 1 | 1 | 1 |   |   | 7 |   |   |   | 4 | 1.425 | 1.4 |
| 1 | 0 | 0 | 0 | 0 | 0 |   |   |   |   | 1/60 |   |   |   |   |
| 1 | 0 | 0 | 0 | 0 | 1 |   |   | 8 |   |   |   | 5 | 1.350 | 2.0 |
| 1 | 0 | 0 | 0 | 1 | 0 |   |   |   |   | 1/125 |   |   |   |   |
| 1 | 0 | 0 | 0 | 1 | 1 |   |   | 9 |   |   |   | 6 | 1.275 | 2.8 |
| 1 | 0 | 0 | 1 | 0 | 0 |   |   |   |   | 1/250 |   |   |   |   |
| 1 | 0 | 0 | 1 | 0 | 1 |   |   | 10 |   |   |   | 7 | 1.200 | 4.0 |
| 1 | 0 | 0 | 1 | 1 | 0 |   |   |   |   | 1/500 |   |   |   |   |
| 1 | 0 | 0 | 1 | 1 | 1 |   |   | 11 |   |   |   | 8 | 1.125 | 5.6 |
| 1 | 0 | 1 | 0 | 0 | 0 |   |   |   |   | 1/1000 |   |   |   |   |
| 1 | 0 | 1 | 0 | 0 | 1 |   |   | 12 |   |   |   | 9 | 1.050 | 8.0 |
| 1 | 0 | 1 | 0 | 1 | 0 |   |   |   |   | 1/2000 |   |   |   |   |
| 1 | 0 | 1 | 0 | 1 | 1 |   |   | 13 |   |   |   | 10 | 0.975 | 11 |
| 1 | 0 | 1 | 1 | 0 | 0 |   |   |   |   |   |   |   |   |   |
| 1 | 0 | 1 | 1 | 0 | 1 |   |   | 14 |   |   |   | 11 | 0.900 | 16 |
| 1 | 0 | 1 | 1 | 1 | 0 |   |   |   |   |   |   |   |   |   |
| 1 | 0 | 1 | 1 | 1 | 1 |   |   | 15 |   |   |   | 12 | 0.825 | 22 |
| 1 | 1 | 0 | 0 | 0 | 0 |   |   |   |   |   |   |   |   |   |
| 1 | 1 | 0 | 0 | 0 | 1 |   |   | 16 |   |   |   | 13 | 0.750 | 32 |
| 1 | 1 | 0 | 0 | 1 | 0 |   |   |   |   |   |   |   |   |   |
| 1 | 1 | 0 | 0 | 1 | 1 |   |   | 17 |   |   |   | 14 | 0.675 | 45 |
| 1 | 1 | 0 | 1 | 0 | 0 |   |   |   |   |   |   |   |   |   |
| 1 | 1 | 0 | 1 | 0 | 1 |   |   | 18 |   |   |   | 15 | 0.600 |   |
| 1 | 1 | 0 | 1 | 1 | 0 |   |   |   |   |   |   |   |   |   |
| 1 | 1 | 0 | 1 | 1 | 1 |   |   | 19 |   |   |   | 16 | 0.525 |   |
| 1 | 1 | 1 | 0 | 0 | 0 |   |   |   |   |   |   |   |   |   |
| 1 | 1 | 1 | 0 | 0 | 1 |   |   | 20 |   |   |   | 17 | 0.450 |   |
| 1 | 1 | 1 | 0 | 1 | 0 |   |   |   |   |   |   |   |   |   |
| 1 | 1 | 1 | 0 | 1 | 1 |   |   | 21 |   |   |   | 18 | 0.375 |   |
| 1 | 1 | 1 | 1 | 0 | 0 |   |   |   |   |   |   |   |   |   |
| 1 | 1 | 1 | 1 | 0 | 1 |   |   | 22 |   |   |   | 19 | 0.300 |   |
| 1 | 1 | 1 | 1 | 1 | 0 |   |   |   |   |   | cL |   |   |   |
| 1 | 1 | 1 | 1 | 1 | 1 |   |   | 23 |   |   |   | 20 | 0.225 |   |

F I G.100

| APERTURE VALUE OF TOTALLY OPENED DIAPHRAGM $AV_G$ | VIGNETTING ERROR $AV_G$ IN BINARY CODE | | | | | | | |
|---|---|---|---|---|---|---|---|---|
| | 16 | 8 | 4 | 2 | 1 | 1/2 | 1/4 | 1/8 |
| 1.2 | 0 | 0 | 0 | 0 | 1 | 0 | 1 | 0 |
| 1.4 | 0 | 0 | 0 | 0 | 1 | 0 | 0 | 0 |
| 1.8 | 0 | 0 | 0 | 0 | 0 | 1 | 1 | 0 |
| 2.0 | 0 | 0 | 0 | 0 | 0 | 1 | 0 | 0 |
| 2.5 | 0 | 0 | 0 | 0 | 0 | 0 | 1 | 0 |
| 2.8 | 0 | 0 | 0 | 0 | 0 | 0 | 0 | 0 |

F I G.101

CAMERA SYSTEM

BACKGROUND OF THE INVENTION

1. Field of the Invention

This invention relates to photographic systems, particularly to a camera system which responds to various demands placed thereon. When taking a picture with a camera, it is necessary to consider the total photographic system, i.e., the overall photographic environment. The term "photographic system" here is used to define a combination of five elements. The first of these is what is herein called the "object system", and refers to what is generally called "the subject or object to be photographed". It includes the entire object field appearing on the picture plane. The second element is the projection system. This serves to form the optical image of the object system on a recording location such as an image plane. It includes such things as the camera's optical arrangement and the camera assemblage with its various mechanism.

The third element is the recording system for recording the optical image formed by the projection system in a particular form in accordance with a particular desired purpose. In an ordinary camera, the recording system is in the form of a film. However, light sensing means other than photographic light sensing materials participate in the recording process. Thus, it is possible to think of the recording system as an image system with a recorder at its center.

The fourth element is an adjusting system for producing the desired image. The fifth system is the observation system which provides the information to a human for setting the adjusting system.

2. Description of the Prior Art

When we think of a camera device for taking a picture, the photographic system as total system can not be disregarded. What is called the photographic system here is the combination of the five elements, namely the object system, the projection system, the recording system, the adjusting system and the observation system.

Hereby the important system for an ordinary camera is the projection system. Control of this projection system affects the object system, the recording system, the adjusting system and the observation system, and is greatly influenced by the data or the fed back data from these systems. In consequence when one refers to a camera one often means the projection system. Yet it is essential for a camera to establish an overall photographic arrangement and take into account the interaction between various systems.

When such a camera device is thought of from the view point of the photographic work on the actual spot, the problem of the operability which has one of the most important connection with the photographer who is the subject of the projection system should be pointed out beside the problem of the optical and the mechanical precision, or of the efficiency.

The projection system, namely the camera device can, as has already been explained, be divided into two systems, namely the optical arrangement and the body assemblage. The efficiencies of these two are different in accordance with the type of camera. In an ordinary single reflex camera as one example, the optical arrangement involves the focusing efficiency and the aperture adjusting efficiency while the body assemblage involves the shutter efficiency and the finder efficiency. These functions have an important relation with the operability of the camera's aperture determining operation, speed determining operation, focusing operation framing operation and so on.

Of the above, the operation for determining the aperture value and that for calculating the exposure time are mutually dependent for deciding the total exposure. They have different effects on the exposure conditions so that it is necessary to have them operate properly. Specifically when taking a picture the shutter is operated after the focusing operation, the framing operation and the exposure setting operation. It is conventional to control the aperture value and the shutter speed in order to control the exposure. However, one purpose for controlling the aperture value is to the aperture value can be selected in order to makes the main object stand out by focusing out the background. On the other hand, the shutter speed should be selected to prevent the effect of the vibration of the camera and to stop or emphasize movement. Thus when taking a picture the aperture value and the shutter speed are the variables to be selected independently from each other.

In consequence, it goes without saying that the exposure amount should be considered in connection with the photographic system as a whole. In the camera for the exposure value $EV=11$, there are 11 combinations of the aperture values with the shutter times. These are as follows: (F1: 1/2000 sec.) (F1.4: 1/000 sec.) (F2: 1/500 sec.) (F2.8: 1/250 sec.) (F4: 1/125 sec.) (F5.6: 1/60 sec.) (F8: 1/30 sec.) (F11: 1/15 sec.) (F16: ⅛ sec.) (F22: ¼ sec.) and (F32: ½ sec.). Theoretically, any one of the above combinations produces the same total exposure. However, as mentioned, the aperture and the shutter control not only the total exposure. The aperture affects the depth of field and the image definition while the shutter time directly affects the ability to catch an object in motion and so on. Although they give the same exposure amount, the combination of F1 at 1/2000 sec. produces a different photographic image than F32 at ½ sec. when the above-mentioned conditions are taken into consideration.

In a camera with an automatic exposure control device, namely an AE (automatic exposure) camera, a mechanism automatically controls the aperture, the shutter time or their combination for obtaining the proper or the desired exposure of the object for the sensitivity of the film. This contrasts with a manual camera where it is necessary for the photographer to select a proper exposure value and a proper exposure time suited for the photographic purpose on the basis of the object brightness measured by means of the exposure meter and on the basis of the film sensitivity. With an AE camera, the photographer can do other work while taking a picture. This permits efficient and rapid photography so that such cameras are widely used.

Three AE camera systems are presently used. The first one is the so-called shutter or shutter time, priority system. This obtains the proper exposure by automatically controlling the aperture value of the photographic lens as the operation results of the brightness of the object. The shutter time is optionally decided by the photographer. The film sensitivity and so on are given in advance.

The second one is the so-called aperture, or aperture value, priority system for obtaining a proper exposure by automatically controlling the shutter time on the basis of the brightness of the object. The aperture value is selected by the photographer. The film sensitivity and so on are entered in advance.

The third one is the so-called program system for obtaining the proper exposure. Here, the total exposure is automatically calculated on the basis of the object brightness, the film sensitivity and so on. The camera selects the predetermined combination of the aperture value of the photographic lens and the shutter time for obtaining the above-mentioned exposure amount. Thus, neither the shutter time nor the aperture value is decided by the photographer.

Each of the above-mentioned systems has its own advantages. However, each of them also has its own shortcomings.

In the shutter speed priority system, the shutter time can be optionally selected in advance. This is useful for catching a speedy object, for snapshot photography or for telephotography in which the shorter shutter time can be selected to overcome movement of the object or an unstable camera. The depth of field is subject to the aperture value of the photographic lens automatically operated in the camera device in accordance with the shutter time set in advance. Thus, this cannot be said to be a proper exposure control system for taking a picture of a landscape or of a still life. There, depth of field plays in important part in a picture.

In the second system, namely the aperture value priority system, quite the opposite is true. The depth of field can be selected while the shutter time cannot be selected by the photographer. Thus, an automatically produced slow shutter time may result in a blurred picture. Therefore, this cannot be said to be a proper exposure control system for a quickly moving object or for a manually held camera.

In the third system, namely the program system where only the proper exposure is taken into consideration, the photographic conditions cannot be selected by the photographer. In consequence, the above-mentioned program system is used in a simple middle quality camera.

In an AE camera, the shutter time setting dial is at the position equivalent to the aperture value setting ring. In the APEX system series, the shutter time TV and the aperture value AV are in the following relationship for the exposure amount:

$$EV = TV + AV \tag{1}$$

so that when the shutter time setting dial is handled, the aperture value is varied in order to obtain a certain exposure amount while the aperture setting ring is handled, the shutter time is varied. In consequence, whether the shutter time setting dial or the aperture setting ring is handled, the result is the same, namely there is no need for dividing the case into two.

An aperture priority AE camera known at present is the aperture value priority AE camera in which the automatically controlled shutter time is not transmitted to the photographer at all. If the automatically controlled shutter time is displayed in the viewfinder and the exposure is controlled while the eye is put on the viewfinder, no matter whether the aperture setting ring or the shutter time setting dial is operated, the exposure is controlled while the displayed shutter time is observed in such a manner that the effect is the same as when the shutter time setting dial is handled and the camera can be considered to be a shutter time priority AE camera in this meaning.

Namely, the aperture value priority system AE camera and the shutter time priority system AE camera are reversible in their position depending upon how one uses it and how one thinks.

To summarize the above, the aperture value of the photographic lens and the shutter time are factors very important for deciding the total exposure. When the automatic exposure control efficiency is accorded to the camera, it is necessary to treat the aperture value and the shutter time equally. This is a problem to be especially considered because the reason for according the automatic exposure efficiency to the camera is not only for simplification of the camera handling but also for increasing snap photographic efficiency as well as for allowing the photographer to concentrate more on the framing at the time of camera handling.

Further, before discussing the total exposure, let us consider two systems, namely the object system and the recording system between which the camera as the projection system is located.

At the time of taking a picture, it is necessary for the object system, namely the object field to have its own brightness, called the object brightness and represented BV in APEX system series. Further, the recording system, for example, the photosensitive film has a sensitivity called the film speed normally represented ASA by SV in the APEX system series.

As is well known in the APEX system series, the object brightness BV and the film speed SV are the factors in deciding the exposure amount EV in accordance with the following relationship:

$$BV + SV = EV \tag{2}$$

The upper and lower limit of the EV range settable in the camera, namely in the projection system, can be made infinite by making the shutter time infinitely long or by the lens attenuating the light. From the viewpoint of a proper exposure, there must be a limit.

In consequence, at the time of taking a picture of an object field at low brightness, namely the BV value is low. It is sufficient to make the film speed SV larger as is clear from relationship (2). On the other hand, at the time of taking an object field with the high brightness, naturally it is sufficient to make the film speed SV smaller. This is an important role in the recording system of the photographic system. Seen from the camera, the recording system can only participate in the film support, the film exchange or the film feeding and not in the alternation of the sensitivity. The only one that is possible is to prepare a film with ultra high sensitivity and to put film with various permiability selectively into the optical path of the projection system so as to alter the sensitivity of the film in an equivalent way. At the present technical level, there is a limit in raising the sensitivity of the film so that it is not easy to use the above method.

On the other hand, when it is desired to obtain a constant exposure while the film sensitivity SV is permitted to be constant, it is necessary to alter the brightness of the object, which is the well known lighting.

Although various methods for the lighting can be through of, now let us take the speed light or flash unit most generally used in connection with a camera.

The intensity of the light from a flash unit is indicated by the guide number. Generally, the aperture value of the lens is decided from the distance to the object and the guide number. However, quite recently, attempts have been made to obtain the proper exposure automatically even while taking a picture with the speed light device. This involves a system in accordance with which light reflected from the object field is detected and the lighting stopped as soon as the amount of the reflected light reaches a predetermined value. Although such a flash unit is part of the object system, it is necessary that it operate in close connection with the camera, i.e., the projection system, because its light time is very short. A device which never disturbs the operability of the camera nor decreases the freedom of the framing by the photographer is especially desired.

Generally, framing as well as focusing are carried out through the viewfinder while operating the camera. Basically, the so-called viewfinder allows the photographer to conform the image of the object to be projected on the film plane. However, at present the viewfinder also serves for focusing.

In a single reflex camera with a built-in light measuring mechanism, light measurement involves the viewfinder.

As mentioned above, the viewfinder plays an important part in the camera handling and can be said to have an important relation with the operability of the camera, for most of the camera operation including the framing and the focusing operation, as the basic operation is carried out through the viewfinder.

Consequently, the information centralizing viewfinder has become widely adopted in such a manner that the photographer can obtain all of the photographic data through the viewfinder. These data have to be displayed in a limited space so that ease of observation and confirmation of the data is required.

Cameras are now used in dim conditions. Hence, it is necessary that the data be displayed in the viewfinder in a dark place just as in a bright place.

Among the camera operations, the framing operation and the focusing operation have a close connection with the portability of the camera body and the operability of the parts. Namely, when taking a picture, it is necessary that the framing be decided by the viewfinder while the camera body is being held in the hands, while the focusing is carried out by operating the distance ring of the lens and the shutter is released at the desired time after operation, for deciding the exposure and others. Hence, it is necessary to arrange the parts in a rational way so as not to prevent the operability of other parts.

To speak more particularly of the operability, the projection system serves to fix a certain moment in the recording system so that it is essential that an absolute counter-measures against the misoperation or the mishandling should be used.

As mentioned above, the operability of the camera can be largely improved by combining the basic operations, such as the operation for deciding the exposure, the framing operation and the focusing operation without auxiliary operations.

It is an object of the invention to provide a camera capable of operating as a total photographic system.

SUMMARY OF THE INVENTION

A purpose of the present invention is to provide a camera capable of performing as a projection sub-system in an overall photographic system.

Another purpose of the present invention is to provide a camera capable of enabling efficient operation by the photographer and at the same time, realizing the photographer's intention in taking the picture.

Further, another purpose of the present invention is to provide a camera with an automatic exposure control mechanism for automatically controlling the exposure.

Further, another purpose of the present invention is to provide a compact and economical camera with an automatic exposure control mechanism with both aperture and shutter priority whereby the shutter time priority system or the aperture value priority system can optionally be selected in such a manner that the proper control system can freely be selected so that to meet the exposure conditions desired by the photographer.

Further, another purpose of the present invention is to offer a camera with a flash unit to be combined with the camera body so as to furnish an efficient and suitable exposure.

Further, another purpose of the present invention is to provide a camera with means for effectively displaying to the photographer as much data as possible in the viewfinder for framing and focusing.

Further, another purpose of the present invention is to provide a camera with improved picture taking by arranging the parts in such a manner so that they cooperate with each other efficiently.

Further, another purpose of the present invention is to offer a camera system applicable to all types of cameras, where various camera operations or means peculiar to the camera can can be optionally selected by forming most of the control parts with the digital electrical circuits which can be integrated and at the same time introducing sequence controllability.

Further, another purpose of the present invention is to offer a compact and economical camera system usable with a single reflex camera with a through the lens measuring system (hereinafter called TTL light measuring system) and suited for the series production.

Further, other purposes of the present invention will be disclosed in accordance with the explanation of the embodiments.

BRIEF DESCRIPTION OF THE DRAWINGS

FIGS. 1a through 1f show six views of the camera to be used on an embodiment of the camera system in accordance with the present invention;

FIG. 2 shows the lens device 2 and the camera body 4 of the camera shown in FIG. 1 in separated perspective view;

FIG. 7 shows an incident light exposure meter to be used with the camera system in accordance with the present invention in perspective view;

FIG. 8 shows an embodiment of the motor drive to be used with the camera system in accordance with the present invention in perspective view;

FIG. 9 shows the finder information seen through the finder window 13 of the camera;

FIGS. 10a through 10(f) show examples of the finder data shown in FIG. 9;

FIGS. 11A and 11B show a logical diagram of the relationship between the photographic modes of the camera;

FIG. 12 shows a concrete disposition for taking the digital data relative to the film sensitivity out of the ASA sensitivity setting dial 40;

FIG. 17 shows a logical diagram of the operation of the Flip-Flop shown in FIG. 16;

FIG. 18 shows a concrete disposition for taking the data set by means of the dial 34 and the information as to the state of the mode selector switch 38;

FIG. 19 shows details to obtain the largest aperture value of the lens 2;

FIG. 20 shows a table of the input timing of various data;

FIGS. 21 and 22 show concrete disposition for taking the state of various kinds of switches;

FIG. 24 shows a block diagram of the external light measuring instrument;

FIG. 29 shows a table for explaining the relationship between the various photographic modes by means of the TTL light measurement and of the external light measurement and corresponding operational routines;

FIG. 31 shows the details of the generating circuit of the clock pulse;

FIG. 32 shows a time chart for showing the waveforms of the output pulses out the system pulse generator;

FIG. 47 shows a logic diagram for explaining the CU and the AO signals;

FIG. 49 shows a block diagram of the I.C. circuit element MC14520;

FIG. 50 shows a logic diagram of one of the counters shown in FIG. 49;

FIG. 53 shows a logic diagram of the I.C. circuit element MC14512;

FIG. 54 shows the truth table of the I.C. circuit element shown in FIG. 53;

FIG. 55 shows a time chart for explaining the operation of the input control part;

FIGS. 56 and 57 show a time chart for explaining the state of the A-D conversion at the input control part;

FIGS. 69A and 69B show charts for explaining the output codes of the instruction ROM504;

FIGS. 70a through 70h show comparison tables between the address of the instructions ROM504 and the instructions as well as the operand codes.

FIG. 74 shows a logic diagram of the logic circuit 598;

FIG. 75 shows a detailed circuit arrangement of the data selector 502 and the fixed tenter ROM534 as well as the circuit for taking the largest aperture value AMAX of the photographic lens 2 to be used;

FIG. 76 shows a block diagram of the I.C. circuit element CD4013;

FIG. 77 shows a logic diagram of the logic circuit 592;

FIG. 78 shows a block diagram of the multiplexer 594;

FIG. 79 shows a logic diagram of the operation circuit 500;

FIG. 99 shows a comparison table between the data and the binary codes;

FIG. 100 shows a comparison table between the input smallest aperture value of the vignetting error ROM 528 and the binary codes of the output vignetting error;

FIG. 101 shows respectively a comparison table between the binary codes and the display codes of the aperture value display decoder ROM 702, the shutter time display decoder ROM 704 and the signal display decoder ROM 706.

Figure 3:
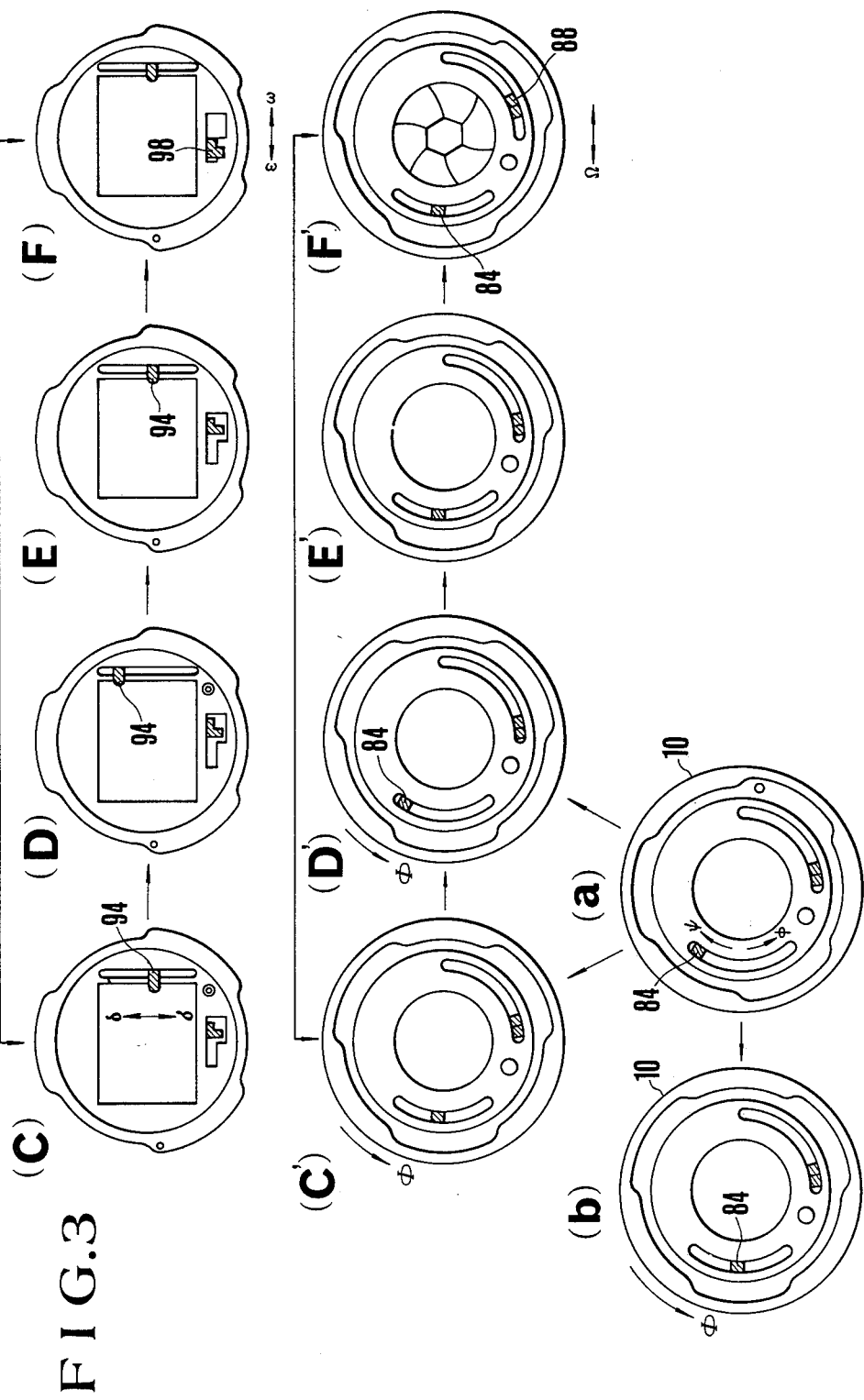
FIG. 3 shows the operation of each lever in the state in which some aperture value is preset at the side of the lens 2.

The present invention will be explained in more detail in accordance with the accompanying drawings.

DETAILED EXPLANATION OF THE DRAWINGS:

FIG. 1 shows six views of a camera forming an embodiment of the camera system in accordance with the present invention. Here FIG. 1(a) is a front view of a camera.

FIG. 1(b) is a plane view.

FIG. 1(c) is a bottom view.

FIG. 1(d) is a right side view.

FIG. 1(e) is a left side view.

FIG. 1(f) is a rear view of the camera.

The camera shown in the drawings is a single reflex camera including an automatic exposure control mechanism with both aperture and shutter priorities and a TTL light measuring system. The components are disposed to facilitate operability.

In the camera, a lens 2 forms an optical system on a body 4. Various combinations of different lenses with the camera body permit a wide range of photographic possibilities.

The lens 2 includes a distance adjusting ring 6 and an aperture adjusting ring 8, and is mounted on the body 4 by means of the clamping ring 10. The image forming i.e., focusing position of the lens 2 can be changed by means of the distance adjusting ring 6. The aperture value can be preset by the aperture adjusting ring 8 by setting the aperture value indications 9, the aperture adjusting ring 8 at the index 7 on the lens barrel of the lens 2. Normally, the lens 2 is in the totally opened state. The preset aperture value is obtained by closing the diaphragm blades of the lens 2 down to a preset position with the driving power supplied from the camera body 4 during exposure upon shutter release.

In principle, the operational emphasis of this camera is put on the controllability of the automatic control so that the aperture adjusting ring 8 is arranged so that the aperture value can be preset from the body 4 when the mark 12 on the aperture adjusting ring 8 is set at the index 7. This mechanism plays an essential part of the aperture control of this camera. Further, this lens 2 includes a mechanism for transmitting the information such as the aperture value of the totally opened diaphragm to the camera body 4. This mechanism plays an important role for transmitting necessary information to the camera body to carry out the exposure control.

The camera body 4 constitutes a dark box in which the image of the object to be photographed introduced by the lens 2 is formed on the film plane. The 35 m/m roll film in a cartridge is wound up on a spool one frame at a time to change the film exposed. A focal plane shutter with two shutter curtains or running screens covers the film behind the lens 2. As will be explained, the drive power of the two screens is produced by a spring while the starting time of the two screens is controlled electrically. The camera body 4 contains a viewfinder mechanism mainly composed of a quick return mirror and a pentagonal prism. The viewfinder mechanism is such that the framing operation and the focusing operation, before taking a picture, can be carried out through the viewfinder window 13. This viewfinder mechanism is the same as that of a conventional single reflex camera. The only difference lies in the fact that almost all of the information necessary for taking a picture can be obtained through the viewfinder window 13. The viewfinder mechanism is provided with TTL light measuring ability for measuring the object brightness introduced through the lens 2 so as to obtain the object brightness information (APEX value: BV) necessary for the operation for the automatic exposure control.

A winding lever 14 winds the film one frame at a time and energizes the springs for driving the necessary mechanical components during shutter release. The number of the frames of film wound by means of the winding lever 14 is displayed in a film counter 15. The button 16 at the center of rotation of the winding lever 14 is that for multiple exposures, so that when the winding lever 14 is operated while the button is being pushed down, only the necessary mechanical components are charged and the film is not wound. The winding lever 14 also serves as the power source switch for the electrical components in the camera by switching on a power source when the lever 14 is moved a little along the direction of the arrow α. This is useful for preventing the effects of careless failure to switch off the power source because automatic exposure control mechanisms in this kind of camera drain the power source enough to create the possibility of misoperation.

A shutter release button 18 on the upper part of the camera body 4 can be pushed down by the index finger of the right hand in the same way as in a conventional camera when the camera body 4 is held in both hands. Pushing this button 18 starts all the necessary movements for shutter release. A hole 20 at the center of the shutter release button 18 is for a cable release or an air release. In the neighborhood of the shutter release button 18, a selector lever 22 permits selection of various kinds of functions when the selector lever 22 is rotated around the shutter release button 18. This selector lever 22 can be operated by the same finger that operates the shutter release button 18, namely the index finger of the right hand holding the camera body 4.

When the selector lever 22 is rotated to the position in which the mark 24 is selected, the shutter release button 18 is locked and cannot be pushed down further. This locked state is also applicable for keeping the button 18 down when the mark 24 is selected after the button 18 has been pushed to permit a long time exposure when the shutter time is set at the bulb position. Namely, the selection of the mark 24 by means of this selector lever 22 serves in two ways, namely to prevent the misoperation of the shutter release button 18 and to enable a long time exposure.

The selector lever 22 may also be set at the mark 26 to lock the AE (Automatic-Exposure) operation. In this locked state, the measured light is fixed to the exposure values (a combination of the aperture value with the shutter time) obtained as the result of a previous light measurement. The operation responds to the amount immediately before the selection of the mark 26 during the automatic exposure control operation and thereafter. Even if the measured light changes the actual exposure is carried out on the basis of the previously fixed exposure values. This function is very important especially for taking a picture of an object with large differences in brightness, when the frame which is really to be photographed is different from that out of which the object brightness relative to the light measuring is to be obtained. Hence, this function is essential for a camera with automatic exposure controllability. As this AE locking mechanism, the mechanical clamping mechanism and the electrical one can be through out, whereby to this camera, the electrical one is to be applied.

The lever 22 selecting the mark 26 is automatically returned to the initial position, when the shutter release button 18 which was pushed down resumes its initial position, unless an external force prevents return of the lever 22.

When the selector lever 22 is placed at the mark 28, the self-timer is set. In this camera, as distinct from a conventional camera, the self-timer counts the time electrically. When the shutter release button 18 is pushed down, the self-timer is set, a series of operations relating to the shutter release is controlled, an electrical signal issues after the elapse of a predetermined time. The operation of the self-timer is displayed by the twinkling of a light emitting illumination diode 32 hidden under the selector lever 22 on the upper part of the camera body 4, when the selector lever 22 is at its initial position. If the selector lever 22 is brought back to the initial position during the operation of the self-timer, the self-timer is released out of the set state. The shutter can now be released by the shutter release button 18 in the normal way. Moreover, one set, the self-timer mechanism remains set even after the shutter release operation has been carried out. Hence, self-timer photography is possible repeatedly, without repeated setting of the self-timer. This function enables automatic photography at given time intervals by combining the self-timer with a motor drive, as will be explained.

When the selector lever 22 is set at mark 30, the battery can be checked. If the LED lamp 32 twinkles in this condition, it reveals that the power source has a sufficient voltage. When the LED lamp 32 does not light, it reveals that the voltage of the power source is too low for the camera to perform its electrical functions. The selector lever 22 when positioned at the mark 30 is normally urged by a spring to return to the mark 28. Hence, the selector lever 28 resumes the position of the mark 28 when the finger is removed after a battery check. This function is most advantageous, because if the operator forgets to bring back the lever 22 to its initial position after the battery check, not only does the camera not work properly but also electrical power is wasted because of the twinkling LED 32.

A dial 34 sets the aperture value or the shutter time from the exposure data, and the set value is displayed in a display window 36. As has been mentioned, this camera includes an automatic exposure control mechanism with both aperture and shutter priority so that the aperture priority mode and the shutter priority mode can be used selectively, instead of only the aperture priority mode or only the shutter priority mode. In the aperture priority mode, the aperture value is set while the shutter time is automatically obtained. In the shutter priority mode, the shutter time is set while the aperture value is automatically obtained. Either mode can be selected as is clear from the afore-mentioned equations (1) and (2), whether the aperture or shutter priority mode is selected. The operational process is the same so that the desired amount corresponding to the aperture value or the shutter time is set by means of only one dial 34. Whether the amount set at the dial 34 is the aperture value or the shutter speed is determined by operating a mode selector switch 38. Operation of the mode selector switch 38 changes the content of the numerical value displayed in the display 36. The aperture value is displayed in the display window 36 when the mode selector switch 38 is set for aperture priority, while the shutter time is displayed in the display window 36 when the switch 38 is set for shutter priority. This mechanism can be such a simple one that either the aperture value or the shutter time displayed parallel to each other is selectively shaded.

An ASA sensitivity dail 40 is set to the ASA sensitivity of the film to be used. This dial 40 C an be rotated along the direction of the arrow β when it is pulled up slightly with one's fingers. When it is freed from the fingers after setting the film sensitivity, a spring biases it in a direction reverse to the arrow β so that the set position is fixed. This mechanism serves to prevent the unexpected rotation of the dial 40 during operation.

A scale 42 with indices is set for obtaining an overexposure or an under-exposure. This is done by displacing the ASA sensitivity setting dial 40 to alter the set film sensitivity relative to the actual film sensitivity when one wishes to obtain an over-exposure or under-exposure using the automatic exposure control. Utilizing the fact that if the set film sensitivity is altered, relative to the actual film sensitivity, as is clear from the aforementioned equations (1) and (2) the proper exposure values is over or under by the deviation. Thus, it is possible to obtain an over-exposure or under-exposure easily without any alternation of the operation circuit or the operation routine.

Film rewind knob 44 contains a film rewind lever 46. The exposed film wound up frame by frame by the winding lever 14 is rewound into the cartridge by rotating the knob. In order to rewind the film, a rewind button 48 on the bottom of the camera body 4 is pushed to release the film rewind mechanism from the film winding lever 14, the rewind lever 46 is pulled out of the film rewind knob 44 and rotated along the direction of the arrow γ. Such film rewinding is well known.

As is conventional, this camera is provided with an accessory shoe 50. It goes without saying that the shoe 50 is intended for mounting a speed light device or electronic flash unit. As explained later, in detail, the flash device is closely related to the camera. An external light measuring adapter included in the camera system in accordance with the present invention can be connected to the shoe 50. The accessory shoe 50 includes a synchronism contact 52, a control terminal 54 for introducing the control information from the flash or from the external light measuring adapter, a data terminal 56 for introducing data and an AE locking terminal 58. Several levels of signals are introduced at the control terminal 54 so as to instruct the camera to operate in accordance with the different modes while the aperture value set on the flash unit or the data relative to the object brightness measured by means of the external light measuring adapter is introduced digitally at the data terminal 56. The flash unit and the external light measuring adapter is explained later in detail.

A lever 60 for the eye-piece shutter for shading the viewfinder window 13 is intended to prevent the film from being exposed to the light coming through the viewfinder window 13 when the eye leaves the viewfinder window 13, for example, during a self-timer photograph. At the same time, it also prevents errors in the object brightness information, essential especially for automatic exposure control due to light coming through the viewfinder window 13. The viewfinder window is closed by operating the eye-piece shutter lever 60 along the direction of the arrow c. This mechanism is quite essential for the camera with TTL light measuring mechanism.

An X contact 60 serves the same function as that in a conventional camera, i.e., it forms a synchronization contact during flash photography.

A diaphragm closing lever 64 closes the lens diaphragm when pushed in the direction of the arrow δ. If the aperture value is preset by the aperture adjusting ring 8 of the lens 2, the diaphragm is closed to the preset position by operating the diaphragm closing lever 64. In case the mark 12 on the aperture adjusting ring 8 is set at the index 7, the operation of diaphragm closing lever 64 is restricted. It is possible to set the mark 12 on the aperture adjusting ring 8 at the index 7 while the diaphragm closing lever 64 is being operated into the diaphragm closing position. However, this is displayed in the viewfinder as a misoperation. The relation between the state of the aperture adjusting ring 8 of the lens device 2 with that of the diaphragm closing lever 64 on the camera body 4 and of the mode selector switch 38 will be explained later in detail. The diaphragm closing lever 64 is locked in the diaphragm closing position, and is released by pushing the lock release button 66 so that the diaphragm closing lever 64 is brought back into the initial position.

A screw hole 68 is provided on the bottom of the camera for securing a tripod or for mounting a motor drive. To mount the motor drive, a cover 70 at the lower part of the shaft of the winding lever 14 is removed and the shaft of the winding lever 14 is mechanically coupled to the winding shaft of the motor drive. When the motor drive is mounted, a control signal is transmitted to the motor drive through a contact 72 on the bottom of the camera body 4. The motor drive will be explained in detail. It serves to wind the film and to energize other necessary components with a motor instead of the film winding lever 14 upon termination of the camera operation after each shutter release. This makes it possible to release the shutter continuously thereby making it easy for the photographer to catch the desired picture taking opportunities. This is advantageous despite the weight at the driving motor and its power source.

When the film rewind knob 44 is pulled up the back cover 74 on the back of the camera body 4 opens so that the film cartridge can be exchanged. At the time of opening the back cover 74, the film counter 15 on the upper part of the camera body 4 is reset to its initial position.

So far the composition of each component of this camera has been explained briefly. The following concerns details of the exchange between the lens 2 and the camera body 4 or the aperture control mechanism of the lens 2 from the camera body 4, the relation of the operation of the flash unit mounted on the accessory shoe 50 or of the external light measuring adapter to that of the camera, the relation of the motor drive mounted on the bottom of the camera body 4 to the operation of the camera and the relation of the information or the data display in the viewfinder 13 to the operation of the camera.

FIG. 2 shows a perspective view of the lens 2 and the camera body 4 taken apart from each other. The lens is mounted on the body 4, and is shown displaced along the direction of arrow λ. The camera body 4 is provided with a mount ring 76 located on the mounting plane of the lens and having three independent flanges 78A, 78B and 78C around the circumference. The mount ring 76 is firmly fixed on the camera body so as to surround the optical path perpendicular to the optical path and parallel to the film plane. Because the mount ring 76 is the only member for combining the lens 2 with the camera body 4, lowering of the mounting precision due to aging will adversely influence the object image formed on the film plane. Accordingly, the clamping ring 10 is rotatably provided on the lens 2. The clamping ring 10 is a circular ring having notches 80A, 80B and 80C for allowing the passage of the flange parts 78A, 78B and 78C of the mount ring 76 when the lens 2 is displaced along the direction of the arrow λ so as to be mounted on the camera body 4. By rotating the clamping ring 10 along the direction δ after having brought each flange 78A, 78B and 78C of the mount ring 76 through the corresponding notches 80A, 80B and 80C, the flange parts 78A, 78B and 78C engage the protruding parts 82A, 82B and 82C of the clamping ring 10. This secures the lens 2 to the camera body 4.

The end of the lens 2 facing the camera body 4 contains various kinds of mechanisms for exchanging data with the camera body 4 or for control.

A lever 84 related to the step number of the diaphragm from the totally opened position of the lens 2, is movable along a ring hole 86 in the direction of the arrows φ and ψ. This lever 84 is urged along the direction of the arow ψ by a strong spring. When the lens 2 is not mounted on the camera body 4 and the clamping ring 10 is in the ready state as shown in the drawing the ring hole 86 is moved along the direction of the arrow φ. This condition is changed by rotating the clamping ring 10 along the direction of the arrow ψ so as to mount the lens 2 on the camera body 4. At this time, the lever 84 is moved along the direction of the arrow φ by means of the strength of the spring but only up to a predetermined position which corresponds with the step number of the diaphragm for the preset aperture value of the lens 2 from the totally opened position. The movement of the lever 84 is more in the direction of the arrow φ the smaller the step number of the diaphragm while the movement of the lever 84 is greater in the direction of the arrow ψ the larger the step number of the diaphragm. The aperture value can be preset in the lens 2 by means of the aperture setting ring 8 as has already been explained. The position at which the displacement of the lever 84 is restricted is changed in accordance with the preset aperture value and the lever 84 is displaced accordingly. In consequence, it is possible to transmit the step number of the diaphragm closing, corresponding to the preset aperture value set on the aperture setting ring 8, to the camera body 4 by the position of the lever 84. As will be explained in detail later, it is also possible to preset the aperture value from the body of the camera so that it is not necessary to detect the diaphragm step number preset in the lens 2 by the aperture setting ring 8 by detecting the position of the lever 84.

When the mark 12 on the aperture setting ring 8 is set at the index 7, the lever 84 is always at the position corresponding to the largest diaphragm step number of the lens, namely pushed as far as possible, in the ring hole 86, along the direction of the arrow ψ by means of the spring. No matter at which position the displacement of the lever 84 along the arrow ψ by the spring is restricted, it is possible to displace the lever 84 against the spring along the direction of a smaller diaphragm step number, namely along the direction of the arrow φ. In other words, it is possible to set the desired aperture value by setting the lever 84 at the desired position against the force of the spring, without using the aperture setting ring 8. This characteristic is applicable to a so-called servo AE camera in which the aperture value can automatically be controlled by controlling the position of this lever 84 by means of a servo-motor and has been realized to some extent. However, there are some shortcomings such as slow response so that in the present embodiment, this characteristic is obtained by other means.

A diaphragm closing lever 88 is normally urged by a spring along the direction of the arrow Ω toward the position of a totally opened diaphragm. Further, the direction of the arrow ν is toward the position of the closed diaphragm so that by displacing the diaphragm closing lever 88 against the strength of the spring along the direction of the arrow ν closes the diaphragm of the lens 2 by a diaphragm step number corresponding to the position of the lever 84 from the totally opened position.

An opening pin with a projecting length corresponding to the largest aperture value of the lens 2 transmits the largest aperture value of the lens 2 to the camera body 4. This opening pin 90 is important in order to carry out various kinds of compensations for calculating the exact object brightness information during an exposure operation based upon the object brightness information in accordance with a TTL light measurement.

A minimum aperture value pin 91 has a projecting length corresponding to the smallest aperture value, and transmits the minimum aperture value of the lens 2 to the camera body 4. This smallest aperture value pin 91 is used to detect the controllable limit of the diaphragm of the lens 2 during exposure control.

An AE pin 92 projects when the mark 12 on the aperture setting ring 8 at the index 7 and transmits to the camera body 4, the fact that the aperture value is not preset at the lens 2.

An AE lever 94 operates when the lower edge contacts the upper edge of the lever 84 on the lens 2, whereby the AE lever is normally urged along the direction of the arrow ∂ by means of a weak spring. The spring urging this AE lever 94 along the direction of the arrow ∂ is very weak in comparison with the one urging the lever 84 at the side of the lens 2 along the direction of the arrow ψ, so that the strength for displacing the lever 84 along the direction of the arrow ψ cannot be overcome. Consequently, this AE lever 94 is normally urged by means of the lever 84 at the side of the lens 2 along the direction of the arrow δ. During operation of the winding lever 14, the AE lever 94 is displaced along the direction of the arrow ∂ against the urging of the lever 84 and locked in the position shown. The lever 94 is freed during shutter release and is driven in the direction of the arrow δ by the lever 84. The camera body 4 includes a mechanism for stopping and clamping the AE lever 94 at the proper position in accordance with the control aperture value set by the dial 34 or obtained as the result of the operation. Consequently, the displacement of the lever 84 along the direction φ naturally ends at a position corresponding to the stopped position of the AE lever 94. This presets the diaphragm step number. The clamping position of the AE lever 94 is extremely important for determining the diaphragm step number of the lens 2 and a mechanism with very high precision is needed for detecting the clamping position. Such a mechanism preferably senses the desired diaphragm step number by counting a number of pulses corresponding to the diaphragm step number while the displacement amount of the AE lever 94 from its locked position as started along the direction of the arrow δ is converted into pulses. To close the diaphragm of the lens, one pushes the diaphragm closing lever 64 in the direction ∂. The AE lever 94 at the standard position or the clamping position is now released and forced by the lever 84 along the direction of the arrow δ. If at this time, the aperture value is selected or set by means of the aperture setting ring 8, the displacement of the lever 84 is stopped at the position corresponding to the diaphragm step number for this aperture value. The AE lever 94 then also stops running and the diaphragm is closed down to the set aperture value. But if the mark 12 on the aperture setting ring 8 is set, the displacement of the lever 84 is not stopped until it reaches the position of the smallest aperture and the diaphragm is closed down to the smallest aperture value. Hence, in the present embodiment, the diaphragm closing lever 64 is locked so as to be out of operation in case the mark 12 is set on the aperture setting ring 8. However, it is possible to lock the AE lever 94 at the standard position simply without feeding film by operating the winding lever while pushing the button for the multiple exposure if for some reason the AE lever 94 is freed from its locked standard position before shutter release. The fact that the AE lever 94 has been locked at the standard position indicates that AE has been energized while the fact that the AE lever 94 is released indicates discharge of the AE.

A total opening input pin 96 picks up the aperture value of the totally opened diaphragm of the lens 2. The pin 96 contacts the opening pin 90 of the lens 2 so as to pick up the signal corresponding to the protruding length of the pin, namely a signal corresponding to the aperture value of the totally opened diaphragm of the lens 2. The pin 96 is connected to a mechanism for converting the displacement amount of the pin 90 and thus the aperture value of the totally opened diaphragm of the lens 2 as a digital value.

A largest aperture value input pin 97 picks up the aperture value of the smallest diaphragm opening of the lens 2, by contacting the largest aperture value pin 91 of the lens 2. The pin 97 thus picks up the signal corresponding to the largest aperture value of the lens 2, namely a signal corresponding to the aperture value of the smallest diaphragm opening. The pin 97 is connected to a mechanism for converting the displacement of the pin 97, and hence, the largest aperture value of the lens, as a digital value.

A diaphragm driving lever 98 has an edge in the direction ε which contacts the edge in the direction Ω of the diaphragm closing lever 88 of the lens 2. During shutter release the lever 98 is displaced along the direction of the arrow ε before the start of the exposure. This drives the diaphragm closing lever 88 along the direction of the arrow ν so as to close the diaphragm of the lens 2 from being totally open down to the position determined by the lever 84. At the termination of the exposure this diaphragm driving lever 98 resumes its initial position by being displaced toward the direction ω so as to fully open the diaphragm of the lens 2. The diaphragm driving lever 98 can be displaced along the direction of the arrow ε by operating the diaphragm closing lever 64 in the direction of the arrow δ. This mechanism is essential in order to observe the object image through the lens 2 with the closed diaphragm through the viewfinder 13.

An AE detecting member 100 opposing the AE pin 92 of the lens 2, detects the AE pin 92 which protrudes when the mark 12 is selected so as to produce a control signal showing that the mark 12 is selected.

As is clear from the above, it is necessary that the mark 12 of the aperture setting ring 8 should be set at the index 7 to control the aperture value of the lens 2 from the camera body 4. Hereafter, the mark 12 will be called the AE mark.

The operations of the lever 84, the AE lever 94, the diaphragm closing lever 88 and the diaphragm driving lever 98 from the mounting of the lens 2 till closing of the diaphragm, namely the shutter release operation, when the aperture setting ring 8 is set at a given aperture value are explained with respect to FIG. 3. The operation when the aperture ring 8 is set at the AE mark 12 may be best understood by referring to FIG. 4.

FIG. 3 shows the position of each lever when a certain aperture value is preset at the lens 2. In FIG. 3(a), the lens 2 is in the ready state, mounted on the camera body 4, with the clamping ring 10 not yet rotated into the mounting position. Hence, the lever 84 is kept displaced in the direction ψ against the urging of the spring along the direction φ. Now, if only the clamping ring 10 is rotated along the direction of the arrow φ, without mounting the lens 2 on the camera body 4, the lever 84 is displaced along the direction φ into the position determined by the aperture setting ring 8 as is shown in FIG. 3(i b). This displacement is motivated by means of the spring urging the lever 84 along the direction of the arrow φ.

Now let us suppose that lens 2 is mounted on the camera body 4 when AE has not yet been charged or the diaphragm closing lever 64 has not yet been pushed down. In this condition, the AE lever 94 is being urged by the spring along the direction δ while not locked. When the lens 2 is mounted on the camera body 4, and the clamping ring is rotated along the direction of the arrow φ, the spring urging the lever 84 along the direction φ is stronger than the spring urging the AE lever 94 in the direction of the arrow δ. Accordingly, the lever 84 is displaced in the direction φ into the position determined by the aperture setting ring 8 as is shown in FIG. 3(C). At the same time, the AE lever 94 is pushed by the lever 84 to the position shown in FIG. 3(C). Now let us suppose that the winding lever 14 is operated to charge AE when the diaphragm closing lever 64 of the camera body 4 is returned into its initial position. Then, the AE lever 94 is displaced along the direction of the arrow ∂ against the force of the lever 84 so as to be locked at the standard position as is shown in FIG. 3(D). The lever 94 thus pushes the lever 84 to the position shown in FIG. 3(D'). Naturally, in the same way the AE lever 94 and the lever 84 are kept at the positions shown in FIG. 3(D) and 3(D') when the lens 2 is mounted on the camera body 4 in which AE has been charged.

When the shutter is then released, the lever 84 starts to run along the direction of the arrow δ against the force of the spring of the AE lever 94, because the locking of the AE lever 94 is released, so as to stop at the position determined by the aperture setting ring 8 as is shown in FIG. 3(E'). At this time, the AE lever 94, pushed by the lever 84 stops at the position of the lever 84 as shown in FIG. 3(E). When the diaphragm driving lever 98 of the camera body 4 is displaced along the direction of the arrow ε as is shown in FIG. 3(F), the diaphragm closing lever 88 of the lens 2 is driven toward the direction of the arrow ν as is shown in FIG. 3(F') in such a manner that the diaphragm is closed down to the position determined by means of the lever 84. This establishes the exposure, that is, the condition shown in FIG. 3(F) and 3(F') that is maintained at least up to the termination of the exposure. When the diaphragm driving lever 98 has returned along the direction ω after the termination of the exposure, the lever 84, the diaphragm closing lever 88, the AE lever 94 and the diaphragm driving lever 98 are brought back into the positions shown in FIG. 3(C) and (C').

The present invention does not provide any mechanism for picking up the diaphragm step number information concerning the aperture value set by the aperture setting ring 8 from the lever 84 for the camera body 4 while the AE lever 94, clamped at a desired position, prevents the lever 84 from being displaced to preset the aperture from the camera body 4. Hence, the levers 84 and 94 execute no function at all once the aperture is preset by means of the aperture setting ring 8 on the lens 2. However, as is clear from the drawing the levers 84 and 94 each have an independent function while in the mode having nothing to do their function there is no danger for intervention nor interference. This is largely due to the arrangement of the AE lever and the lever 84 for a certain lens composition and to the distribution of the strength of the springs for urging the levers.

Figure 4:
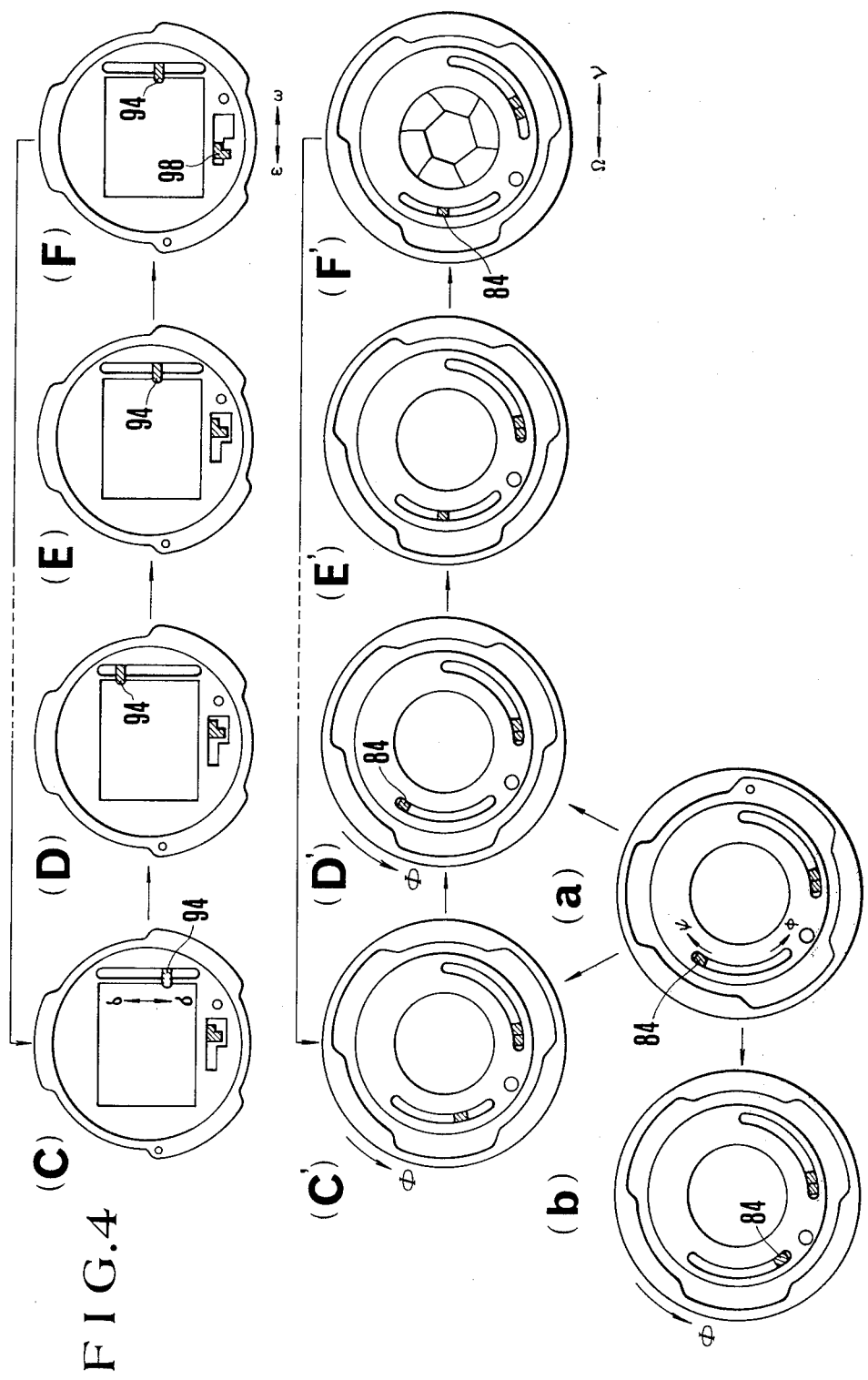
FIG. 4 shows the operation of each lever in the state in which no aperture value is preset at the side of the lens 2.

FIG. 4 shows the operation of the lever when no aperture value is preset at the lens 4 as afore-mentioned. FIG. 4(A) shows the lens 2 mounted on the camera body 4 in a ready state. Here, the clamping ring 10 has not been rotated into the mounting position so that the lever 84 is displaced in the direction 104 against the force of the spring urging the lever 84 in the direction φ. If only the clamping ring 10 is rotated along the arrow φ without mounting the lens 2 on the camera body 4, the lever 84 is displaced the complete distance along the direction φ as shown in FIG. 4(B). This position corresponds to the largest aperture selectable by the aperture setting ring 8. This displacing force is produced by the spring urging the lever 84 along the arrow φ.

The lens 2 may be mounted on the camera body 4 in which AE has not been charged yet or the diaphragm closing lever 64 is pressed. In this case, the AE lever 94 on the camera body 4 is at an uncertain position depending upon the previous photographic mode or the condition of the diaphragm closing lever 64. In other words, when the aperture preset is controlled from the camera body 4, the AE lever 64 is clamped at the position corresponding to the aperture value and remains there until the next AE charge. When the diaphragm closing lever 64 is operated, AE is discharged and at the same time, the clamping is released. Consequently, when the lens 2 is mounted on the camera body 4, and the clamping ring 10 rotated along the arrow φ, the lever 84 is urged by the spring toward the position shown in FIG. 4(B). In practice, the AE lever 94 has been clamped at the position shown in FIG. 4(C) (in practice at an uncertain position) so that the lever 84 is displaced by means of the AE lever in the direction φ into the position shown in FIG. 4(C'). Further displacement is restricted by the AE lever 94. Now let us suppose that AE has been charged, and the winding lever 14 of the camera body 4 operated. The AE lever 94 is driven along the arrow ∂ against the force of the lever 84 until it is locked at the standard position shown in FIG. 4(D). Consequently, the lever 84 remains as shown in FIG. 4(D'), pushed by means of the AE lever 94. It is natural that the AE lever 94 and the lever 84 would be kept at the position shown in FIG. 4(D) and 4(D') in the same way when the lens 2 is mounted on the camera body 4 in which AE has been charged. When the shutter is then released, the AE lever 94 is released so that the lever 84 starts to run along the direction δ against the force of the spring of the AE lever 94 so that the latter lever 94 runs along the direction δ. In the camera, the displacement of the AE lever 94 is detected as impulses. When the displacement reaches an amount corresponding to the diaphragm closing step number for the aperture value set or otherwise calculated in the camera body, the AE lever 94 is stopped at the position shown in FIG. 4(E). At the same time, the lever 94 stops displacement of the lever 84 at the position shown in FIG. 4(E'). These operations bring the aperture value set or calculated at the camera body to the preset state.

When the diaphragm driving lever 98 of the camera body 4 is then displaced along the direction ε as shown in FIG. 4(F), the diaphragm closing lever 88 of the lens 2 is driven along the direction ν as shown in FIG. 4(F'). This closes the diaphragm down to the position established by the lever 84. The exposure then starts and the positions shown in FIG. 4(F) and 4(F') remain until the termination of the exposure. When the diaphragm driving lever 98 has returned along the direction of the arrow ω after the termination of the exposure, the lever 84, the diaphragm closing lever 88, the AE lever 94 and the diaphragm driving lever 98 resume the position equivalent to that shown in FIG. 4(C) and 4(C').

The above-mentioned operation is carried out while the light is measured in the totally opened lens 2 and during aperture priority and shutter priority automatic exposure control. This is valuable for controlling the aperture value from the camera body 4 of the camera device.

Figure 5:
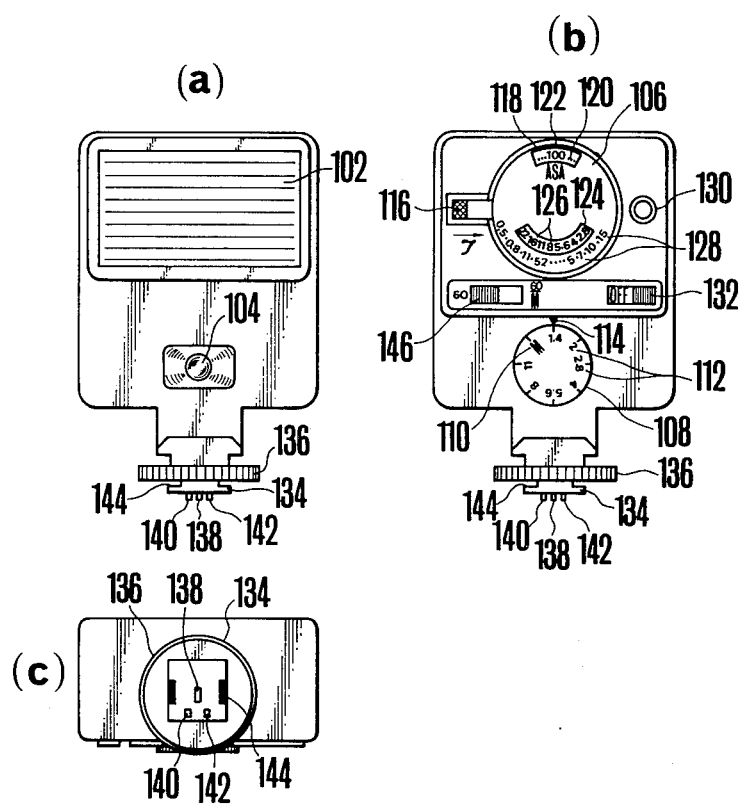
FIGS. 5a, 5b and 5c three view of an embodiment of the flash unit to be used with the camera system in accordance with the present invention.

FIG. 5 shows an embodiment of a flash unit used in the camera system in accordance with the present invention. FIG. 5(A) shows a front view, FIG. 5(B) a rear view and FIG. 5(C) a bottom view. This device includes the well known automatic light adjusting ability but is further characterized in being capable of exchanging information with the camera device.

In the drawing, an illuminating member 102 issues a flash A light detecting member 104 detects the light flash reflected from an object so as to adjust the flash of the illuminating member 102. In the automatic light adjusting system of this flash unit, when taking a picture the device is actuated to produce a flash of light from the illuminating member 102 toward the object while at the same time, the light reflected from the object is measured by the light detecting member 104. The operation of the illuminating member 102 is stopped as soon as the total of the reflected light reaches a given value to expose a film properly.

To carry out such automatic light adjustment it is essential that the sensitivity of the film to be used and the aperture value of the photographic lens should be entered in advance. A film sensitivity setting dial 106 and the aperture value setting dial 108 are provided for this purpose. Although it may be thought that the film sensitivity and the aperture value can be entered through the film sensitivity setting dial 40 on the camera and the aperture value or the shutter time setting dial 34, in this embodiment, the input for automatic light adjustment is intentionally provided in the flash unit to enable use of the unit on other camera systems.

The aperture value setting dial 108 permits the photographer to set the aperture value manually or to select a desired aperture value for the automatic light adjustment. This selection is carried out by setting the manual mode indication 110 or the aperture value indication 112 provided on the above-mentioned dial 108 at the index 114 provided on the speed light device body, by rotating the dial 108. Further, the film sensitivity setting dial 106 can be made rotatable, by displacing a lock lever 116 and restricting its rotation along the direction of the arrow δ. This lock lever 116 is normally urged by a spring against the direction of the arrow δ so as to prevent the unexpected rotation of the film sensitivity setting dial 106. By rotating the dial 106, the ASA sensitivity indication 120 is made to appear in a window 118 on the dial 106. The film sensitivity setting is completed by setting the desired ASA sensitivity indication 120 at the index 122 on the dial 106 in the window. The film sensitivity setting dial 106 also serves as the calculator of the guide member. When the manual mode has been selected by the dial 108 this can be used to set the aperture value of the lens 2 manually in accordance with the object distance. When the aperture value setting dial 108 is set in the manual mode the flash unit does not carry out an automatic adjustment but emits its maximum output. Consequently, it is necessary to select a proper combination of the object distance and aperture value in order to expose the film properly. The guide member calculator to be used for this purpose is designed so that the combination of the object distance with the aperture value is altered to be suited for the guide number of the flash unit in accordance with the film sensitivity. In consequence, it may be thought that the film sensitivity setting dial 106 is used as the guide number calculator. However, in the present embodiment, the film is properly exposed by the photographer setting the aperture value in the camera manually from the corresponding aperture value indication 126 and the corresponding object distance indication 128. The series aperture value indication 126 is made in the window 124 on the dial 106 while the series object distance indication is made along the circumference of the window 124. As is well known many flash units are of the condenser discharge type, wherein the voltage of the battery or the net voltage is stepped up to a voltage sufficiently high for a Xenon discharge tube to operate and be stored in a capacitor. The charge stored in the condenser is discharged through the Xenon discharge tube when taking a picture to illuminate the discharge tube. In consequence, in order that the above-mentioned Xenon discharge tube illuminates without fail it is necessary that the condenser has been charged to a predetermined voltage. When a picture is taken before the completion of the charging of the condenser, a sufficient exposure cannot be obtained on the film because the flash unit does not operate properly. Thus, what is needed is a charge completion display lamp 130 which illuminates at the termination of the charge so as to tell the photographer that the condenser is charging. Further, this charge completion display lamp 130 serves at the same time as the switch for testing the device which illuminates when this switch is pushed. This is convenient for making an exposure measurement by means of a flash meter or the like. Operating a power source switch 132 starts charge of the condenser.

The speed light device has almost the same efficiency as that with the conventional automatic light adjusting device, whereby this speed light device constitutes one of the constructional members of the system being combined with the camera so as to improve the operability of the camera.

The flash unit shown in FIG. 5 can be mounted on the accessory shoe 50 of the camera shown in FIG. 1 by the clamping ring 136 after the shoe 134 engages the accessory shoe 50 from the back of the camera. A synchronization contact 138, a control signal contact 140 and a data signal contact 142 at the bottom of the shoe 134 are electrically connected to the synchronization contact 52, the control terminal 54 and the data terminal 56 of the accessory shoe 50 upon mounting the flash unit. A ground terminal 144 is grounded to the accessory shoe body upon mounting the flash unit.

The shutter time of a camera with the focal plane shutter synchronized with the flash unit, namely the flash unit synchronization shutter time (TSYN) is generally shorter than 1/60 sec. or 1/125 sec. The camera is often misset because it is inconvenient to reset the shutter time for flash. The present flash embodiment employs not a passive method that only issues an alarm misoperation but actively controls the shutter speed for flash from the flash unit. In the present embodiment, it is possible to select a fully automatic system in accordance with no matter what shutter speed is set at the camera, since the shutter is automatically released at the flash synchronization shutter time TSYH during flash photography, or a semi-automatic system in accordance with which the shutter automatically operates at flash speed only when a shutter time shorter than the flash synchronization shutter time is set at the camera while when the set shutter speed is longer than the flash synchronization shutter time (TSYH) the shutter is released with the set shutter time. The selector switch 146 at the back of the flash unit serves to switch between the fully automatic system and the semi-automatic system.

The position of switch 146 is transmitted as a signal with data to the control terminal 54 of the accessory shoe 50 through the control contact 140 together with the signal for showing the termination of the charge of the flash unit. This is done by making the value of the current at the time when a voltage is applied to the control contact 140 at the flash unit through the control terminal 54 at the camera differ depending upon the position of the selector switch 146. There, data is transmitted to the camera in accordance with the AND conditions with the information as to the termination of the charge of the speed light device. No signal is transmitted to the camera when the flash unit has not been charged. If the signal now showing the termination of the charge of the flash unit is applied as the first signal, this signal is taken into the camera as a signal showing the fully automatic system, while the signal showing the termination of the charge of the speed light device is applied as the second signal. This signal is entered into the camera as a signal showing the semi-automatic system. In accordance with the first and the second signals through the control terminal 54, the camera is set in the flash mode. Hence, the flash synchronization shutter speed or a longer time than the above (in case of semi-automatic systems) is selected. At the same time, the data for the aperture value or the total flash value is entered through the data terminal.

The information set by means of the aperture setting dial 108 is given to the data terminal 56 as an analog value. Namely, as aforementioned the information as to the aperture value is essential in the automatic light adjusting mode so that it is constructed so that the information can be set at the flash unit. Hence, the transmission system is necessary in order to make the set value the aperture control signal at the camera. The data contact 142 is provided on the flash unit, while the data terminal 56 is provided on the camera body for this purpose. When the charge completion terminal signal is put in the camera body, the camera body takes the analog information concerning the aperture value through the data terminal 56 so as to control aperture in accordance with this information. When the aperture setting dial 108 at the side of the speed light device has been set in the manual mode, analog information other than that of the level corresponding to the aperture value, for example, an analog signal with the higher lever than that of the data showing the aperture value is produced at the data contact 142 in such a manner that a signal showing that the flash unit is in the manual mode well illuminates with its maximum light amount is transmitted to the camera body. At this time, the aperture is not controlled at the camera so that it is necessary to set the desired aperture value or the aperture value obtained from the guide number calculator at the lens 2 through the aperture setting ring 8.

It is possible to automatically obtain the proper exposure even in case of flash photography by means of the present embodiment of the camera system. Although in conventional photography with an automatic light adjusting flash unit, it is necessary to set the shutter time at the camera longer than the speed light synchronism shutter time (TSYN), for example, 1/60 sec. At the same time, it is necessary to set the aperture value at a value needed for the automatic light adjusting flash unit. Not only the shutter speed but also the aperture value can automatically be set so that the operability can be substantially improved while misoperation can effectively be avoided. Further, at the camera, the exposure is controlled automatically before the flash unit has not yet been charged so that a picture can be taken with the proper exposure or the nearly proper exposure even when the shutter is released before the flash unit has not been charged fully. This increases the probability of superior pictures. When a picture is taken with flash, when the flash unit has not been charged fully, the flash unit does not illuminate at the time of the shutter release and underexpose the film with the shutter speed and the aperture value are set for flash photography.

When a flash picture is taken, the camera is automatically changed into the flash mode when the flash unit is mounted on the camera, the power source switch is closed and the flash unit is fully charged. One need merely focus and release the shutter. This is a clear advantage in comparison with a conventional camera system in which various setting operations are needed for a flash picture.

One of the most important things for completing the automatic exposure control efficiency of the camera is the light measuring system. The efficiency of this light measuring system is to take the object brightness information which is one of the factors for the exposure operation, being mostly designed so that the object brightness is converted into the electrical signal through a photoelectric converting element.

At present, most of the exposure meters built in the single reflex camera are of the TTL light measuring type, which is also applied to the single reflex camera with automatic exposure control efficiency. In accordance with the TTL light measuring system, a comparatively precise light measurement is possible because the light beam of the object actually coming through the lens is measured. Hence, in case lenses with different focal length are used, the system can be adapted in the same way, which is remarkably convenient. Further, it is possible to confirm the portion in which the light is measured or the frame through the viewfinder so that the measured light amount can be easily compensated.

What is discussed regarding a camera with this TTL light measuring system is the problem concerning the light measuring range in the frame. This light measuring range is principally divided into the partial light measuring range in a predetermined portion in the frame, for example, the central portion is weighted and the average light measuring range in which the whole portion in the frame is averaged, whereby the combination of the partial light measuring range with the mean light measuring range as well as other exceptional light measuring ranges such as the division of the mean light measuring range into several ranges in each of which the light is measured with different weight.

In the camera with automatic exposure control efficiency, the average light measuring range is generally used because it is more convenient for snap shot photography. Here problems still remain.

The largest difficulty takes place when a picture is taken with a wide-angle lens and the like, whereby the brightness of the background is extremely different from that of the object actually photographed, the automatic exposure control mechanism controls the exposure in accordance with the brightness of the background so that there exists the danger of extreme underexposure or extreme over-exposure of the object to be photographed. The afore-mentioned AE lock mechanism is provided to avoid such difficulties. When it is desired to measure the brightness of the object at a predetermined position in the frame in a camera having such average or mean light measurement, it is necessary to take such troublesome operations that the framing is made in the neighborhood of the object in such a manner that the position of the predetermined portion of the object assumes almost all of the frame portion so as to measure the brightness and then the framing and the focusing are made under the operation of the AE lock mechanism at a distance from the object so as to release the shutter. Thus, the partial light measurement of the object brightness is preferable in order to avoid such difficulties.

In the camera system of the present invention, in order to avoid the above-mentioned difficulties, an external light measuring meter can be mounted on the accessory shoe 50 to be used with the automatic exposure control.

Figure 6:
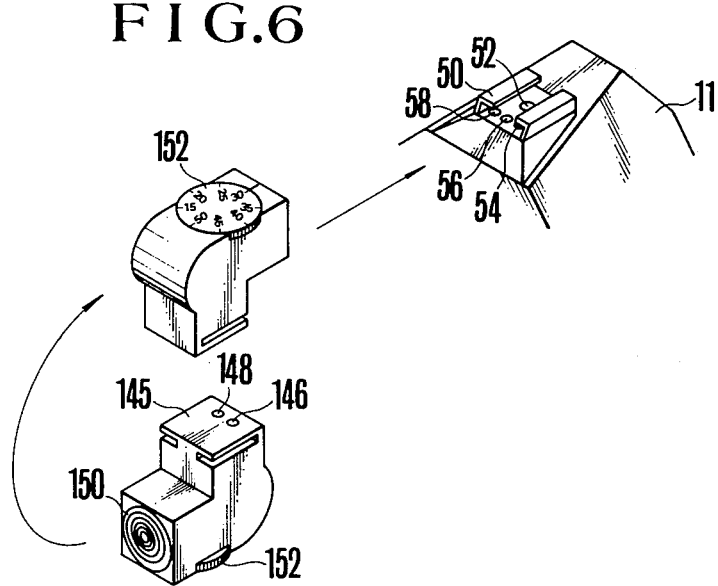
FIG. 6 shows an external light measuring instrument to be used with the camera system in accordance with the present invention in perspective view.

FIG. 6 shows an external light measuring meter applicable to the present invention in perspective view. Here, contact 146 provided on the bottom of this light measuring meter can be brought into contact with the control terminal provided in the accessory shoe 50 at the side of the camera so as to send a signal to the side of the camera that the light measuring meter has been mounted on the accessory shoe 50. This is sent to the camera from the light measuring meter as the third signal which is different from the charge completion signal because it contains data for full automatic operation and semi-automatic operation of the flash unit. In the camera upon receipt of this third signal, the mode is changed into the external light measuring mode whereby the analog information put in through the data terminal 56 is taken as the object brightness information. Here, the contact 148 provided at the bottom of the light measuring meter can be brought into contact with the data terminal 56 when the light measuring meter is mounted on the accessory shoe 50. This produces the brightness of the light beam of the object coming through the light receiving window 150 as analog data to be transmitted to the camera through the data terminal 56. The light receiving angle of the afore-mentioned light receiving window 150 can be fixed correspondingly for this purpose. The light receiving window 150 is such that, being provided with zooming efficiency, the light receiving angle is freely variable in accordance with the focal distance of the telephoto lens and the desired light measuring range by means of a dial 152 on the upper part of the light measuring meter.

In a camera composed as previously mentioned, the mode is automatically changed into the external light measuring mode when the external light measuring meter is mounted on the accessory shoe 50 in such a manner that the exposure is automatically controlled in accordance with the information coming from the external light measuring meter, whereby the operability of the camera is further expanded.

With reference to the TTL exposure meter built in the signal reflex camera or the external light measuring meter, the light measuring system is of the so-called reflection light system in which the light reflected by the object is measured so that the amount of measured light of the object brightness corresponds with the actual brightness. However, this object brightness is largely influenced by the color tone and the surface condition of the object. This system cannot be said to be the proper method for determining an exact exposure, free from the color tone and other differences of the object by measuring the exact brightness, the practicability being hereby put aside. For example, when a completely white object and a completely black object are measured under the same illumination by means of a reflection light system, the measured light amounts naturally differ from each other. On the other hand, when they are measured by means of an incident light system, there is no difference between the two amounts because the measured light amount naturally depends upon the illumination condition for the object. In consequence the incident light system is preferred in case it is desired to obtain an exact exposure. In a camera, even in a camera with an automatic exposure control system, the automatic exposure control in accordance with the measurement result by means of the incident light system is preferred.

From the above-mentioned point of view, the camera system in accordance with the present embodiment further includes the exposure meter with the incident light system as the external light measuring system.

FIG. 7 shows an incident light system exposure meter applicable to the camera system in accordance with the present invention in perspective view. The exposure meter 60 is connected to the camera body by a cord 154. This cord 154 includes a signal line for transmitting various data from the exposure meter 160 to the camera, whereby the exposure meter 160 is connected to the camera, the coupler 156 at the one end being mounted on the accessory shoe 50 of the camera while the plug at the other end is fixed on the socket 162 of the exposure meter. The contact 166 provided on the bottom surface 164 of the coupler 156 can contact the control terminal 54 in the accessory shoe 50 at the side of the camera and send a signal that the exposure meter 160 has been connected to the camera to the side of the camera in the same way as the case with the aforementioned external light measuring meter. This signal is given as the third information which is different from the charge completion signal consisting of the two data for the full-automatic light adjusting operation and for the semi-automatic light adjusting operation of the flash unit. In the camera upon receipt of the third information the mode is switched into the external light measuring mode whereby the analog information coming through the data terminal 56 is taken as the illumination information. This illumination information is treated in the exposure operation as a value equivalent to the object brightness put in the aforementioned external light measuring meter. Further the contact 168 provided at the bottom of the coupler 156 can be brought into contact with the data terminal 56 when the coupler 156 is mounted on the aforementioned accessory shoe 50, serving to transmit the illumination information obtained by the exposure meter 160 to the camera through the data terminal 56 as an analog data. Further the contact 170 at the bottom of the coupler 156 can be brought into the contact with the AE lock terminal 58 of the aforementioned accessory shoe 50, serving to lock the automatic exposure control mechanism of the camera especially the measured light amount. The contact 170 is brought into contact with the AE lock terminal as soon as the coupler 156 is mounted. The AE lock is released only while the light measuring button 174 provided on the exposure meter is being pushed. Here with the pushing of the light measuring button 174 the exposure meter 160 starts the light measurement and stops it as soon as the button is released.

To explain the exposure meter 160 more in detail, a rotatable light receiving head 176 is covered by a semi-spherical diffusing member 178. At the time of the light measurement, the light measuring button 174 is pushed while the light sensitive part of the light receiving head 176 is directed toward the camera from the position of the object. With this operation, the AE lock at the camera is released whereby the exposure meter 160 starts the light measurement so as to transmit the data concerning the illumination information measured at the light sensitive part to the camera through the cord 154 as analog data. Here the camera in which the AE lock is released starts to carry out the operation for the automatic exposure control based upon the data concerning the illumination. Further at the time of the light measurement the illumination obtained as the result of the light measurement is also displayed by means of the meter 180 at the side of the exposure meter 160. In consequence, the photographer can also learn the combination of the aperture value with the shutter time necessary for attaining the proper exposure out of the display by the finger or needle 182 of the meter 180 through the calculator. By releasing the pushing of the light measurement button 174 at termination of the light measurement the camera is brought into the AE locked state while the finger 182 of the meter 180 is clamped. By releasing the shutter when the corresponding operations such as the framing, the focusing and so on have been carried out, in this state, after taking the exposure meter 160 out of the light measuring position, the exposure can automatically be controlled based upon the AE locked operational result so as to obtain the desired exposure.

The reason why the AE locking efficiency of the camera is given to this incident light system exposure meter is that it is unavoidable that the incident light system exposure meter should be used in the neighborhood of the object instead of the place at which the camera is set at the time of taking a picture. That is, the place at which the light is measured by the exposure meter 160 is not always the same place at which the camera is set for taking a picture so that when the shutter is released while the light is being measured, the exposure meter is also photographed together with the object. This has to be avoided.

The exposure meter 160 carries out the light measurement temporarily in the neighborhood of the object in the same way as in the case with conventional unitary incident light system exposure meters while the AE lock of the camera is released only during the light measurement. Hence the operation for automatic exposure control is carried out in accordance with the light measurement data. After termination of the light measurement, the operational result at the time of the light measurement is locked by the AE locking. This is done so that after then the exposure can be controlled in accordance with the operational result at the time of the light measurement even if the exposure meter 160 is brought out of the place at which the light was measured.

As mentioned above, the application field of the camera can be enlarged by applying an automatic exposure control efficiency based upon the light measurement data by means of the incident light system exposure meter to the camera with an automatic exposure control mechanism.

The camera system in accordance with the present invention is usable with a motor drive. This motor drive device includes a mechanism for automatically winding the film after the shutter release. This is very valuable for successively photographing an object in motion or catching a proper shutter opportunity. Moreover, the winding operation of the film is not necessary. Hence more attention can be concentrated on framing or focusing and catching of the shutter opportunity so that photographic possibility can be substantially enlarged.

It is requested that the motor drive device to be applied to the camera system in accordance with the present invention should be compact and superior in efficiency in such a manner that the device can be applied quite effectively for taking a picture while the operability of the camera does not deteriorate in comparison with that before mounting the device.

FIG. 8 shows an embodiment of the motor drive applied to the camera system in accordance with the present invention in perspective view. In the drawing, member 186 is the motor drive device body, 188 the camera mounting screw rotatably projecting on the body 186 and engageable into the screw hole provided on the bottom face of the camera body 4 so as to mount the device body 186 on the camera body 4, 190 the mount ring being adapted on the camera mounting screw 188, so as to rotate the mounting screw 188, 192 the power source switch of the motor drive device, 194 the picture number setting gear for setting the photographable number of pictures of the used film or the numbers of pictures desired by the photographer by means of the motor drive device. A film counter 196 displays the number of the remaining pictures in the film fed by means of this motor drive device or the number of the pictures set by the aforementioned picture number setting gear. Member 198 is a contact terminal to be connected to the contact device 72 provided on the lower surface of the camera body 4 when this motor drive device is mounted on the camera, 200 the winding coupler to be mechanically connected to the shaft of the winding lever of the camera when the motor drive device is mounted on the camera. A rewind lever 202 operates the winding back button 48 from the motor drive device, because this button cannot be operated when the motor drive device is mounted on the bottom surface of the camera body 4 and 204 the winding back button projecting on the device body 186 when operating the aforementioned winding back lever 202 so as to push the winding back button 48 on the bottom surface of the camera body 4. Hereby in order to mount the motor drive device on the camera it is necessary to take off the cover 70 on the bottom surface of the camera body 4 and to expose the coupler 206 to be mechanically linked with the shaft of the winding lever 14 of the camera. When the motor drive 186 has been mounted on the bottom surface of the camera body 4 after removing the cover 70, the winding coupler 200 at the side of the body 186 is adapted to the coupler at the side of the camera body 4 so as to enable film winding from the side of the motor drive.

It is necessary that the motor drive mounted on the camera should operate in close connection with other operations of the camera, for which purpose some transmission of information is necessary between the drive device and the camera. The contact device 72 at the side of the camera and the contact terminal 198 on the motor drive device are also provided for the above-mentioned purpose. Hence when the motor drive is mounted on the camera the three contacts 214, 216 and 218 included in the contact device 72 on the bottom surface of the camera body 4 are respectively connected electrically to the three contacts 208, 210 and 212 included in the contact terminal 198 of the motor drive device 186. The contact of the contact 208 with the contact 214 serves as the grounding between the camera and the motor drive device while the contact of the contact 210 with the contact 216 serves to transmit the signal for driving the winding motor from the camera to the motor drive until the winding has been terminated after termination of the exposure. Further, the contact of the contact 212 with the contact 218 serves to release the shutter of the camera by means of the shutter release provided at the side of the motor drive device.

A shutter release device 220 operates the camera to wind film by the shutter release and the motor drive device from a remote place. This shutter release 220 is connected to the motor drive device 186 by means of a control cord 222 of a corresponding length by inserting the plug 224 provided at the end of the control cord 222 into the socket 226 provided on the motor drive device 186. This shutter release 220 includes an operation button 228, which, when operated produces a shutter release signal from the motor drive to the camera through the contacts 212 and 218. The service of this operation button 228 is quite the same as that of the shutter release button 18 provided on the upper surface of the camera body 4. Further the aforementioned operation button can be locked in the pushed down state, when being displaced along the direction of the arrow while being pushed down.

To explain the motor drive device constructed as mentioned above in more detail, in order to apply the motor drive device to the camera, the cover 70 provided on the bottom surface of the camera body 4 is removed and then the bottom surface of the camera body 4 is laid on the upper surface of the motor drive device 186. In this state the winding coupler 220 is in a position in which the coupler 200 can be adapted to the coupler 206, while the mounting screw is in an engageable position into the screw hole 68. Further the pin 204 is opposed to the winding back button 48. Further it is necessary that the contacts 208, 210 and 212 of the contact terminal should be at the positions at which they can be brought into contact with the corresponding contacts 214, 216 and 218 of the contact device 72, respectively. This positioning can easily and quickly be made by holding the bottom surface of the camera body 4 by means of the holding edge 228 provided at the edge of the upper surface of the motor drive device so far as the camera and the motor drive device are not reversed in the direction. Then being rotated by rotating the mounting ring 190, the mounting screw 190 is engaged into the screw hole 68 provided on the bottom surface of the camera body 4 in such a manner that the motor drive device is secured on the camera body 4. In this state the winding coupler 200 is adapted to the coupler 206 and the contacts 208, 210 and 212 of the contact terminal 198 are brought into the corresponding contacts 214, 216 and 218 of the contact device 72. The winding coupler 200 and the coupler 206 are adapted to each other by engaging the two claws 230 of the winding coupler 200 into the two engaging holes 232 of the coupler. Hence depending upon the rotational position of the respective coupler at times the claws 230 of the winding coupler 200 do not engage the engaging holes 232 of the coupler well. In order to avoid such inconvenience, the winding coupler 200 is movable along its axial direction, and held in a protruding position by means of a spring. When the claws 230 of the winding coupler 200 are not engaging holes 232 of the coupler 206, the claws are retired, being pushed by other parts than the engaging holes 232 of the coupler 206. This avoids the need for unreasonable strength to be exercised on the couplers when mounting the motor drive. However, when due to the operation of the winding lever 14 at the side of the camera or the rotation of the winding coupler 200 or of the coupler 206 the claws 230 are brought into the position at which the claws 230 can be engaged into the engaging holes 232, the claws protrude by means of the strength of the spring so as to be engaged into the engaging holes 232.

With the mounting of the motor drive device, the film can be wound automatically after the termination of each photograph at the camera so as to take successive photographs. When the photographer desires to take pictures by means of the motor drive, the motor drive device is switched in by means of the power source switch 192. When at this time the film has been wound at the camera, the motor drive remains in the waiting state, while the film has not been wound yet the motor drive device enters into the waiting state, having once wound up the film. Then by operating the shutter release button 18 at the side of the camera, the film is wound by the motor drive after photographing a scene. Further by holding the aforementioned shutter release button 18, the shutter release and the film winding are repeated successively. Further every time the film is wound once, the film counter 196 carries out one subtraction until the content of the counter 196 becomes "0". This ends operation of the motor drive device. This particularly important for protecting the film perforations, and preventing the motor drive device from being exposed to the unreasonable pull.

When the film is wound back after the termination of the whole film, the rewinding lever 202 is wound back along the direction of the arrow, the winding back pin 48 of the camera is pushed by the pin and then it becomes possible to wind back the film.

The shutter release device 220 has the same efficiency as that of the shutter release button 18 provided at the side of the camera. When the operation button 228 is pushed down the shutter is released and the film is wound, while when the operation button is kept pushed or locked, the shutter is released and the film is wound in successive frames.

Further, when the shutter release button 18 is kept pushed down or the operation button 228 of the shutter release device is locked in the pushed down state while the selector lever 22 provided on the upper surface of the camera body 4 is being kept at the position at which the mark 28 is selected, the shutter is released and the film is wound repeatedly at a time interval determined by the self-timer mechanism.

As explained above the motor drive to be applied to the camera system in accordance with the present invention contributes much to enlarge the application of this camera and to increase its mobility, snap-shot efficiency and operability.

As explained above the viewfinder plays an important role for the camera handling, because almost all of the camera handling including the framing and the focusing constituting basic camera operation are made through the viewfinder in such a manner that the viewfinder has something very important with the operability of the camera. Therefore the operability can be further increased remarkably if almost all of the information necessary for the camera handling can be obtained through the viewfinder. It is essential that the photographic information to be displayed in the viewfinder should be distributed efficiently in a limited area where the displayed information could easily be recognized. This is important in order that the photographer can concentrate his attention to the framing and the focusing.

The viewfinder of the camera in accordance with the present invention presents a novel information display system by means of which photographic information can be efficiently and easily observed while the misoperation of the camera can be avoided. This improves camera operation.

Through this information display system the photographer can obtain various data such as the shutter time, the low brightness alarm for aperture value, the high brightness alarm for aperture value, the automatic or manual operation, the bulb signal, the flash unit charge completion signal and the misoperation alarm and so on. Thus, he is in a position to get all the data for all situations, while he is looking through the viewfinder.

FIG. 9 shows the viewfinder information displayed in the viewfinder window 13 of the camera, whereby on the focusing screen 234 a split portion 236 and a microprism portion 238 are arranged coaxially in order that the focusing can be carried out precisely and quickly. This focusing screen is one of the most important parts, because the image of the object is formed thereon so as to permit focusing and framing. The photographer can obtain desired information necessary for taking a picture from a part of the circumference of this focusing screen 234. In order that the photographic information can be recognized in darkness for example in case of flash photography or stage photography, the display consists of illuminating elements such as LED and the like. The present embodiment is characterized in the digital display of the data. Different from the conventional fixed point system or the conventional follow finger system from which relative photographic data are obtained, it is possible to obtain objective photographic data from the present digital display system of the information, so that the photographer can judge the depth of the object field and the unstable manual holding already in advance at the time of the framing and focusing operation in such a manner that a more correct photograph becomes possible.

The LED display on a part of the focusing screen 234 is composed of a first display part 244, composed of a numerical figure display part 242 with a figure display part 240 for displaying a reciprocal number and "8"; segments for displaying four numerical figures or signs and of a decimal point display part 243 for displaying the decimal point. A second display part 250 is composed of a decimal point display part 246 for displaying the decimal point and of a numerical figure display part 248 composed of "8" segments for displaying two numerical figures or signs and a third display part 252 for displaying a figure "M" at the time of manual operation.

The aforementioned first display part mainly serves to display the shutter time while the second display part mainly serves to display the aperture value. Other information can also be displayed in accordance with the operation mode.

Namely beside the display of the shutter time from 60 sec. to 1/2000 sec. the first display part displays "bulb" when "bulb" is selected as shutter time, "EF" display together with the speed light photographic shutter time so as to tell the photographer that flash photography is possible when the flash unit has been charged and "EEEE" twinkling display as an alarm so as to tell the photographer that normal photographing is possible.

Further beside the display of the aperture value from F1.2 to F22, in case the exposure is manually adjusted by means of the aperture setting ring 8 while the diaphragm of the lens device 2 is being closed, the aforementioned second display part displays an "oP" twinkling display so as to tell the photographer that the manually set aperture value produces an under-exposure, "oL" twinkling display so as to tell the photographer that the manually set aperture value will produce an over-exposure and "oo" display so as to tell the photographer that the manually set aperture value will produce a proper exposure. An "EE" twinkling display, together with the aforementioned first display part, serves as an alarm to tell the photographer that a normal photograph is impossible.

As explained above, the data displayed in the viewfinder have a close relationship with various operational modes of the camera. Consequently, the operational modes of the camera shown in FIG. 1 will be explained below while the information displayed in the viewfinder in accordance with the operational modes will be explained in accordance with FIG. 10.

If automatic exposure control photography (hereinafter called AE photography) is carried out with shutter priority by the camera shown in FIG. 1, the mode selector switch 38 on the camera body 4 is set for shutter priority so that the set shutter time can be entered by rotating the dial 34. Further the mark 12 on the aperture setting ring 8 at the lens device 2 is set at the mark 7 in such a manner that the diaphragm of the lens device 2 can be controlled, preset from the camera body 4. Now this camera has been set so that AE photography with shutter priority is possible. Rotation of the dial 34 alters the shutter time displayed in the aforementioned display part. The shutter time is displayed as is shown in FIG. 10 (a)-(I), and the photographer can select and set the desired shutter time by rotating the aforementioned dial 34, while looking at the shutter time displayed in the first display part 244. At the same time a not shown operational circuit operates an aperture value necessary for the proper exposure, or the over-exposure or the under-exposure designed by the photographer (the over-exposure or the under-exposure can be obtained by selecting (+) or (−) of the scale 42 of the ASA sensitivity setting dial provided on the upper surface of the camera body 4, whereby they are also called proper exposure here). Operation is in accordance with the object brightness information corresponding to the brightness of the object (or the illumination) and are displayed in the second display part 250 as is shown in FIG. 10 (a)-(I). In consequence the photographer can know the aperture value operated for the shutter time set by himself before the shutter time. When in this state the shutter is released in the camera, the diaphragm of the lens device 2 is closed down to the operated aperture value and the shutter is released with the set shutter time.

The aperture of the diaphragm of the lens device 2 to be used has the upper and the lower limit, whereby when the aperture value operated for the set shutter time is smaller than the smallest aperture value of the photographic lens device 2, namely the object brightness is too low, the aperture control with the operated aperture value is impossible. In this case, the second display part 250 displays twinkling of the aperture value of the photographic lens corresponding to the controllable aperture value, namely the smallest aperture value. Hereby the controlable aperture value of the photographic lens 2, namely the smallest aperture value is sensed from the totally open pin 90 of the photographic lens device 2 through the totally open input pin 96 at the side of the camera body 4.

In case the aperture value operated for the shutter time set by means of the dial 34 is larger than the largest aperture value of the photographic lens device 2, namely the object brightness is too high, the aperture control is impossible with the operated aperture value. In this case the second display part 250 flashes the aperture value of the photographic lens 2 corresponding to the controllable aperture value, namely the largest aperture value so as to tell the photographer the fact.

Hereby the controlable largest aperture value of the photographic lens device 2 is taken from the smallest diameter pin of the lens device 2 through the smallest diameter input pin 97 at the side of the camera body 4.

Hereby even if the smallest or the largest aperture value is displayed twinkling an alarm at the second display part 250 when the object brightness is too low or too high for the set shutter time, the shutter can be released. Hence, the aperture value is controlled by the value displayed twinkling at the second display part 250.

In case now the AE photography is carried out with aperture priority, the mode selector switch 38 provided on the camera body 4 is set for aperture priority in such a manner that the aperture value can be set and entered by operating the dial. Further the mark 12 of the aperture setting ring 8 at the lens 2 is set at the index in such a manner that the diaphragm of the lens device 2 can be preset and controlled at the aperture value set at the dial at the side of the camera body 4. The camera is now set for AE photography with aperture priority. The rotation of the dial 34 alters the aperture value displayed at the aforementioned second display part 250. The aperture value is displayed as is shown in FIG. 10(*a*)-(II), and the photographer is in a position to select and set the desired aperture value by operating the aforementioned dial 34, while looking at the aperture value displayed at the display part 250. At the same time the not shown operational circuit produces the shutter time necessary for obtaining the proper exposure in accordance with the object brightness information corresponding to the brightness of the object (or illumination information) and displayed at the first display part 244 as is shown in FIG. 10(*a*)-(II). In consequence, the photographer can learn the shutter time produced for the aperture value set by himself before the shutter release. When in this state the shutter is released, in the camera the diaphragm of the camera is closed to the set aperture value and the shutter is released with the operated shutter time.

Further the aperture value of the photographic lens device 2 has the upper and the lower limit. Hence with the aperture value set at the dial 34 at the camera body 4 is smaller than the smallest value of the photographic lens 2, the diaphragm cannot be controlled with the set aperture value. In this case, the aperture value can be misset, whereby some counter-measure is necessary. For such missetting in this embodiment the smallest aperture value of the photographic lens is treated as set. If for example the aperture value is set at "1.4" in F-number at the dial 34 at the camera body 4 although smallest aperture value of the lens device 2 is 1.8 in F-number, actually the aperture value is treated as set at "1.8" in F-number in the camera, and the shutter time is operated for this aperture value. At this time independently of the value set as the dial 34 the aperture value and the shutter time for actually controlling the exposure are displayed as is shown in FIG. 10(*e*)-(I).

When on the other hand, the aperture value set at the dial 34 at the camera body 4 is larger than the largest aperture value of the photographic lens 2, the diaphragm cannot be controlled with the set aperture value. In this case, the aperture value can be said to be misset and some counter-measures are necessary. In this embodiment for such missetting the largest aperture value of the photographic lens is treated to be set. In case for example, the aperture value of F-22 is set at the dial 34 at the side of the camera body 4 although the largest aperture value of the lens device 2 is "16" in F-number, in the camera the aperture value of "16" in F-number is treated to be set actually so as to operate the shutter time based upon this value. At this time, the aperture value and the shutter time for the actual exposure control independent of the value set at the dial 34 are displayed in the viewfinder as is shown in FIG. 10(*e*)-(II).

Further the shutter time controlable at the camera body 4 has the upper and the lower limit. In case the shutter time operated for the set aperture value is longer than the shutter speed controlable at the side of the camera body 4, namely the object brightness is too low, the shutter time cannot be controlled with the operated shutter time. In this case, the first display part 244 flashes a shutter time corresponding to the longest controllable shutter time so as to provide an alarm for the photographer.

In case the calculated shutter time for the aperture value set at the dial 34 is shorter than the time controlable in the camera body 4, namely the object brightness is too high, the shutter cannot be controlled at the calculated shutter time. In this case the first display part 244 intermittently displays the shortest shutter time capable of controlling shutter and hence furnishes an alarm for the photographer.

Hereby even if the first display part 244 flashes the longest or the shortest shutter time when the object brightness is too low or too high for the set aperture value, the shutter can be released. In this case the shutter time is controlled with the value intermittently displayed at the first display part 244.

The camera shown in FIG. 1 is intended mainly for the above-mentioned two modes, namely the AE photographic mode with shutter priority and the AE photographic mode with aperture priority. Almost all of the requirements of ordinary photography are thought to be met by the above-mentioned two modes.

However, on the lens 2 the mark 12 on the aperture setting ring 8 is not always set at the index 7. There is a possibility that at times the aperture value indication 9 on the ring 8 should be set at the index 7. In this case, the camera is brought into the totally opened light measured, manual exposure adjustment photographic mode. At this time two modes are possible, namely the mode in which the aperture value is manually set at the lens device 2 after the shutter time is set at the dial 34 with priority depending upon the mode selector 38, and the mode in which the same aperture value is also manually set at the lens 2 after the priority aperture value is set at the dial 34. In case now the mode selector 38 is set for shutter priority, the dial 34 serves to set an optional time. The selected and set shutter time is displayed at the first display part 244 as is shown in FIG. 10(*a*)-(II). In the camera, on the other hand, the aperture value of the photographic lens device 2 for obtaining the proper exposure is operated in accordance with the object brightness information obtained through the lens device or the set shutter time and so on and is displayed at the second display part 250 as is shown in FIG. 10(*a*)-(II). Further at this time, the aperture value displayed at the second display part 250 is not controlled from the camera body 4 but is preset at the lens 2 by setting the aperture value displayed at the second display part 250 out of the aperture value display 9 on the aperture setting ring 8 at the index 7 by means of the aperture setting ring 8 at the lens 2. Further in order to tell the photographer that it is necessary to set the aperture value displayed at the second display part 250 manually at the side of the lens device 2, the letter "M" is displayed at the third display part in the viewfinder. Further in case the mode selector 38 is set for aperture priority, the dial 34 serves to set the aperture value, whereby by operating this dial 34 an optional aperture value can be selected and set. The selected and set aperture value is displayed at the second display part 250 as is shown in FIG. 10(*a*)-(III). On the other hand, in the camera, the shutter time necessary for obtaining the proper exposure is obtained in accordance with the object brightness information obtained through the lens device 2 or the set aperture value and so on and displayed at the second display part 250 as is shown in FIG. 10(*a*)-(III). The aperture value displayed at the second display part 250 is not controlled from the side of the camera body 4 preset from the lens 2 by means of the aperture setting ring 8 at the lens 2 by setting a value equal to the aperture value displayed at the second display part out of the aperture value indication 9 on the aperture setting ring 8, namely the aperture value set at the dial 34 at the index 7. In this way the letter "M" is displayed at the third display part 252 in the viewfinder in order to tell the photographer that it is necessary to set the aperture value displayed at the second display part 250 manually at the side of the lens device 2.

As mentioned above by setting the shutter time or the aperture value with the dial and manually setting the aperture value at the lens 2 in accordance with the display at the second display part 250 in the viewfinder the lens 2 is closed to the position manually set in such a manner that in the camera body 4 the shutter is released with the shutter time set by means of the dial 34 or operated, whereby the proper exposure can be obtained.

If the mode selector 38 is set for aperture priority even if the camera is in this totally open light measuring, manual exposure adjustment photographic mode, AE photography with aperture priority is possible by advance setting of the dial 34 so it corresponds with the aperture value to be set at the lens device 2. Namely in case of the AE photography with priority on aperture value the exposure time for the set aperture value is operated and controlled, so that in case the lens 2 is preset for the aperture value preset in advance, the action of the system must be the same no matter whether the presetting is made from the camera body 4 or from the lens. Nevertheless the aperture value must be set by both the camera body 4 and the lens device 2 in this case, which is unavoidably a hindrance in operation.

In the totally open light measuring, manual exposure adjustment photographic mode if it happens that the aperture value operated for the set shutter time is smaller than the smallest aperture value of the lens device 2 or larger than the largest aperture value the smallest aperture value or the largest aperture value is displayed on-and-off in order to provide an alarm for the photographer.

Further in this mode it also happens that if the shutter time obtained for the set aperture value is shorter than the shortest shutter time controlable at the side of the camera body 4 or longer than the longest shutter time, the shortest shutter time or the longest shutter time is displayed as a flashing alarm.

Further especially in case the mode selector 8 is set for aperture priority in this mode, the range of the aperture value set at the dial 34 is naturally different from that which can be set at the side of the lens device 2.

In short the aperture value of the photographic lens device 2 to be used has an upper and a lower limit so that when the aperture value is set by the dial 34 at the camera body 4 is smaller than that of the smallest aperture value of the photographic lens device 2 the diaphragm cannot be controlled with the set aperture value. In this case the aperture value is misset, so that some counter-measures are necessary. For such a missetting in this embodiment, the smallest aperture value of the photographic lens is treated to be set. This is the same as the case with the AE photographic mode with priority on aperture value.

If on the other hand the aperture value set at the dial 34 on the camera body 4 is larger than the largest aperture value of the photographic lens device 2, the diaphragm cannot be controlled with the set aperture value. In this case, the aperture value is misset, and some counter-measures are necessary. For such missetting in this embodiment, the largest aperture value of the photographic lens is used. This is the same with the case with the AE photographic mode with aperture priority.

In case of the AE photographic mode with priority on shutter speed, the AE photographic mode with priority on aperture value and the totally open light measuring, manual exposure adjustment photographic mode, the light is measured with the totally open diaphragm, so that there remains a problem that the effect of the diaphragm closing, especially the object field depth at the time of shutter release cannot be confirmed on the focusing screen 234 in the viewfinder.

Especially in the case of AE photographic mode, the aperture value displayed in the second display part in the viewfinder is preset only after the shutter release so that before the shutter release the effect of the closed diaphragm cannot be confirmed by means of the diaphragm closing lever 64. The reason is that, as is clear from the explanation of FIG. 2, when the aperture setting ring 8 at the lens 2 is selected and set at the mark □ for the AE photographic mode, the Ae charge is released by operating the diaphragm closing lever 64 in such a manner that the diaphragm on the lens 2 cannot be controlled from the camera body 4, and therefore as mentioned the diaphragm closing lever 64 is locked so as to be unoperable.

On the other hand in case of the totally open light measuring, manual exposure adjustment photographic mode, it is possible to close the diaphragm of the lens device 2 down to the position preset at the aperture setting ring 8 on the lens 2 by operating the diaphragm closing lever 64. Through this operation the photographer can confirm the state of the image on the focusing screen when the diaphragm of the lens device 2 is closed down to the set position. The diaphragm closing operation at this time causes the camera to switch from light measurement with the totally open diaphragm to light measurement with the closed diaphragm. Hence the control operation in the camera differs depending upon whether the mode change changeover switch 38 is at the side of the priority on shutter time or of the priority on aperture value. In case hereby this mode changeover switch 38 is set at the side of the priority on aperture value, the camera is in the AE photographic mode with priority on aperture value with the light measurement through the closed diaphragm. When the switch 38 is set for shutter priority, the camera is in the manual exposure adjustment photographic mode with light measurement through the closed diaphragm.

Below the AE photographic mode with priority on aperture value with the light measurement through the closed diaphragm will be explained. The diaphragm of the lens device 2 is normally in the closed state, and the aperture value alters in accordance with the set position of the aperture setting ring 8. On the other hand no matter which aperture value is set at the dial 34 at this time, it is disregarded. In the camera body 4 at this time the object brightness with aperture value taken into consideration is measured through the lens 2 whose diaphragm is closed down to the position set by the aperture setting ring 8. Hence the shutter time is calculated for obtaining the proper exposure at this time. The shutter time obtained in this way is displayed at the first display part in the viewfinder as is shown in FIG. 10(*a*)-(IV).

When the shutter is released after the above-mentioned operation, the aperture value with the diaphragm in the closed state is maintained at the lens 2 while in the camera body 4 the shutter is released with the shutter time operated and displayed at the first display part 244 so as to obtain the proper exposure.

If the shutter time obtained from the light measured with the closed diaphragm is longer than the shutter time controlable in the camera body 4 even in the above-mentioned mode, the shutter cannot be controlled with the obtained shutter time. In such a case the shutter time corresponding to the longest controlable shutter time is flashed on-and-off at the first display part 244 as an alarm for the photographer.

If the shutter time obtained from the light measured with the closed diaphragm is shorter than the shortest controlable shutter time at the camera body 4, the shutter cannot be controlled with the operated shutter time. In such a case the shortest controlable shutter time is flashed on-and-off in the first display part as an alarm for the photographer.

In this photographic mode the aperture value is not displayed in the second display part 250 in the viewfinder. The reason is that, as is explained in accordance with FIG. 2, the camera body 4 does not have any means for taking the aperture value set by the aperture setting ring 8, in the lens 2.

Below the manual exposure adjustment photographic mode with the light measurement through the closed diaphragm will be explained. The diaphragm of the lens device 2 is normally in the closed state, and the aperture value varies in accordance with the set position of the aperture setting ring 8. On the other hand at this time the shutter time is set at the dial 34, and the set shutter time is displayed in the first display part 244 in the viewfinder. At this time in the camera body 4 the object brightness with the aperture value taken into consideration is measured through the lens device 2 whose diaphragm is closed down to the position set by the aperture setting ring, and whether the proper exposure can be obtained with the set shutter time is judged. If it is confirmed that with the combination of the then aperture value with the shutter time the proper exposure or the exposure with a predetermined allowance can be obtained, "00" is displayed in the second display part 250 as is shown in FIG. 10(a)-(V). This informs the photographer that the proper exposure or the exposure with a given allowance can be obtained with the set aperture value and the shutter speed.

When on the other hand it is judged that the exposure is insufficient with the combination of the then set aperture value and the shutter time, an "OP" display is flashed on-and-off in the second display part 250 as is shown in FIG. 10(a)-(V) so as to tell the photographer of under-exposure with the combination of the then set aperture value and the shutter time. In such a case the photographer can set the shutter time or the aperture value necessary for obtaining the proper exposure or the exposure with a certain allowance. This is done either by operating the aperture setting ring 8 so as to set the aperture value of the photographic lens device 2 smaller or by operating the dial 34 so as to set the shutter time longer until "00" for the proper exposure is displayed in the second display part 250.

When on the other hand it is judged that the exposure is excessive with the combination of the then set aperture value with the shutter time, "CL" is flashed off-and-on in the second display part 250 as is shown in FIG. 10(a)-(V) so as to tell the photographer than an over-exposure exists with the combination of the then set aperture value and the shutter time. In such a case the photographer can set the aperture value or the shutter time necessary for obtaining the proper exposure or the exposure with a given allowance. This is done either by operating the aperture setting ring so as to set the aperture value of the photographic lens device 2 larger or by operating the dial so as to set the shutter time shorter until "00" for the proper exposure is displayed in the second display part 250.

This manual exposure adjustment photographic mode with the light measurement through the closed diaphragm "M" for the manual mode is displayed in the third display part 252 in the viewfinder.

When the shutter is released after the above-mentioned operations the aperture value with the closed diaphragm is maintained in the lens device 2 while in the camera body 4 the shutter is released with the shutter time set by the dial 34. Thus the proper exposure can be obtained.

When the mode selector switch 38 is then set at the side of the priority on shutter time, the bulb mode can be selected by the dial 34. In case the dial 34 is set at "bulb", the shutter is kept open while the shutter release button 18 is being operated in such a manner that the shutter time can be selected optionally by the photographer. In most cases bulb is used for long time exposure.

Further in case of the bulb photographic mode, when the bulb is set by the dial while the mark 12 is set at the index 7 with the aperture setting ring 8 on the lens 2, the aperture value to be controlled cannot be operated because no shutter time is set. In consequence it is desirable that the aperture should be set manually at some value. Hence the present embodiment is constructed so that the aperture is controlled at the smallest value in case no special aperture value is set. The bulb photographic mode is mostly used in case of low brightness. At this time in the first display part 244 in the viewfinder "bulb" is displayed while in the second display part 250 the aperture value of the photographic lens device 2 to be used where diaphragm is totally open is displayed as is shown in FIG. 10 (b)-(1).

On the other hand in the bulb photographic mode, when the bulb is set by the dial 34 while the aperture value is set at the lens 2 in accordance with the aperture value indication 9 on the aperture setting ring 8, the camera completely enters the manual mode. In the viewfinder at this time "bulb" is displayed in the first display part 244 as is shown in FIG. 10 (b)-(II), while in the third display part 252 "M" is displayed. The reason why at this time the aperture value set at the lens 2 is not displayed in the second display part 250 is that, as already explained repeatedly, the camera body does not have any means for sensing the aperture value set at the side of the lens device 2.

Below the flash photographic mode will be explained. This camera is constructed so that the flash unit shown in FIG. 5 is used, so that the exposure can be automatically controlled by the flash unit.

The flash unit shown in FIG. 5 includes an automatic light adjusting efficiency as mentioned and is mounted on the camera body 4 by engaging the shoe 134 on the accessory shoe 50 provided at the camera 4. This brings the synchronization contact 138, the control signal contact 140 and the data signal contact 142 into electrical contact with the synchronization contact 52, the control contact 54 and the data terminal 56 on the camera body 4.

It is necessary to consider this flash unit, dividing its mode into two modes, namely the automatic light adjustment mode and the total light amount mode.

The above-mentioned automatic light adjustment mode is selected when a predetermined aperture value is set by the aperture setting dial 108. As explained, in order to give a proper exposure to the film surface with the set aperture value, the flash light is projected from the illuminating part 102 while the light reflected from the object is detected by the detector 104 so as to adjust the amount of the flash light projected from the above-mentioned illuminating part 102. Hence the aperture value set by the aperture setting dial 108 is sent to the camera body 4 through the data signal contact 142 and the data terminal 46 as an analog signal.

On the other hand the total light amount mode is selected when the mark "M" is set by the aperture setting dial 108 instead of a particular aperture value, and the flash unit issues the largest possible total amount of light. The fact that the flash unit is in the total light amount mode is transmitted to the side of the camera body 4 through the data signal contact 142 and data terminal 56 by means of an analog signal at a predetermined level.

No matter in which mode the speed light device is, it gives the camera body 4 a signal for controlling the shutter time. The reason is, as is already mentioned, that the now existing focal plane shutter cannot be synchronized with the flash with a shutter time shorter than 1/60 sec. or 1/125 sec. Hence either the fully automatic control or the semi-automatic control can be optionally selected. This fully automatic control or the semi-automatic control is selected by means of the changeover switch 146. If the fully automatic control system is selected, no matter which shutter time is selected by the dial 34 of the camera body 4, at the same time with the charge completion of the flash unit the charge completion signal is delivered as an analog signal at one level from the flash unit through the contro signal contact 140 and control terminal 54 so as to set the shutter time at the side of the camera body 4 at the speed light synchronization shutter time TSYN. If the semi-automatic control system is selected, only when a shutter time shorter than the speed light synchronization time TSYN is selected by the dial 34 at the camera body 4 the charge completion signal of another level is delivered as an analog signal from the flash unit through the control signal contact 140 and the control terminal 54. This automatically sets the shutter time on the camera body 4 at the speed light synchronization shutter time TSYN. When shutter time set by the dial 34 of the camera body 4 is longer than the speed light synchronization time TSYN, the shutter time remains uncontrolled.

No matter whether the fully automatic system or the semi-automatic system is selected by the changeover switch at the side of the flash unit, in case the "bulb" is selected by the dial 34 at the side of the camera body 4, the shutter of the camera operates with the first priority on bulb.

On the other hand the efficiency of the camera greatly alters in accordance with the position at which the aperture setting ring 8 at the lens device 2 is set, no matter in which state the camera body 4 and the flash unit are. This depends upon whether the mark 12 is set at the index 7 by the aperture setting ring 8.

When the charge completion signal is delivered from the flash unit to the camera body 4 in case of the flash photographic mode, "EF" is displayed in the last two positions at the first display part 244 in the viewfinder so as to tell the photographer that the flash unit is ready for operation as is shown in FIG. 10 (c).

Below various kinds of control or operation systems will be explained. It goes without saying that it is necessary to apply these systems so as to meet the photographic purpose.

The first is when the flash unit is in the fully automatic light adjusting mode, the fully automatic mode is set for the shutter time and moreover the shutter time is set by the dial 34 and the mark 12 is selected by the aperture setting ring 8. At this time the camera is in the AE photographic mode with priority on shutter time before the charge completion of the flash unit. Thus when the charge completion signal is delivered from the flash unit to the camera body 4 the camera is brought into full automatic control, automatic light adjustment, and automatic flash photographic mode. At this time the shutter time at the camera body 4 is automatically set at the speed light synchronization shutter time TSYN, for example at 1/60 sec so that the diaphragm of the photographic lens 2 is controlled from the camera body 4 with the aperture value set by the aperture setting dial 108 at the side of the flash unit. At this time the display in the viewfinder is as shown in FIG. 10 (c)-(I), whereby in the first display part 244 the speed light synchronization shutter time TSYN, for example 1/60 sec, and "EF" for the charge completion signal of the flash unit are displayed, while in the second display part 250 the aperture value set at the side of the flash unit is displayed. When the shutter is released in this state, the flash unit operates with the automatic light adjustment itself while the camera is controlled with the same shutter time and the same aperture value as is shown in the viewfinder.

The second is when the flash unit is in the automatic light adjustment mode, the fully automatic control is set for the shutter time and moreover the shutter time is set by the dial, while the mark 12 is not selected by the aperture setting ring 8. At this time the camera is in the manual exposure control photographic mode with light measurement through the totally open diaphragm and ready for operation before the charge completion of the flash unit. When the charge completion signal of the flash unit is given to the camera body 4 the camera is brought into full automatic control, automatic light adjustment, and the manual speed light photographic mode. At this time the shutter time on the camera body 4 is automatically set at the speed light synchronization shutter time, while the diaphragm of the photographic lens 2 is manually set and controlled by means of the aperture setting ring 8. The display at this time is as is shown in FIG. 10 (c)-(II). In the first display part 244 the speed light synchronization shutter time and "EF? for the charge completion of the flash are displayed. In the second display part 250 the aperture value set at the side of the flash unit is displayed and in the third display part "M" is displayed so as to tell the photographer that it is necessary to set the aperture by the aperture setting ring 8 manually. In consequence it is necessary for the photographer to set the aperture at the lens 2 in accordance with the aperture value displayed at the second display part 252 in the viewfinder, namely the aperture value set at the flash unit. Thus when the shutter is released in this state, the flash unit operates with the automatic light adjustment mode itself. The camera is controlled with the same shutter time as displayed in the viewfinder and the aperture value manually set at the lens device.

The third situation is when the flash unit is in the automatic light adjustment mode, the fully automatic control is set for the shutter and moreover the shutter time is set at the position of bulb by the dial 34 and the mark 12 is selected at the aperture setting ring. At this time the camera is in the bulb photographic mode before the charge completion of the flash. Hence, bulb photography is possible with the totally open diaphragm. When the charge completion signal of the flash unit is given to the camera body 4 the camera is brought into the bulb, automatic light adjustment, and automatic speed light photographic mode. At this time the shutter time at the camera body 4 is set at bulb with priority and the diaphragm of the photographic lens 2 is controlled from the camera body 4 with the aperture value set by the aperture setting dial 108 at the side of the flash unit. The display in the viewfinder at this time is as is shown in FIG. 10 (c)-(III). In the first display part 244 "b" for the "bulb" photographic mode and "EF" for the charge completion signal of the flash unit is displayed while in the second display part 250 the aperture value set at the side of the flash unit is displayed. When the shutter is released in this state the flash unit operates with the automatic light adjustment mode itself while the camera is controlled with a shutter time optional to the photographer and the same aperture value as shown in the viewfinder.

The fourth situation is when the flash unit is in the automatic light adjustment mode, the fully automatic control is set for the shutter and moreover the shutter time is set at the bulb position by means of the dial 34, while the mark 12 is not selected by the aperture setting ring 8. At this time the camera is in the bulb photographic mode before the charge completion of the flash unit. Now bulb photography is possible with the aperture value set at the side of the lens device 2. When the charge completion signal of the flash unit is given to the camera body 4, the camera is brought into the bulb, automatic light adjustment, and the manual flash photographic mode. The shutter time at the of the camera at this time is set and maintained at the bulb with priority, while the aperture of the photographic lens 2 is manually set and controlled by means of the aperture setting ring 8. The display in the viewfinder at this time is as is shown in FIG. 10 (c)-(IV). In the first display part 244 "b" for the bulb photographic mode and "EF" for charge completion signal of the flash unit are displayed. In the second display part 250 the aperture value set at the side of the flash unit is displayed and in the third display part 252 "M" is displayed so as to tell the photographer that it is necessary to set the aperture manually by means of the aperture setting ring 8. In consequence it is necessary for the photographer to set the aperture at the lens device 2 in accordance with the aperture value displayed in the second display part 252 in the viewfinder. That is, the aperture set in the flash unit. When the shutter is now released the flash unit operates with the automatic light adjustment mode itself, while the camera is controlled with the shutter time optional to the photographer and the aperture value is manually set at the lens 2.

The fifth situation is when the flash unit is in the automatic light adjustment mode, the semi-automatic control is set for the shutter and moreover the shutter time is set by the dial 34 and the mark 12 is selected at the aperture setting ring 8. Here the camera is in the AE photographic mode with priority on shutter time before the charge completion of the flash unit, being ready for AE photography. When the charge completion signal of the flash unit is applied to the camera body, the camera is brought into the semi-automatic control, automatic light adjustment, and automatic speed light photographic mode. If at this this time the shutter time set by the dial 34 at the camera body is shorter than the speed light synchronization shutter time TSYN, the shutter time at the side of the camera body 4 is set at the speed light synchronization shutter time TSYN. When the shutter time set by the dial 34 at the camera body is longer than the speed light synchronization shutter time TSYN, the shutter time at the side of the camera body 4 is set at the value set by the dial, while the diaphragm of the lens device 2 is controlled from the side of the camera body 4 with the aperture value set by the aperture setting dial 108 at the flash unit. The display at this time is as is shown in FIG. 10 (c)-(V). The first display part 244 displays the speed light synchronization shutter time TSYN or the set shutter time and "EF" for the charge completion signal of the flash unit. The second display part 250 displays the aperture value set at the flash unit. When the shutter is released in this state the flash unit operates with the automatic light adjustment mode itself, while the camera is controlled with the same shutter time and the same aperture value as indicated in the viewfinder.

The sixth situation is when the flash unit is in the automatic light adjustment mode, the semi-automatic control is set for the shutter and moreover the shutter time is set by the dial 34, while the mark 12 is not selected by the aperture setting ring 8. Here the camera is in the manual exposure adjustment photographic mode with the light measurement through the totally open diaphragm before the charge completion of the flash unit, and is ready for operation. When the charge completion signal of the flash unit is given to the camera body 4, the camera is brought into the semi-automatic control, automatic light adjustment, and manual speed light photographic mode. When at this time the shutter time set by the dial 34 at the camera body is shorter than the speed light synchronization shutter time, the shutter time at the side of the camera body 4 is set at the speed light synchronization shutter time. While the shutter time set by the dial 34 of the camera body 4 is longer than the flash synchronization shutter time, the shutter time at the camera body 4 is set by the dial 34. The photographic lens 2 is manually set and controlled by the aperture setting ring 8. The display in the viewfinder at this time is as is shown in FIG. 10 (c)-(VI). In the first display part 244, displays the speed light synchronization shutter speed TSYN or the set shutter time and "EF" for the charge completion of the flash unit. The second display part 250 displays the aperture value set at the flash unit. The third display part 252 displays "M" so as to tell the photographer that it is necessary to set the aperture manually by means of the aperture setting ring 8. In consequence it is necessary for the photographer to set the aperture at the lens device 2 in accordance with the aperture value indicated in the second display part 252 in the viewfinder, namely the aperture value set at the side of the lens device 2. Thus, when the shutter is released in this state, the flash unit operates in the automatic light adjustment mode itself while the camera is controlled with the same shutter time as is displayed in the viewfinder and the aperture value is manually set at the lens device 2.

The seventh situation is when the flash unit is in the automatic light adjustment mode, the semi-automatic control is set for the shutter and moreover the shutter time is set at the bulb position by means of the dial 34 and the mark 12 is selected by the aperture setting ring 8. The camera is in the bulb photographic mode before the charge completion of the flash unit, being in a position to carry out the bulb photography with the smallest aperture value. When the charge completion signal of the flash unit is given to the camera body 4 the camera is brought into the bulb, automatic light adjustment, automatic flash photographic mode. At this time the shutter time at the side of the camera body 4 is set and maintained at the bulb with priority, while the photographic lens 2 is controlled from the camera body 4 with the aperture value set by means of the aperture setting dial 108 at the flash unit. The display in the viewfinder at this time is as is shown in FIG. 10 (*c*)-(VII). In the first display part 244 "b" for the bulb photographic mode and "EF" for the charge completion of the flash unit are displayed. The second display part 250 displays the aperture value set at the side of the flash unit. When the shutter is released in this state, the flash unit operates in the automatic light adjustment mode itself while the camera is controlled with the shutter time optional to the photographer and the same aperture value is as shown in the viewfinder.

The eighth situation is when the flash unit is in the automatic light adjustment mode, the semi-automatic control is set for the shutter and moreover the shutter time is set at the bulb by means of the dial 34 while the mark 12 is selected by the aperture setting ring 8. Here the camera is in the bulb photographic mode before the charge completion of the flash unit, and is in a position to carry out bulb photography with the aperture value set at the lens device 2. When the charge completion signal of the flash unit is given to the camera body 4, the camera is brought into the bulb, automatic light adjustment, and manual speed light photographic mode. At this time the shutter time at the side of the camera body 4 is set and maintained at bulb with priority, while the aperture of the photographic lens 2 is set and controlled by means of the aperture setting ring 8 manually. The display at this time is as is shown in FIG. 10 (*c*)-(VIII). The first display part 244 displays "b" for the bulb photographic mode and "EF" for the charge completion of the speed light device. The second display part 250 displays the aperture value set at the flash unit. The third display part 252 displays "M" to tell the photographer that it is necessary to set the aperture manually by the aperture setting ring 8. In consequence it is necessary for the photographer to set the aperture at lens device 2 in accordance with the aperture value displayed in the second display part 252 in the viewfinder. That is, the aperture value is set at the flash unit. Hence when the shutter is released in this state the flash unit operates in the automatic light adjustment mode itself while the camera is controlled with the shutter time optional to the photographer and the aperture value set manually at the lens device 2.

The ninth situation is when the flash unit is in the total light amount mode, the full automatic control mode is set for the shutter and moreover the shutter time is set by the dial 34 and the mark 12 is selected by the aperture setting ring 8. The camera is in the AE photographic mode with shutter priority before the charge completion of the flash unit, in a position to carry out AE photography. When the charge completion signal of the flash unit is delivered to the camera body 4, the camera is brought into the fully automatic, total light amount, flash photographic mode with largest aperture value. At this time the shutter time at the camera body 4 is automatically set at the speed light synchronization shutter time TSYN, for example 1/60 sec, while the photographic lens 2 is controlled with the largest aperture value of the photographic lens 2 to be used. The display in the viewfinder at this time is as is shown in FIG. 10 (*d*)-(I). The first display part 244 displays the speed light synchronization shutter time, for example 1/60 sec. and "EF" for the charge completion of the flash unit are displayed. Nothing is displayed in the second display part 250 so as to alarm the photographer as misoperation, because the largest aperture value of the lens device does not always offer the proper exposure.

When the shutter is released in this state, the flash unit issues the total light amount, while the camera is controlled with the same shutter time as is displayed in the viewfinder and the largest aperture value of the lens device 2.

The tenth situation is when the flash unit is in the total light amount mode, the fully automatic control mode is set for the shutter and moreover the shutter time is set by the dial 34 while the mark 12 is not selected by the aperture setting ring 8. Here the camera is in the manual exposure adjustment photographic mode with the light measurement through the totally open diaphragm before the charge completion of the flash unit, and is ready for operation. When the charge completion signal of the flash unit is given to the camera body 4, the camera is brought into the fully automatic, total light amount, manual flash photographic mode. At this time the shutter time at the side of the camera body 4 is automatically set at the speed light synchronization shutter time. The aperture of the photographic lens 2 is manually set and controlled by means of the aperture setting ring 8. The display in the viewfinder at this time is as is shown in FIG. 10 (*d*)-(II). The first display part 244 displays the speed light synchronization shutter time and the "EF" for the charge completion of the flash unit. The third display part displays "M" to tell the photographer that it is necessary to set the aperture by means of the aperture setting ring 8 manually. In consequence it is necessary for the photographer to set the aperture manually by means of the aperture setting ring 8 by obtaining the aperture value to be set at the lens device 2 based upon the distance from the camera to the object by making use of the guide number calculator 106 belonging to the flash unit.

When the shutter is released in this state, the flash unit issues the total light amount. The camera is controlled with the same shutter time as is displayed in the viewfinder and the aperture value manually set at the lens device 2.

The eleventh situation is when the flash unit is in the total light amount mode, the fully automatic mode is set for the shutter and moreover the shutter time is set at the position of bulb by the dial 34 and the mark 12 is selected by the aperture setting ring 8. At this time the camera is in the bulb photographic mode before the charge completion of the flash unit, and in a position to carry out bulb photography with the totally open diaphragm. When the charge completion signal of the flash unit is given to the camera body 4 the camera is brought into the bulb, total light amount, largest aperture value flash photographic mode. At this time the shutter time at the camera body 4 is kept set at the bulb with priority, whereby the photographic lens 2 is controlled with the largest aperture value of the photographic lens device 2. The display in the viewfinder at this time is as is shown in FIG. 10 (*d*)-(II). The first display part 244 displays "b" for the bulb photography and "EF" for the charge completion of the flash unit.

When the shutter is now released, the flash unit operates with total light amount mode, while the camera is controlled with a shutter time optional to the photographer and the largest aperture value of the lens device 2.

The twelfth situation is when the flash unit is in the total light amount mode, the fully automatic mode is set for the shutter and moreover the shutter time is set at the position of bulb with the dial 34, while the mark 12 is not selected at the aperture value setting ring 8. At this time the camera is in the bulb photographic mode before the charge completion of the flash unit, and in a position to carry out the bulb photography with the aperture value set at the side of the lens device 2. The charge completion signal of the flash is given to the camera body 4 the camera is brought into the bulb, total light amount, manual flash photographic mode. At this time the shutter time at the side of the camera body 4 is kept set at the bulb with priority, while the photographic lens 2 is set and controlled manually with the aperture setting ring 8. The display in the viewfinder at this time is as is shown in FIG. 10 (*d*)-(IV), whereby in the first display part 244, "b" for the bulb photographic mode and "EF" for the charge completion of the flash unit are displayed while in the third display part 252 "M" is displayed so as to tell the photographer that it is necessary to set the aperture value by means of the aperture setting ring 8 manually. In consequence it is necessary for the photographer to set the aperture value by means of the aperture setting ring manually, obtaining the aperture value to be set at the lens device 2 basing upon the distance from the camera to the object by making use of the guide number calculator 106 belonging to the flash unit.

When the shutter is released in this state, the flash unit operates in the total light amount mode while the camera is controlled with a shutter time optional to the photographer and the aperture value manually set at the lens device 2.

The thirteenth situation is when the flash unit is in the total light amount mode, the semi-automatic mode is set for the shutter and moreover the shutter time is set by the dial 34 and the mark 12 is selected with the aperture value setting ring 8. At this time the camera is in the AE photographic mode with priority on shutter time before the charge completion of the flash unit, and in a position to carry out the AE photography. When the charge completion signal of the flash unit is given to the camera body 4, the camera is brought into the semi-automatic, total light amount, largest aperture value flash photographic mode. When at this time the shutter time set with the dial 34 at the side of the camera body 4 is shorter than the speed light synchronization shutter time TSYN the shutter time at the side of the camera body 4 is shorter than the speed light synchronization shutter time TSYN the shutter time at the side of the camera body 4 is set at the speed light synchronization shutter time TSYN. When the shutter time set with the dial 34 is longer than the speed light synchronization shutter time TSYN, the shutter time at the side of the camera body 4 is set at the speed light synchronization shutter time TSYN. Hence the photographic lens 2 is controlled with the largest aperture value of the photographic lens device 2. The display in the viewfinder at this time is as is shown in FIG. 10 (*d*)-(V). The first display part 244 shows the speed light synchronization shutter time or the set shutter time and "EF" for charge completion of the flash unit.

When the shutter is released in this state, the flash unit operates in the total amount mode, while the camera is controlled with shutter time displayed in the viewfinder and the largest aperture value of the lens device 2.

The fourteenth situation is when the flash unit is in the total light amount mode, the semi-automatic mode is set for the shutter and moreover the shutter time is set at the dial 34, while the mark 12 is not selected with the aperture setting ring 8. At this time the camera is in the totally open light measuring, manual exposure adjustment mode before the charge completion of the flash unit, being ready for operation. When the charge completion signal of the flash unit is given to the camera body 4, the camera is brought into the semi-automatic, total light amount, manual flash photographic mode. When at this time the shutter time set with the dial 34 at the side of the camera body 4 is shorter than the speed light synchronization shutter time, the shutter time at the side of the camera body 4 is set at the speed light synchronization shutter time. When the shutter time set with the dial 34 at the side of the camera body 4 is longer than the speed light synchronization shutter time, the shutter time is set at the value set with the dial 34. Thus the photographic lens 2 is set and controlled manually with the aperture setting ring 8. The display in the viewfinder at this time is as is shown in FIG. 10 (*d*)-(VI). The first display part 244 displays the speed light synchronization shutter time or the set shutter time and "EF" for the charge completion of the flash unit. The third display part 252 displays "M" to tell the photographer that it is necessary to set the aperture value with the aperture setting ring 8 manually. In consequence it is necessary for the photographer to set the aperture value with the aperture setting ring 8 manually, and obtain the aperture value to be set at the lens device 2 based upon the distance from the camera to the object by making use of the guide number calculator 106 belonging to the flash unit.

When the shutter is released in this state, the flash unit operates in the total light amount mode. The camera is controlled with the shutter time displayed in the viewfinder and the aperture value manually set at the lens device 2.

The fifteenth is when the flash unit is in the total light amount mode, the semi-automatic mode is set for the shutter and moreover the shutter time is set at the position of the bulb with the dial 34 and the mark 12 is selected with the dial 34. At this time the camera is in the bulb photographic mode before the charge completion of the flash unit being in a position to carry out the bulb photography with a totally opened diaphragm. When the charge completion signal of the flash unit is given to the camera body 4, the camera is brought into the bulb, the total light amount, largest aperture value speed light photographic mode. The shutter time at the side of the camera body 4 at this time is kept set at the bulb with priority, while the photographic lens 2 is controlled with the largest aperture value of the photographic lens device 2. The display in the viewfinder at this time is as is shown in FIG. 10 (*d*)-(VII). The first display part 244 displays "b" for the bulb photographic mode and "EF" for the charge completion of the flash unit are displayed.

When the shutter is released in this state, the flash unit operates in the total light amount mode, while the camera is controlled with the shutter time optional to the photographer and the largest aperture value of the lens device 2.

The sixteenth is when the flash unit is in the total light amount mode, the semi-automatic mode is set for the shutter and moreover the shutter time is set at the position of the bulb with the dial 34, while the mark 12 is not selected with the aperture setting ring 8. At this time the camera is in the bulb photographic mode before the charge completion of the flash unit, and in a position to carry out bulb photography with the aperture value set at the side of the lens device 2. When the charge completion signal of the flash unit is given to the camera body 4, the camera is brought into the bulb, total light amount, manual flash photographic mode. At this time the shutter time at the side of the camera body 4 is kept set at the bulb with priority, while the photographic lens 2 is set and controlled with the aperture setting ring 8. The display in the viewfinder at this time is as shown in FIG. 10 (d)-(VIII). In the first display part 244 "b" is displayed for the bulb photographic mode and "EF" for the charge completion of the flash unit. The third display part 252 displays "M" to tell the photographer that it is necessary to set the aperture manually with the aperture setting ring 8. In consequence it is necessary for the photographer to set the aperture with the aperture setting ring 8 manually, obtaining the aperture value set to the lens device 2 based upon the distance from the camera to the object by making use of the guide number calculator 106 belonging to the flash unit.

When the shutter is released in this state, the flash unit operates in the total light amount mode. The camera is controlled with the shutter time optional to the photographer and the aperture value set at the lens device 2 manually.

When the mode selector switch 38 at the side of the camera 4 is selected for aperture priority for the flash photographic mode, the aperture value set with the dial 34 is completely disregarded. The aperture is controlled with the value set at the flash or the value set with the aperture setting ring 8 at the lens device 2 or the largest value.

When now the flash unit is in the fully automatic mode the shutter time is automatically set at the speed light synchronization shutter time, for example, 1/60 sec. When the flash unit is in the semi-automatic mode, there is a danger that the shutter time longer than the speed light synchronization shutter time could not be controlled in case no shutter time is not set at the camera body 4. In consequence each of the above-mentioned modes is effective only when the mode changeover switch 38 is set for shutter priority. Hence at times there is a possibility that semi-automatic flash photography is carried out while the mode changeover switch 38 remains set for aperture priority. Thus in order to avoid the above mentioned shortcoming, the shutter time is set at the speed light synchronization shutter time regardless of the state of the changeover switch 146. This is so even if the semi-automatic mode is set at the flash unit when the mode selector switch 38 is set for aperture priority in the flash photographic mode as if it were controlled in the so-called fully automatic mode. The reason is that the semi-automatic mode is used only when there is something intended with reference to the shutter time so that the semi-automatic mode is never used with aperture priority.

The above mentioned photographic modes at the time of flash photography are shown in FIG. 11 (A) schematically. Bulb photography is not shown particularly because the same thing can be said of when the shutter time is replaced with bulb.

Below the counter-measures against misoperation of the camera system in accordance with the present invention will be explained.

Originally the camera system based upon a synthetic and rational system should be so designed that there could be no room for mishandling or misoperation. So far as we know the exposure control means, such as the shutter mechanism or the diaphragm mechanism by means of which the best and most precise picture can be obtained at present consists mostly of mechanical components while their operation is controlled by means of a complicated sequence mechanism. On the other hand in order to apply reasonable control to the camera as a synthetic system it is necessary to introduce electrical control mechanism on a large scale. It is quite difficult to design the system completely free from the mishandling or misoperation, handicapped by the interface of the electro-mechanism or the complicated mechanism of the camera. In this respect the present embodiment adopts a system for telling the photographer of his mishandling and for locking the shutter release so as to avoid misoperation due to mishandling.

What is considered as mishandling of the camera in the present embodiment will be explained below in accordance with the logic diagram shown in FIG. 11 (B). Here the mishandling has a close connection with the operation of the lever 84 of the lens device 2 and the lever 94 of the camera body 4 as is explained in accordance with FIG. 2. Namely when the mark 12 is selected and set at the aperture setting ring 8 at the lens 2 this is considered to be equivalent to the case when the largest aperture value is selected at the lens 2. Hence in case no aperture control is made by means of the AE lever AE at the body 4 at all the lens device is to be controlled with the largest aperture value unconditionally. This is uncontrollable. Further when the AE lever is not charged in case of AE photography the aperture control of the lens device 2 from the side of the camera body 4 is impossible. In the present embodiment the above two cases are considered as misoperation and the alarm lock is made. These cases correspond to the states shown in FIG. 11 (B)-(I), (II), (III), (IV). The states shown in FIG. 11 (B)-(III), and (IV) are those after the film has been wound by means of the winding lever 14. The reason is that before the AE charge occasioned by the film winding the AE lever 94 is in the AE discharge state without any particular operation. This state is not always a misoperation state. Here there exists no AE charge state in which the diaphragm of the lens device 2 is closed by means of the diaphragm closing lever 64, as is clear from the explanation made in accordance with FIG. 2. Thus the corresponding space is blank in FIG. 11 (B).

Now let us consider in which case the misoperation states shown from FIG. 11 (B)-(V) to FIG. 11 (B)-(IV) take place.

If the mark 12 is selected with the aperture setting ring 8 at the lens 2 the camera is either in the AE photographic mode with priority on shutter time or in the AE photographic mode with aperture value depending upon the state of the mode selector switch. Here, the display in the viewfinder is as is shown in FIG. 10 (a) (I) or (II). The photographer may now try to confirm the object field depth on the finder screen in this state by actually closing the diaphragm of the lens device 2 down to the aperture value displayed in the second display part 250. However, it is impossible in the AE photographic mode to close the diaphragm of the lens device 2 down to the aperture value set at the camera body or electrically obtained due to the construction of the AE lever 94. If in spite of this situation the diaphragm of the lens device 2 would be closed by means of the diaphragm closing lever 64, the diaphragm of the lens device 2 should be closed down to the largest aperture value, because the position set with the mark 12 of the aperture setting ring 8 corresponds to the position of the largest aperture value of the lens device 2. These states correspond to those shown in FIG. 11 (B)-(I), (II) and are an apparent mishandling. In case of the present embodiment such a situation is prevented because as already explained the diaphragm closing lever 64 is restricted in its operation so far as the mark 12 is selected at the aperture setting ring of the lens. On the other hand, in order to confirm the object field depth the photographer can at first release the selection of the mark 12 with the aperture setting ring 8 of the lens device 2 as a first step. He can then set the aperture value to be manually confirmed at the lens 2 and then operate the diaphragm closing lever 64 so as to close the diaphragm down to the position set at the lens 2. The camera is now in the manual exposure adjustment photographic mode with light measurement through the closed diaphragm or in the AE photographic mode with priority on aperture value with light measurement through the closed diaphragm in such a manner that the object field depth can be confirmed. In this state, as is clear from FIG. 2, the AE lever 94 is in the AE discharge state.

However, if the photographer resets the mark 12 of the aperture setting ring 8 of the lens device 2 out of the abovementioned state, the state as is shown in FIG. 11 (B)-(I) or (II) is affirmed, which is, as explained, apparently a mishandling. Now the alarm "EEEE EE" is displayed "twinkling" as is shown in FIG. 10 (f) so as to prevent shutter release.

Further in case the photographer releases the close diaphragm of the lens 2 by means of the closed diaphragm releasing button 66 out of the state shown in FIG. 11 (B)-(I) or (II), the AE photographic mode is resumed while the AE lever 94 remains AE discharged as is shown in FIG. 11 (B)-(III), (IV), which is also a mishandling, the AE photography being impossible. The alarm lock "EEEE EE" is flashed off-and-on in the viewfinder as is shown in FIG. 10 (f) so as to prevent shutter release.

Here by releasing the mark 12 from the aperture setting ring 8 of the lens device 2 in the state shown in FIG. 11 (B)-(I), (II), the photographer alerted to the mishandling as is shown in FIG. 10 (f) is able to carry out manual exposure adjustment photography with the light measurement through the closed diaphragm or the AE photography with aperture priority with the light measurement through the closed diaphragm. The operator also becomes able to carry out manual exposure adjustment photography with the light measurement through the totally open diaphragm by opening the diaphragm of the lens 2 with the closed diaphragm releasing button 66. Further by setting the mark 12 at the aperture setting ring 8 of the lens device 2, the state is again brought into the alarm lock state as is shown in FIG. 11 (B)-(III), (IV). The alarm lock state can be released as follows.

By releasing the mark 12 from the aperture setting ring 8 of the lens device 2 in the state shown in FIG. 11 (B)-(III), (IV), the photographer alerted to the mishandling as is shown in FIG. 10 (f) is able to carry out the manual exposure adjustment photography with the light measurement through the totally open diaphgram. Apart from the above by operating the film winding lever 14 while the multiple exposure button 16 provided on the upper surface of the camera 4 being pushed down, the AE lever 94 is recharged so as to enable AE photography with shutter or aperture priority.

Hereby the state shown in FIG. 11 (b)-(III), (IV), is judged as a mishandling only after film winding and is treated as the AE photographic mode with priority on shutter time or the AE photographic mode with priority on aperture value before the film winding. The state shown in FIG. 11 (b)-(I), (II), is judged as misoperation before as well as after the film winding.

As explained above in the case of the camera system in accordance with the present invention the improvement as well as the amplification of the efficiency is tried by positively providing for various kinds of restrictions likely between the mechanical composition or the composition of the conventional lens device and various kinds of control mechanisms introduced for the sake of the improvement of efficiencies. For unavoidable mishandlings and misoperation, alarms are displayed in the viewfinder so as to alert the photographer to the mishandling and misoperation, while locking the shutter mechanism.

Embodiments for realizing various efficiencies rendered to the camera shown in FIG. 1 will be explained.

The conventional camera includes a diaphragm control mechanism for determining the aperture of the lens device and the shutter mechanism for determining the time of the exposure to the film. These two mechanisms generally will comprise mechanical control mechanisms in the future as in the past. However, quite recently structures with electrical control mechanisms have been proposed and realized for various control mechanisms in a camera system. The electrical mechanisms are mostly exposure control mechanisms including the light measuring system of the camera. The reason for the latter is that generally the light measuring system takes the data as to the object brightness and so on into the camera system as an electrical signal by means of the photoelectric converting efficiency. Hence, it is essential to go through the interface between the electrical means and the mechanical means in order to execute an automatic exposure control.

As such an interface a simple mechanism suffices in order to realize a simple efficiency in the camera system and its specific structure has long been well known. However, with the increase of the efficiency required from the camera system its structure tends to become complicated. On the other hand a comparatively simple analog electrical control system is applied to many camera systems known at present, the reason for which is that such control system is so designed as to operate with priority on shutter time or with priority on aperture value, which is realized by means of a comparatively simple and economical circuit composition.

However in the camera system of the present invention which includes various judging and determining efficiencies beside those with priority on shutter speed and with priority on aperture value, the structure would be extremely complicated. It is not only problematical to apply purely electrical circuits to such a structure but also the structure itself will become so complicated as not only to decrease its economy but also prevent the device from being compact. This is disadvantageous.

On the other hand a digital electrical circuit can be integrated, and serve for realizing the efficiency of the camera system shown in FIG. 1. This digital electrical circuit is quite suited for being applied to the devices presenting various judging and determining efficiencies, measuring and display efficiencies such as the camera system because it is easy in the system design in comparison with analog electrical circuits. Various control modes can be realized in an easy way and it can instantly be modified for the alteration of the specifications.

In consequence most of the control systems applied to the camera system in accordance with the present invention are composed of a digitalized electrical circuit so as to improve the reliability as well as the economy.

Below how the light measurement data, the set data, the operation condition, the operation state and so on are taken into the camera shown in FIG. 1 will be explained, before the systems for operating the camera is explained. It is a comparatively important problem for the composition of the digital system, particularly of the camera system in which various mechanical moving members are to be built in a small space in a compact way to think over the adoption of such various information.

Principally the above-mentioned camera includes a TTL light measurement system. Here a light sensitive element, e.g., a photoelectric transducing element such as CdS or silicon light sensitive element is used. The above-mentioned photoelectric transducing element produces analog signals, which are later compressed logarithmically, namely converted into an APEX value and then converted into digital information by means of the A-D converter. Now let the information obtained from the light measurement system BVo in APEX value in case of the light measurement with a totally opened diaphragm and BVs in case of the light measurement with the closed diaphragm, so we obtain the following relationships.

$$Bvo = BV - AVo - AVc \tag{3}$$

$$BVs = BV - AV - AVc' \tag{4}$$

The value AVo corresponds to the smallest aperture value of the lens device 2, AV corresponds to the actual aperture value with the closed diaphragm, AVc corresponds to the vignetting error of the lens device 2 with a totally opened disphragm and AVc' corresponds to the vignetting error with the closed diaphragm. It is necessary to obtain the vignetting errors AVc and AVc' from the calculation based upon the aperture value of the lens 2 at the time of the light measurement. The vignetting error with the totally opened diaphragm can easily be calculated because the smallest aperture value is introduced from the side of the lens device 2. It is impossible to calculate the vignetting error with the closed diaphragm because there is no means for transmitting the actual aperture value with the closed diaphragm from the side of the lens device 2 to the camera body. In consequence in the camera system in accordance with the present invention the vignetting error with the closed diaphragm is disregarded so as to obtain the following relationship.

$$BVs = BV - AV \tag{5}$$

As is clear from the above explanation, the data obtained from the light measurement system is that relative to the object brightness represented by the above-mentioned relationship (3) or (b 5).

Hereby the above-mentioned data is later converted into binary digital data of 8 bits by means of the A-D comparator, the last bit having a weight of "$\frac{1}{8}$", while the first bit having a weight of "16". Namely the light measurement data is converted into the digital data having a precision of $\frac{1}{8}$ step in the APEX value.

The TTL light measurement system uses a convenient circuit for compressing the analog voltage signal proportional to the received light amount into an analog signal corresponding to the APEX value in a logarithmic way.

Further as is explained above, the ASA sensitivity setting dial 40 for the photographic film is provided on the upper surface of the camera body 4. This ASA sensitivity setting dial 40 serves to set the ASA sensitivity of the photographic film to be used. The present tendency of the photographic film on the market is that the ASA sensitivity is set by $\frac{1}{3}$ step in APEX value. In consequence by means of the ASA sensitivity setting dial 40 the ASA sensitivity is set with the precision of $\frac{1}{3}$ step in APEX value as follows:

ASA 16, 20, 25, 32, 40, 50, 64, 80, 100, 125, 160, 200, 250, 320, 400, 500, 640, 800 . . .

However it goes without saying that the film sensitivity data set by means of this ASA sensitivity setting dial 40 is taken as digital value, whereby it is impossible to take a value corresponding to $\frac{1}{3}$ in decimal by means of binary code. In this respect it can be so arranged that the weight of the bit corresponding to a figure smaller than "1" in binary code is treated as value corresponding to "$\frac{1}{3}$" and "$\frac{2}{3}$". All other data is treated with the precision of $\frac{1}{8}$ step in binary system in this camera system so that no matching can be taken for the digital operation with other data in such a manner that complicated operations including multiplication or division becomes unavoidable. When on the other hand the operation result for the actual control is obtained with the precision of $\frac{1}{8}$ step in binary value, such complicated operation as mentioned above becomes unnecessary. In consequence in case of this camera system the data concerning the film sensitivity with the precision of $\frac{1}{3}$ step is taken in approximation with the data with the precision of $\frac{1}{8}$ step.

Namely "$\frac{1}{3}$" and "$\frac{2}{3}$" can be approximated with the precision of $\frac{1}{8}$ step as follows.

$$\frac{1}{8} + \frac{1}{4} + \frac{1}{8} = 0.375 \tag{6}$$

$$\frac{2}{8} + \frac{1}{4} + \frac{1}{8} = 0.625 \tag{7}$$

whereby the error taking place is ±0.042 step, namely within a sufficient allowance in comparison with $\frac{1}{8}$ step, namely 0.125 step. In consequence the film sensitivity set by means of the ASA sensitivity setting dial 40 is directly taken upon with the precision of $\frac{1}{8}$ step. In this camera system the film sensitivity is treated as a digital data with seven bits in binary system. The last bit has a weight of "$\frac{1}{8}$" while the first bit has a weight of "8". It goes without saying that this binary data is the approximated one with the precision of the ⅛ step of the film sensitivity and with the precision of ⅓ step as represented by the relationships (6) and (7). Further as is clear from the relationships (6) and (7), beside the bit with the weight of "1" of the binary data including an approximated data with the precision of ⅛ step corresponding to "⅓" or "⅔", "1" appears either in the bit with the weight of "¼" or in the bit with the weight of "½". In consequence it can be arranged so that "1" appears either in the bit with the weight of "¼" or in the "½" bit without particularly entering information relative to the "⅛" bit at the time of taking the data concerning the film sensitivity of seven bits. Thus, the camera system in accordance with the present invention is such that the data from the ASA sensitivity setting dial 40 is sensed as a binary code with six bits and later converted into a data with seven bits.

FIG. 12 shows an embodiment for developing digital data relative to the film sensitivity out of the ASA sensitivity setting dial. The digital data is obtained from the digital data setting disc 254 linked with the ASA sensitivity setting dial so as to be rotated with the dial in accordance with the rotational position of the dial. The digital data setting disc 254 consists of a plural number of conductor rings 256 concentrically arranged on the insulated base plate so as to correspond to respective bits of the film sensitivity setting data and of a common ring 258 keeping electrical conductivity with all of the above-mentioned conductor rings 256 through a conductor 262 extending along the radial direction of the data setting disc 254. The above-mentioned common ring 258 is normally in contact with the brush 260 which is connected to the power source Vcc through a resistance 261 and also to the inverter 263. Data tracks between the above-mentioned conductor rings 256 correspond to respective bits of the film sensitivity setting data. Six brushes corresponding to respective bits of the data are in contact with the respective tracks. The above-mentioned tracks include conductive parts 266 extending from the above-mentioned conductor rings 256 to the parts in contact with respective brushes 264 along the radial direction. Electrical contact is established between the above-mentioned conductor rings and the brushes 264 corresponding to the weight "2" of the bits of the digital value of the set data so as to correspond to each of the setting positions of the ASA sensitivity setting dial 40 for setting the film sensitivity by ⅛ step.

Figure 13:
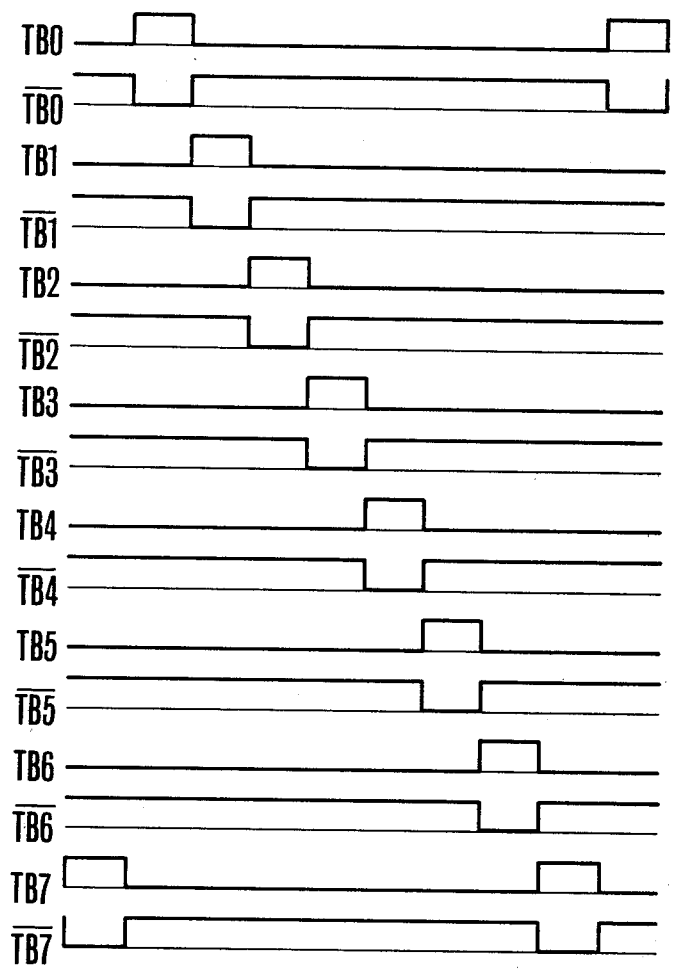
FIG. 13 shows a time chart for explaining the state of the timing pulses $TB_1$-$TB_6$.

As will be later explained in detail, this camera system is controlled by eight timing pulses TB₀-TB₇ as is shown in FIG. 13. The camera system is also controlled in this way when taking the film sensitivity data. For taking up various setting data or setting conditions six timing pulses shown in FIG. 13 are used.

The structure shown in FIG. 12 is such that the above-mentioned timing impulses or pulses TB₁-TB₆ are applied to respective brushes 264 through respective diodes 265. In case the brush 264 to which a timing pulse is applied is not in contact with the conductive part 266, the inverter 263 delivers a low level output because the power source voltage Vcc is applied to the inverter 263 through the resistance. In case the brush 264 is in contact with the conductive part 266, the inverter 263 delivers a high level output, because the input of the inverter 263 is induced to be at low level through the conductor rings 256, the brushes 264 and the diode 265. Namely the above-mentioned inverter 263 delivers a digital value of six figures corresponding to the APEX value of the ASA sensitivity set by means of the above-mentioned ASA sensitivity setting dial 40 from the last bit in sequence in synchronization with the timing pulses TB₁-TB₆. This data of six bits is the one whose last two bits are "½" and "¼". Digit "1" is made to appear in the bit with the weight "⅛" when "1" appears either in the bit with the weight "½" or in the bit with the weight "¼". This is done so that after the data with six bits is converted into a data with seven bits including an approximated data of "⅔" or "⅓". As mentioned above, the data SV (APEX value) relative to the film sensitivity is taken as a digital value of seven bits with the precision of a ⅛ step.

By means of the above arrangement, the camera shown in FIG. 1 employs the sensitivity of the film to be used as a digital value corresponding to the APEX value.

As explained, this camera is constructed to sense the smallest aperture value (APEX value) of the photographic lens device 2 to be used in the digital value. As explained in accordance with FIG. 2 the lens device includes a diaphragm opening pin 90 protruding in an amount corresponding to the smallest aperture value AVo of the lens. The camera body 4 includes the smallest aperture value input pin 96 for detecting the protruding amount of the diaphragm opening pin 90. This diaphragm opening pin 90 is connected to a mechanism for detecting the displacement amount of the pin 96 so as to respond to the smallest aperture value AVo of the lens device 2 in the digital value. Such a mechanism is shown in detail in FIG. 14. Here the smallest aperture value input pin 96 is displaced in accordance with the protruding amount of the diaphragm opening pin 90, while the one end of the pin 96 is in contact with the pin 90. This displacement amount is converted into the rotational amount around the shaft 270 of the rotary lever 268 in contact with the smallest aperture value input pin 96.

In order to remove the rotational amount converted into a digital value of four bits in accordance with its magnitude a fan shaped smallest aperture value detecting disc 272 with the shaft 270 as certer is provided. This smallest aperture value detecting disc 272 comprises four conductor rings 274 concentrically arranged around the shaft 270 so as to correspond to respective bits of the digital data of the smallest aperture value AVo. A common ring 276 is arranged concentric to the conductor rings 274 and connected to the power source Vcc through the resistor 275 and further connected to the inverter 279. Data tracks corresponding to respective bits of the smallest aperture value AVo of the lens device 2 between the conductor rings 274. Four brushes 280 provided at the one end of the rotary lever 268 correspond to respective data tracks. The brush 280 is electrically connected with the common brush 282 provided parallel to the brush 280 and is normally in contact with the common ring 276.

The conductor rings 274 include extended conductive portions in contact with the respective brushes 280 on the data tracks in accordance with the rotational amount of the rotary lever 268. This is done so that the conductor rings make an electrically closed circuit with the brush corresponding to the data track corresponding to the bit with the weight "1" of the bits of the smallest aperture value AVo. The digital value corresponding to the APEX value of the smallest aperture value of the lens device set from the diaphragm opening pin 90 of the lens device 2 through the smallest aperture value input pin 96 of the camera body 4 is replaced with the selective contact of the brushes 280 with the conductive portion 282. Further at the time of detecting the smallest aperture value AVo of this lens, the timing pulses shown in FIG. 13 play a part. Hereby for taking this smallest aperture value AVo, the four timing pulses $\overline{TB_3}$-$\overline{TB_6}$ are used.

Figure 14:
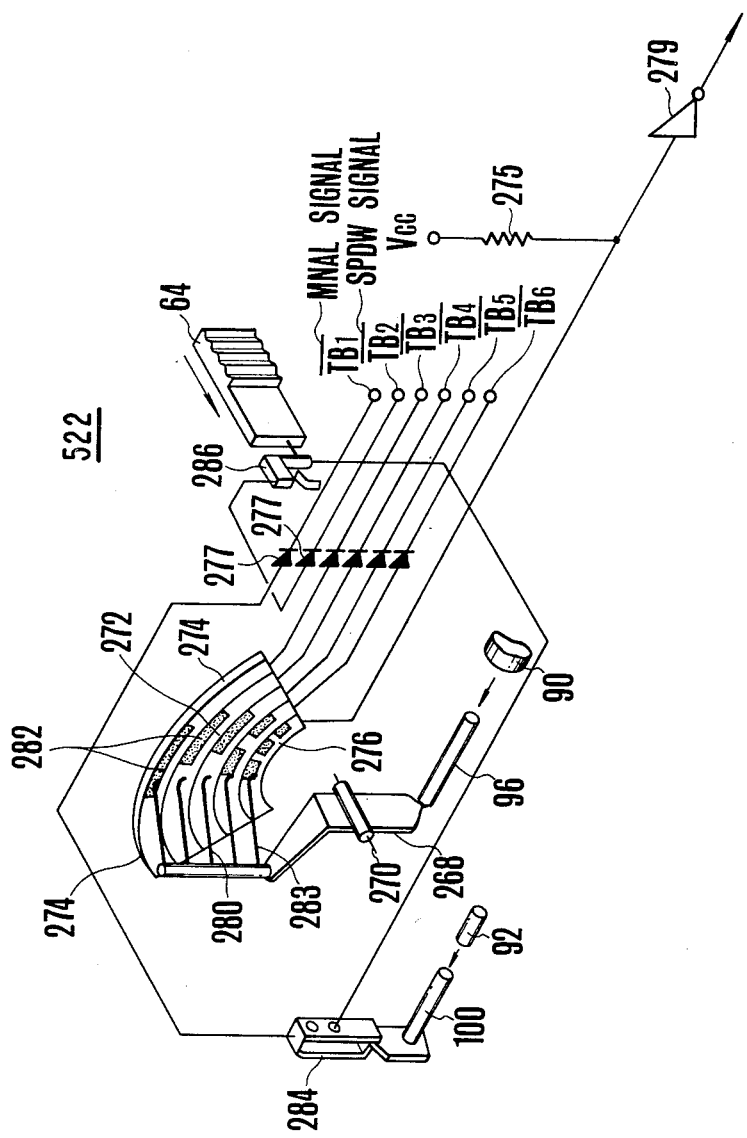
FIG. 14 shows a concrete composition for taking the data as to the smallest aperture value of the lens 2, the state of the aperture ring and the information as to the diaphragm driving lever.

In FIG. 14 the timing pulses $\overline{TB_3}$-$\overline{TB_6}$ are applied to the respective conductor rings 274 through respective diodes 277. When no brush 286 is in contact with the conductive portion 282 extending from any conductor ring 274 to which the timing pulse is applied, the inverter 279 delivers a low level output because the power source voltage Vcc is applied to the inverter 279 through the resistance 275. When the brushes are in contact with respective conductive portions, the inverter delivers a high level output because the input of the inverter 279 is induced to be at low level through the common ring 276, the common brush 283, the brushes 280, the conductor rings 274 and the diodes 277. Thus the inverter 279 delivers the digital value of four figures corresponding to the smallest aperture value of the photographic lens device 2 taken from the diaphragm opening pin 90 through the smallest aperture value input pin 92 in synchronization with the timing pulses $\overline{TB_3}$-$\overline{TB_6}$ from the bit with larger weight in sequence. The first figure of this data of four bits has the weight of "4" while the last figure has the weight "½".

Developing the data concerning the smallest aperture value AVo involves sensing the difference between the protrusion of pin 90 relative to the protrusion at the smallest aperture value Avo on the lens device 2. However, it is difficult to precisely read out small differences in protrusions. The protrusion of the diaphragm opening pin 90 cannot be altered significantly for each smallest aperture value AVo on each lens 2. Also reading digital data from the disc 272 on the basis of the positions of the brushes 282, may result in errors when the brushes stop between one data position and the next. The then misread value is never read as the mean but a value quite different therefrom. This problem is overcome by using grey code and not a binary code. As is well known the content of such a grey code differs only in 1 bit between the adjacent digital data so that it can be used efficiently with a digital value corresponding to the displacement of the smallest aperture value input pin 96 by means of a mechanism as is shown in FIG. 14. In the camera system in accordance with the present invention, the grey code is used in the mechanism for reading the smallest aperture value Avo of the lens 2 and later converted into binary code.

In more detail, the content of one grey code differs by only 1 bit from the adjacent codes. The difference from the ordinary binary code is shown in the comparison table in FIG. 15. However, the relation between this grey code and the binary code is not random at all. When each figure of the binary code is compared with the corresponding figure of the grey code, it can be seen that the content of the figure of the binary code corresponding to the figure of "0" of the grey code is equal to that of the figure one step higher while the content of the figure corresponding to the figure "1" of the grey code is equal to the inverted content of the figure one step higher.

Figures 15, 16:
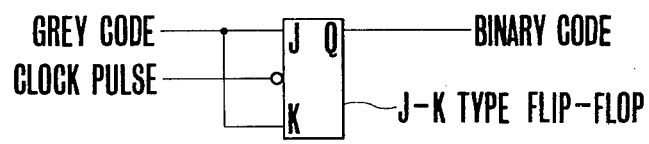
FIG. 15 shows a comparison table of the grey code with the binary code.
FIG. 16 shows a principle of the circuit for converting the grey code into the binary code.

In consequence the data in the grey code picked up in synchronism with the timing pulses $\overline{TB_3}$-$\overline{TB_6}$ from the higher order figures is converted into binary code in the circuit shown in FIG. 16.

A J-K flip-flop delivers a Q output as is shown in FIG. 17 when the J input is identical with the K input. In short both of the J pinput and of the K input are "1", the Q output is inverted in synchronization with the next clock pulse. When both the J input and the K input are "0" the Q output is kept the same. Thus the data produced at the Q output terminal in sequence in synchronism with the clock pulse when a grey code is applied to the J-K input terminal of the J-K flip-flop in sequence from the figures with the larger weight is the data converted into a binary code out of the grey code.

As explained above the camera shown in FIG. 1 picks up the smallest aperture value AVo of the photographic lens digitally corresponding to APEX value through the structure explained above.

As mentioned the camera includes a mechanism for transmitting to the camera body 4 information as to whether the lens 2 is in the manual mode in which the aperture is preset manually by the aperture setting ring 8, or in the automatic mode in which the aperture can be preset from the camera body 4, and the mark 12 is selected with the aperture setting ring 8.

In the lens 2 the AE pin 92 protrudes when the mark 12 is selected with the aperture setting ring 8. In the camera body 4 the AE detecting part 100 is functionally engaged with the switch 284 as is shown in FIG. 14. This switch 284 consists of a normally closed contact with one terminal connected to the power source Vcc through the resistance 275 and to the input terminal of the inverter 279. The other terminal receives the timing pulse $\overline{TB_1}$ through the diode 277. The state of the switch 284 is sensed by means of the timing pulse $\overline{TB_1}$. When the switch 284 is closed the inverter 279 is forced to a low level by the switch 284 and the diode 277. When the switch 284 is open the inverter 279 delivers the low level output because the power source voltage Vcc is applied to the input terminal of the inverter through the resistance 275. In consequence in the manual mode, namely when the AE pin 92 does not protrude, the inverter 279 delivers a high level output in synchronism with the timing pulse $\overline{TB_1}$. In the automatic mode, namely when the AE pin protrudes, the inverter delivers a low output in synchronism with the timing pulse $\overline{TB_1}$.

By virtue of this structure the camera system in accordance with the present invention picks up the aperture setting condition by means of the aperture setting ring 8 of the lens 2, namely information as to whether the aperture is preset at the lens or at the camera body. In the following explanation the high level signal delivered from the inverter 279 in synchronization of the timing pulse $TB_1$ is called the MNAL signal.

As mentioned, in the camera shown in FIG. 1 the diaphragm of the lens 2 can be closed by operating the diaphragm closing lever 64 on the camera body 4. The lever 64 not only serves for mechanically closing the diaphragm of the lens device 2 but also functionally engages the switch for detecting the closed state of the diaphragm of the lens 2 as is shown in FIG. 14. This switch 286 has normally opened contacts with one terminal connected to the power source Vcc through the resistance 275 and to the input terminal of the inverter 279. The other terminal receives the timing pulse $\overline{TB_2}$ through the diode 277. The state of the switch 286 is sensed by the timing pulse $\overline{TB_2}$. In the opened state the inverter 279 delivers a low level output because the power source voltage Vcc is applied to the input terminal of the inverter 279 through the resistance 275. In the closed state the inverter 279 delivers a high level output because the input of the inverter 279 is induced to be at the low level through the switch 286 and the diode 277. In consequence when the diaphragm of the photographic lens 2 is closed by operating the diaphragm closing lever 64, the inverter 279 delivers a high level output in synchronization with the timing pulse $\overline{TB_2}$.

By means of this structure the camera system in accordance with the present invention picks up the information as to whether the diaphragm of the lens device 2 is in the closed state or not. In the following explanation the high level signal delivered from the inverter 279 in synchronization with the timing pulse $TB_2$ is called SPDW signal.

As is clear from the above explanation the inverter 279 shown in FIG. 1 delivers the MNAL signal in synchronism with the timing pulse $\overline{TB_1}$, the SPDW signal in synchronism with the timing pulse $\overline{TB_2}$ and the data as to the smallest aperture value AVo of the photographic lens device 2 from the figures with the larger weight in sequence in synchronism with the timing pulses $\overline{TB_3}$-$\overline{TB_6}$. The output of the inverter is assorted accordingly in accordance with the timing pulses $\overline{TB_1}$-$\overline{TB_6}$. The structure is explained later in detail.

In FIG. 1, the dial 34 for setting the shutter speed or the aperture value desired by the photographer on the front surface of the camera body 4 is as explained. This shutter dial 34 is intended to set the shutter time TV (APEX value) in case of the shutter time priority photography and the aperture value (APEX value) in case of the aperture value priority photography in the digital value. The structure is similar to that for taking up the digital value of the film sensitivity out of the ASA sensitivity setting dial 40. Namely the dial 34 is so designed that as is shown in FIG. 18 the digital data in accordance with the rotational position of the dial is put in the system out of the digital data setting disc 288 rotated together with the dial 34. The digital data setting disc 288 is composed of a plural number of concentric conductor rings 292 corresponding to respective bits of the digital value of the shutter time TV or the aperture value AV and a common ring 294 electrically connected to all of the conductor rings 292 through the conductor extending along the radial direction of the data setting disc 288 on an insulated base plate. The common ring 294 is normally in contact with the brush 296. The brush 296 is connected to the power source Vcc through the resistance 297 and at the same time to the inverter 299. The data tracks corresponding to respective bits of the digital data of the shutter time TV and the aperture value AV are provided between the conductor rings 292. Five brushes 290 are in contact with respective data tracks corresponding to respective bits of data. The data tracks consist of conductive portions 300 extending along the radial direction from the conductor rings 256 on the parts in contact with the respective brushes 290 in such a manner that the brushes 290 corresponding to the bits with "1" for the digital value of the set dial contact with conductor rings 292 in accordance with respective set positions of the dial 34 for setting shutter time TV or the aperture value AV.

The timing pulses play in important part in taking the shutter time TV or the aperture value. In FIG. 18 the timing pulses $\overline{TB_2}$-$\overline{TB_6}$ are applied to the five brushes 290 through respective diodes 301. When the brush to which a timing pulse is applied is not in contact with the conductive portion 300, the inverter 263 produces a low level output because the power source voltage Vcc is applied to the inverter 299 through the resistance 297. When the brush 290 is in contact with the conductive portion 300, the inverter 299 produces a high level output because the input of the inverter 299 is made low by the rings 292, the brushes 290 and the diode 31. The inverter 299 delivers a digital value with five figures corresponding to the APEX value of the shutter time TV and the aperture value set by dial 34 from the bit with the smallest weight in sequence in accordance with the timing pulses $\overline{TB_2}$-$\overline{TB_6}$. The weight of the last figures of the data with five bits is "½", while that of the first figure is "8".

It is necessary to determine whether the digital data obtained above by means of the dial 34 relates to the shutter time TV or the aperture. For this purpose the mode selector switch 38 is provided on the upper surface of the camera body 4. This switch 38 is functionally engaged with a normally open switch 30 which is closed when the switch 38 is set at the aperture priority mode. One terminal of switch 302 is connected to the power source Vcc through the resistance 297 and at the same time to the input terminal of the inverter 299. The other terminal receives the timing pulse $TB_1$ applied to the diode 301. The state of the switch 302 is sensed by means of the timing pulse $TB_1$. When the switch 302 is open the inverter 299 delivers a low level output because the power source voltage Vcc is applied to the input terminal of the inverter 299 through the resistance 297. When the switch 302 is closed the inverter 299 delivers a high level output because the input of the inverter 299 is made low by the switch 302 and the diode 301. In consequence the inverter 299 delivers a high level output in synchronism with the timing pulse $\overline{TB_1}$ when the switch 38 is set for the aperture value priority mode while the inverter 299 delivers a low level output when the switch 38 is set for the shutter time priority mode.

By means of this structure the camera system in accordance with the present invention judges whether the data set by means of the dial 34 relates to the shutter time TV or to the aperture value. Further in the following explanations the high level signal produced by the inverter 299 in synchronism with the timing pulse $\overline{TB_1}$ is called the ASLC signal.

In the present embodiment the shutter time TV is selected out of the values by one step by means of the dial while the aperture value is selected out of the values by ½ step. Namely although the ½ step data are not necessary in order to set the shutter time by 1 step, it is necessary for the dial 34 to set the aperture value including the data by ½ step, so that depending upon the setting position of the dial 34 the shutter time including data of ½ step may be set. In order to provide for this problem in this embodiment it suffices to set the data relative to the shutter time with the half of the necessary digital data to be set and to duplicate the digital data read out in accordance with the set position of the dial 34 so as to use it as the digital data TV corresponding to the APEX value relative to the shutter time.

As mentioned for the camera shown in FIG. 1 the inverter 299 delivers, in synchronism with the timing pulse $\overline{TB_1}$, the ASLC signal for judging whether the data set by means of the dial 34 relates to the shutter time or the aperture and further, in synchronism with the timing pulses $\overline{TB_2}$-$\overline{TB_6}$, the data set by the dial 34 from the figure with the larger weight in sequence. The output of the inverter 299 is assorted correspondingly in accordance with the aforementioned timing pulses $\overline{TB_1}$-$\overline{TB_6}$. This structure will be explained in detail later.

By means of this structure, the camera system in accordance with the present invention picks up the shutter time TV or the aperture value AV set with the dial by the photographer in digital value corresponding to the APEX value.

The camera also includes a structure for detecting the largest or highest aperture value of the lens 2. As is clear from the explanation of FIG. 2 the lens 2 includes the largest aperture value pin 91 which protrudes an amount corresponding to the largest aperture value of the lens, while the camera body 4 includes a largest aperture value input pin 97 for detecting the protrusion of the pin 91. This pin 97 is connected to a mechanism for detecting its displacement to specify which of a number of given aperture values is the largest aperture value of the lens 2. Such mechanism is shown in detail in FIG. 19. Here one end of the pin 97 is in contact with the pin 91 to be displaced in accordance with the protrusion of the pin 91.

The displacement of the pin 97 is converted into rotation around a shaft 303a of rotation lever 304, which the pin 97 contacts. This rotation is used for selecting one of the aperture values F11, F16, F22, F45, F64. For this purpose a fan shaped largest aperture value detecting disc 306 is mounted on the shaft 303. The disc 306 is composed of six electrodes arranged along the circumference to select one of the aperture values F11, F16, F22, F32, F45, F64 as the largest aperture value on an insulated base plate in such a manner that the electrodes 308 can be selectively brought into contact with the brush 305 provided at the end of the lever 304 in accordance with the rotational amount of the lever 304. At the same time the largest aperture value detecting disc 306 includes a common electrode 310 extending along the circumference.

The brush 305 is normally in sliding contact with the common electrode 310 regardless of its position so that a bridge is formed between one of the electrodes and the common electrode 310. The common electrode 310 is also connected to the power source Vcc through the resistance and at the same time to the input terminal of the inverter 316, while the six electrodes 308 receive timing pulses $\overline{TB_1}$-$\overline{TB_6}$ respectively through the diode 312.

In this arrangement, the protrusion of the largest aperture value pin 91 corresponding to the largest aperture value of the lens 2 is detected by the pin 97 at the camera body 4. The brush 305 selects one of the six electrodes 308 in accordance with the displacement of the largest aperture value pin 97 in such a manner that a conductive state is established between one electrode 308 and the common electrode 310.

When no timing pulse is applied to the electrode 308 in contact with the brush 305 through the diode 312, the inverter 316 delivers the low level output because the input terminal of the inverter 316 is at a high level due to the power source voltage Vcc. When the corresponding timing pulse is applied to this electrode 308 through the diode 312, the inverter 316 delivers a high level output because the input terminal of the inverter 316 is at a low level. Thus the inverter 316 delivers a high level output in synchronism with the timing pulse and corresponding to the detected largest aperture value. By assorting the output of the inverter 316 in accordance with the timing pulses $\overline{TB_1}$-$\overline{TB_6}$ it is possible to detect to which F11, F16, F22, F32, F45, F64 the detected largest aperture value belongs.

As mentioned above, it is possible for the camera shown in FIG. 1 to detect the largest aperture value AMAX of the photographic lens device 2 to be used. In the following explanations the output signal of the inverter 316 is called AMAX'.

The film sensitivity data SV, the smallest aperture value data AVo of the photographic lens device to be used, the judging signal MNAL of the manual mode or the automatic mode, the lens device diaphragm closing signal SPDW, the shutter time TV or the aperture value AV setting data, the aperture value priority mode selecting signal ASLAC and the largest aperture value detecting signal AMAX and so on are all taken up in synchronism with the timing pulses $\overline{TB_1}$-$\overline{TB_6}$.

As shown in FIG. 20, the inverter 263 (FIG. 12) delivers the data relative to the film sensitivity SV from the bit $SV_{\frac{1}{4}}$ with the weight "$\frac{1}{4}$" up to the bit $SV_8$ with the weight "8" in sequence in accordance with the timing pulses $TB_1$-$TB_6$. This data relative to the film sensitivity SV is later added with the bit $SV_{\frac{1}{8}}$ with the weight "$\frac{1}{8}$" so as to be converted into an approximated data with the precision of $\frac{1}{8}$ of the data with the precision of $\frac{1}{3}$ step, as has already been explained. Further the inverter 279 (FIG. 14) delivers the MNAL signal for showing that the aperture value is selected at the lens 2 in synchronism with the timing pulse $TB_1$, the SPDW signal for showing that the diaphragm of the lens device 2 is in the closed state in synchronism with the timing pulse $TB_2$ and the grey code data AVogc relative to the smallest aperture value AVo of the lens device 2 to be used from the bit $AVo\frac{1}{2}gc$ with the weight of "$\frac{1}{2}$" up to the bit AVo4gc with the weight of "4" in sequence in synchronism with the timing pulses $TB_3$-$TB_6$. This grey code data AVogc relative to the smallest aperture value AVo of the lens 2 is later converted into the binary code data AVo as explained.

Further the inverter 299 (FIG. 18) delivers the signal ASLC for the aperture value priority mode in synchronism with the timing pulse $TB_1$ and the data relative to the set shutter time TV or the set aperture value AV in synchronism with the timing pulses $TB_2$-$TB_6$. The data delivered in synchronism with the timing pulse $TB_2$ has the weight of "178", that delivered in synchronization with the timing pulse $TB_3$ has the weight of "1", that delivered in synchronism with the timing pulse $TB_4$ has the weight of "2", that delivered in synchronism with the timing pulse $TB_5$ has the weight of "4" and that delivered in synchronism with the timing pulse $TB_6$ has the weight of "8". This is due to the fact that the data for the aperture value AV is taken up with the precision of $\frac{1}{2}$. On the other hand the shutter time taken up through the common dial 34 is set with the precision of "1" step, so that the bit $TV_1$ of the shutter time with the weight of "1" is taken up as the data with the weight of "$\frac{1}{2}$" in synchronism with the timing pulse $TB_2$, the bit $TV_2$ with the weight of "4" is taken up as the data with the weight of "2" in synchronism with the timing pulse $TB_4$, the bit $TV_8$ with the weight of "8" is taken up as the data with the weight of "4" in synchronism with the timing pulse $TB_5$ and the bit $TV_{16}$ with the weight of "16" is taken up as the data wit the weight of "8" in synchronization with the timing pulse $TB_6$. In other words the data for the shutter time can be said to be once halved so as to be matched with the precision of the data for the aperture value as the data with the precision of $\frac{1}{2}$ step and set with the common dial 34. In consequence when the data delivered from the inverter 299 in synchronism with the timing pulse TB$_2$-TB$_6$ is used for the shutter time TV, the data is duplicated.

Further the inverter 316 (FIG. 19) delivers the signal AMAX' for showing to which of F11, F16, F22, F32, F45, F64 in F numbers the largest aperture value of the photographic lens device 2 to be used belongs. Thus the largest aperture value is determined by the one out of the timing pulses TB$_1$-TB$_6$ with which the output AMAZ' of the inverter is synchronized.

The camera shown in FIG. 1 includes other switching mechanisms for setting various operational modes including the switching mechanism functionally engaged with the shutter release button. This switching mechanism is, as shown in FIG. 21, construcyed so that the switch S1 is closed by the operation of the shutter release button 18 so as to deliver a high level output through the inverter 11 in such a manner that the necessary camera operation after the shutter release are started. The operations includes those for the lifting of the reflex mirror, the closing of the diaphragm of the lens device 2 down to the present position, the starting of the front shutter plane of the focal plane shutter and so on. In the following explanation this switching mechanism is called SW$_2$, while the output signal is called SR.

Further the selector lever 22 is functionally engaged with two switching mechanisms. One of them is for AE locking. This switching mechanism is, as shown in FIG. 21. Here when the selector lever 22 is set at the position at which the mark 26 is selected, the switch S1 is closed so as to deliver a high level output through the inverter 11, in accordance with which high level output the measured light amount is maintained. In the following explanation this switching mechanism is called SAELK while its output signal is called AELK. The other one is for setting the self-timer. In the switching mechanism shown in FIG. 21, when the selector lever 22 is set at the position at which the mark 28 is selected, the switch S1 is closed so as to deliver a high level output through the inverter 11, in accordance with which high level output the shutter is released after the lapse of a given time after the operation of the shutter release button 18. This performs the so-called self-timer photography. In the following explanation this switching mechanism is called SSELF while its output signal is called SELF.

The camera shown in FIG. 1 includes other switches or mechanisms for judging various operational modes. First of all the AE charge detecting switching mechanism detects whether the AE lever 94 in the camera body 4 is in the AE charge state or not. This switching mechanism is, as shown in FIG. 21, constructed so that when the AE lever 94 is in the AE charges state, the switch S is closed so as to deliver the output "1" through the inverter 11. In the following explanation, this switching mechanism is called SAECG, while its output signal is called AECG.

A winding completion detecting switching mechanism detects whether the film has been wound. In the switching mechanism shown in FIG. 21, when the springs for moving components necessary for film winding by the winding lever 14 and shutter releasing have been charged the switch S1 is closed so as to deliver the output "1" through the inverter 11. The switch S1 remains closed until the necessary operations have been done successively and the rear shutter plane of the focal plane shutter has run after the shutter was released. In the following explanation this switching mechanism is called SWAUP while the output signal is called WAUP.

A front shutter plane start detecting switching mechanism detects whether the front shutter plane of the focal plane shutter has started running. This switching mechanism is, as is shown in FIG. 22, so designed that when the front shutter plane starts to run the closed switch S2 is opened so as to convert the output "1" into the output "0". The output of this switching mechanism is used for counting the shutter time so as to control the starting time of the rear shutter plane. In the following explanation this switching mechanism is called SCTST while its output signal is called CTST.

The camera in FIG. 1 includes, as mentioned, a mechanism for presetting the aperture of the lens device 2 from the camera body 4. The operation of this mechanism has already been explained with respect to FIG. 2. Namely immediately before the shutter release the AE lever 94 is locked at the AE charge position while the lever 84 for presetting the aperture of the lens 2 is kept at the preset position of the totally opened diaphragm of the lens 2. The locking is released at the time of the shutter release. Then the AE lever 94 releases the lever 84 urged toward the largest aperture value preset side so that the lever 84 starts to run toward the largest aperture value preset side. At the same time by detecting the displacement of the lever 84 by pulse means, the number of the diaphragm preset steps of the motion of lever 84 (this number increased with the displacement of the lever 84) is detected. This is done so that by clamping the AE lever 94 at the time at which the detected step number coincides with the step number, the lever 84 is made to step at the position at which the lever 84 has been displaced over the distance corresponding to the step number for control. The above-mentioned operations make it possible to preset the aperture of the lens 2 from the camera body 4.

Figure 23:
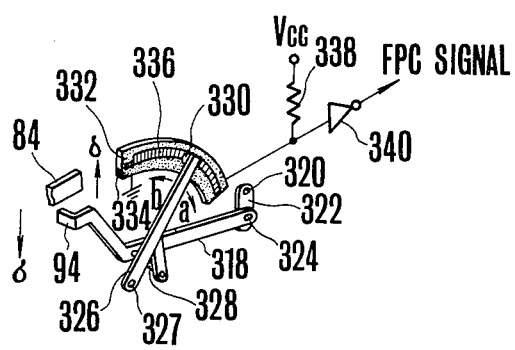
FIG. 23 shows a concrete disposition for detecting the amount of displacement of the AE lever 94.

FIG. 23 shows the mechanism for detecting the displacement of the lever 84 converted into pulses. The AE lever 94 is integral with the arm 318. The arm 318 is rotatably held on the arm 322 and rotatable around the shaft 320 by means of a pin 324. This structure makes the AE lever 94 displaceable along the direction ∂ or δ. The lever 94 is slightly urged along the direction of the arrow ∂ by a not shown spring. The lever 326 is borne on the shaft, while one part is rotatably converted with the above-mentioned arm 318 by means of a pin 328. Thus this lever 326 serves to obtain pulses whose number corresponds to the displacement of the AE lever 94. The lever 326 includes a brush 330 which is rotated along the direction b or around the shaft 327 when the lever 94 is displaced along the direction δ or ∂. The brush 330 is normally in sliding contact with the fan-shaped pulse generating disc 322. On part is normally in contact with the grounded common electrode 334. The other part faces a radially protruding comb shaped electrode 336. The teeth of the electrode 336 are conductive among each other, being connected to the power source Vcc through the resistance 338 and at the same time to the input terminal of the inverter 340. When the AE lever 94 is displaced along the direction δ or ∂, the brush 330 is displaced along the direction b or a, in the sliding contact with the pulse generating disc 322. At this time the brush 330 is displaced, being repeatedly brought into and out of contact with the above-mentioned comb shaped electrode 336. Hence when the brush 330 is in contact with the electrode 336 the inverter 340 delivers a high level output because the input of the inverter 340 is now grounded. When the brush 330 is not in contact with the electrode 336, the inverter 340 delivers a low level output because the input of the inverter 340 is made high by the power source Vcc. In consequence, when the AE lever 94 is displaced out of the locked position in the AE charge state along the direction of the arrow δ, urged by the lever 84 at the lens 2, naturally the brush 330 is also displaced along the direction of the arrow a. Hence the pulse signal corresponding to the displacement of the AE lever 94 is obtained from the inverter. Thus by counting the pulse number of this pulse signal, the displacement of the AE lever 94, namely the preset position corresponding to the diaphragm closing step number for the lever 84 is detected. By clamping the AE lever 94 at the time at which the detected step number coincides with the desired step number, the aperture can be preset by the lever 84 of the lens device 2.

It is natural that there exist time differences between the operation of the mechanical components such as the AE lever mechanism, the clamping mechanism etc., on the one hand, and the operation of the electrical components such as for counting the output pulse signal of the inverter 340 on the other hand. It goes without saying that such differences should be compensated mechanically or electrically based upon experimental data.

The wave form of the pulses obtained through the contact mechanism such as the pulse generating disc 332 in FIG. 32 is not necessarily suited for counting. When it is inverted by means of the inverter 340, it is reshaped to some extent. However in case it is necessary the wave form could be further changed by means of wave form shaping means.

In the camera the aperture of the lens device 2 can thus be preset from the body. The clamping position of the lever for aperture presetting is determined by means of a digital means such as counting pulses so that high precision presetting is possible. In the following explanation the pulse signal for detecting the position of the AE lever 94 including the output of the inverter 340 is called FPC.

When a speed light device i.e., flash unit is mounted on the camera in accordance with the present invention, flash photography can be carried out automatically as explained. Below the operation of the flash unit will be explained in detail in accordance with FIG. 24. In the drawing, 342 is the flash unit in the automatic ligh adjusting system, whereby the total light flashed is controlled in accordance with the light reflected from the object to be photographed. Here the film sensitivity information from the film sensitivity setting dial 106 and the aperture value information from the aperture setting dial 108 are used as elements for the light control. Such a speed light unit is so well known that its detailed explanation will be omitted here.

In order that the speed light unit 342 operate, it is essential that the not shown discharge condenser or capacitor be charged to a certain voltage. With the charge completion of this condenser, this speed light unit 342 is ready for operation. Then the signal for the charge completion of the discharge condenser is delivered through the signal line 344 in order to tell the photographer that the charge has been completed. This signal is introduced into the current circuit 346. Then the first current value signal as the full automatic charge completion signal and the second current value signal as the semi-automatic charge completion signal can be introduced into this current circuit 346 through the control contact 140 in accordance with the mode of the switch 146. Further when the above-mentioned first current value or the second current value is deliverable to the control contact 140 from the control terminal 54, this condition is detected in the camera and the mode is automatically switched into the flash mode. The circuit is changed over into the one by means of which the analog information from the data terminal 56 is converted into digital information and taken instead of the analog information from the not shown TTL light measuring system built in the camera body 4. As mentioned, when the camera is switched into the flash mode by means of the first current (full automatic charge completion signal) the shutter is automatically operated at 1/60 sec. no matter what shutter time is set. When the camera is switched into the flash mode by the second current (semi-automatic charge completion signal) the shutter is automatically operated at 1/60 sec. only when the shutter time is shorter than 1/60 sec. set in the camera body 4. On the other hand the data terminal 56 receives from the data contact 142 analog data concerning the aperture value set by the aperture setting dial 108 at the speed light unit through the level setting device 348 directly connected to the aperture setting dial 108. This analog information is digitized so it can be introduced into the camera and used for the aperture control.

When the shutter is released in the camera which has been switched into the speed light photographic mode by means of the fully automatic or the semi-automatic charge completion signal from the flash unit, an operation instruction synchronized with the movement of the shutter of the camera body 4 is applied to the speed light unit 342 through the synchronization contacts 52, 138. This is done in such a manner that the speed light unit 342 controls the light automatically. On the other hand in the camera the shutter is released at the shutter time of 1/60 sec. or longer (in case of the semi-automatic mode), while the aperture is controlled with the value set at the side of the flash unit.

In the following explanation, the signal for the fully automatic charge completion including the first current detected through the control terminal 54 is called CSA1 signal, the signal for the semi-automatic charge completion including the second current is called CSA2 signal and both of the two charge completion signals are called CSA signals. The data relative to the aperture value taken up through the data terminal 56 are called VSA signals.

When the external light measuring meter is mounted on the camera system in accordance with the present invention, a wider exposure control becomes possible as explained. Details of the external light measuring meter appear in FIGS. 25 and 26.

Figure 25:
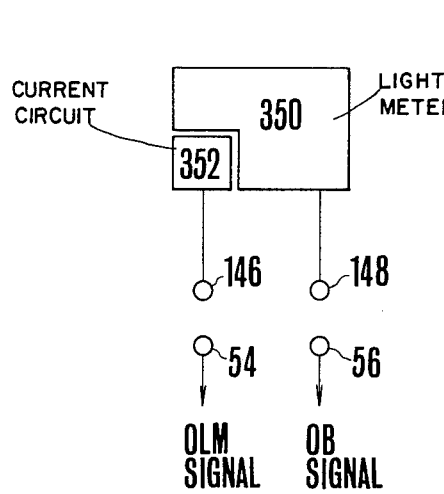

In FIG. 25, a reflection light system light measuring meter 350 serves for directly measuring the light reflected from the object to be photographed without the intermediary of the photographic lens and so on. This external light measuring meter 350 includes a current circuit 352 into which a third current forming an external light measuring mode signal can be introduced from the terminal 54 on the camera through the contact 146. The camera for this reflection light system light measuring meter is then automatically switched into the external light measuring mode, detecting when the third current can be introduced into the contact 146 through the control terminal 54 and the circuit is selected.

In which the analog information from the data terminal 456 is converted into a digital one instead of the analog information from the not shown TTL light measuring system built in the camera body. At the same time the external light measuring meter 350 delivers analog data concerning the measured object brightness from the data contact 148 to the data terminal 56. This analog information is digitized for introduction into the camera and used as the data for exposure control.

Figure 26:
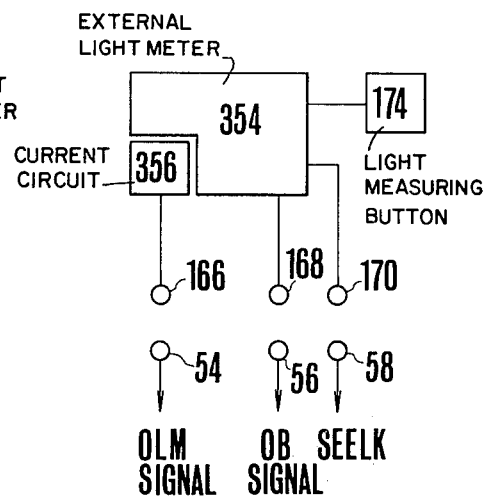
FIG. 26 shows a block diagram of the incident light exposure meter.

In FIG. 26, incident light system light measuring meter 354 serves for directly measuring the illumination of the object. In the same way as in the light measuring meter shown in FIG. 25, this external light measuring meter 354 includes a current circuit 356 into which the third current indicating the external light measurement mode can be introduced from the control terminal 54 at the camera through the contact 166. The camera on which this incident light measuring meter is mounted is automatically switched into the external light measuring mode when the third current is in a position to reach the contact 166 from the control terminal 54, and the circuit is selected in which the analog information from the data terminal 56 is converted into a digital one instead of the analog information from the not shown TTL light measuring system built in the camera body 4. At the same time the illumination information obtained as a result of the light measurement is applied to the data terminal as analog information from the external light measuring meter 354 through the data contact 168. The analog information is converted into a digital one so as to be introduced into the camera and used as the data for the exposure control. The data taken up at this time at the camera is the illumination information obtained in accordance with the incident light system. The data is handled similar to the object illumination information obtained in the reflection light system.

As is clear from the above-mentioned explanation the reflection light system external light measuring meter can be handled quite similar to the incident light system external light measuring meter. A specific difference resides in that the incident light system light measuring meter includes the AE lock function of the camera. The incident light system light measuring meter 354 is such that only while the light measuring button 174 is pushed down the light is measured so as to produce the light measurement data at the terminal 168. Thus it is desired that the camera be in the AE locked state when the light measuring button 174 is pushed down and no light measurement data is produced at the terminal 168. Thus the light measuring button 174 is functionally engaged with a normally closed switch not shown in the drawing whereby the switch is connected in parallel to the switch SAELK for AE lock built in the camera body 4 through the contact 170 and the AE lock terminal.

As explained above both the reflection light system external light measuring meter and the incident light system external light measuring meter can be used in the camera system in accordance with the present invention. In the following explanation the signal for the external light measuring mode including the third current detected through the control terminal 54 is called OLM signal. The data for the measured light taken through the terminal 56 is called OB signal. This OB signal is an APEX value equivalent to the object brightness BV.

By means of the above-mentioned mechanisms the camera system in accordance with the present invention takes up various input data, the setting data and the information as to the setting condition operation state.

As is clear from the above explanation, the camera system in accordance with the present invention takes up the data necessary for exposure control, the operation conditions and the information as to the operation through various means. These input data are handled by means of the digital control system to be explained later.

As explained the camera system applies the digital control to the control system in such a manner that the operation control for connecting synthetic systems in an organic way is carried out. Compactness and the high precision can be achieved at the time of manufacture in a simple way and the most rational operations can be developed for a number of the input information.

Figure 27:
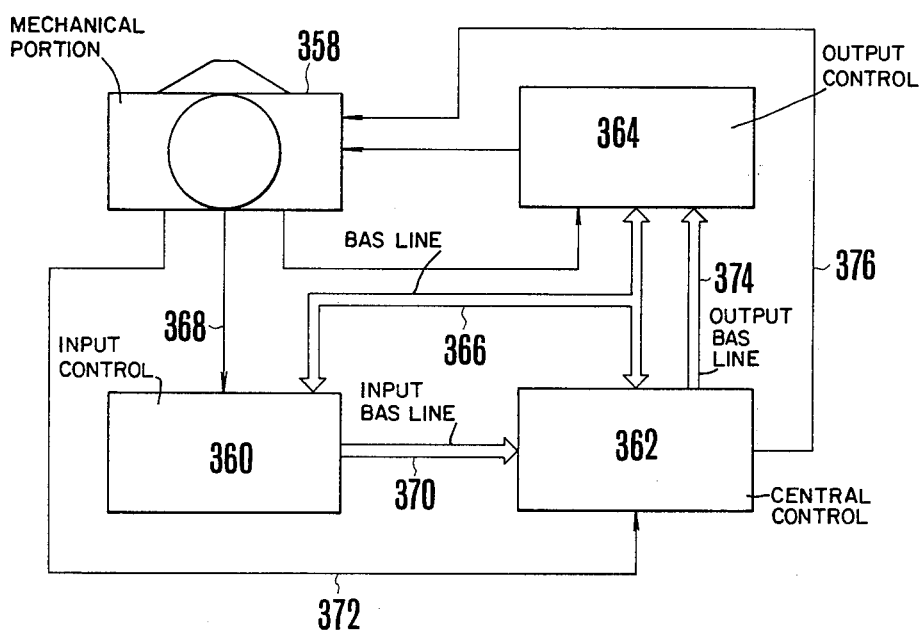
FIG. 27 shows a block diagram of the camera system in accordance with the present invention.

Below an embodiment of the digital control system used in the camera system in accordance with the present invention will be explained. FIG. 27 shows an outlined block diagram of the digital control system for realizing the afore-mentioned various efficiencies of the camera shown in FIG. 1. The control system is divided into three large blocks for the mechanical part 358. These three large blocks are the input control (or input control part) 360, the central control (or central control part) 362 and the output control (or output control part) 364. All of these parts are connected to each other by means of one BAS line 366. The mechanical part 358 includes various exposure control mechanisms and various display mechanisms beside the aforementioned input parts, namely the light measuring part, various data setting parts, various condition setting parts, various operation state judging parts and so on.

The measured light analog data, various condition setting signals and the operation state judging signals are introduced into the above-mentioned input control part 360 from the mechanical part 358 through the input system 368. The data or signals are converted into digital data most suited for the information processing and transmitted to the central control part 362 through the input BAS line 370.

Various setting data or various condition setting signals are introduced into the above-mentioned central control part 362 from the mechanical part 358 through the input system 372. The above-mentioned data or signals are converted into forms most suited for information processing, accordingly used together with the digital information from the input control part 360 and then transmitted to the output control part 364 through the output BAS line 374 as the data necessary for the control of various exposure control mechanisms and various display mechanisms included in the mechanical part 358. On the other hand the above-mentioned central control part 362 delivers the timing signal for taking up various setting data or various condition setting signals and the timing signal for the dynamic driving of various display mechanisms to the mechanical part 358 through the timing line 376.

The output control part 364 delivers control signals to various exposure control mechanisms of the mechanical part 358 as well as necessary information to various display mechanisms based upon various condition setting signals or various operation state judging signals from the mechanical part 358 and the control information from the central control part 362.

Below the mechanical parts of the camera shown in FIG. 27 will be explained more in detail in accordance with the diagram shown in FIG. 28.

The mechanical part 358 takes part in all of the operations relative to the input, the output and the control display of the camera, including various setting switches for the input or the detecting switch or the measuring device, various switches for the output or the line, various power source plunger for the control, various display mechanisms and so on.

The TTL light measuring means produces an output signal which is compressed logarithmically by means not shown to produce analog value corresponding to the APEX value BVo (=BV−AVo−AVc) in case of the light measurement with the totally opened diaphragm and BVs (=BV−AV−AV"c) in case of the light measurement with the closed diaphragm.

The output analog signal of the TTL light measuring means 378 is led to the A - D converter 382 through the signal changeover circuit 380 of the input control part 360 so as to be converted into a digital data and introduced into the system. The signal selector circuit 380 uses the above-mentioned A - D converter at the time of converting the analog data from light measuring means other than the TTL light measuring means 378, namely the reflection light system light measuring meter 350, the incident light system light measuring meter 354 or the speed light device 384 into digital values.

Figure 24:
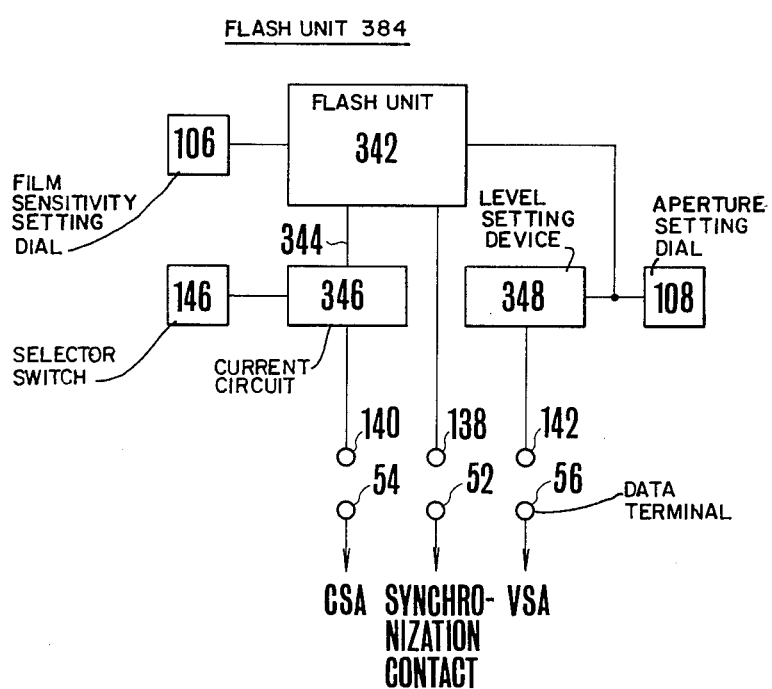
FIG. 24 shows a block diagram of the flash unit.

FIG. 24 shows a simplified block diagram of the flash unit or speed light device 384. When the device 384 is mounted on the camera body 4, the data contact 142, the control contact 140 and the synchronization contact 138 of the speed light device 384 are respectively connected to the data terminal 56, the control terminal 54 and the synchronization contact 52 on the accessory shoe 50 of the camera body 4. When the power source switch 132 (FIG. 5) of the speed light device 384 is closed, the data VSA relative to the aperture value set with the aperture setting dial 108 is led to the signal changeover circuit 380 of the input control part 360 through the data contact 142 and the data terminal 56. If, now the speed light device 384 has not yet completed charging there is no charge completion signal CSA so that the input of the above-mentioned data VSA is in the restricted state in the circuit 380. When the speed light device 384 has been charged a current is ready to reach the charge completion detecting circuit 346 through the control terminal 54 and the data contact 140 at the side of the speed light device 384. Namely the charge completion signal CSA is delivered from the speed light device 384 in form of a negative current signal through the data contact 140 and the control terminal 54 so as to be detected by the current detector 386 provided at the input control part 360. This current detector 386 includes facilities for applying a control signal to the signal changeover circuit 380, when a current is delivered through the control contact 54, so as to apply an analog signal from the terminal 56 to the A - D converter 382 instead of the analog signal from the TTL light measuring means 378 and a means for detecting the intensity of the above current so as to judge the control signal included in the current. Thus when the charge completion signal CSA is delivered from the speed light device 384, the signal changeover circuit 380 delivers the data VSA relative to the aperture value taken up through the terminal 54 in analog value to the A - D converter 382 in such a manner that the data VSA relative to the aperture value is converted into a digital value and introduced into the system. On the other hand, the current detector 386, which detects the CSA signal, delivers the charge completion signal CGUP. This brings the system into the speed light photographic mode and at the same time determines whether the fully automatic state or the semi-automatic state the speed light photographic mode prevails. This is done in accordance with the current of the CSA signal to which a current is selectively given in two steps. This is done by means of the charge completion detecting circuit 346 including means for switching the current of the charge completion signal in two steps by means of the switch 146. This produces the fully automatic signal FAT in case the speed light photographic mode is fully automatic. Thus the system is brought into the fully automatic speed light photographic mode or the semi-automatic speed light photographic mode in accordance with the input of the charge completion signal CGUP produced by the current detector 386 and the existence of the fully automatic signal FAT.

Hereby the speed light device 384 for speed light photography is triggered by means of the synchronization switch of the mechanical part 358. The speed light device 384 is connected to the switch 388 through the synchronization contacts 138 and 52. Further, as is well known, the synchronization switch 388 is closed by means of the member 390 for detecting when the front shutter plane has operated in case of the two shutter plane system focal plane shutter.

Figure 24A:
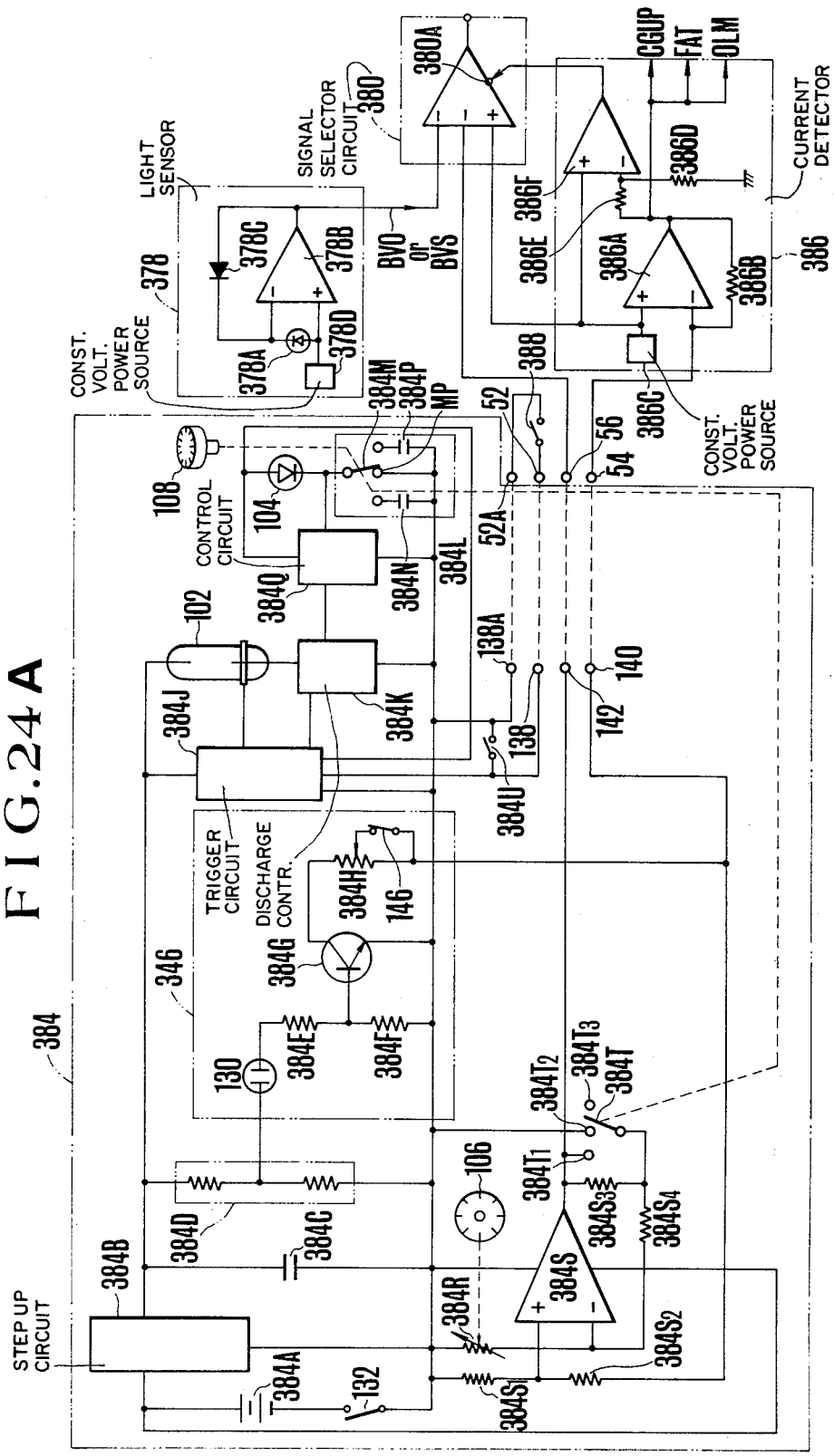
FIG. 24A shows a detailed circuit diagram of the speed light photographic device shown in FIG. 24.

Below the speed light device 384 will be explained more in detail in accordance with FIG. 24A. FIG. 24A shows the circuit of the speed light device 384, of the current detector 386, of the signal switching over circuit 380 and of the TTL light measuring circuit 378.

In FIG. 24A, member 384A is a power source, 384B a step up circuit for the power source voltage, 384C a main condenser for storing the speed light energy and 384D a voltage detecting circuit for detecting the terminal voltage of the main condenser 384C, including a voltage dividing resistance and so on. A detecting circuit 346 produces the charge completion display when the main condenser 384C has been charged to a certain voltage. In the circuit 346, a neon tube 130 serves as a display lamp, the resistances 384E and 384F, a voltage dividing circuit, and the transistor 384G and the resistance 384H serve for setting two steps of the current. Member 146 is the aforementioned changeover switch. 384J is the trigger circuit, 102 the flash tube and 384K the conventional discharge control tube connected to the flash tube 102, composed of the thyrister, the condenser and so on. A detector 104 includes a photocell and so on for sensing the reflected flash light of the flash discharge tube 102. An integrating circuit 384L serves for integrating the output of the sensing element 104. At the same time circuit 384L serves as the aperture information setting circuit and 384M is the switch functionally engaged with the aperture value setting dial 108 in such a manner that the switch 384M is set at the position MP when the dial 108 is set at M (FIG. 5). Members 384N and 384P are capacitors, 384Q is a control circuit for detecting the output level of the integrating circuit 384L, so as to deliver the flash light stopping signal to the discharge control circuit 384K when the output level has reached a certained value. Member 384R is the resistance whose value is variable in functional engagement of the film sensitivity setting dial 106. Element 384S is the operational amplifier, $384S_1$-$384S_4$ the resistances and 384T the switch functionally engaged with the switch 384M so as to be connected to the contact $384T_1$-$384T_3$ selectively. Elements 138, 140 and 142 are the aforementioned contacts, 138A the contact connected to the negative electrode of the power soruce 384A through the power source switch 132, and 384U the flash light test switch. Element 52A is the contact to be connected to the contact 138A, 52, 54 and 56 the contacts and 388 the synchronization switch. The current detector 384 includes an operational amplifier 386A, the resistance 386B, the constant voltage power source 386C, the resistances 386D and 386E and the comparator 386F. Member 380 is the aforementioned signal changeover circuit including the changeover terminal 380A connected to the output terminal of a comparator 386F, a non-inverting input terminal connected to the aforementioned constant voltage power source 386C, an inverting terminal connected to the contact 56 and an inverting terminal connected to the output terminal of the light measuring circuit 378. Member 378 is the light measuring circuit including the light sensitive element 378A for sensing the light of the object, the operational amplifier 378B, a diode 378C for logarithmically compressing the light of the element 378A and a constant voltage power source 378D.

In operation, when the flash light device 384 is mounted on the camera, the terminals are connected as is shown in the drawing. Now, when an aperture value determined by the speed light device is set with the aperture value setting dial 108, the switch 384M is also selected. When at this time the switch 384M is connected to the contact 384P, the switch 384T functionally engaged with the switch 384M is also connected to the contact 384T$_3$. Thus in the feed back circuit of the operational amplifier 384S the resistance 384S$_3$ whose value corresponds to a predetermined aperture value set with the aperture value setting dial 108 in advance is inserted in such a manner that the aperture information for the control at the time of the flash light photography is set at the operational amplifier 384S constituting the aperture control signal forming means for the flash photography. When the power source switch 132 is then closed, the power source 384A is connected to the step up circuit 384B in such a manner that the stepped up voltage of the power source 384A is applied to the main condenser 384C so as to change the condenser 384C. Further the charge of this condenser 384C is detected by means of the voltage dividing circuit 384D constituting the detecting circuit. Thus when the main condenser 384C is sufficiently charged for flash light photography the neon tube 130 in the detecting circuit lights up for displaying the charge completion while at the same time, a base current is delivered to the transistor. When the shutter of the camera is released while the neon tube 130 is on, a voltage is applied from the camera to the speed light device through the terminals 54 and 140 of the current detecting circuit 386. At this time, a base current is delivered to the transistor 384, so the signal voltage from the aforementioned detector 386 is applied to the transistor 384G through the terminals 54 and 140, the switch 146 as well as the resistance 384H so as to bring the transistor 384G in the switched on state. The value of this resistance 384H is set small in comparison with that of the resistances 384S$_1$ and 384S$_2$ so that the current flowing through the resistance 384H is comparatively large in such a manner that the output level of the operational amplifier 386A of the detector 386 assumes the value corresponding to that of the resistance 386. The current flowing through the terminals 54 and 140 at this time is the signal CSA$_1$ for bringing the camera into the fully automatic mode. The output level of the aforementioned amplifier 386A becomes comparatively high so that the comparator 386F is actuated so as to operate the signal selector circuit 380. Thus the signal changeover circuit 380 is supplied with the data VSA from the speed light device, namely the data as to the aperture value through the terminal 142 and 56 instead of the output of the light measuring circuit 378. On the other hand, at the terminal 140 the signal CSA$_1$ is produced so that the operational amplifier 386A as the output terminal of the detector 386 delivers the charge completion signal CGUP and the fully automatic mode signal FAT. Further the current flowing through the terminal 140 when the normally closed type switch 146 is in the opened state is smaller than the switch 146 is in the closed state. That is, at this time, the semi-automatic mode signal CSA2 is produced at terminal 140. It goes without saying that the charge completion signal CGUP is delivered from the output terminal of the detector 386 while the fully automatic mode signal FAT is not delivered, because the output level of the detector 386 goes down.

When the synchronization switch 388 is closed actuating the shutter of the camera in the above-mentioned state the trigger signal is delivered from the trigger circuit 384J so as to trigger the flash tube 102 as well as the discharge control circuit 384K in such a manner that the flash tube illuminates the object (not shown in the drawing).

When the light reflected from the object reaches the light sensitive element 104 the capacitor 384P is charged until the charge level reaches a certain value when the control circuit 384Q delivers the flash light stopping signal from the output terminal so that the discharge control circuit 384K stops the operation of the flash tube 102. Further when the mark M is selected with the aperture value setting dial 108, the switch 384M is connected to the contact MP so that whole of the charge stored in the condensor 384 of the speed light device is discharged, whereby the total flash mode is achieved.

In order to complete the camera system in accordance with the present invention, this synchronization switch 388 is used to obtain synchronization not only with the speed light device 384 to be mounted on the accessory shoe 50 of the camera body 4 but also with other conventional electronic flash units or incandescent flash devices, for which purpose the switch 388 is also connected to the X contact 64.

FIG. 25 shows a simplified block diagram of the reflection light system light measuring meter 350. When this light measuring meter 350 is mounted on the camera body 4, the data terminal 56 and the control terminal 54 provided on the accessory shoe 50 of the camera body 4 are respectively connected to the contacts 148 and 146 of the light measuring meter 350. At this time a current is ready to reach the contact 146 at the side of the light measuring meter 350 through the control terminal 54. Namely the signal OLM for showing the mounting of the external light measuring meter is delivered in a form of a negative current signal from the light measuring meter 350 through the contact 146 and the control terminal 54. This signal OLM is detected by the current detector 386 provided at the input control part 360. Thus the control signal is given to the above mentioned signal changeover circuit 380 from this current detector 386. The data relative to the measured light amount in analog value from the data terminal 56 is introduced into the A - D converter 382 instead of the analog signal from the TTL light measuring means 378 so as to be converted into a digital data and introduced into the system. This measured light amount data OB is not the one obtained through the photographic lens device so that various compensations are not necessary in such a manner that the obtained signal directly corresponds to the object brightness. On the other hand, the above mentioned current detector 386 judges the above mentioned OLM signal in accordance with the current and produces the control signal OLM so as to bring the system into the external light measuring mode. The system carries out operation based upon the external light measuring data in accordance with the control signal OLM.

FIG. 26 shows a block diagram of the incident light system light measuring meter 354. When the coupler (FIG. 7) of the light measuring meter 350 is mounted on the camera body 4, the contacts 168, 166 and 170 of the coupler 156 are respectively brought into contact with the data terminal 56, the control terminal 56 and the AE lock terminal 58 provided on the accessory shoe 50 of the camera body 4. At this time a current is ready to reach the contact 166 on the light measuring meter 354 through the control terminal 54. Namely the signal showing the mounting of the external light measuring meter is delivered in a form of a negative current signal from the light measuring meter 354 through the contact 166 and the control terminal 54. Hence this signal OLM is detected by the current detector 386 provided at the input control part 360. Thus the control signal is delivered to the signal changeover circuit 380 from this current detector 386. The data OB relative to the measured light amount in analog value from the data terminal 56 is ready to reach the A - D converter 382 instead of the analog signal from the TTL light measuring means 378.

This incident light system light measuring meter 354 includes a normally closed AE lock switch 392. When the coupler 156 is mounted on the accessory shoe 50 of the camera body 4, the AE lock switch 392 short-circuits the ordinary AE lock switch SAELK included in this mechanical part 358 through the contact 170 of the coupler 156 and the AE lock terminal 58 of the accessory shoe 50 in such a manner that this camera is brought into the AE lock state.

This AE lock switch 392 is functionally engaged with the light measuring button 174 for actuating the light measuring meter 354 so as to be opened by the operation of the button 174. This is done so that when the light measurement is started at the side of the light measuring meter 354, the camera is released out of the AE lock state.

At this time the data OB relative to the measured light amount is produced in analog value by the light measuring meter 354 at the contact 168 and introduced into the A - D converter 382 through the data terminal 56 and the signal changeover circuit 380 so as to be converted into a digital value and introduced into the system.

Although this measured light amount data OB is the data relative to the illumination quite different from the object brightness information BV because the data OB is not the one obtained in accordance with the reflection light system, the handling in the APEX operation is virtually identical with that of the object brightness information BV so that when the analog value produced by the light measuring meter 354 is adjusted properly, the obtained measured light data OB can directly correspond to the object brightness BV. On the other hand the above mentioned current detector 386, which judges the OLM signal in accordance with its current amount, produces the control signal OLM so as to bring the system into the external light measuring mode. This system carries out operations based upon the external measured light data in accordance with the control signal quite in the same way as in case with the incident light system light measuring meter. With the exception of the serviceability of the AE lock, the operation of this camera system is absolutely the same no matter which of the reflection light system light measuring meter or the incident light system light measuring meter is used as an adapter for the external light measurement.

As is clear from the above explanation, the meaning of the digital signal produced by the A - D converter 382 is specified in accordance with the signals CGUP, FAT and OLM produced by the current detector 386. The operation of the system is also converted into the one in the desired mode in accordance with the output of the above mentioned current detector 386. In the following explanation the digital signal is produced by the A - D converter 382.

The input control part 360 picks up various conditions and operation states set at the mechanical part 358, after having detected them and also the AELK signal for the AE lock, the AECG signal for the AE charge state of the AE lever and so on through the SAELK designed in the same way as the switching mechanism shown in FIG. 21, the winding up completion detecting switch SWHUP and the AE charge detecting switch SAECG. The AE lock switch SAELK is functionally engaged with the selector lever 22 on the upper surface of the camera body 4, the switch SWHUP with the mechanism operated by the winding lever 14 and the switch AECG with the mechanism mechanically linked with the AE lever 94.

As mentioned the data and the condition setting signals taken up into the input control part 360 are, after having been accordingly arranged in the timing, transmitted to the central control part 362 through the BAS line 370.

The control part 362 receives various setting data and setting conditions from the mechanical part 358. This central control part 362 delivers the timing pulses as is shown in FIG. 13 through the timing line 394, and takes up, in synchronism with their timing pulses, the SV' data relative to the film sensitivity SV, the data AVo (Grey code) relative to the smallest aperture value of the photographic lens device, the MHAL signal for showing that the aperture of the photographic lens device has been set at the side of the lens, the SPDW signal for showing that the diaphragm of the lens has been closed, the data relative to the set aperture value AV or the set shutter time TV, the data ASLG for showing that the data relates to the aperture value AV, the signal AMAX for showing the largest aperture value of the photographic lens device and so on.

As mentioned various data and signals for setting conditions are taken up through the structure shown in FIGS. 12–19.

The central control part 362, in which various operations are controlled, delivers the data signals for the control of various exposure control mechanisms of the mechanical part 358 and the data signal for the display to the output control parts 364 through the output BAS line 374.

The output control part 364 includes various control facilities such as a shutter release control for starting the camera operations, an aperture control for controlling the aperture value of the lens with the set or the controlled value, a shutter time control for controlling the shutter time with the set or automatically controlled value and a display control for displaying necessary data and delivering the control signals for shutter release means 386, aperture control means 398, shutter time control means 400, digital display means 402 and twinkling or flashing display means 404. On the other hand, this output control part 364 takes up various setting conditions and the operation states of the above mentioned mechanical part 358, after having detected them and takes up the SELF signal for showing that the self-timer has been set, the shutter release SR signal for starting the camera operation after the shutter release and the CTST signal for showing that the front shutter plane of the focal plane shutter has run through the self-timer set switch SSELF in the same way as the switch arrangement shown in FIG. 21, the shutter release switch SW2 and the front plane starting switch SCTST in the same way as the switch arrangement shown in FIG. 22. Further the above mentioned output control part 364 takes up, through the structure shown in FIG. 23, the FPC signal obtained by converting the distance the AE lever 94 has travelled from the AE charge position into pulses.

The switch SSELF engages the selector lever 22 over the upper surface of the body 4, the shutter release switch SW2 with the shutter release button 18 and the switch SCTST with the front plane starting detecting member 406.

The mechanical part 358 of this camera uses a mechanical sequence control mechanism and an electrical control mechanism with an electromagnetic solenoid. The shutter release means 396, the aperture control means 398 and the shutter time control means 400 are connected with the electrical control.

The shutter release means 396 serves for starting the mechanical sequence of the camera by means of a remarkably small electromagnetic solenoid. The operation of shutter release means 396 has a close connection with the shutter release signal SR and the self-timer set signal SELF introduced into the input control part 360, the winding completion signal WHUP introduced into output control part 364 and so on.

The mechanical sequence started by the operation of the shutter release means 396 includes the operation for displacing the AE lever from the AE charge position. This AE lever 94 includes, as mentioned, a structure for presetting the aperture value of the lens 2, is stopped at a proper position during the displacement from the charge position toward the discharge position. The displacement of the AE lever 94 from the AE charge position determines the final position. That is, the displacement of AE lever 94 from the AE charge position, as is clear from the explanation of FIG. 2, corresponds to the preset value of the control diaphragm closing member of the lens 2. Hence it is possible to preset the aperture at the lens 2 by detecting the displacement of the AE lever 94 in such a manner that when the detected amount reaches a value corresponding to the control diaphragm closing step number, the AE lever 94 is clamped to maintain the displacement.

The FPC signal is introduced into the output control part in accordance with the displacement of the AE lever 94 during such operation. This FPC signal is the pulse signal whose number corresponds to the displacement of the lever 94 so that it is possible to learn the displacement of the lever 94 simply by counting the FPC signal with a counter.

The aperture control means 398 serves to actuate the mechanism for clamping the AE lever 94 when the displacement of the AE lever 94 from the AE charge position reaches a value corresponding to the diaphragm closing step number from the central control part 362. A small electromagnetic solenoid performs the operation.

The mechanical sequence started by the operation of the above mentioned shutter release means 396, includes, besides the operation for displacing the AE lever 94 from the charge position, such operations as the lifting of the mirror, the closing of the diaphragm of the photographic lens device 2 down to the preset aperture value, starting the front shutter plane of the focal plane shutter and so on.

Generally the shutter time of the focal plane shutter is controlled by controlling the time from the start of the front shutter curtain till the start of the rear shutter curtain. This camera is not an exception. Thus the desired shutter time is obtained by counting the time after the start of the front shutter curtain while controlling the start of the rear shutter curtain so that when the time corresponding to the shutter time given by the above mentioned central control part 362 has passed the rear shutter curtain is started. It goes without saying that in this camera the time is counted electrically.

When the front shutter curtain starts, the mechanical part delivers the signal CTST. The output control part 364, to which the CTST signal is delivered, counts the time based upon the shutter time data from the central control party 362. When the shutter opening time has passed the rear shutter curtain started by the shutter time control means 400 which uses a small electromagnetic solenoid.

As mentioned above, the shutter release means 396, the aperture control means 398 and the shutter time control means 400 are the parts for directly connecting the electrical control system to the exposure control in this camera system and assume a very important position in the system.

The mechanical sequence of the camera itself continues even during operation of the electrical control means. The mechanical control mechanisms participate in the quick return of the mirror after the rear shutter curtain has run, the release of the diaphragm closing drive and so on.

Beside the above this output control part 346 has the display function for displaying the information necessary for taking a picture to the photographer. The camera shown in FIG. 1 includes, as is already mentioned, a display means 402 for displaying the necessary information in the viewfinder 13. This data display means is included in the mechanical part 358 of the system. The data display device 402 from the output control part 364 with the data to be displayed, namely the code signal for the display The central control part 362 supplies the timing signal for the dynamic display drive through the timing line 394. This dynamic display drive is a well known display method. Here the desired data is displayed in the desired display unit by giving to all of the display units constituting a display device the common information altering with time and at the same time selectively driving the units by means of the timing. This method is widely used because the circuit can be simplified while the power consumption can be decreased. This dynamic display drive is especially advantageous when a large power source cannot be built in a limited space such as in a camera.

An LED lamp 32 on the upper surface of the camera body 4 shown in FIG. 1 checks the battery. It also indicates that the self-timer is in operation by lighting up during photography with the self-timer. Also this LED lamp 32 receives a control signal from the output control part 364. As mentioned above the mechanical part 358 connects the input control part 360, the central control part 362 and the output control part 364 closely to the input conditions such as the light measurement data, the external input data, the setting data, the setting condition, the judgement state and so on or to the control as well as the display of the shutter release, the aperture value, the shutter time and so on.

Figure 28:
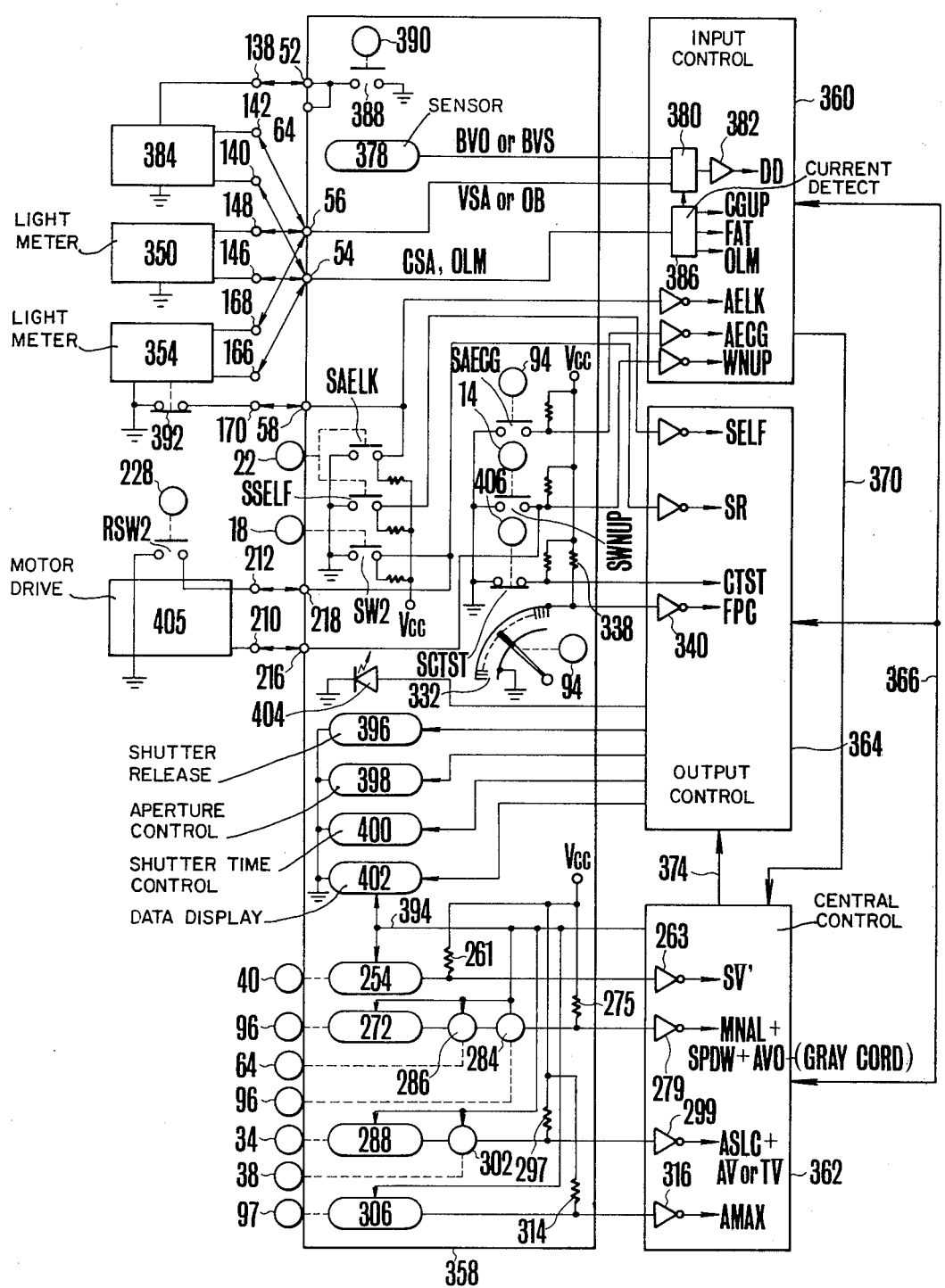
FIG. 28 shows a composition for explaining the efficiency of each mechanism of the camera system shown in FIG. 27.

The motor drive whose details are shown in FIG. 8 is designated 405 in FIG. 28. This motor drive device 405 is connected to the switch SWNUP through the contact 210 and the contact 216 of the camera body. The switch SWNUP is kept closed from the completion of the film winding till the completion of the operation of the rear shutter plane after the shutter release at the side of the camera as has been explained and in consequence kept at the high level through the inverter during the time interval so as to obtain the WNUP signal. The motor drive is controlled by means of the WNUP signal before passing through the above mentioned inverter, namely the WNUP signal. This WNUP signal is high during a time interval other than the above mentioned in the operation cycle of the camera. That is, from the completion of the rear shutter plane till the completion of the film winding in such a manner that the motor drive device 405 drives the film winding motor by means of this WNUP signal. The motor drive starts the film winding operation as soon as the rear shutter plane has completed the operation after the shutter release. It stops the film winding operation at the time the film winding operation has been completed so that there is no room for the misoperation. At the same time speedy film winding is possible.

In FIG. 8, this motor drive device 406 includes the shutter release device 220 capable of remotely controlling the shutter release of the camera. Thus, this shutter release device 220 is not always electrically connected to the motor drive 405. The operation button 228 provided on this shutter release device 358 is functionally engaged with the switch connected in parallel with the shutter release switch SW2 of the mechanical part 358 through the contacts 212 and 218. Its operation is the same as that of the shutter release button on the upper surface of the camera body 4.

As mentioned afore, the input control part 360, the central control part 362 and the output control part 364 have various advantages and are connected to each other through the BAS lines to form a rational system together with the mechanical part 358.

The principal purpose of this system is to carry out the operation based upon the external conditions (such as the measured light data) and the conditions set by the photographer and to deliver the necessary exposure control data to a display for the photographer as well as to control the exposure on the basis of the control data. The operation of the cover device in various modes is generally as follows.

The digital data DD produced by the A - D converter 382 of the input control part 360 corresponds to either of the measured light data BVo with light measurement with the totally opened diaphragm, the measured light data BVs with the light measurement with the closed diaphragm, the aperture control data VSA from the speed light device 384 and the external measured light data OB from the external light measuring adapters 350 and 354. They are assorted and treated accordingly in accordance with the signals such as the charge completion signal CCUP produced by the afore mentioned current detector 386, the external light measurement mode control signal OLM, the diaphragm closing signal SPDW produced by the switch 286 mechanically linked with the diaphragm closing lever 64 and so on.

Now let us suppose that no flash unit 384 nor external light measuring adapter 350 and 354 is mounted on the accessory show 50 of the camera body 4. At this time the camera is in a position to be five photographic modes.

The device modes are the aperture value priority AE photographic mode, the shutter time priority AE photographic mode, the manual exposure control photographic mode with light measurement with totally opened diaphragm, the manual exposure control photographic mode with light measurement with closed diaphragm and the aperture value priority AE photographic mode with the light measurement with the closed diaphragm. Any of the modes can be selected in accordance with the state of the mode selector 38 on the upper surface of the camera body 4, the diaphragm closing lever provided on the front surface of the camera body 4 and the aperture setting ring of the lens device 2 as is shown in FIG. 11. With data operation the necessary operation routine is reduced to four because the manual exposure adjustment mode with the light measurement with totally opened diaphragm is equal to the aperture value priority or the shutter time priority AE photographic mode.

When the mode selector is set for aperture priority, the diaphragm closing lever 64 at the diaphragm opening and the aperture value setting ring 8 of the lens device 2 at the position at which the mark 12 is selected, the system is in the aperture value priority AE photographic mode. The measured light BVo relative to the object brightness obtained at this time from the result of the light measurement includes, as mentioned, the smallest aperture value AVo of the lens device 2 and the vignetting error AVc. The actual object brightness data BV is obtained from the relation (BVo=BV−AVo−AVc) as is shown in the relation (3). On the other hand the data SV relative to the film sensitivity, the data AVo relative to the smallest aperture value of the lens device 2, the aperture value AV designed by the photographer and so on are set. The data AVo concerning the vignetting error AVc is also derived from the smallest aperture value data AVo. However, this vignetting error AVc is not derived by the operation but selected from a plural number of data as to the vegnetting error prepared in advance so as to correspond to the smallest aperture value AVo of the photographic lens 2.

In this camera system, before starting the operation for the exposure control a determination is made whether the aperture value AV set by the dial 34 is longer than the smallest aperture value AVo of the photographic lens 2 but smaller than the largest aperture value ANAX. In case the result of this comparison operation shows that the aperture value set by the dial 34 is smaller than the smallest aperture value AVo, the set aperture value AV is replaced with the smallest aperture value Avo. If the result shows that the aperture value set by the dial 34 is larger than the largest aperture value AMAX the set aperture value AV is replaced with the largest aperture value AMAX.

The reason for the above is that, as menionted, the aperture value AV is set not at the lens device 2 but at the dial 34 and therefore there is a possibility that the set value lies beyond the controllable range of the photographic lens 2, whereby the smallest or the largest aperture value AVo or AMAX is applied as the aperture value AV for the control.

The measured light data BVo is introduced into the input control part 362 from the TTL light measuring means provided at the mechanical part 358 through A - D converter 382 and is further introduced into the central control part 362 so as to be operated as follows.

First of all the data SV relative to the film sensitivity is added to the measured light data introduced as mentioned above. Namely the operation $$BVo + SV = SV - AVo - AVc \qquad (8)$$

is carried, whereby the relation (9) corresponds to $$BVo + SV = EV - AVo - AVc \qquad (9)$$

in accordance with the relation (2). Then the data AVo relative to the smallest aperture value and that AVc relative to the vignetting error are added to the above mentioned operation results. Namely the operation $$BVo + SV + AVo + AVc = EV \qquad (10)$$

is carried out in such a manner that through the above mentioned calculation the proper exposure amount EV is obtained for the film to be used based upon the measured light data.

As indicated, this operation is carried out digitally. When the operation register overflows with the operations in accordance with the relations (8), (9) and (10), the maximum capacity of the operation register is considered as the operation result.

Them, as mentioned, the aperture value AV set with the dial is subtracted from the obtained exposure amount EV, whereby the result is, as is clear from the relation (1), $$EV - AV = TV \qquad (11)$$

in such a manner that the shutter time necessary for obtaining the proper exposure for the set aperture value is obtained.

The shutter time TV obtained in this way is the control data for satisfying the exposure amount EV in accordance with the relation (10) for the set aperture value AV. There is a possibility that at times the operation result should be beyond the range of the shutter time of the camera body 4 and in order to provide for such a case it is necessary to sell the fact to the photographer and prevent misoperation. This being the situation the camera system is constructed to investigate whether the shutter time obtained from the operation is shorter than the longest shutter time TMAX but longer than the shortest shutter time TMIN of the shutter mechanism of the camera body 4. In case the result shows that the shutter time obtained from the operation is beyond the longest shutter time or the shortest shutter time, the shutter time TV is replaced with the shutter time of TMAX or TMIN. At the same time the fact is transmitted to the photographer.

The smallest aperture value AVo of the photographic lens 2 is subtracted from the aperture value AV for the control as follows.

$$AV - AVo = AVs \qquad (12)$$

so as to obtain the diaphragm closing step number AVs for the aperture control. The reason why this camera system applies the diaphragm closing step number to the aperture control is that the step number control mechanism is applied to the control mechanism of the photographic lens device 2 shown in FIG. 2.

By means of the above mentioned operation process, the shutter time TV and the control diaphragm closing step number AVs are derived based upon the set aperture value.

It is possible for the photographer to confirm the results of the operation in the viewfinder 13. As shown in FIG. 10 (a)-(II), the aperture value set with the dial 34 and the shutter time obtained from the operation are displayed. This display mode has already been explained.

In accordance with the operation result, the exposure control of the camera is carried out after the shutter release. The lens device 2 carries out the preset control of the diaphragm closing step number AVs from the side of the camera body 4 because the aperture setting ring 8 selects the mark 22.

In case the mark 22 is not selected with the aperture setting ring 8 at the side of the lens device 2, it is impossible to preset the diaphragm closing step number AVs of the lens device 2 from the side of the body 4 and at the time of the actual exposure control the lens device 2 is closed down to the aperture position preset by means of the aperture setting ring 8. Thus in case of this camera system, such a case as mentioned above is made the manual exposure adjustment photographic mode with the light measurement with the totally opened diaphragm. Thus, it is possible to control the exposure with the set aperture value and the automatically obtained shutter time by presetting the aperture value with the aperture setting ring 8 at the side of the lens device 2 in accordance with the aperture value displayed in the viewfinder, namely the aperture value set with the dial 34 at the side of the camera body 4. In the manual exposure adjustment photographic mode with the light measurement with the totally opened diaphragm, as is shown in FIG. 10 (a)-(III), the character "M" is displayed beside the aperture value set with the dial 34 or the shutter time operated so as to inform the photographer of the necessity to set the aperture value of the photographic lens device 2 in accordance with the display manually as has already been explained. This manual exposure adjustment photographic mode can be said to be of the character with the priority on the aperture value because what is set with the dial 34 at first is the aperture value. What is especially interesting in case of this manual exposure adjustment photographic mode is the fact that this camera carries out the aperture value priority AE photographic operation by keeping the aperture value preset or set by closing the diaphragm at the side of the lens device 2 equal to the aperture value set with the dial 34.

When the mode selector 38 is set at the side of the priority on the shutter speed, the diaphragm closing lever 64 at the side of the total opening and the aperture setting ring 8 of the lens device 2 at the position at which the mark 12 is selected, this system is the shutter time priority AE photographic mode. The measured light BVo relative to the object brightness obtained as a result of light measurement at this time includes, as has been explained, the smallest aperture value of the lens device 2 and the vignetting error AVc the relation $BVo = BV - AVo - AVc$ is established for the actual object brightness BV as explained.

On the other hand the data SV relative to the film sensitivity, the data AVo relative to the smallest aperture value of the lens device 2, the shutter time TV desired by the photographer and so on have been set in the mechanical part 358. The data AVc relative to the vignetting error AVc has also been derived from the above mentioned smallest aperture value data AVo in the same way as in case of priority on the aperture value.

The measured light data BVo introduced into the input control part 360 through the A - D converter 382 from the TTL light measuring means 378 provided in the mechanical part is further introduced into the central control part 362 so as to be processed further.

First of all the data SV relative to the film sensitivity is added to the measured light data BVo introduced as mentioned above. Namely the operation $BTo + SV$ ($= BV + SV - AVo - AVc$) is carried out, whereby the relation corresponds to $BVo + SV = EV - AVo = AVc$ in accordance with the aforementioned relation (2) in the same way as in the case of priority on aperture value. Then, to the operation result the data AVo relative to the smallest aperture value of the lens device and that AVC of the vignetting error are added. Namely the operation $BVo + SV + AVo + AVc$ ($= EV$) is carried out. The exposure amount Ev proper for the film to be used is carried out on the basis of the light measurement data.

As has already been mentioned, this operation is carried out digitally. Hence, when the operation register overflows with a series of the above mentioned operations, the maximum capacity of this operation register is taken for the operation result.

Then the data TV relative to the shutter time set with the dial 34 is subtracted from the exposure amount EV obtained as mentioned above. The result is, as is clear from the relation (1), $EV - TV = AV \ldots$ (13), in such a manner that the aperture value necessary for obtaining the proper exposure is obtained for the set shutter time TV.

The thus obtained aperture value AV is the control data for satisfying the exposure amount EV operated for the set shutter time TV. There is a possibility that at times this operation result lies beyond the controllable range of the aperture value of the lens device 2. In such a case it is necessary to inform the photographer of the fact in order to prevent the misoperation. For this purpose this camera system is so designed as to investigate whether the obtained aperture value AV is smaller than the largest aperture value AMAX controllable with the lens device 2 but larger than the smallest aperture value AVo. It goes without saying that when the above investigation results show that the aperture value AV obtained from the operation is beyond the largest aperture value AMAX or the smallest aperture value AVo this limit value AMAX or AVo is made the aperture value AV for the control instead of the aperture value obtained from the operation. At the same time the fact is transmitted to the photographer.

Then the data AVo relative to the smallest aperture value of the photographic lens device 2 is subtracted from the aperture value for the control ($AV - AVo = AVs$) so as to obtain the diaphragm closing step number AVs for the aperture control. The reason why this camera system controls the aperture with the diaphragm closing step number AVs is that the step number control mechanism is applied to the control mechanism of the photographic device 3 shown in FIG. 2, as explained.

Thus the control step number AVs is derived based upon the set shutter time TV through the above mentioned operation process.

Further it is possible for the photographer to confirm the result of the operation in the viewfinder. As is shown in FIG. 10 (a)-(I), the aperture value obtained as the result of the operation with the shutter time set with the dial 34 is displayed at the same time. The display mode is that which has already been explained.

The camera carries out the exposure control after the shutter release based upon the operation result. In the lens device 2 the mark 22 is selected with the aperture setting ring so that the preset control is carried out with the diaphragm closing step number AVs from the side of the camera body 4.

Because the mark 22 is selected with the aperture setting ring 8 at the side of the lens 2, the preset control is carried out with the diaphragm closing step number AVs from the side of the camera body 4.

Further it is impossible to preset the diaphragm closing step number AVs of the lens 2 from the side of the camera body 4 in case the mark 22 is not selected with the aperture setting ring 8 at the lens 2. At the time of the actual exposure control the lens 2 is closed down to the aperture position preset with the aperture setting ring 8. Thus in case of this camera system, such a case is made the manual exposure adjustment photographic mode with the light measurement with the totally opened diaphragm. Thus it is possible to control the exposure with the set shutter time and the aperture value preset with the lens device 2 by presetting the aperture value by means of the aperture setting ring 8 at the lens 2 based upon the aperture value displayed in the viewfinder, namely the aperture value derived from the operation result. As explained, in case of such manual exposure adjustment photographic mode with the light measurement with the totally opened diaphragm the character "M" is displayed in the viewfinder 13 as is shown in FIG. 10 (a) - (III). This is done by the display to inform the photographer of the necessity of manually setting the aperture value of the photographic lens 2.

When the mode selector 38 is set at the priority on the aperture value, the diaphragm closing 64 is at the side of the diaphragm closing out the aperture setting ring 8 at the position at which a certain aperture value is preset, the system is in the aperture value priority AE photographic mode. The measured light BVs relative to the object brightness obtained from the result of the light measurement includes at this time, as has already been explained, the largest aperture value AV of the lens device 2 and the vignetting error AVc. Hence, it is impossible to obtain the vignetting error because this system does not include the means for taking up the aperture value AV so that the vignetting error is disregarded. Thus as is clear from the relation (5), the measured light amount BVs has the following relation for the actual object brightness $$BV_s = BV - AV.$$

On the other hand, the data SV relative to the film sensitivity is set at part 358.

The measured light data BVs with the closed diaphragm introduced into the input control part 360 through the A - D converter 382 from the TTL light measuring means 378 provided in the mechanical part 358 is introduced into the central control part 362 so as to be processed further.

At first the data SV relative to the film sensitivity is added to the measured light data thus introduced. Namely, the operation is carried out as follows $$BV_s + SV = BV - AB + SV \quad (14).$$

This relation corresponds to the relation $$BV_s + SV = EV - AV = TV \quad (15)$$

in accordance with the relations (1) and (2). This operation makes it possible to derive the shutter time TV necessary for obtaining the proper exposure EV.

Further the shutter time TV obtained in this way is the control data for satisfying the exposure amount EV of the relation (15) for the aperture value of the closed lens device 2. There is a possibility that at times the operation result lies beyond the limit of the shutter time given to the camera body 4 and in such a case it is necessary to inform the photographer of the fact in order to prevent misoperation. For this purpose this camera system investigates whether the shutter time TV obtained from the operation result is shorter than the longest shutter time and longer than the shortest shutter time of the shutter mechanism built in the camera body 4. When the investigation result shows that the shutter time TV obtained from the operation result is beyond the limit of the longest shutter time TMAX or the shortest shutter time TMIN, this limit value of TMAX or TMIN is adopted as the shutter speed TV for the control instead of the shutter time TV for the control instead of the shutter time TV obtained from the operation result. It goes without saying that the fact is transmitted to the photographer.

Here it must be added that in this photographic mode the aperture value set with the dial 34 is disregarded.

Thus by means of the operation result, the shutter time is derived based upon the aperture value of the closed photographic lens 2.

Here it is possible for the photographer to confirm the operation result in the viewfinder, whereby the display at this time is as is shown in FIG. 10 (a)-(IV). This display mode is as has already been explained.

In accordance with the operation result the camera controls the exposure after the shutter release. The shutter is controlled with the shutter TV at the side of the camera body 4. The diaphragm of the lens 2 is kept in the closed state at the position manually set.

When the mode selector 38 is set at the priority on shutter time, the diaphragm lever 64 at the side of closing and the aperture setting ring 8 of the lens device 2 at the position at which a certain aperture value is preset, the system is in the manual exposure adjustment photographic mode with light measurement with the closed diaphragm. The measured light amount BVs relative to the object brightness obtained from the result of the light measurement at this time includes the aperture value of the lens device 2 with the closed diaphragm and the vignetting error. This system does not include any means for taking up the aperture value so that the vignetting error is disregarded. Thus the measured light BVS has the relations BVS=BV−AV for the actual object brightness, which has already been mentioned. On the other hand, at the mechanical part 358 the data relative to the film sensitivity, the shutter time desired by the photographer and so on have been set.

The data BVs of the light measured with the closed diaphragm introduced into the input control part 360 through the A - D converter 382 from the TTL light measuring means 378 on the mechanical part 358 is introduced into the central control part 362 so as to be processed further as follows.

First of all the data SV concerning the film sensitivity is added to the measured light data BVs introduced as mentioned above. Specifically, the operation BVS+SV (=BV−AV+SV) is carried out. As has already been explained, this relation corresponds to BVs+SV=EV−AV=TV, so that through this operation the shutter time TV necessary for obtaining the proper exposure EV can be obtained.

Further the shutter time TV obtained in this way is the operation data for satisfying the exposure EV for the aperture value AV of the lens device 2 with the closed diaphragm. This operation data is not always equal to the shutter time TV' for control set with the dial 34 of the camera body 4. Thus, when the photographer wishes to realize the proper exposure EV it is necessary to adjust the aperture to make the operation data TV' equal to the set data TV' by operating the aperture setting ring 8 of the lens device 2 or alter the data of the set shutter time TV' to make the set data TV' equal to the operation data TV.

In this camera system an allowance +K1, −(K2−K1) is set for the operation data TV obtained from the operation. The manual operation for bringing the shutter time TV set with the dial 34 within the allowance is displayed to the photographer in the viewfinder 13.

In the operation process, the constant K1 is first added to the shutter time data TV obtained from the operation result. In case the data TV+K1 obtained from the result of the addition overflows the capacity of the operation register, the maximum capacity of this operation register is taken as the operation result.

Then the shutter time data TV' set with the dial 34 is subtracted from the data TV+K1 obtained in this way, whereby, when a carrier takes place as the result of the subtraction, the set shutter time data TV' is beyond the allowance. This camera system gives the photographer the instruction for reducing the closing of the lens 2 or reducing the set data of the shutter time data TV' in such case. On the other hand if no carrier takes place as the result of this subtraction, the constant K2 is further subtracted from the subtraction result TV+K1−TV' as follows.

$$TV = K1 - TV' - K2 \; (=TV - (K2 - K1) - TV') \quad (16)$$

When a carrier takes place as the result of this subtraction, the set shutter time data TV' is within the allowance or tolerance +K, −(K2−K1) for the automatically produced shutter time TV. The fact is transmitted to the photographer. When no carrier takes place, the set shutter time TV' is beyond the allowance. This camera system then gives the photographer an instruction for increasing the closure of the diaphragm of the lens 2 or for increasing the set data of the shutter time data TV'.

The above process permits judgment of whether the closure of the diaphragm of the photographic lens device 2 is proper for the set shutter time TV' or whether the set shutter time TV' is proper for the closure of the diaphragm of the photographic lens device 2.

It is possible for the photographer to confirm the result of the judment in viewfinder 13. The display at this time is as shown in FIG. 10(a)-(V). The mode of this display has already been explained. With this display it is possible for the photographer to produce the most suitable combination of shutter time TV and diaphragm opening for obtaining the proper exposure in accordance with such a display.

In this mode, the shutter is controlled from the camera body 4 in accordance with the shutter time TV' set with the dial 34 by the photographer, while the diaphragm of the lens 2 is kept closed at the position manually set by the photographer.

The display and the manual operation in case of the manual exposure adjustment photographic mode with the light measurement with the closed diaphragm has already been explained, so that the detailed explanation will be omitted here.

All of the above mentioned modes such as the aperture priority AE photographic mode, the shutter priority AE photographic mode, the manual exposure photographic mode with light measurement with the totally opened diaphragm, the aperture priority AE photographic mode with light measurement with the closed diaphragm and the manual exposure adjusting photographic mode with light measurement with the closed diaphragm, operate in response to the light measured with the TTL light measuring means 378 in the mechanical part 358. As has already been explained, it is possible to apply the external light measuring adapter to this camera system.

Now let us consider the case when an external light measuring adapter such as the reflection light system light measuring meter 350, the incident light system light measuring meter 354 and so on are mounted on the accessory shoe of the camera body 4. The camera at this time can assume three kinds of photographic modes (with the exception of the bulb photographic mode).

These three photographic modes are the aperture value priority AE photographic mode, the shutter time priority AE photographic mode and the manual exposure adjusting photographic mode with the external light measurement. Each can be selected by the mode selector on the upper surface of the camera body 4, the aperture setting ring of the lens device 2 and the diaphragm closing lever 64.

In operation of each of the above mentioned modes no substantial difference exists from operation with the TTL light measuring means 378. However, the measured light obtained when the external light measuring adapter is applied is absolutely different from that obtained with the TTL light measuring means 378 in its character. Thus other special operations become necessary.

That is, no matter whether the reflection light system or the incident light system is used, the light measured with the external light measuring meter 350, 354 corresponds to the object brightness BV. Thus, the measured light does not include any factor concerning the smallest aperture value AVo of the photographic lens 2 to be used, the vignetting error AVc and so on. Hence, no process for processing the object brightness BV is needed.

When this external light measuring adapter is applied, the mode selector 38 is set at shutter priority, the diaphragm closing lever 64 at the opening, and the aperture setting ring 8 of the lens device 2 set at the position at which the mark 12 is selected, the system is in the aperture value priority AE photographic mode with external light measurement. The then obtained light directly corresponds to the object brightness BV so that the addition of the smallest aperture value AVo or the vignetting error AVc is not necessary. With the exception of this point, the operation process after then is absolutely identical to that in the case of the aperture value priority AE photographic mode. Further the display of the operation result is absolutely identical with that in case of the aperture value priority AE photographic mode as is shown in FIG. 10 (a)-(II).

If the mark 12 is not selected by the aperture setting ring 8 at the side of the lens device 2, it is impossible to preset the diaphragm closing step number AVs of the lens device 2 from the side of the body 4. Hence, at the time of the actual exposure control the diaphragm is controlled with the value set with the aperture setting ring 8 at the side of the lens device 2. This means that it is necessary to manually set also the same aperture value that is set with the dial 34 of the lens 2. In this case the light is measured through the external light measuring adapter so that the same operation can be used no matter whether the diaphragm of the lens device 2 is totally open or closed. Thus no matter whether the diaphragm of the lens device 2 is totally opened or closed, when the mark 12 is not selected with the aperture setting ring 8 at the lens 2, this camera system is in light measurement. Hence, it is possible to control the exposure with the produced shutter time and the preset aperture value or the set aperture value of the closed diaphragm by presetting the aperture value with the aperture setting ring 8 in accordance with the aperture value displayed in the viewfinder, namely the aperture value set with the dial 34 on the camera body 4. If this manual exposure adjusting photographic mode with the external light measurement, the viewfinder 13 displays the aperture value set with the dial 34, the operated shutter time and the character "M" for showing the necessity for manually setting the lens device 2 as shown in FIG. 10 (a)-(III) quite in the same way as in the case of manual exposure adjusting photograhic mode with the light measurement with the totally open diaphragm.

If this external light measuring adapter is used, the mode selector 38 is set for shutter priority, the diaphragm closing lever 64 at opening and the aperture setting ring 8 of the lens 2 at the position at the mark 12, the system is in the shutter time priority AE photographic mode with external light measurement.

The then obtained measured light directly corresponds to the object brightness BV so that the addition of the smallest aperture value AVo or the vignetting error AVc is not necessary. With the exception of this point, the operation after then is quite identical with that in the aforementioned shutter time priority AE photographic mode. Also the display of the operation result is quite identical with that in the shutter time priority AE photographic mode as is shown in FIG. 10(a)-(I).

When the mark 12 is not selected with the aperture setting ring 8 at the side of the lens device 2, it is impossible to preset the diaphragm closing step number AVs.

At the time of the actual exposure control the diaphragm is controlled with the value set by the aperture setting ring 8. This means that it is necessary to manually set the lens 2 to the aperture value obtained in accordance with the shutter time set with the dial 34, the measured light and so on. In this case the light measurement is carried out through the external light measuring adapter so that the same operation can be used whether the diaphragm is totally opened or closed. Thus, when the mark 12 is not selected with the aperture setting ring 8, this camera system is in the manual exposure adjusting photographic mode with external light measurement no matter whether the diaphragm of the lens device 2 is totally opened or closed. Hence, it is possible to control the exposure with the set shutter time and the operated aperture value by presetting the aperture value with the aperture setting ring 8 in accordance with the aperture value displayed in the viewfinder 13, namely the aperture value obtained from the operation. In this manual exposure adjusting photographic mode with external light measurement, in the viewfinder 13 the shutter time set with the dial 34, the produced aperture value and the character "M" for showing the necessity for manually setting the lens device 2 are displayed in substantially the same way as in the manual exposure adjusting photographic mode with light measurement with the totally opened diaphragm as is shown in FIG. 10(a)-(III).

Further, the character of this manual exposure adjusting photographic mode with external light measurement is decided into two modes, namely the one with priority on the aperture value and the other with the priority on the shutter time. This depends upon whether the mode selector 38 is set at aperture priority or at shutter priority. Thus there is no substantial difference between them. However, when the mode selector 38 is set at aperture priority, this camera is in the aperture value priority AE photographic mode so far as the aperture value preset at the side of the lens device 2 is always kept equal to that set with the dial 34.

In case the external light measuring adapter is used, the operation routine is, as mentioned, the same as in the photography with the TTL light measuring means with the exception of one part.

FIG. 29 shows the relation between the above mentioned photographic modes with the TTL light measurement and the external light measurement and the corresponding operation routine. The table shows the photographic modes of this camera system due to the state of the aperture setting ring 8 of the lens device 2, of the diaphragm closing lever 64 and to the light measuring system and four operation routines. When the mark 12 is selected with the aperture setting ring 8 of the lens device 2 while the diaphragm closing lever 64 assumes the position at which the diaphragm of the lens device 2 is closed, the alarm lock for the misoperation is carried out as has already been explained.

On the other hand this camera system has facilities to operate in close cooperation with the automatic light adjusting speed light device as has already been explained. Below let us consider the case when this speed light device 384 is applied to the photographic purpose. When the speed light device 384 becomes ready for operation, namely has been charged after the speed light device 384 is mounted on the accessory shoe 50 of the camera body in such a manner that an electrical connection is established between the speed light device 384 and the camera body 4, this camera is switched into the speed light photographic mode.

At this time, 16 photographic modes can be assumed depending uon the setting of the condition of the camera and of the speed light device as has already been explained. The operation carried out in the camera in this mode is divided into four routines.

One of these four operation routines is selected depending upon the state of the aperture setting dial 108 of the speed light device 384 and of the selector switch 146. For various factors set at the camera the corresponding mode is carried out by the corresponding control system. FIG. 11(A) also shows the operation mode which this system assumes in accordance with the set state of the speed light device and the camera. The above mentioned operation routines correspond to each of the fully automatic, automatic light adjustment, automatic and semi-automatic modes, automatic light adjustment, automatic mode and semi-automatic mode, total light, manual and semi-automatic modes, total light, and manual mode. Other modes are also entered into the operation in accordance with the operation result by means of the above mentioned four operation routines.

In the fully automatic, automatic light adjustment, automatic mode, the flash unit 384 is brought into a state capable of automatic light adjustment in accordance with the film sensitivity setting dial 106 and the aperture value set by means of the aperture setting dial 108, while the data VSA of the analog signal corresponding to the aperture value set by means of the aperture setting dial 108 as well as the charge completion signal CSA are given. This charge completion signal CSA includes the control signal relative to the fully automatic mode or the semi-automatic mode depending upon the current. The fully automatic mode takes place when this charge completion signal CSA includes the fully automatic mode control signal or the mode selector 38 at the camera is set for aperture priority.

The aperture value data taken up into the camera is converted into a digital value by means of the A - D converter 382 and introduced into the central control party 362. The data VSA relative to this aperture value is biased by the constant CST2 from the aperture value to be used for the actual control. The reason is that a corresponding bias is given because the data VSA relative to the aperture value is taken up as an analog value while this analog value includes a number of steps so that there is a danger of incorrect inputs in the small voltage range. The digitally converted data DD is also larger than the aperture value data actually used by the amount corresponding to the bias. Thus, at first the following operation $$VSA - CST2 = AV \tag{17}$$

is carried out so that the control data AV relative to the aperture value introduced from the speed light device is derived. The aperture value AV obtained in this way corresponds to that set by means of the aperture setting dial 108 at the side of the speed light device. At times this operation result lies beyond the range of the aperture value controllable at the side of the lens 2 and hereby the fact has to be informed to the photographer. In consequence this camera system is construction to investigate whether the aperture value AV set at the speed light device 384 is smaller than the largest aperture value AMAX but larger than the smallest aperture value AVo. In case this investigation operation shows that the aperture value AV is beyond the largest aperture value AMAX or the smallest aperture value AVo, this limit value AMAX or AVo is taken for the aperture value for the control instead of the aperture value set at the speed light device 384. This fact is transmitted to the photographer.

Further the above mentioned operation is substantially the same for the fully automatic mode, the automatic light adjusting mode or the manual mode. However in case of this mode the data for the diaphragm closing step number AVs for the aperture control is not used for the aperture control.

Further it is possible for the photographer to confirm the operation result in the viewfinder 13. The display at this time appears as shown in FIG. 10 (c)-(I) and (II). The display shows the speed light synchronization shutter speed TSYN, for example 1/60 sec, the "EF" display for showing the speed light photographic mode in which the speed light device 384 has been charged and the aperture value AV used for the control. In case of the manual mode, it is necessary for the photographer to manually set the lens 2 for the aperture value AV displayed in the viewfinder 13. The character "M" is also displayed as is shown in FIG. 10 (c) (II).

The operation of the camera as well as of the speed light device 384 at the time of the fully automatic, automatic light adjusting, automatic mode as well as of the fully automatic, automatic light adjusting and manual mode have already been explained.

In the semi-automatic, automatic light adjusting, automatic mode, the speed light device 384 is ready for operation in the automatic light adjustment mode with the aperture value set by the aperture setting dial 108 and the film sensitivity set by the film sensitivity setting dial 106, while the data VSA of the analog signal corresponding to the aperture value set by means of the above mentioned aperture setting dial 108 and the charge completion signal are given to the camera. This charge completion signal CSA includes the control signal relative to the fully automatic mode or the semi-automatic mode depending upon the current amplitude. As explained, the semi-automatic mode occurs when the charge completion signal CSA includes the control signal for the semi-automatic mode while the mode selector 38 in the camera is set for shutter speed priority.

In this case the speed light synchronization shutter time TSYN of the camera body 4 and the shutter time TV set with the dial 34 of the camera body are operated first so as to be compared with each other in such a manner that the slower shutter time is used for the shutter time TV for the control.

Then a constant CST2 corresponding to a constant is subtracted from the aperture value data VSA. The latter is introduced from the speed light device 384 to the camera and digitally converted so as to obtain the control data AV relative to the aperture value from the speed light device. The aperture value obtained in this way corresponds to that set by means of the aperture setting dial 108. At times this operation result lies beyond the range controllable in the lens device 2. In such a case the fact has to be transmitted to the photographer to prevent the misoperation. In consequence this camera system operates to investigate whether the aperture value set at the speed light device 384 is smaller than the largest aperture value AMAX controllable in the lens 2 but larger than the smallest aperture value. In case such investigation shows that the aperture value AV lies beyond the largest aperture value AMAX or the smallest aperture value AVo, this limit value AMAX or AVo is taken up for the aperture value AV for the control instead of the aperture value set at the side of the speed light device 384. This fact should be transmitted to the photographer at the same time. Then the smallest aperture value AVo of the lens device 2 is subtracted from the aperture value data AV for the control so as to obtain the diaphragm closing step number AVs for the aperture control.

This operation is also carried out substantially in the same way for the semi-automatic, automatic light adjusting, manual mode. However in this mode the data for the diaphragm closing step number is not used for the aperture control.

It is possible for the photographer to confirm the above mentioned operation result in the viewfinder 13. The display at this time is as is shown in FIG. 10 (c)-(V) and (VI). After the aforementioned investigation operation, the selected shutter time TV for the control "EF" for showing the speed light photographic mode when the speed light device 384 has been charged and the aperture value AV for the control are displayed. Further in case of the manual mode it is necessary for the photographer to manually set the aperture value displayed in the viewfinder 13. Hence the character "M" is displayed as is shown in FIG. 10 (c)-(VI).

Further operation of the camera as well as the speed light device 384 in case of the semi-automatic, automatic light adjusting, automatic mode as well as of the semi-automatic, automatic light adjusting, manual mode have been explained.

Then, in case of the fully automatic, total light, manual mode the speed light device 384 is in the total light mode without setting any aperture value with the aperture setting dial 108, while the data VSA of the analog signal for showing that no aperture value is set with the aperture setting dial 108 and the charge completion signal CSA are given to the camera. This charge completion signal CSA includes the control signal relative to the fully automatic mode or the semi-automatic mode depending upon the current. The fully automatic mode is operative when this charge completion signal CSA includes the control signal for full automatic mode or the mode selector 38 is set for priority on aperture value.

As the data VSA received at the camera such an analog amount that which overflows the A - D converter at the time of A - D conversion is set flash unit. For the flash mode the signal for total light amount is introduced into the camera when the A - D converter 382 is overflowed. No preset control of the aperture of the lens 2 can be carried out from the camera body 4, and in such a case is manually set by the aperture setting ring 8.

The same control routine is carried out for the fully automatic total light amount, largest aperture value mode. However, in this mode the mark 12 is selected through the aperture setting ring 8 of the lens 2, so that the latter assumes a position of the largest aperture value.

It is possible for the photographer to confirm in the viewfinder the mode set by the judging operation, whose display is shown in FIG. 10 (d) (A) and (II). With a flash synchronization shutter time, for example of 1/60 sec. the viewfinder displays "EF" for the flash mode when the flash unit 384 has been charged and the character "M" for the necessity to manually preset the aperture value of the lens 2 (See FIG. 10 (d) (II). If the largest aperture value mode of the lens 2 is unset so that no information about aperture value is displayed as shown in FIG. 10 (d)-(I), the photographer is also informed.

Then in the semi-automatic, total light amount, manual mode, the flash unit 384 is in the total light amount mode. When the manual mode display is not set with any aperture value. The data VSA of the analog signal showing that no aperture value is set with the setting dial 108, and the charge completion signal CSA, are applied to the camera. The semi-automatic mode takes place, as explained, when the charge completion signal CSA includes the control signal for the semi-automatic mode while the mode selector 38 at the side of the camera is set for shutter priority.

In such a case the flash synchronization shutter time TSYN of the camera 4 and the shutter time set with the dial 34 of the camera 4 are operated for comparison with each other, after which the slower shutter time is taken up for the shutter time for the control.

As the data VSA introduced into the camera from the flash unit 384, such an analog amount as that which overflows the A - D converter is set at the flash unit. Consequently, when the A - D converter 382 overflows for the flash mode, the signal for total light amount mode is introduced into the camera. No preset control of the aperture of the lens 2 is carried out from the camera 4. For such a case the aperture has to be manually preset by the aperture setting ring 8 on the lens 2.

The same control routine is carried out for the semi-automatic, total light quantity, largest aperture value mode. However in this mode the mark 12 is not selected by the aperture setting ring 8 on the lens 2. Hence and the latter assumes the state equivalent to that in which it is preset at the largest aperture value.

It is possible for the photographer to confirm in the viewfinder the state of the mode set by means of the judging operation as shown in FIG. 10 (d)-(V), (VI). After the comparison operation the shutter time TV selected for the control and "EF" which shows the flash mode when the flash unit 384 has been charged are displayed. In a manual mode the character "M" is displayed, showing the necessity to manually preset the aperture value of the lens as shown in FIG. 10 (D)-(II). In case of the largest aperture mode the aperture of the lens 2 is unset so that no aperture information is displayed (See FIG. 10 (d)-(I).

When bulb is selected at the camera body 4 in the flash mode, it is possible to carry out bulb photography while disregarding the automatic shutter time control.

Thus in the flash mode with bulb no special operation for this purpose is carried out. However, the same operational control is used for aperture control of the photographic mode, as for the flash mode.

Consequently in this camera system, the exposure control operation in accordance with light measurement includes four routines. Similarly, the operation for flash exposure control includes four light operation control routines, such that each photographic mode is realized by applying one of these eight operation control routines.

It is possible to realize a control system capable of setting the control signal as well as the control sequence effective for the mechanical operation of the camera mechanism by automatically assorting and taking up data for various photograhic modes. This is done princi-
pally in accordance with the eight operation routines. Missetting or misoperation is detected and displayed to the photographer as well as various data necessary for various types of photography.

Figure 30:
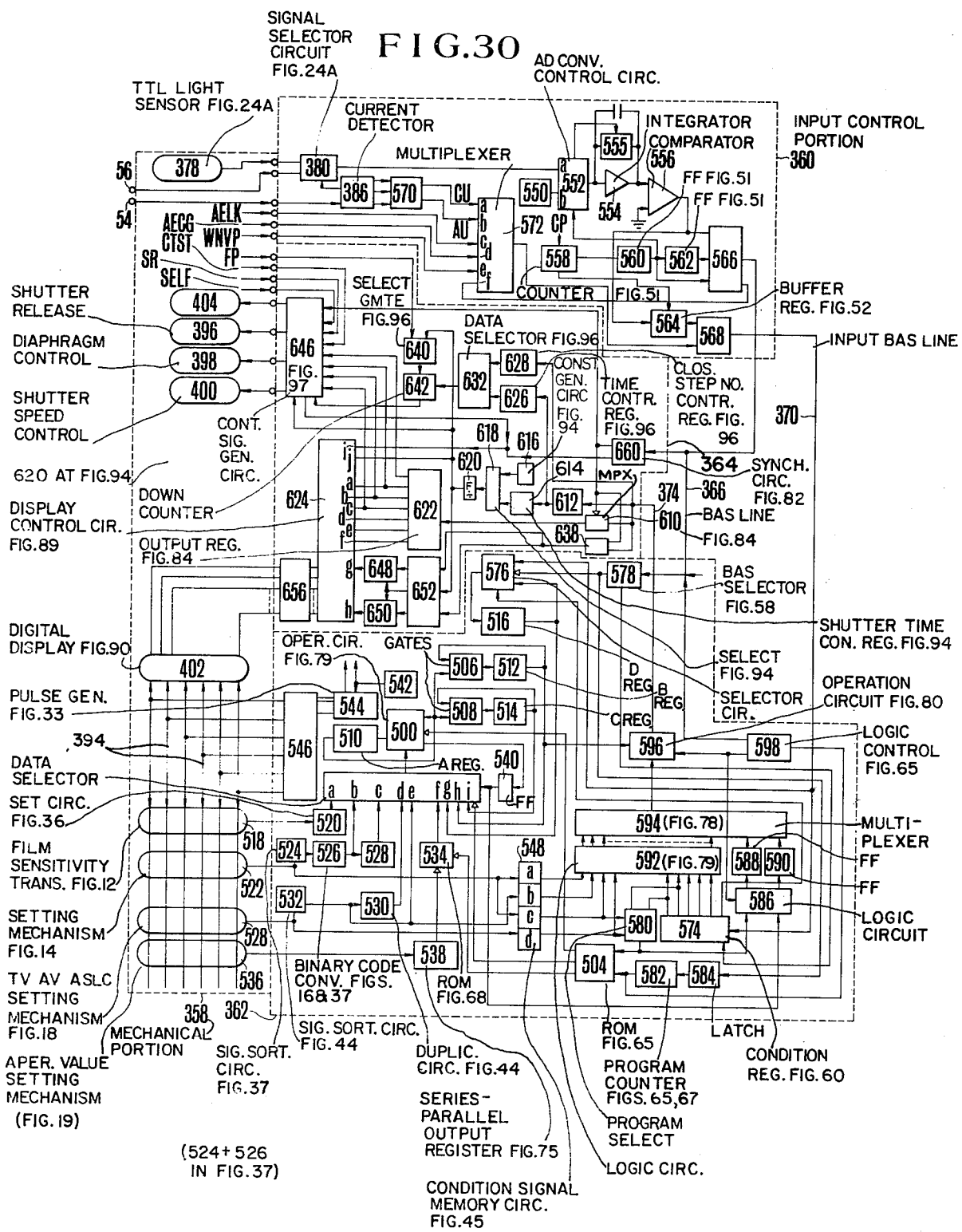
FIG. 30 shows a block diagram of the control circuit of the camera system in accordance with the present invention.

FIG. 30 shows a block diagram of the control circuit for such a purpose. The input control part 360, the central control part 362 and the output control part 364 in FIG. 28 are shown in more detail.

This system is in principle controlled by means of the clock pulses CP, for which purpose a clock pulse generator 542 is provided in the central control part 362. The clock pulses are distributed to the whole system. The clock pulse generator 542 is shown in FIG. 31. The period of these clock pulses CP is important for counting the actual time, as will be explained. Hence, it is necessary to adjust the generator by means of a variable resistance 542A shown in FIG. 31.

A system pulse generator 544 produces system pulses in accordance with the introduced clock pulses CP, as is shown in FIG. 32. The system pulses consist of counter pulses CT1 - CT4 and timing pulses TB0 - TB7 and so on, and control various operations of the camera system. In this system the time between the timing pulses TB0 - TB7 makes one word.

Figure 33:
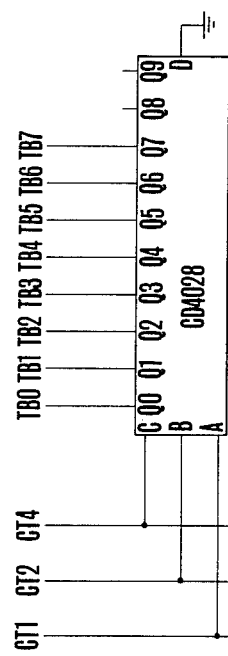
FIG. 33 shows details of the system pulse generator.

Details of this system pulse generator 544 are shown in FIG. 33. Here a binary up counter in which the integrated circuit element of CD 4029 (manufactured by RCA) is applied to generate the counter pulses CT1, CT2 and CT4. A decoder using an integrated circuit element CD 4028 (manufactured by RCA) generates the timing pulses TB0 - TB7.

Figure 34:
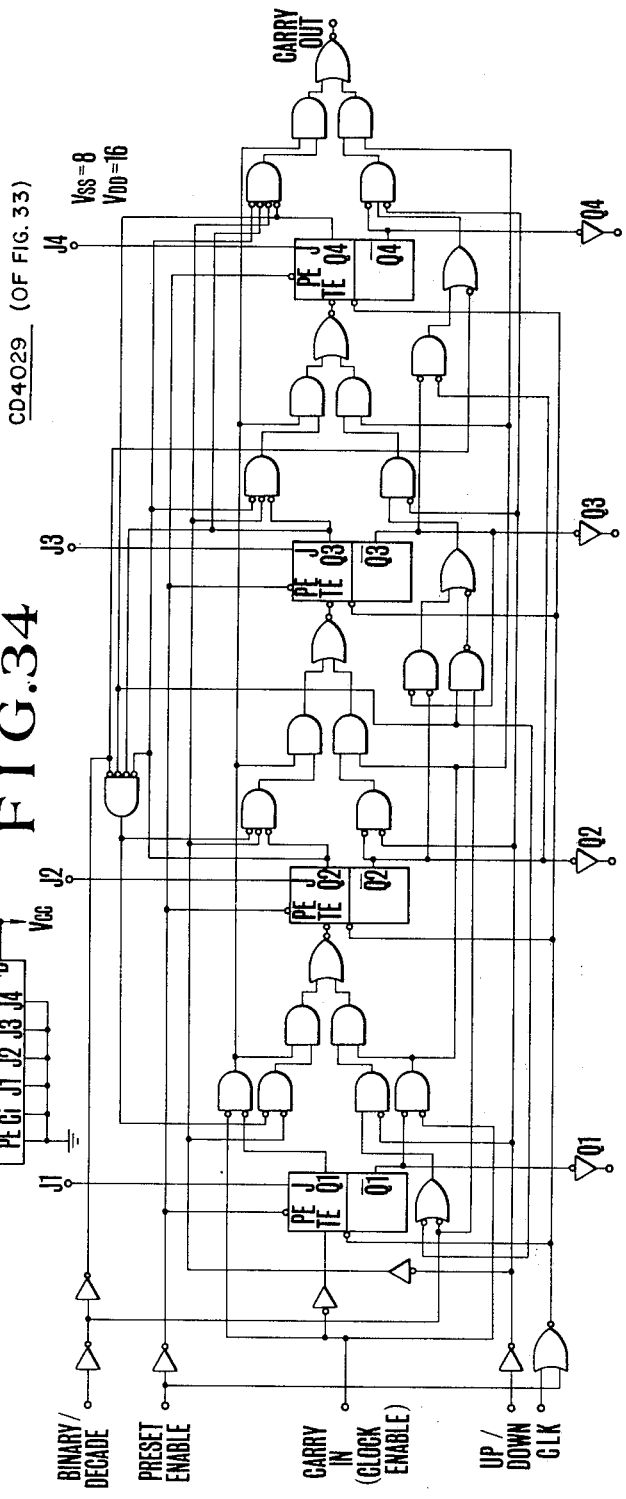
FIG. 34 shows a logic diagram of the I.C. circuit element CD4029.

The logic diagram of the integrated circuit element CD 4029 is shown in FIG. 34 in detail and functions as an up/down counter operating in synchronization with the clock pulses CP. In such a structure, by applying the clock pulses CP to the clock pulse terminal CLK, the counter pulses CT1 - CT4 shown in FIG. 32 can be obtained respectively from the output terminals Q1 - Q3.

Figure 35:
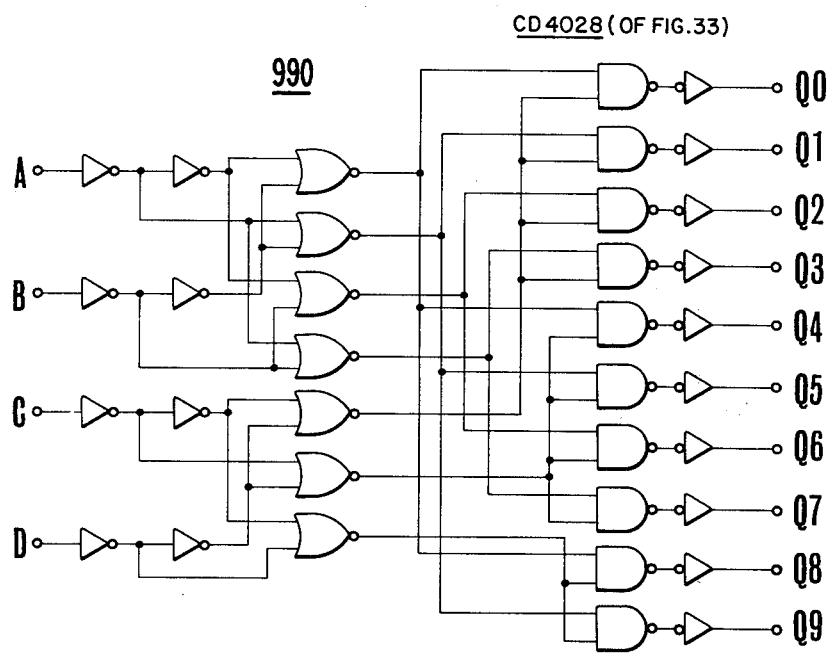
FIG. 35 shows a logic diagram of the I.C. circuit element CD4028.

The logic diagrapm of the integrated circuit element CD 4028 is shown in detail in FIG. 35. This element functions as a binary decoder. In this system, by applying the counter pulses CT1, CT2 and CT4 to the terminals A - C of this element, the timing pulses TB0 - TB7 can be obtained from the output terminal Q0 - Q7 as is shown in FIG. 32.

The resulting timing pulses TB1 - TB6 are applied to the driver circuit 546, which in turn produces the timing pulses $\overline{TB1}$ - $\overline{TB6}$. The timing pulses $\overline{TB1}$ - $\overline{TB6}$ are applied through the timing lines 394 for dynamically driving the display means 402. Pulses $\overline{TB1}$ - $\overline{TB6}$ are also applied through timing line 394 to the film sensitivity input mechanism 518, the smallest aperture value MNAL SPDW setting mechanism 522, the AV TV ASLC setting mechanism 528 and the largest aperture value setting mechanism 536, as timing pulses for taking up data.

The film sensitivity input mechanism 518 is constructed as shown in FIG. 12. The film sensitivity SV' can be taken out from the last figure in synchronization with the timing pulses $\overline{TB1}$ - $\overline{TB6}$. The details of this operation have been explained. As to the data relative to the film sensitivity, data set with the precision of ⅓ step is taken up, being approximated with the precision of ½ step. Namely at first the input mechanism 518 of the film sensitivity take up the data SV' relative to the film sensitivity. "1" takes place respectively in the bit with a weight of ¼ step for the weight of ⅓ step and in the bit with a weight of ½ step for the weight of ⅔ step, as explained. However this does not make the data approximate a precision of ⅛ step. It is necessary to use the film sensitivity data SV' entered with a "1" at the ½ step or ¼ step bit location and the ⅛ step with the precision of a ⅛ step as already explained. This is nothing but the execution of the approximation by the relation (6) and (7).

The set circuit 520 converts the data SV' relative to the film sensitivity SV into the film sensitivity data SV with the precision of ⅛ step, placing "1" in the bit with the weight of ⅛ step. When this set circuit 520 detects "1" at the ¼ step bit location ¼ of the film sensitivity data SV' introduced from the lower figure in sequence in synchronism with the timing pulses $\overline{TB1}$ - $\overline{TB6}$, or in the ½ step bit location, a "1" is entered in synchronism with the timing pulse TB0 for the next word time. This produces film sensitivity data SV with the precision of ⅛ step in synchronism with $\overline{TB0}$ - $\overline{TB6}$.

Figure 36:
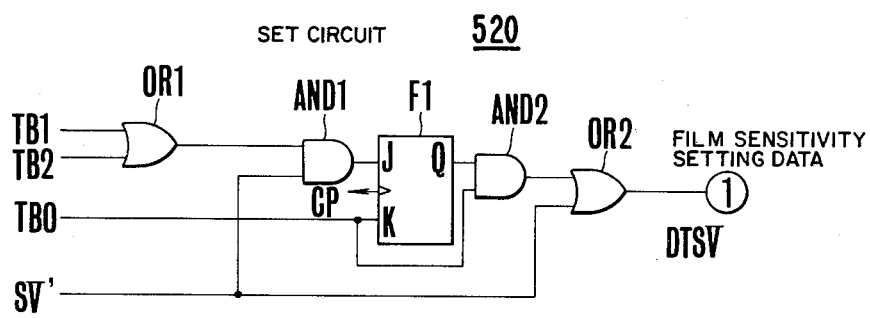
FIG. 36 shows a detailed circuit arrangement of the set circuit 520.

The set circuit 520 is shown in detail in FIG. 36. As clear in the drawing, the fact that "1" is put in either the ¼ step bit location synchronized with TBL or in the ½ step bit location synchronized with TB2 from the film sensitivity data SV' in sequence in synchronism with the timing pulses $\overline{TB1}$ - $\overline{TB6}$ is detected through the AND gate AND1 by the timing pulse TB1 or TB2. These are applied at the OR gate OR1 and memorized. This This is done by applying the output of the AND gate AND1 to the J input terminal of the Flip-Flop F1. At this time the Q output of Flip-Flop 1 is "1", which is read out through the AND gate AND2 in synchronization with the first timing pulse of the next word time and delivered in synchronism with the timing pulse TBO as the ⅛ step bit location of the film sensitivity data SV through the OR gate OR2. Thus a film sensitivity SV with a precision of ⅛ step is used in synchronism with the timing pulses TB0 - TB6.

In the following explanation the output ① of the OR gate OR2 is called the film sensitivity setting data DTSV.

The smallest aperture value MNAL SPDW setting mechanism 522 is constituted as shown in FIG. 14. The MNAL signal can be taken out in synchronism with the timing pulse $\overline{TB1}$, the SPDW signal in synchronism with the timing pulse $\overline{TB1}$, the SPDW signal in synchronism wiht the timing pulse $\overline{TB2}$ and the data AVo (Grey code) relative to the smallest aperture value of the lens 2 in synchronism with the timing pulses TB3 - TB6 from the higher figures in sequence. The details have been explained.

The smallest aperture value data AVo (Grey code) is delivered from the higher figure in sequence in synchronism with the timing pulses $\overline{TB3}$ - $\overline{TB6}$ from the smallest aperture value MNAL SPDW mechanism 522 as explained. This information includes the MNAL signal and the SPDW signal so that it is necessary to sort out the smallest aperture value data AVo (Grey code) only. A signal sorting circuit 524 serves to sort out the smallest aperture value data AVo which is then converted into the smallest aperture value AVo through the next Grey code-binary code-converter 526. This Grey code-binary code-converter 526 is based on the same principle as shown in FIG. 16. The smallest aperture value data AVo (Grey code) delivered from the higher figures in sequence, in synchronism with the timing pulses $\overline{TB3}$ - $\overline{TB6}$, is converted into a binary code to produce the data AVo with the precision of ½ step in synchronism with the timing pulses TB2 - TB5.

Figure 37:
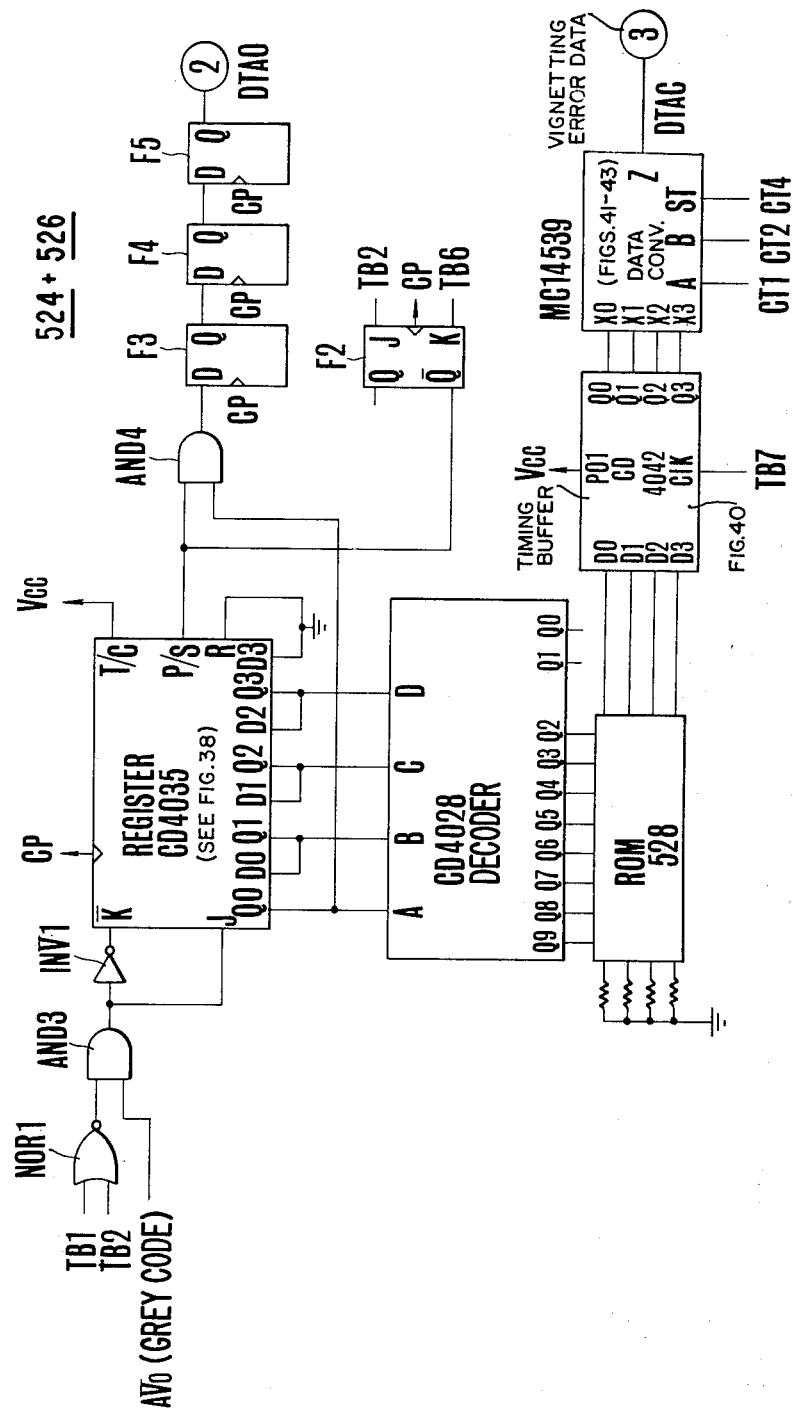
FIG. 37 shows a detailed circuit arrangement of the grey-binary converter.

The signal sorting circuit 524 and the Grey code-binary code-converter 526 are shown in detail in FIG. 37. As is clear from the drawing, the smallest aperture value data AVo (Grey code) is separated from the MNAL signal or the SPDW signal and so on by means of the AND gate AND3. The latter receive the output of the NOR gate NOR1 supplied with the timing pulses TB1, TB2. The gate AND3 delivers its output to the J-terminal and through the inverter INV1 to the $\overline{K}$-terminal of the four bit parallel input parallel output shift register CD 4035 (manufactured by RCA).

Figure 38:
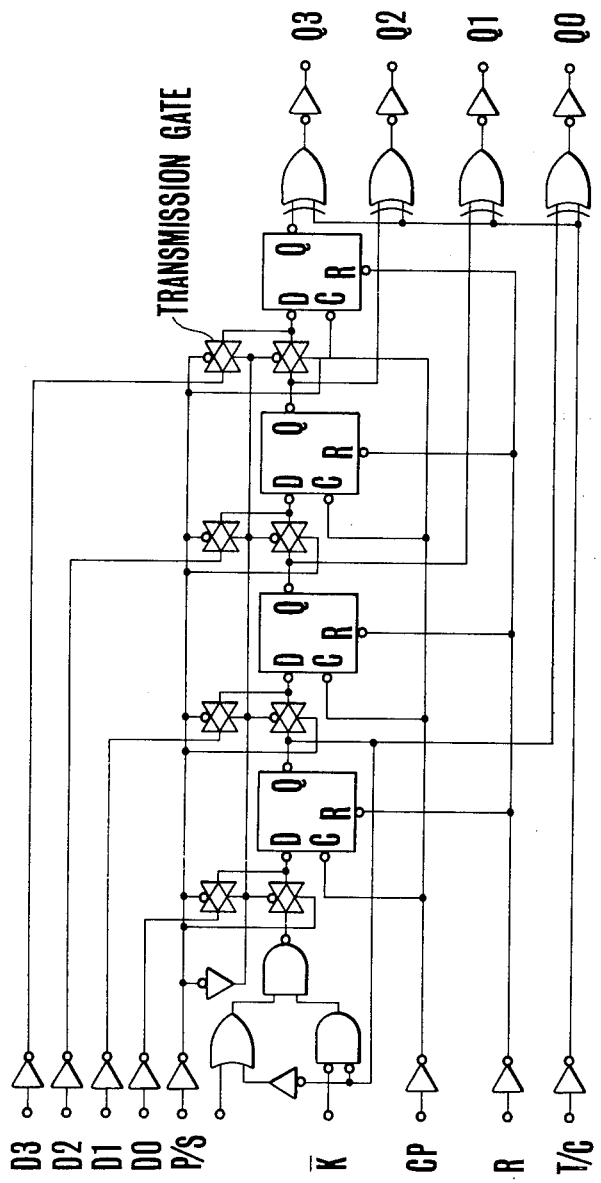
FIG. 38 shows a detailed circuit arrangement of the I.C. circuit element CD4035.
Figure 39:
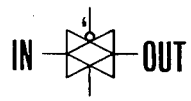
FIG. 39 shows a logic of the transmission gate shown in FIG. 38.

The logic circuit composition of this integrated circuit element CD4035 is shown in detail in FIG. 38, while the transmission gate shown in FIG. 38 is shown in FIG. 39.

This circuit element CD4035 is so designed as to act as a series shift register when "0" is applied to the P/S terminal and as a parallel shift register when "1" is applied to the P/S terminal. This P/S terminal is supplied with the $\overline{Q}$ output of the Flip-Flop 2 whose J input terminal is supplied with the timing pulse TB2 and whose K input terminal is supplied with the timing pulse TB6. Namely this Flip-Flop 2 is set for synchronization with the rising up of the clock pulse CP next to the timing pulse, namely the rising up of TB3. The flip-flop 2 is reset in synchronism with the rising up of the clock pulse CP next to the rising up of TB6, namely the falling down of TB6. This occurs so that "0" is delivered to the P/S terminal of element CD4035 during the internal $\overline{TB3}$ - $\overline{TB6}$ the smallest aperture value data AVo (Grey code) is delivered so as to make CD4035 act as a series shift register.

If the series Grey codes inverted relative to the other are delivered in sequence to the J and the $\overline{K}$ terminals of the integrated circuit element CD4035 from the higher figures in sequence, they are converted into a series binary code and stored. This operation is carried out while the timing pulses TB3 - TB6 are produced and the smallest aperture value data AVo (Grey code) is delivered.

When the Flip-Flop 2 is reset to produce the $\overline{Q}$ output of "1" the CD4035 whose P/S terminal is supplied with this $\overline{Q}$ output. Element CD 4035 delivers Q3 output to the D2 input terminal, Q2 output to the D1 input terminal and Q1 output to the D0 input terminal, thus acting as reversed series register whenever "1" is applied to the P/S terminal, namely during the interval TB7 - TB2. At this time the smallest aperture value data AVo binary converted from the higher figures in sequence is delivered from the Q0 terminal from the lower figures in sequence in synchronism with the timing pulses TB7 - TB2. This data AVo is taken out through the AND gate AND4 supplied with the $\overline{Q}$ output of the Flip-Flop F2 in the reset state during the interval of timing pulses TB7 - TB2. This data is different from other data in the relation between bit steps and the timing pulses. It is taken out from the Q output terminal of the Flip-Flop F5 in synchronism with the timing pulses TB2 - TB6. It is delayed by the interval corresponding to three bit steps through the Flip-Flops F3 - F5. In this way the smallest aperture value AVo is reached with the precision of ½ step in synchronism with the timing pulses TB2 - TB6.

In the following explanation the Q output 2 of the Flip-Flop F5 is called the smallest aperture data DTAO.

The smallest aperture value AVo of the lens 2 has a close connection with the vignetting error AVc produced with a totally opened diaphragm. This vignetting error AVc must be considered when operating for the exposure control with a totally opened diaphragm. Vignetting error AVc may be obtained as mentioned in accordance with the smallest aperture value AVo. However, in the present embodiment, the data for vignetting error AVc have already been prepared for each possible smallest aperture value so that the former data AVc is selected in accordance with the smallest aperture value AVo. Such vignetting error data AVc are stored in the fixed data ROM 528 delivered from the lower figures in sequence with the precision of $\frac{1}{2}$ step in synchronism with the timing pulses TB0-TB5.

Figure 40:
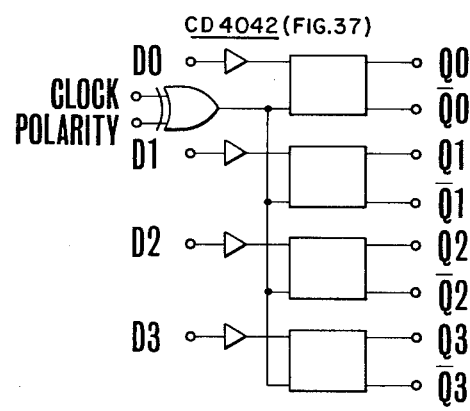
FIG. 40 shows a block diagram of the I.C. circuit element CD4042.

The vignetting error is decoded as shown in detail in FIG. 37. The data from each terminal Q0 - Q3 of the register CD4035 is decoded by the decoder CD4028 so that any of the outputs Q2 - Q9 of this decoder has the value "1". The output of the decoder is delivered to the ROM in which a plural number of the vignetting errors AVc have been stored. The output of this ROM is delivered to each input terminal D0, D1, D2, and D3 of the timing buffer CD4042. This timing buffer CD4042 is an integrated circuit element manufactured by RCA. Its block diagram is shown in FIG. 40. This timing buffer, to whose Po1 terminal Vcc is applied, receives output from the ROM with the timing TB7. It delivers it with timing other than TB7. The register CD4035 terminates the binary conversion of the smallest aperture value AVo with the rising up of TB7, that is, when the terminal Q0, Q1, Q2 and Q3 of the register CD4035 begin to delivery simultaneously the smallest aperture value AVo converted to binary. Thus the output of the ROM becomes the vignetting error AVc corresponding to the input smallest aperture value AVo put in with the timing TB7. In consequence the necessary vignetting error AVc is obtained by entering the resulting output with the timing TB7.

Figures 41, 42:
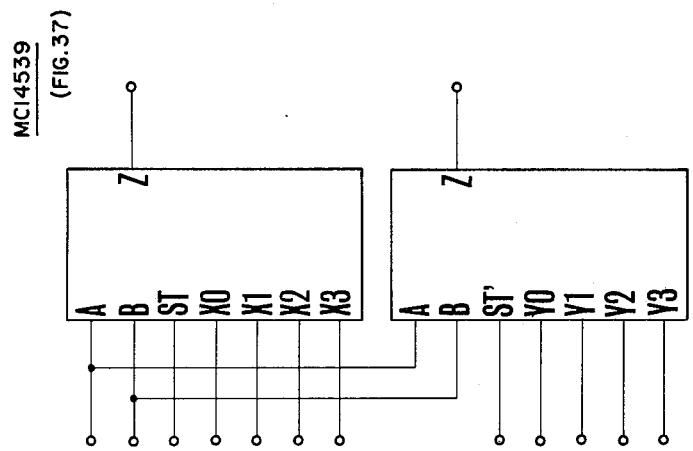
FIG. 41 shows a block diagram of the I.C. circuit element MC14539.
FIG. 42 shows a truth value table of the I.C. circuit element MC14539.
Figure 43:
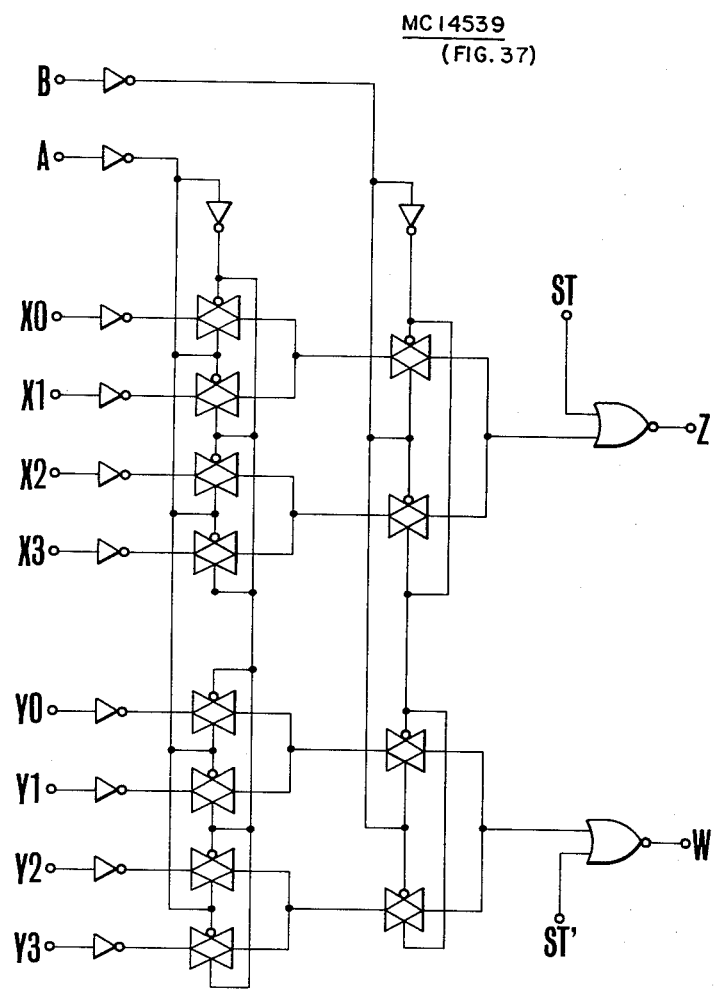
FIG. 43 shows a logic diagram of the I.C. circuit element MC14539.

As mentioned, the vignetting error data AVc stored in the timing buffer CD4042 is delivered respectively from the terminal Q0, Q1, Q2 and Q3 to the terminals X0, X1, X2 and X3 of the integrated circuit element MC14539 (manufactured by MOTOROLA) for the conversion of series data. The block diagram of this integrated circuit element MC14539 is shown in FIG. 41, the truth table in FIG. 42 and a logic diagram in FIG. 43. The vignetting error data AVc introduced simultaneously through the terminals X0, X1, X2 and X3 is delivered out of the Z terminal as a series data in synchronism with the timing pulses TB0 -TB3 in accordance with the counter pulses CT1, CT2 and CT4 respectively applied to the terminals A, B and ST. It is thus delivered from element MC14539 with the precision of $\frac{1}{2}$ step in synchronism with the timing pulses TB0 - TB3.

In the following explanation the Z terminal output ③ of the integrated circuit element MC14539 is called the vignetting error data DTAC.

The above mentioned TV AV ASLC setting mechanism 528 is constituted as shown in FIG. 18. It delivers the ASLC signal in synchronism with the timing pulses $\overline{TB2}$ - $\overline{TB6}$ as explained. Whether the data delivered from the setting mechanism corresponds to the shutter time TV or the aperture value AV can not be distinguished in the latter case. However, it may be distinguished when using the aperture setting signal ASLC entered in synchronism with the timing pulse $\overline{TB1}$. The above mentioned data is taken up from the oV TV ASLC setting mechanism 528 together with the above mentioned aperture setting signal ASLC. The signal sorting circuit 532 sorts data entered in synchronism with the timing pulses $\overline{TB2}$ - $\overline{TB6}$ out of the output signals from the above mentioned setting mechanism 528. The data thus sorted can be used directly as aperture value data AV, while it must be duplicated to be used as the shutter time data. The reason for this is that the smallest set unit of aperture value AV by means of the dial 34 is $\frac{1}{2}$ step while the smallest set unit of shutter time is 1 step. Thus the shutter time TV is divided in two so that the smallest unit of shutter time data TV corresponds to that of the aperture value AV and may be duplicated when later used as the shutter time. The shutter time data is delivered for such a purpose through a duplication circuit 530. This circuit 530 also serves to deliver the data entered in synchronism with the timing pulses TB2 - TB6, as the data in synchronism with the timing pulses TB3 - TB7, by delaying them by an interval of one timing pulse.

As explained, the set shutter time data TV is entered with a precision of 1 step in synchronism with the timing pulses TB3 - TB7 while the set aperture value data AV is entered with a precision of $\frac{1}{2}$ step in synchronism with the timing pulses TB2 - TB6.

Figure 44:
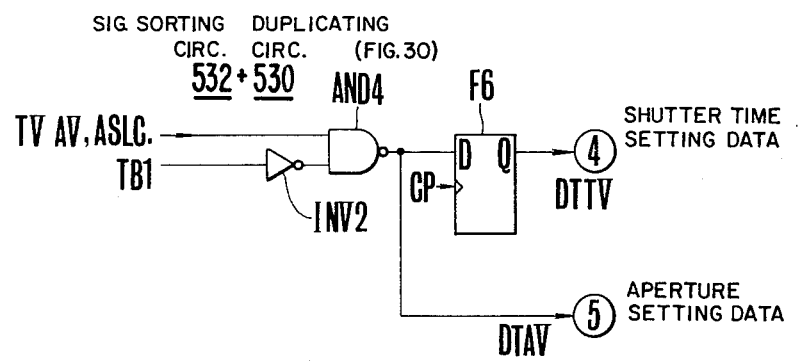
FIG. 44 shows circuit details of the signal assorting circuit and the doubling circuit.

The circuit composition of signal sorting circuit 532 and duplication circuit 530 is shown in FIG. 44. Of the output of the TV AV ASLC setting mechanism 528 only the signal relative to TV AV in synchronism wiht the timing pulses TB2 - TB6 is sorted by the AND gate AND4, which is supplied with the timing pulse TB1 through the inverter INV 2. The sorted data can be used directly as information relative to aperture value. However, to be used relative to shutter time, it must be entered with the precision of 1 step in synchronism with the timing pulses TB3 - TB7, and delayed by the clock time by means of the 0 shaped Flip-Flop F6.

In the following explanation the output ④ of the AND gate 4 is called the aperture setting data DTAV. The Q output of the above mentioned Flip-Flop F6 is called the shutter time setting data DTTV.

The largest aperture value setting mechanism 536 is constructed, as shown in FIG. 19, to deliver the data AMAX' relative to the largest aperture value AMAX of the lens 2 in synchronism with the timing pulses TB1 - TB6 as explained.

This largest aperture value setting mechanism 536 does not produce the largest aperture value itself but selects its data AMAX from a number of fixed data stored in the fixed data ROM 534. In the data AMAX' delivered from mechanism 536 in synchronism with the timing pulses TB1 - TB6, F11, F16, F22, F32, F46 and F64 correspond to the timing pulses TB1 - TB6 respectively as shown in FIG. 20. Consequently, the data is introduced in series and stored in the series input-parallel output register 538. When the bit which produces "1" is discovered in register 438, the largest aperture value AMAX of the lens 2 can easily be determined. Consequently, the parallel output of register 538 is led to the fixed data ROM 534, to which the signal for the largest aperture value AMAX is applied from the instruction ROM 504.

The arrangement for taking the largest aperture value AMAX out of the fixed data ROM 534 will also be explained later in detail.

On the other hand the MNAL signal and the SPDW signal delivered from the smallest aperture value MNAL.SPDW setting mechanism 522 in synchronism with timing pulses TB1 and TB2 are introduced into the condition signal memory circuit 548. They are then separated in accordance with timing pulses, and stored. As the result the MNAL signal and the $\overline{\text{MNAL}}$ signal or the SPDW signal and the $\overline{\text{SPDW}}$ signal can be obtained from the condition signal memory circuit 548.

Figure 45:
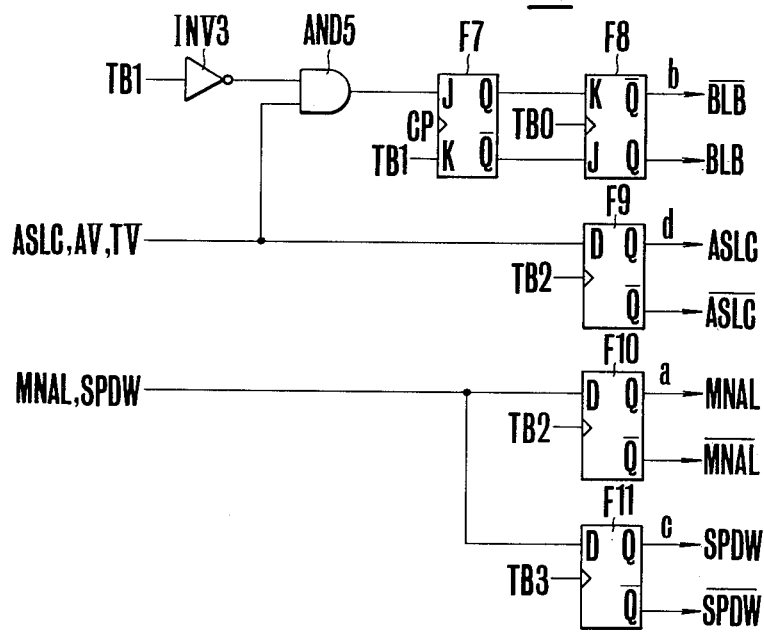
FIG. 45 shows a detailed circuit composition of the condition signal memory circuit.
Figure 46:
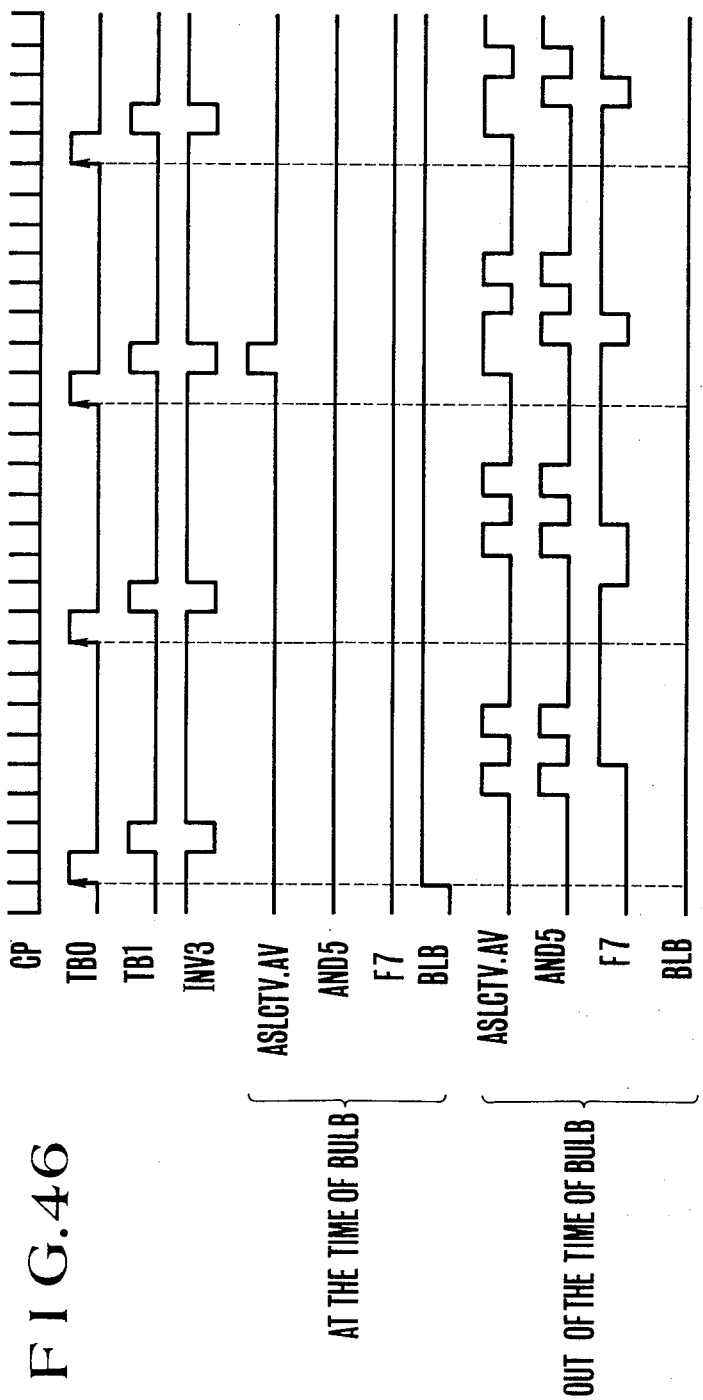
FIG. 46 shows a timing chart for explaining how to detect the bulb signal.

The condition signal memory circuit 548 is constructed as shown in detail in FIG. 45. Of the MNAL and the SPDW signals delivered from the MNAL.SPDW setting mechanism 522 in synchronization with the timing pulses TB1, TB2, the MNAL signal is detected and stored by the Flip-Flop F10 which receives the timing pulse TB2. The SPDW signal is detected and stored by means of the Flip-Flop F11 which receives the timing pulse TB3.

Consequently the MNAL signal is delivered from the Q output terminal of the Flip-Flop F10 and the $\overline{\text{MNAL}}$ signal from the $\overline{\text{Q}}$ output terminal. The SPDW signal is delivered from the Q output terminal of the Flip-Flop F11 and the $\overline{\text{SPDW}}$ signal from the $\overline{\text{Q}}$ output terminal.

Further the ASLC signal delivered from the TV.AV-.ASLC setting mechanism 528 in synchronism with the timing pulse TB1 is introduced into the condition signal memory circuit 548 and sorted in accordance with the timing pulses so as to be memorized. As the result the ASLC signal and the $\overline{\text{ASLC}}$ signal can be obtained from the condition signal memory circuit 548.

The detail for the above is also shown in FIG. 45. The ASLC signal delivered from the TV.AV.ASLC setting mechanism 528 in synchronism with the timing pulse TB1 is detected by the Flip-Flop F9 supplied with the timing pulse TB2 for stroage. The ASLC signal is delivered from the Q output terminal of the Flip-Flop F9 while the $\overline{\text{ASLC}}$ signal is delivered from the $\overline{\text{Q}}$ output terminal.

On the other hand the condition signal memory circuit 548 has taken up the data sorted out by the signal sorting circuit 532 in synchronism with the timing pulses TB2-TB6 to determine when the bulb mode is selected by the dial 34. The system operates in the bulb mode when all the bits of data set by the dial 34 produce "0" so that the existence of the bulb mode is indicated when only "0" signals are delivered during the time interval of the timing pulses TB2-TB6. Specifically, the signal memory circuit 548 serves to detect and memorize. When no "1" outputs appear at the output terminals of the signal sorting circuit 532 during the timing pulses TB2-TB6. This memory signal is delivered from the signal memory circuit 548 as the signal BLB. When the shutter time is in the bulb mode or in the inverse signal $\overline{\text{BLB}}$.

The details for the above are also shown in FIG. 45. The data delivered from the TV AV ASLC setting mechanism 528 in synchronism with the timing pulses TB1-TB2. From these data the ASLC signal in synchronism with the timing pulse TB1 has been excluded by means of the AND data AND5 supplied with the timing pulse TB1 through the inverter INV 3. These data are led to the J-input terminal of the J-K Flip-Flop F7. This J-K Flip-Flop F7 is supplied with clock puse CP at the clock input, while the K-input terminal is supplied with the timing pulse TB1. Flip-Flop F8 is supplied with the clock pulses TB0 at the clock input.

The Flip-Flop F7 is reset in this condition in synchronism with the rising edge of the next clock puse CP when the timing pulse TB1 is applied to the K input terminal of the Flip-Flop F7. If, at this time even one "1" output is delivered from the AND gate AND5 during the time interval of the timing pulses TB1 –TB6, Flip-Flop F7 is set. Thus its Q output becomes "1". This "1" output is led to the K-terminal of the Flip-Flop F8. Hence, the Flip-Flop F8 remains reset even if the Flip-Flop F8 is supplied with the clock input TB0. Hence, its Q output is kept "0". If, on the other hand, no "1" output is delivered from the AND gate AND5 during the time interval of the timing pulses TB1-TB6, this Flip-Flop F7 remains reset, and its $\overline{\text{Q}}$ output also remains "1". This "1" output at the K-input terminal of the Flip-Flop 8 sets the Flip-Flop F8 when the Flip-Flop F8 is supplied with a pulse TB0 at the clock input. Thus its Q output is kept "1". This state is nullified by the next timing pulse TB0 when even one "1" is delivered from the AND gate AND5 during the time interval of the timing pulses TB2-TB6. As explained above the BLB signal appears at the terminal Q of the Flip-Flop F8, while the signal $\overline{\text{BLB}}$ appears at the $\overline{\text{Q}}$ output terminal.

By means of the above mentioned construction the MNAL signal, the $\overline{\text{MNAL}}$ signal, the $\overline{\text{BLB}}$ signal, the BLB signal, the SPDW signal, the $\overline{\text{SPDW}}$ signal, the ASLC signal and the $\overline{\text{ASLC}}$ signal are delivered from the above mentioned condition signal memory circuit 548 in accordance with the state of various conditions set in the mechanical part 358.

The mechanical part 358 delivers various data, the condition setting signal, the state judging signal and so on to the input control part 360.

The analog output from the TTL light measuring means 378 or the analog signal from the terminal 56 is selectively led to the A-D converter through the signal switchover circuit 380 controlled by the current detector 386. The A-D converter consists of a standard level producing means 550, the A-D converter control circuit 552, the integrater 544, the integrator control means 555, the comparator 556, the counter 558, the Flip-Flops 560, 562 and the buffer reigster 564.

This A-D converter is the well know type generally called a dual lamp A-D converter. It integrates the input analog data along the positive direction for a given time interval so as to obtain an integral level proportional to the input analog data. It then integrates the data for the integrated level in the negative direction in accordance with a predetermined level signal so as to obtain the digitally converted value of the above mentioned input analog data. This involves counting standard pulse signals during the time the integration of the analog data first entered in the negative direction terminates.

In the A-D converter mentioned above, the integrater 554 serves to integrate the input analog data in the positive direction and the standard level signal in the negative direction. The standard level producing means 550 serves to produce the standard level and to clear the integrated value remaining the in the above mentioned integrator control means 555. The A-D converter control circuit 552 serves to change the signal introduced into the integrator 554, namely analog data and the standard level signal, and to switch the lamps of the integrater 554 in the positive direction and the negative direction. The comparater 556 serves to compare the output of the integrater 554 with the standard level (ground level in the present embodiment) so as to detect the termination of integration in the negative direction. The counter 558 counts a predetermined time for integrating the input analog data in the positive direction for the predetermined time and counts the time for integrating the standard level signal in the reverse direction. The buffer register 564 serves to take up and store the content of the counter 558 at the time the integration of the standard level signal by the integrator 554 in the reverse direction is terminated. The Flip-Flop 560 produces a signal for switching the signal received by the integrator 554 from the A-D converter control circuit 552 and the signal for switching the direction of the integration by the integrater 554, namely for switching the lamp. The Flip-Flop 562 produces a detection instruction signal for detecting the overflow of the counter as the result of the A-D conversion.

The comparator 556 produces "1" when there is an input integration value of a "0" when the input integration value is below a predetermined level.

When starting the A-D conversion in the above mentioned arrangement, the A-D converter control circuit 552 first takes up analog data through the a input terminal and delivers it to the integrater 554. Because at this time the Flip-Flop 560 still remains reset, the integrater 554 integrates the input analog data in the positive direction. At the same time the counter 558 starts the counting in synchronism with the clock pulse CP. As has already been explained the counter 558 serves to control time and to take up the A-D conversion data. The frequency of the input clock pulse CP is divided accordingly so as to produce the standard time to be counted.

When the above mentioned counter 558 overflows after the counting operation, namely when a predetermined time has elapsed after starting the counting, the content of the counter 558 becomes "0". At this same time the Flip-Flop 56 is set. That the Flip-Flop 560 is set means that a predetermined time has elapsed since the counter started the counting. This means that the integrater 554 has integrated the input analog data for a predetermined time. It goes without saying that the resulting output of the integrater 554 is proportional to the input analog data.

The output of the Flip-Flop 560 is delivered to the A-D converter control circuit 552. This is done in such a manner that the input to the integrater 554 is exchanged for the standard voltage signal from the standard level producing means 550 to be connected to the b terminal of the A-D conversion control circuit 552. At the same time the integrater 554 is set to integrate the data in the negative direction. Hence, the standard voltage signal is integrated in the reverse direction by the integrater 554. Thus in accordance with the standard voltage from the b input terminal the data stored in the integrater 554 as the result of the data integration is integrated in the reverse direction. On the other hand the counter 558 which was overflowed and whose content have become "0" continues counting.

It goes without saying that the amount counted by the counter 558 is proportional to the amount integrated by the integrater 554 in the reverse direction. As a result of the integration in the reverse direction the output of integrator 554 reaches a predetermined value. This occurs when the reversed integration corresponding to the integrated analog data for a predetermined time has been completed. The output of the comparator 556 then changes from "1" to "0". In response to the variation of the output of the comparator 556 the buffer register 564 immediately takes up and memorizes the amount counted by the counter 558. The amount counted by the counter 558 and stored in the buffer register 564 at this time corresponds to the amount integrated by integrater 554 in the reverse direction; that is, the analog data which was integrated by the integrater 554 in the positive direction for a predetermined time. In the present embodiment the amount counted by the counter 558 and stored in the buffer register 564 is now used as the digital conversion data corresponding to the input analog data.

Even after the aforementioned operation the counter 558 continues counting until the counter 558 again overflows. Then the content of the counter 558 become "0" and the Flip-Flop 560 is reset while the Flip-Flop 562 is set. In response to the reset of the Flip-Flops 560, the A-D converter control circuit 552 once clears the above mentioned integrator 554 through the integrator control means 555. It then serves the analog data delivered to the a input terminal and delivers it to the integrator 554 so that the analog data is integrated from the start. Thereafter, the A-D converter repeats the same aforementioned operation. Hence, the system of the present embodiment repeatedly takes up new analog data for A-D conversion so that the content of the buffer register 564 is always renewed with digital data corresponding to the input analog data.

It is always necessary to detect the operating state of this A-D detector. A logic circuit 566 is provided which serves this purpose. The logic circuit 566 receives the output signal of the comparater 556. It also receives the output of the Flip-Flops 560 and 562 so as to deliver the INT signal for showing that the input analog data is being integrated by means of the integrator 554. It receives the ADC signal for showing that the A-D conversion has been completed and read out of the A-D conversion data is possible, or the ADOF signal for showing that the A-D conversion shows the input analog data to be so large that the counter 558 is overflowing.

The analog data introduced into the input control part 360 from the mechanical part 358 is stored in the buffer register 564 as digital conversion data DD. This data DD is transferred to the central control part 362 over the input BAS line by the signal switching circuit 568 in accordance with the instruction from the logic circuit 566 in synchronism with a sequence of the timing pulses TB0-TB7 starting the from the lower figures.

On the other hand, the BAS line 366 carries the INT signal from the logic circuit 566 in synchronism with the timing pulse TB7. The ADCE signal is carried on the BAS line 366 in synchronism with the timing pulse TB6. Further, details will be explained later.

The terminal 54 of the mechanical part 358 is supplied with the charge completion signal CSA, the external light measuring adapter mode signal OLM and so on. These signals are, as has been explained, classified into the CGUP signal by means of the current detector 386 as to whether the speed light device i.e., electronic flash has been charged or not, the FAT signal for showing the full automatic shutter time control during flash photography and the OLM signal for the application of the external light measuring adapter. These signals are further converted into two signals, namely CU and AO by means of the encoder 570. As is explained by FIG. 47, when the CU signal is "0", the exposure control in the system is carried out in accordance with the light measuring data. When the AO signal is "0", the system is in the TTL light measurement photographic mode, while the AO signal is "1", the system in in the external light measurement photographic mode. Also, when the CU signal is "1", the system is in the speed light photographic mode. When the AO signal is "0", the shutter time is controlled semi-automatically, while when the AO signal is "1", the shutter time is controlled fully automatically. The CU signal and the AO signal are respectively applied to the terminals a and b of the multi-plexer 572.

The multi-plexer 572 includes input terminals a-f. It converts the input signals coming through the above mentioned input terminals into the series signals in synchronism with the timing pulses TB1-TB6. The terminals c, d and e of this multiplexer 572 are respectively supplied with the AE lock signal AELK, the AE charge signal AECG and the wind up completion signal WNUP. The terminal f is supplied with the A-D conversion overflow signal ADOF from the logic circuit 566. As the result this multiplexer 572 delivers the ADOF signal, the AELk signal, the AECG signal, the WNUP signal, the AO signal and the CU signal in synchronism with the timing pulses TB1-TB6. These series signals are further transferred from the signal changeover circuit 568 to the central control part 362 in synchronization with the timing pulses TB1-TB6. This is carried on the input BAS line in sequence.

The signal change over circuit 568 is controlled by means of instruction from the logic circuit 566. This is done so that at the time the transfer of the A-D conversion data becomes possible after the A-D conversion of the input analog data has been completed, the output of the buffer register 564 is applied to the input BAS line 370. In other state, the series output signal of the multiplexer 572 is applied to the input BAS line 370.

Figure 48:
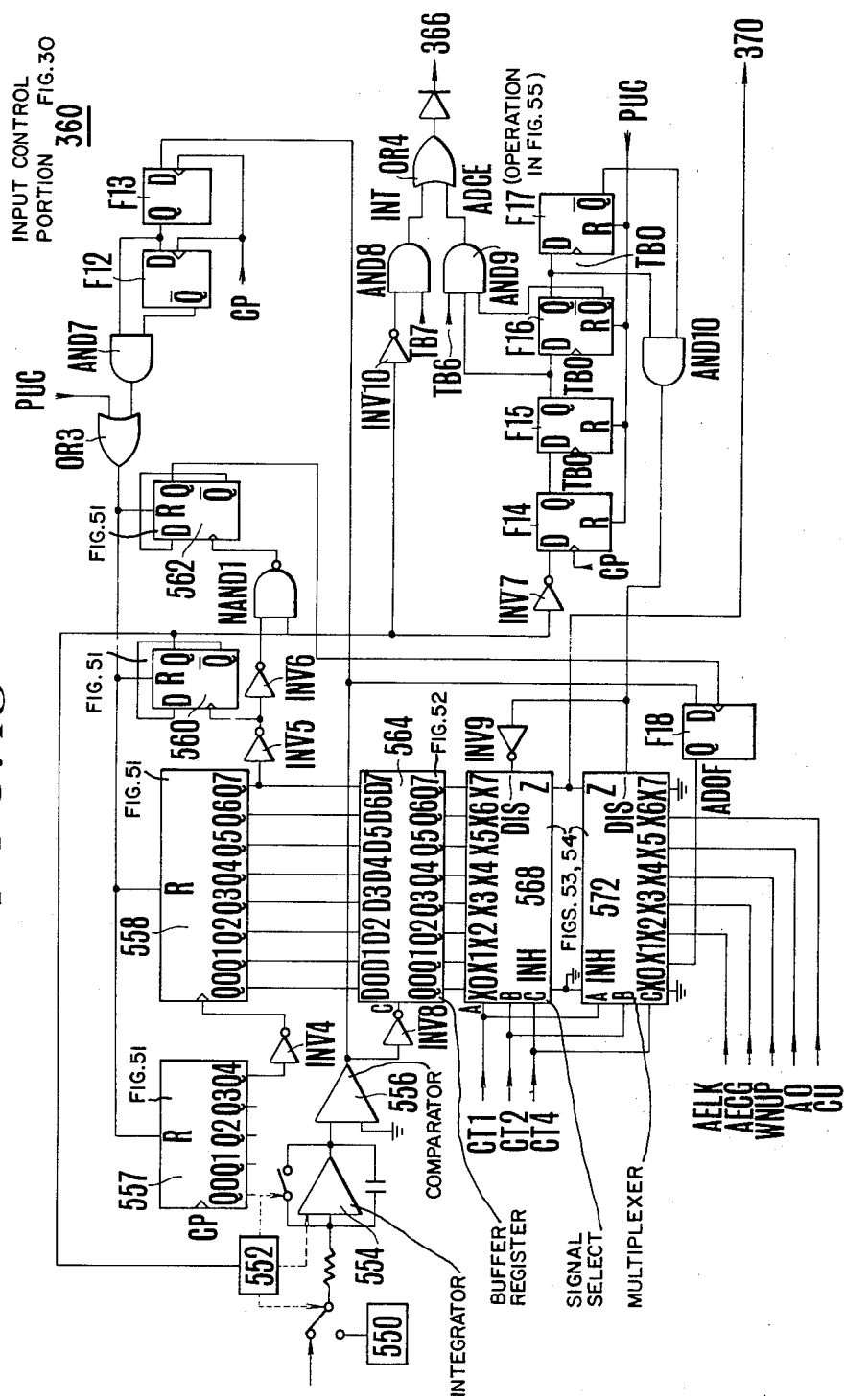
FIG. 48 shows a detailed block diagram of the input control part.

The block diagram of the input control part 360 is shown in detail in FIG. 48. Here, a frequency dividing counter 557 produces the standard counting clock by dividing the clock pulse into 32 parts. This standard clock is applied to the clock terminal of the counter 558 through the inverter INV4. Thus this counter 558 counts the standard clock by dividing the frequency so as to deliver the counting data in eight bits from the terminals $Q_0$-$Q_7$. The highest bit $Q_7$ of the output data of the counter 558 is applied to the clock terminal of the Flip-Flop 560 through the inverter INV5. The $\overline{Q}$ output of this Flip-Flop 560 connected to its D input so as in essence to form a 1 bit extension of the highest bit of the counter 558. The output of the inverter INV5 is introduced to the NAND gate NAND 1 whose one side input terminal receives the Q output of the Flip-Flop 560. The output of the NAND gate NAND1 is applied to the clock terminal of the Flip-Flop 562. As for the above mentioned Flip-Flop the $\overline{Q}$ output of this Flip-Flop 562 is the D input of itself so as to form a 1 bit extension of the Flip-Flop 560 of counter 558.

Figure 51:
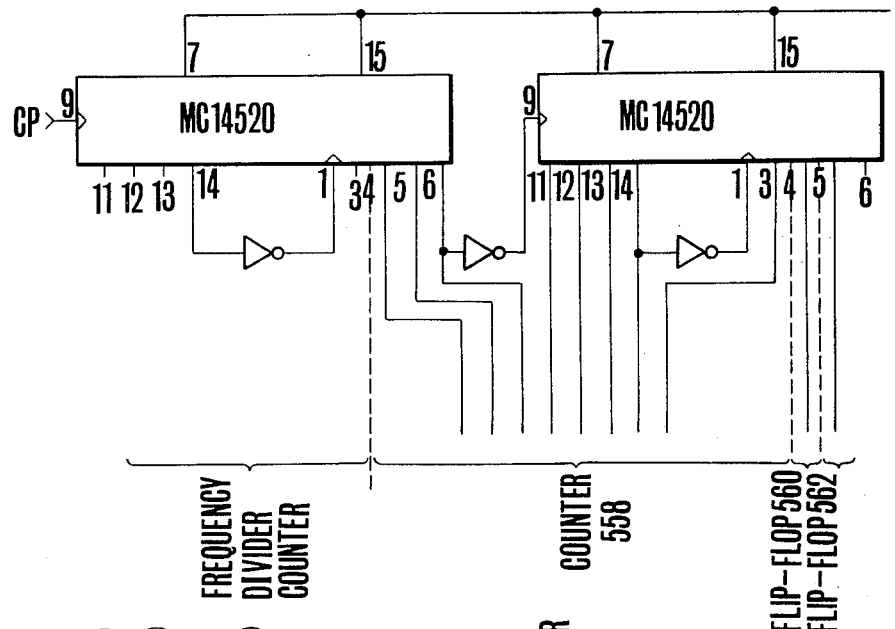
FIG. 51 shows the arrangement of the counter 558 and of the Flip-Flops 560 and 562 by means of the I.C. circuit element MC14520 shown in FIG. 49.

As is clear from the above mentioned explanation the frequency dividing counter 557, the counter 58, the Flip-Flops 560 and 562 as a whole form a 15 bit frequency dividing counter. In the present embodiment, two integrated circuit elements MC14520 (manufactured by MOTOROLA) are used to realize such a 15 bit counter. This integrated circuit element MC14520 is a dual up counter including two 4 bit counters in block diagram FIG. 49. One of the counters is formed of the logic diagram in FIG. 50. By combining the integrated circuit elements MC14520 as shown in FIG. 51, it is possible to realize the above mentioned 15 bit counter, connected. In such a counter the first to the fifth bit are used as the frequency dividing counter 557. The bits six through thirteen are used as an 8 bit counter and the fourteenth and the fifteenth bit are used as the Flip-Flop 560 and 562. The counter composed as above is immediately reset upon the signal input at the direct reset terminal.

In FIG. 48, the buffer register 564 is formed with a parallel in parallel out type register to store the data applied to the input terminals $D_0$-$D_7$ in synchronism with the input at clock terminal c and deliver them from the output terminals $Q_0$-$Q_7$. The $D_0$-$D_7$ terminals of the buffer register 564 are respectively supplied with the outputs from the terminals $Q_0$-$Q_7$ counter 558. The latter are respectively applied to the input terminals $X_0$-$X_7$ of the signal sorting circuit 568. Further the clock terminal c of this buffer register 564 is supplied with the output of the compartor 556 through inverter INV8. In consequence, buffer register 564 receives counting data from the counter 558 when the output of the comparator 556 is changed from "1" to "0", namely when negative integration by integrater 554 is completed.

Figure 52:
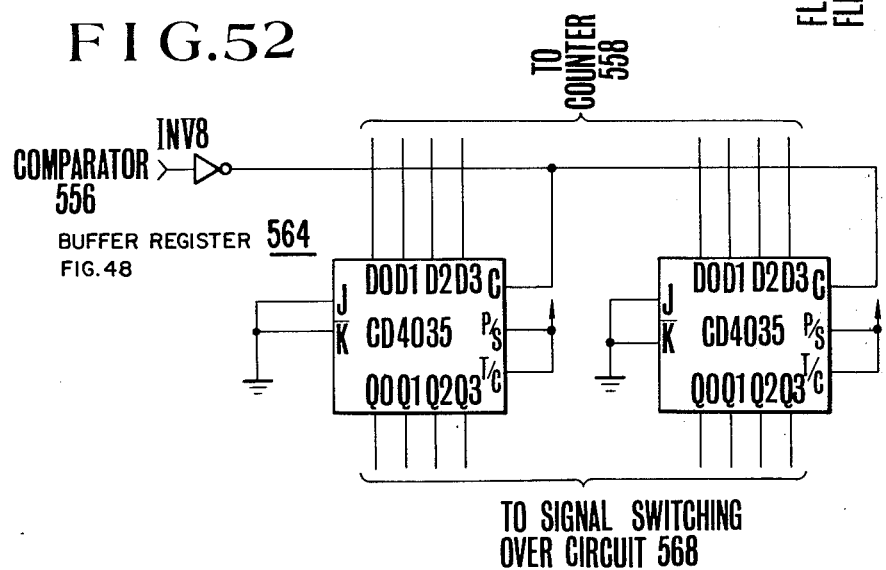
FIG. 52 shows the arrangement of the buffer register 564 by means of the combination of the I.C. circuit element CD4035.

Buffer register 564 can be realized by arranging in parallel two 4 bit parallel in parallel out type shift registers. Two integrated circuit elements CD4035 (manufactured by RCA) in parallel may be used. This parallel arrangement is shown in FIG. 52.

The signal switching circuit 568 and the multi-plexer 572 are both multiplexers with the same basic composition, realizable with the integrated circuit elements MC14512 (manufactured by MOTOROLA). The composition of integrated circuit element MC14512 is shown in the logic diagram FIG. 53 and its characteristics are shown in the fourth value table in FIG. 54. Integrated circuit element MC14512 is supplied with 8 bit series data through the terminals $X_0$-$X_7$. When the counter pulses are given to the terminals A, B and C while the "0" signal is applied at the DIS terminal, the input data is transferred to switching circuit 568 through the Z terminal in sequence. This is done in synchronism with the timing pulses $TB_0$-$TB_7$. The output signals of the buffer register $Q_0$-$Q_7$ are applied respectively to the terminals $X_0$-$X_7$ while the counter pulses $CT_1$, $CT_2$ and $CT_3$ are applied respectively to the terminals A, B and C. Further the $X_1$ terminal of the multi-plexer 572 is supplied with the ADOF signal which indicates overflow in counter 558 as the result of A-D conversion. The X2 terminal receives the AELK signal, the X3 terminal the AECG signal. The X4 terminal receives the WNUP signal, the X5 terminal the AO signal, and the X6 terminal the CU signal. The terminals A, B and C are supplied respectively with the counter pulses $CT_1$, $CT_2$ and $CT_4$. Also the output terminals Z of both the switching circuit 568 and the output terminal Z of the mutli-plexer 572 are wired together to form on OR arrangement to be connected to the input BAS line 370. In such an arrangement the DIS terminal of the above mentioned signal switching circuit 568 is supplied with the same signal as that applied to the DIS terminal of multi-plexer 572 through the INV9. Hence either the data from X0-X7 of circuit 568 or various signals from X0-X7 of multi-plexer 572 are delivered to the input BAS line in synchronism with the timing pulses $TB_0$-$TB_7$. This is done, of course, in accordance with the state of the switching control signal.

The output of the above Flip-Flop 560 is applied to the D terminal of the Flip-Flop F14 in synchronism with the clock pulse CP through the inverter INV7. The output of Flip-Flop F14 is applied to the D terminal of the Flip-Flop F15 in synchronism with the timing pulse TB0. The Q output of this Flip-Flop F15 is applied to the D terminal of the Flip-Flop F16 in synchronism with the timing pulse TB0. The Q output of this Flip-Flop F16 is applied to the D terminal of the Flip-Flop 17 in synchronization with the timing pulse TB0. The operation of the Flip-Flops F14-F17 are later explained in accordance with the timing chart shown in FIG. 55. When the output of the Flip-Flop 560 changes from "1" to "0", the Flip-Flop F14 is set in synchronism with the next clock pulse CP. Thus, a signal "1" is applied to the D terminal of Flip-Flop F15. The Flip-Flop F15 is thus synchronized with the leading edge of the next timing pulse TB0 producing a "1" as Q output. This Q output is applied to the D terminal of the Flip-Flop F16, which is then synchronized with the rise of the next timing pulse TB0 to produce a Q output "1". By entering the conditions of the Q output of the Flip-Flop F 15 and the Q output of the Flip-Flop F16, a 1 word time can be obtained immediately after the output of the comparator 556 changes from "0" to "1". The 1 word time becomes the basis for obtaining the ADCE signal for the A-D conversion completion. The "1" output from the Q terminal of the Flip-Flop F16 is further delivered to the D terminal of the Flip-Flop F17 and set in synchronism with the rise of the next timing pulse TB0, and produces a Q output of "1". By entering the AND condition of the Q output of Flip-Flop F16 and the $\bar{Q}$ output of Flip-Flop F17, the next 1 word time is obtained. The 1 word time thus obtained is used to transfer the A-D conversion data. This is done during a 1 word time interval immediately after the output of the ADCE signal which shows the A-D conversion completion.

Further the Q output of Flip-Flop F15 and the Q output of the Flip-Flop 16 are delivered to the AND gate AND9 supplied with the timing pulse TB6. As a result, a signal is produced by AND gate AND9 in synchronism with TB6 during the 1 word interval immediately after the Q output of the Flip-Flop 560 has changed from "1" into "0". This signal is carried on the BAS line 366 through the OR gate OR4 as the A-D conversion completion signal ADCE. When the Q output of Flip-Flop 560 from "1" onto "0", the lamp of the integrator 554 changes to integrate in a negative direction. Thus there is a completion of the A-D conversion. This will be explained in detail later.

The Q output of the Flip-Flop F16 and the Q output of the Flip-Flop F17 are applied to the AND gate AND10 as a result, (as shown in FIG. 55) a high level signal is produced during the 1 word interval after the ADCE signal has been produced. This high level signal is delivered from the AND gate AND10 to the DIS terminal of the signal switching circuit 568 and used as the data transfer control signal through the inverter INV9. At the same time it is applied directly to the DIS terminal of the multi-plexer 572. As a result, during the next 1 word interval after the production of the ADCE signal, the digital data in the buffer register 564, (obtained through A-D conversion) is delivered into the input BAS line from the lower figures. This is done in sequence from Z terminal of the signal switching circuit 568 in synchronism with the timing pulses TB0-TB7. At this time, a "1" signal is applied to the DIS terminal of the multi-plexer 572 from the ANd gate AND10 to control the output of the Z terminal. In the ordinary state, signals such as AELK, AECG, WNUP, AO, CU, and so on are delivered into the input BAS line 370 in synchronism with the timing pulses TB1-TB6 from the Z terminal of the multi-plexer 572. When the ADCE signal has been produced after A-D conversion digital data DD stored in the buffer register 564 is delivered through the signal switching circuit 568 only during the next word interval.

On the other hand, the Q output of the above mentioned Flip-Flop 560 is delivered to the AND gate AND8 which is supplied with the timing pulse TB7 through the inverter INV10. While the Q output of the Flip-Flop 560 is "0", a signal in synchronism with timing pulse TB7 appears at the output of AND gate AND8. This output signal is carried on the BAS line 360 through the OR gate OR4, as the INT signal which indicates that integrator 554 is integrating the input analog data in a positive direction. When the Q output of the Flip-Flop 560 "0" therefore, the integrator 554 is integrating the input analog data in the positive direction. This will be explained in detail later.

On the other hand, the output of the above comparator 556 is applied to the D terminal of Flip-Flop F13 in synchronism with the clock pulse CP. The Q output of this Flip-Flop F13 is applied to the D terminal of the Flip-Flop F12 in synchronism with the clock pulse CP. The Q output of Flip-Flop F13 and the $\bar{Q}$ output of Flip-Flop 12 are applied to the AND gate AND7 the output of this AND gate AND7 delivered the direct reset terminal R of the frequency dividing counter 557, the counter 558 and the Flip-Flops 560 and 562 through the OR gate OR3. The reason for the above arrangement is if the lamp has been switched after the intergration by the integrator 554 in the negative direction there is a certain time lag characteristic of the integrator. This lag lasts until a positive output is obtained from the comparator 556 which is reset after the integration in a positive direction is started. The counter 558 starts to operate simultaneously with the delivery of the positive output from the comparator 556 thus when comparator 556 starts to deliver positive output, the frequency dividing counter 557, the counter 558, the Flip-Flops 560 and 562 are directly reset during the next 1 word time. Hence, the time for starting the counter 558 and for starting the comparator 556 are synchronized.

The Q output of the Flip-Flop 562 is applied to the clock terminal of the Flip-Flop F18 whose D input terminal receives a signal from comparator 556. This is done so that if the counter 558 is overflowing even though the output of the comparator 556 has not inverted from "1" into "0" (that is, the A-D conversion is not complete), while the integrator 554 is integrating in the negative direction, the Flip-Flop 562 is set. A "1" output is now delivered from the Q terminal of Flip-Flop F18 whose clock pulse is the output from the Q terminal of the Flip-Flop 562. The Q output signal of Flip-Flop F18 is, after A-D conversion, applied to the $X_1$ terminal of the multi-plexer as the ADOF signal which indicates overflow in the counter 558.

the operation of the control portion 360 of FIG. 30, constructed as shown in FIG. 48 is explained in more detail in accordance with the operations shown in FIGS. 56 and 57. FIG. 56 shows the case in which the A-D conversion is carried out in order, while in FIG. 57 overflow occurs as the result of the A-D conversion.

At first, when the power source switch is closed, a clear signal PUC is delivered from the power up clear circuit. This clears and resets the frequency dividing counter 557, the counter 558, the Flip-Flops 560 and 562, F14, F15 and F17 of FIG. 48. In this state the Q output of the Flip-Flop 560 is "0" and consequently the A-D conversion control circuit 552 turns the lamp of the integrator 554 in the positive direction. At the same time circuit 552 delivers the input analog data to the integrator 554. The output of comparator 556 now becomes "1" and almost simultaneously, the counter 558 starts counting the output pulse of the frequency dividing counter 557. While this integration is carried out, the "0" output of the Flip-Flop 560 is applied to the AND gate AND 8 through the inverter INV10. In consequence the AND gate AND 8 delivers the INT signal which indicates that the integrator 554 is integrating the input analog to the BAS line 366 in synchronism with the timing pulses TB7 through the OR gate OR4.

When the counter 558 overflows during the aforementioned operation, the output of the Flip-Flop 560 goes to "1". At the sometime all the bits held by the frequency dividing counter 557 and of the counter 558 become "0" so that the counting begins again from "0". The A-D conversion control circuit 552 uses the "1" output from the Q terminal of Flip-Flop 560 to turn the lamp of the integrator 554 in the negative direction. At the same time it delivers the standard level signal from the standard level producing means 550 to the integrator 554. When this integration in the negative direction is started, the value integrated integrator 554 is in proportion to the input analog data. While this integration in the negative direction is being carried out, the Flip-Flop 560 continues to produce a "1" output. This controls the output of the AND gate AND8 so naturally no INT signal is produced. When the output signal of integrator 554 has been reduced to a determined level as the result of the integration in the negative direction, (that is, when the integration has been completed), the output of comparator 556 changes from "1" to "0". Consequently, the buffer register 564 whose clock terminal C is now supplied with the output signal from comparator 556 through the inverter INV8, enters and stores the counting data produced by the counter 558 and delivered from the terminals Q0-Q7. The counting data received by the buffer register 564 in this way is the digital value corresponding to the input analog data as explained.

Even after the operation the counter 558 continues counting. When the counter 558 overflows the Flip-Flop 560 is reset so that the Q output becomes "0" while at the same time the Flip-Flop 562 is set so that the Q output becomes "1". The Q output of the Flip-Flop 562 is applied to the clock terminal of the Flip-Flop F18. The output of the comparator applied to the D terminal of Flip-Flop F18 has already become "0" so that the Flip-Flop F18 is not set.

On the other hand, the Q output of the Flip-Flop 560 applies a "1" input to the D terminal of the Flip-Flop F14 through the inverter INV7. Hence, as is clear from the timing pulses shown in FIG. 55, during the 1 word time after the first timing pulse TB0 after the Q output of the Flip-Flop 560 has become "0", the ADCE signal is applied in synchronism with the timing pulse TB6, to the BAS line 366 from the AND gate AND9 through the OR gate OR4. Here, the A-D conversion is considered to be completed when the counter 558 which continues counting during the integration by means of the integrator 554 in the negative direction has overflowed. Thus the A-D conversion completion is detected and the Q output of the Flip-Flop 560 changes from "1" to "0" as explained. During the time of the next word after the ADCE signal has been delivered, a "1" output is delivered from the AND gate AND10 to the terminal DIS of the multi-plexer 572 so as to control the signal output from the terminal Z of the multi-plexer 572. At the same time the signal from AND gate AND10 is applied to the DIS terminal of the signal change over or selector circuit 568 through the inverter INV9 as a zero signal. This occurs so that, during the word time when this "1" signal and AND10 is produced, the A-D conversion data DD stored in the buffer register 564 is delivered, from the lower figures in sequence, through the terminal Z and into the input BAS line 370 in synchronism with the timing pulses TB0-TB7.

On the other hand, the Q output of the Flip-Flop 560 which has been reset when the counter 558 overflowed is applied to the A-D conversion control circuit 552. The latter at once clears the integrator 554, switches the lamp into the positive direction and at the same time delivers the input analog data to the integrator 554. The integrator 554 whose lamp has been switched from negative to positive does not always start integration immediately. Rather this occurs after a delay time due to the characteristics of the element. Hence it takes a predetermined time for the comparator 556 to start to deliver "1" after the output of the integrator 554 surpasses a certain level. On the other hand, after the counter 558 has overflowed, the counter 558 immediately starts the counting operation from a state in which all the bits are "0". Hence, there is a danger that the input analog data could not be exactly integrated by the integrator 554. In order to provide for the above the direct reset mechanism composed of the Flip-Flops F12 and F13 and the AND gate AND7 is provide in such a manner that the comparator 556 starts to deliver a "1" at the time of the integration in the positive direction. This is detected so as to clear and reset the frequency dividing counter 557, the counter 558, the Flip-Flops 560 and 562. Hence counting is started again from the state in which all the bits are "0".

This operation is repeated to deliver the A-D conversion completion signal ADCE and the A-D converted digital data DD each A-D conversion cycle. As explained, with the exception of the word time during which A-D converted digital data DD is delivered, the AELK signal, the AECG signal, the WNUP signal, the AO signal and the CU signal repeatedly delivered from the input BAS line 370 in synchronism with the timing pulses TB1-TB6.

When integrator 554 performs in the negative direction after obtaining an integrated value corresponding to the input analog data in the positive direction, the counter 558 overflows before the output of the integrator 554 falls below a predetermined level. This occurs while the output of the comparator 556 remains "1". Thus the Flip-Flop 562 is set. The Flip-Flop F18 whose D input terminal is supplied with the output of the comparator 556 is then set so that its Q output terminal delivers the ADOF signal to show the overflow of the A-D conversion result. This signal is applied to the X1 terminal of the multi-plexer 572. On the other hand, at the time of the overflow of the counter 558 the Flip-Flop 560 is reset. Thus the A-D conversion control circuit 552 which is supplied with the Q output of the Flip-Flop 560 clears the integrator 554 in such a manner that the output of the comparator 554 goes from "1" to "0". In consequence the buffer register 564 whose clock terminal is supplied with the output of the comparator 554 through the inverter INV8 takes up to the content of the counter 558. Thus, because the counter 558 has overflowed all of the bits are "0". Therefore all bits of the data received by the buffer register 564 and "0".

Even when the result of the A-D conversion overflows, the ADCE signal and the INT signal are delivered into the BAS line on the basis of the output of the Flip-Flop 560.

During speed light i.e., electronic flash photography the result of the A-D conversion overflows when the speed light device i.e., flash unit or flash device 384 delivers an analog aperture control signal. This shows the necessity for a manual setting of the aperture value at the camera in an amount which overflows the A-D converter 382. Thus at this time, the data received by the buffer register 564 with all of the "0" bits are naturally disregarded in this system.

The analog data and various conditions or the state judging signal, i.e., indicating, entered in the input control portion 360 from the mechanical part i.e. section 358 as mentioned are applied to the central control part 362 through the input BAS line 370. The signal ADCE for showing the A-D conversion or the INT signal is carried on the BAS line 366.

In the central control section 362 the BAS line 366 is connected to the input BAS selector 578. The BAS selector 578 determines whether the condition signal or the A-D converter data DD the signal carried on the input BAS line after having detected the ADCE signal delivered to the BAS line in synchronism with the timing pulse TB6 is so as to produce an instruction signal of the treatment of the input signal from the input BAS line 370.

On the other hand, the input BAS line 370 is connected to the condition register 574 of the central control section 362 and to the signal change over circuit 576. The signal change over i.e., selector circuit 576 normally serves as a circulation circuit of the D register 516 for storing the A-D conversion data.

When the condition register 574 is supplied with an instruction signal for receiving the conditions from the input pulse selector 378, it takes up and stores the oDOF signal, the AELK signal, the AECG signal, the WNUP signal, the AO signal and the CU signal carried on the input BAS line 370 on the basis of the timing pulses TB1-TB6.

The signal change over or selector circuit 576 normally makes the content DR of the D register circulate. When it is supplied with the instruction signal for taking the data from the input BAS selector 578, it takes and stores the A-D conversion data DD carried on the above mentioned input BAS line 370 in time with the timing pulses TB0-TB7.

In consequence the condition register 574 and the D register 516 is normally and repeatedly supplied with the new setting condition or operation state and the A-D conversion data DD through the input BAS line 370 so as to store them. Specifically, the receiving or entering period of the A-D conversion data is same as the A-D conversion period of the A-D converter. Also, the signal selector circuit 576 is supplied with the AELK signal from the condition register 574. When it is supplied with this AELK signal, even if it is supplied with an instruction signal for taking data from the input BAS selector, the circuit 576 never takes the A-D conversion data anew. It continues the circulation of the data DR of the D register 516. The above mentioned mechanism performs the AE lock of this camera system.

The mechanism to enter the condition signal and the A-D conversion data DD from the input BAS line 370 into the central control portion 362 operates as follows.

After the A-D conversion has been completed in the input portion 360, when the A-D conversion completion signal ADCE is carried on the BAS line in synchronism with the timing pulse TB6, the A-D conversion data DD is delivered to the input BAS line. Delivery is in sequence from the lower figures and in synchronism with the timing pulses TB0-TB7. This occurs during the word time light after the ADCE signal is delivered, as explained. This is done in such a manner that the conversion data DD can be stored in the central control portion 362 in the register 516. This involves entering the content of the input BAS line in the D register 516 in synchronism with the signals TB0-TB7 during the time of the next word, after the ADCE signal in synchronism with the timing pulse TB6 has been inspected. Various signals are carried on the input BAS line 370 from the input control portion 360 during word times other than the above. Hence the condition register 574 need only to take up the signals from the input BAS line 370 in accordance with the timing pulses.

In consequence the input BAS selector 578 need merely take up the signal of the BAS line 366, detect whether the ADCE signal is delivered in synchronism with TB6, and deliver the instruction signal for taking the A-D conversion data from the input BAS line 370 during the next time of the word.

Figure 58:
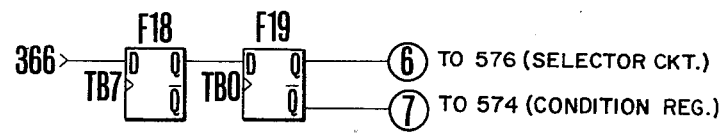
FIG. 58 shows the logic of the input pass selector 578.

From this viewpoint the input BAS selecter 578 in the present embodiment is construction as shown in FIG. 58. Here, the BAS line 366 is introduced to the D terminal of the Flip-Flop F18 in synchronism with the timing pulse TB7. The Q output of this Flip-Flop F18 is applied to the D terminal of the Flip-Flop F19 in synchronism with the timing pulse TB$_0$.

Figure 59:
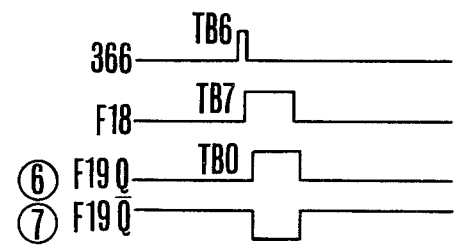
FIG. 59 shows a time chart for explaining the operation of the Flip-Flops F18 and F19 shown in FIG. 58.

In this structure, the Flip-Flops F18 and F19 carry out the operation shown in FIG. 59. The Flip-Flop F18 is not set in synchronism with the timing pulse TB7 when its D terminal input is not "1" at least in synchronism with TB6, namely when there is no ADCE signal in the BAS line 366. The Q output of the Flip-Flop F18 at this time is "0". The D terminal of the Flip-Flop F19 is supplied with this "0" output in synchronism with the timing pulse TB$_O$. It is in the reset state and its $\overline{Q}$ output (7) is "1". The signal at output (7) is applied to the condition register 574 so that the condition register 574 receives the content of the input BAS line.

Figure 60:
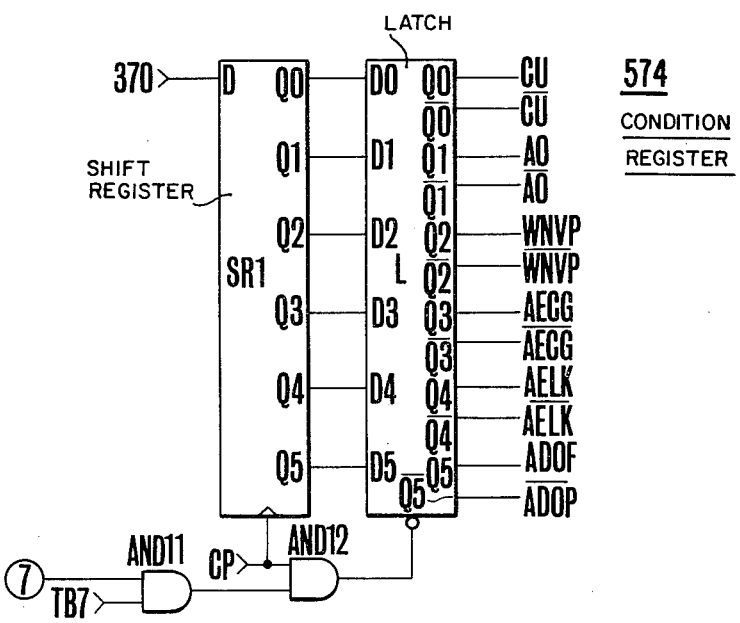
FIG. 60 shows a block diagram of the condition register 574.

The condition register 574 is constructed as shown in detail in FIG. 60. Here, as shown in the drawing, the register 574 is composed of the shift register SR$_1$ and the latch L which operate in synchronism with the rising edges of the clock pulses.

The D terminal of the shift register SR$_1$ is connected to the input BAS line 370 so as to take the data from the input BAS line 370 in synchronism with the clock pulse CP. In this structure the signals carried on the input BAS line 370 with respective clock pulses CP are all sequentially received by this shift register SR and delivered in sequence from the output terminal Q0-Q5 in synchronism with respective clock pulses CP. Consequently in this state the data from the output terminals Q0-Q5 of the shift register SR$_1$ are all uncertain data. During the time when A-D conversion data DD is not carried on the input BAS line 370, namely during the timing pulse TB7 excepting the word time after the ADCE signal has been delivered to the BAS line 366, the CU signal, the AO signal, the WNUP signal, the AECG signal, the AELK signal and ADOF signal are delivered respectively from the output terminals Q$_0$-Q$_5$ of the shift register SR$_1$. This is clear from the fact that the CU signal is carried on the input BAS line 366 in synchronism with the timing pulse TB5, the AO signal in synchronism with the timing pulse TB4, the WNUP signal in synchronism with the timing pulse TB3, the AECG signal in synchronism with the timing pulse TB2, the AELK signal in synchronism with the timing pulse TB1, and the ADOF signal in synchronism with the timing pulse $TB_0$. Six terminals $D_0$-$D_5$ of the latch L are supplied with the outputs from the output terminals $Q_0$-$Q_5$ of the shift register $SR_1$ in synchronism with the falling of the clock pulses. With the signals falling only during the time during which the timing pulse TB7 is delivered, the latch L can take and store the signals such as CU, AO, WNUP, AECG, AELK and ADOF. In the present embodiment, the AND gate AND11 receives the timing pulse TB7 and the signal (7) from the input BAS selector 578. This produces a signal in synchronism with the timing pulse TB7 during the next 1 word time after the ADCE signal has been delivered. The resulting signal is applied to the AND gate AND12 with the clock pulse CP. This produces a signal in synchronism with the clock pulse CP. That is, a signal falling during the timing pulse TB7 is obtained and applies to the clock terminal of the latch L.

By means of this arrangement, the signal representing the new setting condition or operation condition is entered in the parallel-in parallel-out register forming the latch L during each word time except the word time after the ADCE signal has been delivered to the BAS line 366. In the parallel-in parallel-out register forming the latch L, the CU signal comes from the $Q_0$ terminal, the AO signal from the $Q_1$ terminal, the $\overline{AO}$ signal from the $\overline{Q}_1$ terminal, the $\overline{AO}$ signal from the $\overline{Q}_1$ terminal, the WNUP signal from the $Q_2$ terminal, the $\overline{WNUP}$ signal from the $\overline{Q}_2$ terminal, the AECG signal from the $Q_3$ terminal, the $\overline{AECG}$ signal from the $\overline{Q}_3$ terminal, the AELK signal from the $Q_4$ terminal, the $\overline{AELK}$ signal from the $\overline{Q}_4$ terminal, the ADOF signal from the $Q_5$ terminal and the $\overline{ADOF}$ signal from the $\overline{Q}_5$ terminal.

Figure 61:
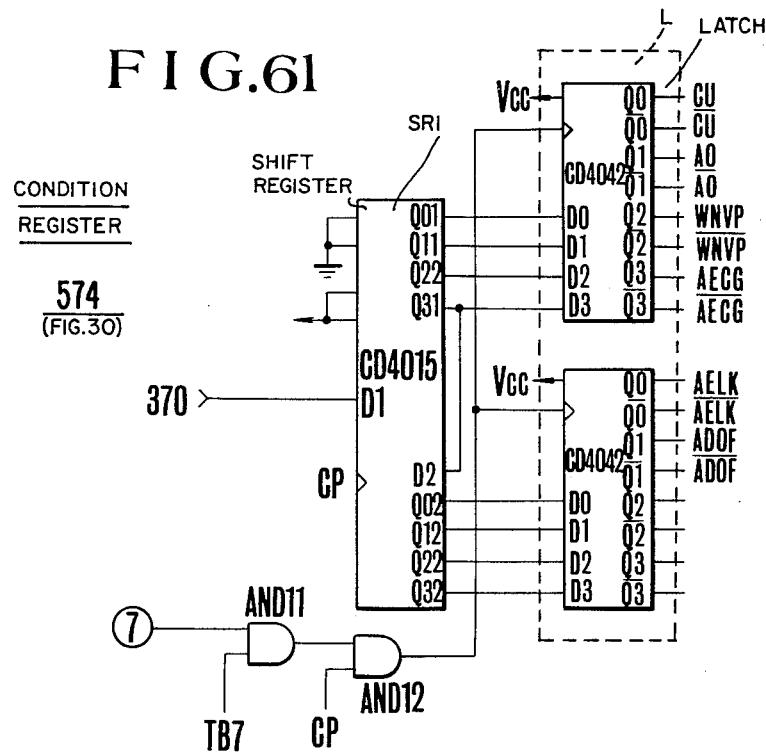
FIG. 61 shows the arrangement of the circuit shown in FIG. 60 by means of the I.C. circuit element.

The condition register 574 is shown in more detail in FIG. 61. As is clear from the drawing the shift register $SR_1$ shown in FIG. 60 is the integrated circuit element CD4015 while the latch consists of two integrated circuit elements CD4042.

Figure 62:
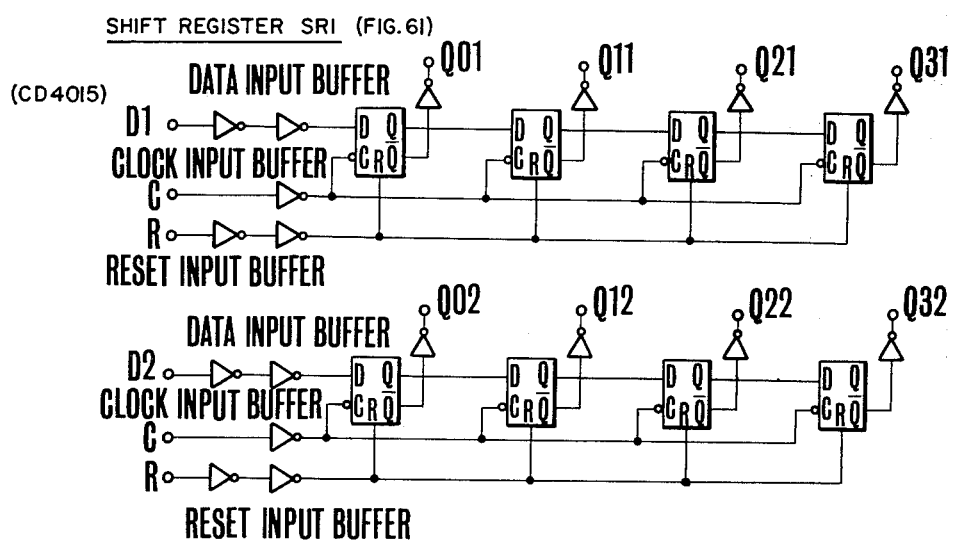
FIG. 62 shows a logic diagram of the I.C. circuit element CD4015.

The integrated circuit element CD4015 (manufactured by RCA) is a dual 4 bit static shift register whose logic diagram is shown in FIG. 62. The Q31 output is adapted to the D2 terminal so as substantially to constitute a 8 bit shift register. In this embodiment 6 out the 8 bits used as a shift register $SR_1$. Further as is clear from the logic diagram shown in FIG. 40, the integrated circuit element CD4042 is a 4 bit latch constructed to receive data in parallel in synchronism with the dropping of the clock input and hold the data during the time during which the clock input is "0". Further it is clear that an 8 bit latch can be formed from two latches CD4042 in parallel. In the present embodiment, 6 of these bits are used as a latch L.

On the other hand, a "1" signal may be applied to the D terminal of the Flip-Flop F18 shown in FIG. 58 from the BAS line 366 in synchronism with the signal TB6, namely when there is an AECE signal. The Flip-Flop F18 is then set in synchronism with signal TB7 to produce a "1" Q output. In consequence the Flip-Flop F19, when supplied with the above mentioned Q output in synchronism with the rising edge of the first timing pulse of the next word time so as to produce a "1" Q output at (6). The Flip-Flop F18 remains set only until the rising edge of the next timing pulse TB7 so that the D input of the Flip-Flop F19 has already become "0" by the time of the appearance of the rising edge of the next timing pulse $TB_0$ of the set Flip-Flop 19. In consequence the Flip-Flop F19 remains set only during one word time from the rising edge of the signal $TB_0$ until the next rising edge of the signal $TB_0$. Hence the Q output (6) is "1" only during this 1 word time.

Figure 63:
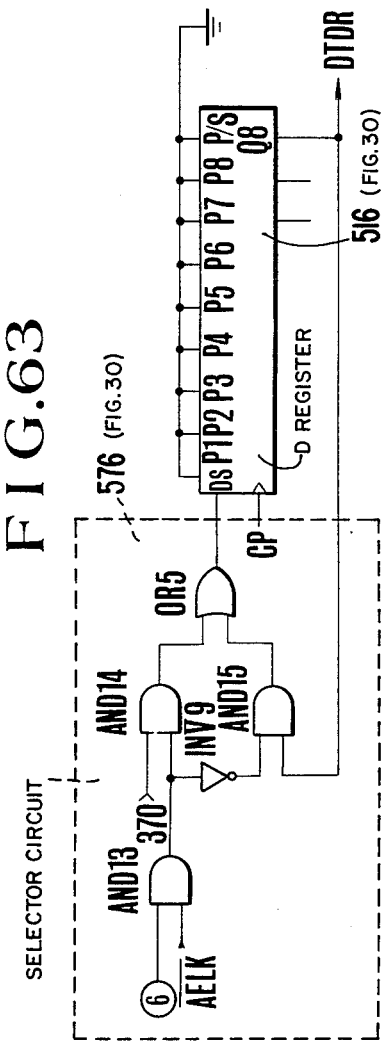
FIG. 63 shows a detailed circuit arrangement of the signal switchover circuit and D register.

This (6) signal is applied to the signal selector circuit 576 (FIG. 63). The signal selector circuit 576 then stops the circulation of the content of the D register 516 in FIG. 63. It introduces the data carried on the input BAS line 370 into the D register 516 only during the one word from $TB_0$ to $TB_7$. The data introduced during the word time is the A-D conversion data DD carried on the input BAS line 370 during this word time at the input control part 360. Furthermore, the data introduced into the D register 516 in this way circulates through the signal selector circuit 576 till the introduction of the next data.

Figure 64:
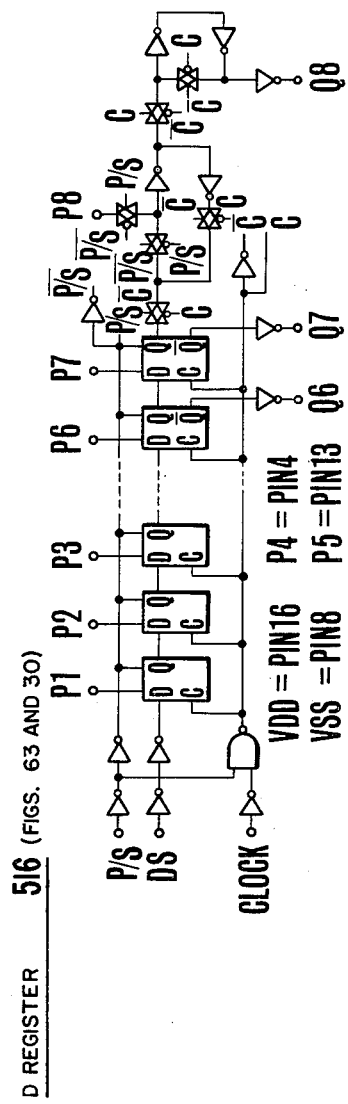
FIG. 64 shows a block diagram of the I.C. circuit element CD4021.

Details of the circuit 576 and the D register 516 are shown in FIG. 63. Here the D register 516 uses the integrated circuit element CD4021 (manufactured by RCA) of the 8 bit shift register as shown in block diagram in FIG. 64.

In the circuit shown in FIG. 63, the Q output (6) of the Flip-Flop F19 shown in FIG. 58 and the $\overline{Q_0}$ output $\overline{AELK}$ of the latch L shown in FIG. 60 are applied to an AND gate AND13. Consequently when the $\overline{AELK}$ signal is "1" while the data entry instruction signal (6) is "0", the output of AND gate AND13 is "0". The output of an AND gate AND14 directly supplied with the output of the AND gate AND13 is also "0". At the same time, an AND gate AND15 is enabled by the output of the AND gate AND13 through the inverter INV9. Hence the content DR of the D register 516 circulates through the Q8 terminal, the AND gate AND14 and an OR gate OR5.

On the other hand, even when the Q output of the Flip-Flop F19, namely the date entry instruction signal is "1", the $\overline{AELK}$ signal becomes "0" in the AE lock state and therefore the output of the AND gate AND13 is "O". Hence the D register 516 does not receive the A-D conversion data from the input BAS line 370. This keeps the content DR, namely the A-D conversion data DD received before in circulation through the AND gate AND15 and the OR gate OR5.

When on the other hand, the $\overline{AELK}$ signal is "1" and the Q output (6) of the Flip-Flop F19 (FIG. 58), namely the data entry instruction signal becomes "1", the output of AND gate AND13 becomes "1". The AND gate AND14 supplied with the output of the above mentioned AND gate AND13 is now enabled. This disables the AND gate AND15 through the inverter INV9. Thus the A-D conversion data DD carried on the input BAS line 370 while the Q output (6) of the Flip-Flop F19 is "1" is entered in the D register 516. This occurs through the above mentioned AND gate AND14 in sequence from the lower figures in synchronism with the timing pulses $TB_0$-$TB_7$.

This arrangement introduces the A-D conversion data DD and various conditions or condition signals obtained in the input control portion 360 into the central control portion 362.

In FIG. 30, an operation circuit 500 carries out the desired operation between the data AR of the A register 510 and the data pointed out by the data selector 502 in accordance with the operation instruction from the instruction ROM504. The operation instruction from the instruction ROM504 at this time includes the aforementioned eight operation control routines. Hence an operation control routine is selectively brought into practice in accordance with the respective photographic mode.

The operation circuit 500 cooperates with the auxiliary registers such as the B register 512 and the C register 514 beside the A register 510. A gate 506 makes the data BR from the B register 512 circulate or take up the data AR from the A register 510. A gate 508 makes the data CR from the above mentioned C register 514 circulate or pick up the data AR from the A register 510.

The above mentioned data selector 502 selectively applies one of the data introduced through the nine terminals a, b, c, d, e, f, g, h, and i to the above mentioned operation circuit 500 in accordance with the instruction ROM504.

The film sensitivity data DTSV is introduced through the terminal a of the data selector 502, the smallest aperture value data DTAO through the terminal b, the vignetting error data DTAC through the terminal c, the shutter time data DTTV through the terminal d, and the aperture value data DTAV through the terminal e. How these data DTSV, DTAO, DTAC, DTTV and DTAV are obtained is as has previously been explained.

The terminal f of data selector 502 picks up the data pointed out by the instruction ROM 504 from the data in ROM34.

The data stored in the fixed data ROM534 are CSTO all of whose bits are "0", CSTC, CSTD and CSTE for other specified data, CSTF all of whose bits are "1", TMIN for the shortest shutter time obtainable in the camera body 4 without control, TMAS for the longest shutter time obtainable in the camera body 4 without control, TSYN for the flash synchronism shutter time during flash photography, the constants $CST_1$ and $CST_2$ for the operation and the largest aperture value AMAX of the photographic lens device 2 and so on. These data are selectively applied to the f terminal of the data selector 502 in accordance with the instruction from the instruction ROM504.

Further a plural number of the data AMAX relative to the largest aperture value are stored in the fixed data ROM534. These aperture values are selected and delivered in accordance with the data AMAX' relative to the largest aperture value introduced from the lens 2 into the camera body 4.

The fixed data stored in the fixed data ROM534 are the constants for various operations, the restriction due to the mechanism of the lens device 2 or of the camera body 4, for example the upper and the lower limit of the shutter time and so on. These are correspondingly set in accordance with the efficiency of the lens device 2 or of the camera body 4, the operation system, the system of the data setting or restriction and so on.

The respective contents DD, BR and CR of the D register 516, the B register 512 and C register 514 are selectively received at the terminals g, h and i of the data selector 502.

The terminals a-i of the above mentioned data selector 502 through which the data are introduced into the operation circuit depends completely upon the instruction from the instruction ROM504. All of the data selected by this data selector 502 are introduced into the operation circuit 500.

The operation circuit 500 serves to carry out the operation control functions such as the introduction of data selected by the data selector 502 into the A register 510, the storing of the result of the desired operation between the data AR of the A register with the data selected by the data selector 502 into the A register 510, the setting of the carrier Flip-Flop 540 when the result of the above mentioned operation is "carry" or "borrow" or the exchange of the content AR of the A register 510 for the content BR of the B register 512 or for the content CR of the C register 514.

In operation the instruction ROM504 provides the operation control instruction to the operation circuit 500. The instruction ROM504 in the central control part 362 includes, as has already been explained, eight operation control routines. These eight routines are selected in accordance with the state of the SPDW signal and the ASLC signal delivered from the condition signal memory circuit 548 as well as of the state of the AO signal and the CU signal from the condition register 574. The program selector 580 serves to determine the operation control routine of the instruction ROM504 in accordance with the state of the SPDW signal, the ASLC signal, the AO signal and the CU signal.

The instruction ROM504 carries out the routine selected and set by the program selector 580, and produces the control signal for the system. The program counter 582 is provided in order to carry out each routine. The inhibit terminal of this program counter 582 is connected to the latch 584. This latch is provided in order to restrict the counting operation of the program counter 582. This occurs so that the program counter 582 can not be started when no A-D conversion data DD is obtained after the completion of the first A-D conversion. The restriction is eliminated to start the counting operation of the program counter 582 when the first ADCE signal is detected by the input BAS selector 578.

The program counter 582 is structured to count up one by one for each timing pulse $TB_0$. In this system the operation control function for one step is carried out by the instruction ROM504 substantially during the 1 word time of the timing pulses $TB_0$-$TB_7$.

Thereafter the program counter 582 repeats the counting operation continuously, and delivers a signal every time the counting operation proceeds to a certain step. This signal means that the instruction ROM504 has terminated the operation control for one routine and is applied to the logic circuit 598. After a time element is added, this signal is on the one hand delivered as the CALE signal to be carried on the BAS line 366 in synchronism with the timing pulse TB5 for showing the completion of one operation. On the other hand the signal is the RSND signal to be delivered with the next timing pulse $TB_0$ after the above mentioned CALE signal has been delivered, so as to carry the data to transferred on the output BAS line 374.

Figure 65:
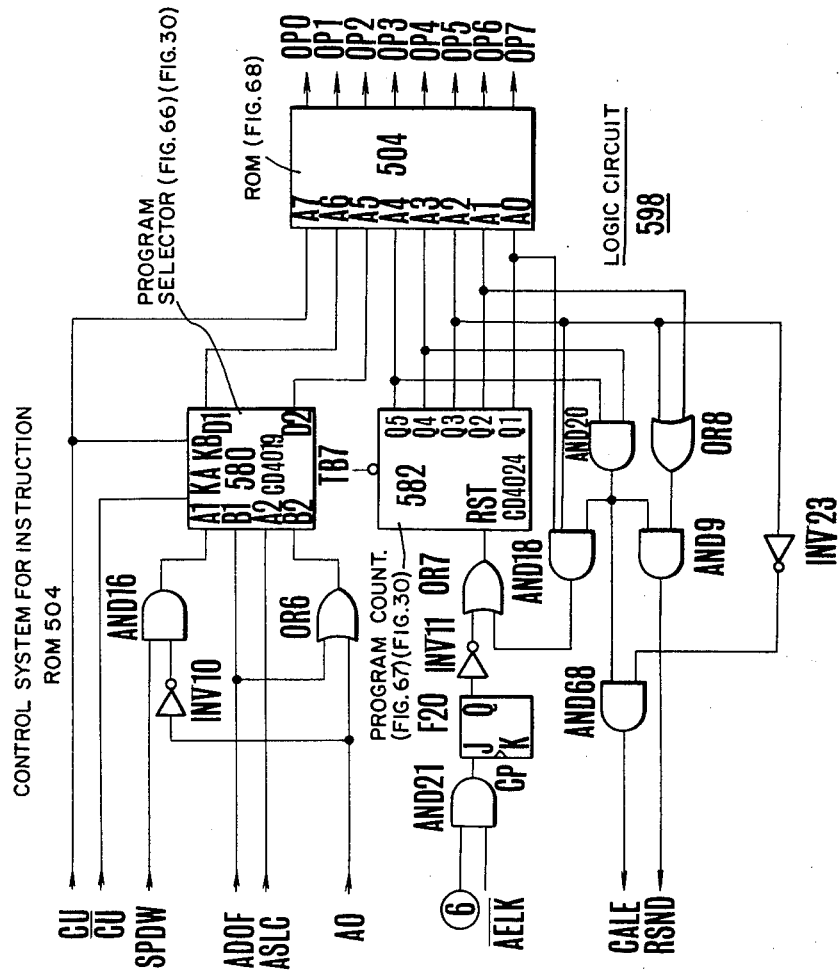
FIG. 65 shows a partial block diagram of the control system of the instruction ROM504 and of the logic circuit 598.
Figure 66:
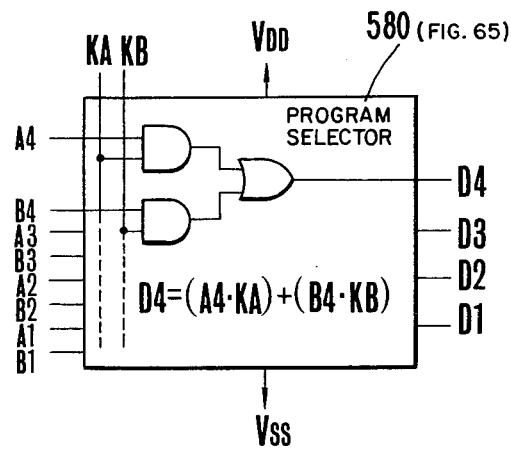
FIG. 66 shows a logic diagram of the I.C. circuit element CD4019.
Figure 67:
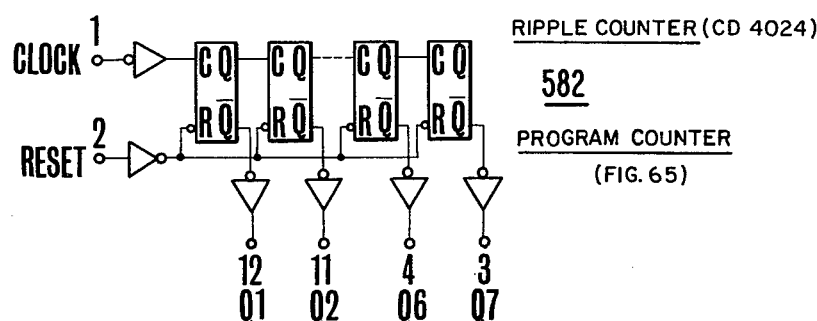
FIG. 67 shows a logic diagram of the I.C. circuit element CD4024.

FIG. 65 shows a block diagram for a control system for the instruction ROM504, the logic circuit 598, the latch circuit 584, the program selector 580 and the program counter 582. In the drawing, the program selector 580 consists of integrated circuit element CD4019 (manufactured by RCA), and said integrated circuit element CD4019 is an AND OR selected gate. Its logic diagram is shown in FIG. 66. The program counter 582 consists of integrated circuit element CD4024 (manufactured by RCA) which is a ripple counter whose logic diagram is shown in FIG. 67.

The program selector 580 has the $\overline{CU}$ signal which is the output of said conditional register 574 applied to the KA terminal thereof. It has the CU signal applied to the KB terminal thereof. The selector 580 is made so that when the system is not set at a speed-light photographing mode each output signal of the terminals $A_1$, $A_2$ is produced at each of the output terminals $D_1$, $D_2$ in flash mode. While the output of the AND gate AND16 is applied to the terminal $A_1$ of said program selector 580, and AND gate AND 16 receives the SPDW signal and receive $\overline{AO}$ signal through the inverter $INV_{10}$. The ADOF signal appears at the terminal $B_1$ of said selector 580, and ASLC signal is applied into the terminal A2 of the same, while AO signal and ASLC signal are applied to the terminal B2 of the same through the OR gate OR6.

In the above set up the program selector 580 can select four computation control programs when the $\overline{CU}$ signal is "1", that is when the system is not set at a flash mode. The selector 580 can also select four computation control programs when the CU signal is "1" that is in the flash mode. Thus the eight operation control routines explained before can be considered together.

While the instruction ROM504 can carry out the instructions of $2^8$ ($=256$) steps by a combination of eight input terminals $A_0$ to $A_7$, the system of this example is made for carrying out eight routines consisting of 32 steps. By the combinations of the inputs from its terminals A5 to A7 the light operation control routines i.e. each routine of 32 steps is carried out following the inputs from the terminals $A_0$–$A_4$. The instruction ROM504 receives a CU signal at its input terminal A7, and receives the signal input from each of the output terminals $D_1$,$D_2$ of the program selector 580 at each of the input terminals A6,A5. Also, each of the input terminals $A_0$ to $A_4$ of the ROM504 receives each of the outputs $Q_1$ to $Q_5$ of the counter 582.

The program counter 582 counts up one by one in synchronism with each of falling edge of the timing pulse $TB_0$. For the start up of the instruction ROM504, some A-D conversion data DD needs to be accumulated at the D register 516 as a result of first A-D conversion. If the program counter 582 counts up while A-D conversion is not completed after a power source switch is put in and no A-D conversion data DD are accumulated at said D register 516, it may cause erroneous operation. Therefore, the program counter 582 first initiates count up operation only after A-D conversions is completed at the input control part 360 when the AE lock is not on. That is, first ADCE signal may be placed on the BAS line 366. The AE lock is not effected by introducing the Q output (6) of the Flip-Flop F19 (FIG. 58) of the input BAS selector 578 provided at the central control portion 362 and the output of the AND gate AND21 receiving the $\overline{AELK}$ signal showing that the system AE is not in a locked state into the J terminal of the JK type Flip-Flop 20. The Flip-Flop F20, is then set and its Q output is "1". Therefore, the program counter 582, which has the Q terminal output of said Flip-Flop F20 applied to the direct reset terminal RST through the inverter $INV_{11}$ and OR gate OR7, receives a zero input at the direct reset terminal RST. This occurs at the time when the Flip-Flop F20 is set. It starts count-up action in synchronism with down rising of the timing pulse TB7.

Figure 68:
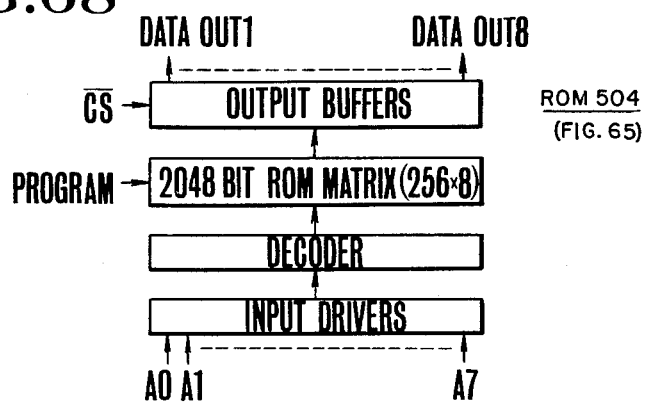
FIG. 68 shows a block diagram of the instruction ROM504.

While said instruction ROM504 has eight output terminals $OP_0$ to $OP_7$, an instruction code is formed of the output of 3 bits OP7 to OP5, and the operand code constitutes 5 bits, OP4 to $OP_0$. The instruction ROM504 is, in this example, embodied as integrated circuit element 1702A (manufactured by INTEL) whose block diagram is shown in FIG. 68.

The output code of said instruction ROM504 has such meaning as shown in the code explanation chart of FIG. 69.

The instruction code operates as follows.

Bits OP7 determine whether an instruction relates to operation or to data exchange. A bit OP7 instructs operation when OP7 is "0", while it instructs a data exchange when OP7 is "1".

When OP7 is "0", that is when an operation instruction is given, OP6 provides the instruction. When OP6 is "0", it instructions addition, while when OP6 is "1", it instructs substraction.

Also at this time OP5 serves to instruction the disposition of the result of said operation. When OP5 is "0" it instructs non-recordation of the operation result in the A register 510. When OP5 is "1", it instructs recordation of the operation result in the A register 510.

Contrary to this, when $OP_1$ is "1" that is when data exchange instruction is given, OP6 instructs the condition of data exchange. When OP6 is "0", it is invalid because the carry Flip-Flop 540 is in reset state, and when OP6 is "1", it is valid because the carry Flip-Flop 540 is in reset state.

Also at this time, OP5 is to instruct the condition of data exchange. When OP5 is "0" it is invalid because the carry Flip-Flop 540 is in set state, while when OP5 is "1", it is valid because the carry Flip-Flop 540 is in set state.

Hence, when OP7 is "0", OP6 is "0", and when OP5 is "0", the content AR of the A register 510 and the data designated by the operand code are added. However, the result thereof is not written in the A register 510, thus it means that nothing is done. This instruction will be called NOOP in the following explanation.

When OP7 is "0", OP6 is "0", and when OP5 is "1", the content AR of the A register 510 and the data designated by the operand code are added then the result thereof is written in the A register 510, that is a so-called addition is instructed. This instruction will be called as ADD in the explanations given hereinafter.

When OP7 is "0", OP6 is "1", and when OP5 is "0", the data designated by the operand code is subtracted from the content AR of the A register 510 and the result thereof is not written in the A register 510. This operation serves to find out whether the carry Flip-Flop 540 is set as a result of operation rather than to obtain the operation result. Thus the content of the A register 510 and the data designated by the operand code are compared. This instruction will be called LT in the following explanations.

When OP7 is "0", OP6 is "1", and when OP5 is "1", the data designated by the operand code is subtracted from the content AR of the A register 510 then the result thereof is written in the A register 510, that is so-called subtraction is instructed. This instruction will be called SUB in the explanations hereinafter.

When OP7 is "1", OP6 is "0", and when OP5 is "0", it instructs that the exchange of the content AR of the A register 510 and the data designated by the operand code is invalid when the carry Flip-Flop 540 is reset or is set. Thus, it instructs that nothing is to be done. This instruction will be called NOOP2 in the explanations hereinafter.

When OP7 is "1", OP6 is "0", and when OP5 is "1", it instructs that the exchange of the content AR of the A register 510 and that the data designated by the operand code is invalid because the carry Flip-Flop 540 is reset, but is valid when the same is set. Thus it instructs performance of data exchange only when the carry Flip-Flop 540 is set. This instruction will be called SWC in the following explanations.

When OP7 is "1", OP6 is "1", and when OP5 is "0", the exchange of the content AR of the A register 510 and the data designated by the operand code is valid as the carry Flip-Flop 540 is reset but said exchange is invalid as it is set. Thus it instructs that the data exchange is to be done only when the carry Flip-Flop 540 is reset. This instruction will be called SWN in the following explanations.

When OP7 is "7", OP6 is "1", and when OP5 is "1", it is instructed that the exchange of the content AR of the A register 510 and the data designated by the operand code is valid either when the carry Flip-Flop 540 is reset or set, thus it instructs to conduct data exchange regardless of the state of the carry Flip-Flop 540. This instruction will be called SWU in the explanations hereinafter.

In the case of data exchange when the operand with which the data exchange is to be preformed by the A register 510 is B register 512 or C register 514, the content AR of the A register 510 can be written in the operand. However, when the operand is fixed data or set data, the content AR of the A of the register 510 can not be written in the operand. Therefore in this case, so-called data read out operation wherein the data of operand is one sidedly written in the A register 510 is done instead of data exchange. However, in the system of this example a data exchange instruction and a data read out instruction are not specifically distinguished. The data exchange instruction works as such only when the operand is a register. It works as a data read out instruction when the operand is other than the register.

As has been explained above said instruction ROM504 has eight instruction systems mentioned above.

In the operand code, OP4 distinguishes whether an operand is fixed data or variable data. When OP4 is "0", an operand is fixed data and the fixed data designated OP3 to OP0 from the fixed data ROM534. Also when OP4 is "0", operands are variable data, and the variable data applied from each of the input terminals a to i of the data selector 502 are to be designated.

When OP4 is "0" that is concerning fixed data, the data designated by OP3 to OP0 will be $CST_0$ data of total bits "0" when OP3, OP2, OP1, OP0 are "0000". It will be the CSTC data of "11100000" when the same are "0010". It will be the CSTD data of "11010000" when the same are "0100", and will be the CSTE data of "00011111" when the same are "0110". It will be the CSTF data with all bits "1" when the same are "0111", also will be the slowest shutter speed TMIN controllable by the body 4 of the camera device when OP3, OP2, OP1, OP0 are "1000". It will be the highest shutter speed TMA4 controllable by the body 4 of the camera device when the same are "1001", and will be the maximum aperture value AMA4 controllable by the lens device 2 when the same are "1010". It will be shutter speed TSYN synchronized with speed-light being controlled by the camera device body 4 when the same are "1011", and will be the first constant CST1 for operation when the same are "1100". It will be the second constant CST2 for operation when the same are "1101".

When OP4 is "1", that is when it indicates variable data, the data designated by OP3 to OP0 will be the content DR of the D register 516 that is DTPR which is A - D conversion data DD when OP3, OP2, OP1, OP0 are "1000". It will be DTSV at the time of "1001", DTTV at the time of "1010", DTAV at the time of "1011", DTAO at the time of "1100", DTAC at the time of "1101", DTBR which is the content BR of the B register at the time of "1110", and DTCR which is the content CR of C register at the time of "1111".

The cross-reference table of the addresses and instructions of said instruction ROM504 and operand code is shown in FIG. 70 (a) to (h).

FIG. 70 (a) shows the routines selected when the inputs of the terminals A7 to A5 of the instructions ROM504 are all "038 and are routines applied at a time of non flash mode, or at a time when the diaphragm is not closed with apriority on shutter speed, or during the the external light measuring mode. This corresponds to the third routine shown in FIG. 29.

Also shown in FIG. 70(b) are routines selected when the inputs at the terminals A7, A6 of the instruction ROM504 are "0" and the input of the A5 terminal is "1". The routines are applied when the diaphragm is not closed not being in a speedlight photographing mode with a priority on apecture value, or in the external light measuring mode. This corresponds to the first routine shown in FIG. 29.

Also shown in FIG. 70 (c) are the routines selected when the input at the terminals A7, A5 of the instruction ROM504 are "0" and the input at the terminal A6 is "1". These routines are applied at a time when flash mode is not applied with priority on aperture value and diaphragm is closed not in the external light measuring mode. This corresponds to the second routine shown in FIG. 29.

Also are shown in FIG. 70 (d) are routines selected when the input at the terminal A7 of the instruction ROM504 is "0" and the inputs at the terminals A6, A5 are "1". The routines are applied when speedlight photographing mode is not applied with a priority on shutter time and diaphragm is closed not being under external light measuring mode. This corresponds to the fourth routine shown in FIG. 29.

FIG. 70 (e) also shows routines selected when the input at the terminal A7 of the instruction ROM504 is "1", and the inputs at the terminals A6, A5 are "0". The routines are applied when the charging at a flash unit is completed and a flash mode is set then the aperture value of the lens device 2 is set at the flash unit device side. At the same time the shutter speed at the camera is controlled semi-automatically. These routines will be called the fifth routine in the following explanations.

Also what are shown in FIG. 70 (f) are routines selected when the inputs at the terminals A7, A5 of the instruction ROM504 are "1" and the input at the terminal A6 is "0". These routines are applied when the aperture value of the lens device 2 is set at the speedlight device side and at the same time the shutter speed at the camera is controlled in a completely automatic manner. The routines will be called the sixth routine in the following explanations.

Also what are shown in FIG. 70 (g) are the routines selected when the inputs as the terminals A7, A6 of the instruction ROM504 are "1" and the input at the terminal A5 is "0". These routines are applied when the aperture value of the lens device 2 is set at the camera device side and at the same time the shutter speed at the camera is controlled semi-automatically. These routines will be called the seventh routine in the explanations hereinafter.

Also what are shown in FIG. 70 (h) are the routines selected when the inputs at the terminals A7, A6, A5 of the instruction ROM504 are "1". These routines are applied when the aperture value of the lens device 2 is set at the camera device side. At the same side the shutter speed at the camera device side is controlled in a fully automatic manner. These routines will be called the eighth routine in the explanations given hereinafter.

If external light measuring adapter is used, the first or third routine is employed on the basis of the ASLC signal. This that is, when measuring light with an external light measuring adapter, the fully opened aperture value AVo of the photographing lens 2 and vignetting error AVc need not be considered. Therefore the steps of correcting for the fully opened aperture value AVo and the vignetting error AVc may be disregarded in carrying out the first and third routines. These steps in the first and third routines are ADD-DTAO at the eighth step and ADD-DTAC at the ninth step in FIG. 70 (a), (b).

When the A-D converter overflows especially in carrying out the fifth and eighth routines, the signal ADOF the necessity to manually set the aperture value of the lens 2 during flash operation. However when the A-D converter 382 overflows during the first to eighth routines, the signal ADOF indicates that the data obtained as a result of light measuring are excessive. In that case some warning needs to be issued. Also, the content of the overflowing register unknown. It needs to be made equal to the maximum capacity of the register, that is "1". This operation can be regarded as totally equivalent with the overflow of the A register 510 when the film sensitivity SV, the fully-opened aperture value AVo, the vignetting error AV, etc. are added to BVo, the light measuring result. Therefore, in this example when the A-D converter 382 overflows when not in a flash mode, a direct-set signal is applied to the carry Flip-Flop 540 in a step next to the above mentioned addition step that is in the A step out of the steps to carry out first to fourth operation routines. This serves for setting said carry Flip-Flop 540.

Also, when the aperture value or shutter speed obtained as a result of operation exceed the maximum or minimum limit of the aperture value of the lens device 2 or the limit of the shutter speed controllable by the body 4, a warning to show the same is required.

This can be easily realized by intermittently flashing the display aperture value or display shutter speed of the digital display device 402. This indicates whether the operation result falls within the aperture value or shutter speed limits. The flickering aperture value display signal AVFL or the flickering shutter speed display signal TVFL may be generated on the basis of the set or reset state of the carry Flip-Flop 540. Thus the output of the Flip-Flop 540 may be observed at the E step and G step of the first to fourth operation routines.

As mentioned a theory circuit 586 generates the signals for displaying aperture value or shutter speed of the digital display device 402 when the overflow generated as a result of A-D conversion, the overflow generated as a result of addition of various data to the light measuring data, and the aperture value or shutter speed obtained as a result of operation exceed the marginal value of control.

The theory circuit 586 receives the output of the carry Flip-Flop 540 and the output of said program selector 580. It distinguishes the output of said carry Flip-Flop 540 at the specific address designated at the program selector 580 and issues signal to intermittently flash the shutter speed or aperture value displayed at the digital display device 402.

The flickering shutter speed signal TVFL from theory circuit 586 appears at multiplexer 594 after being memorized in the Flip-Flop 588. The flickering aperture signal AVF is applied to the multiplexer 594 after being memorized by a Flip-Flop 590.

Now, since the conditions for intermittent flashing the shutter speed or aperture value displayed at the device 402 have been previously explained they will be omitted here. A detailed explanations will be given to show under what circumstances such a flickering signal will be generated in this system.

The theory circuit 586 receives RSND signal from the theory circuit 598 and said Flip-Flops 588, 590 are reset by the RSND signal.

The theories for generating a signal for disregarding the eighth and ninth steps when the external light measuring adapter is used, for directly setting the carry Flip-Flop 540 by the ADOF signal generated at other times than the flash mode, and for applying a flickering signal to the digital display device 402 during AD conversion overflow are all related to the output of program selector 580.

Figure 71:
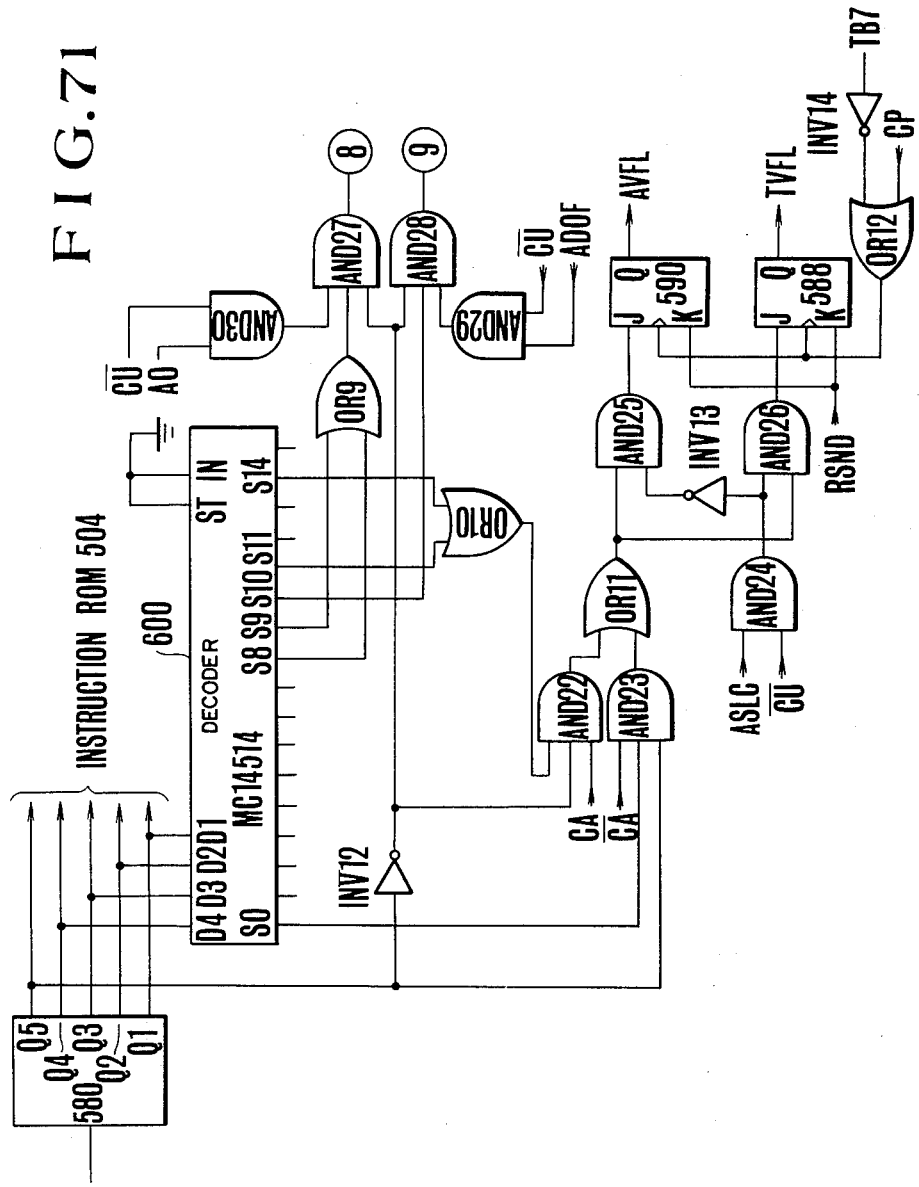
FIG. 71 shows the structure of the output logic circuit of the address decoder 600.
Figure 72:
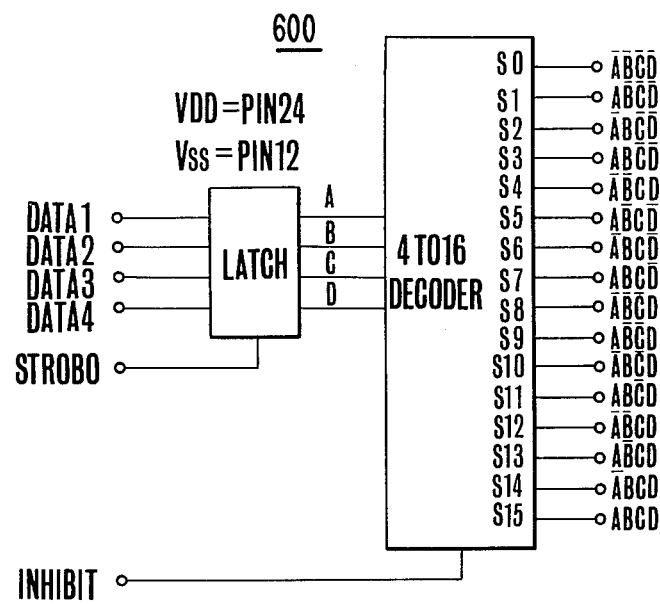
FIG. 72 shows a block diagram of the I.C. circuit element MC14514.
Figure 73:
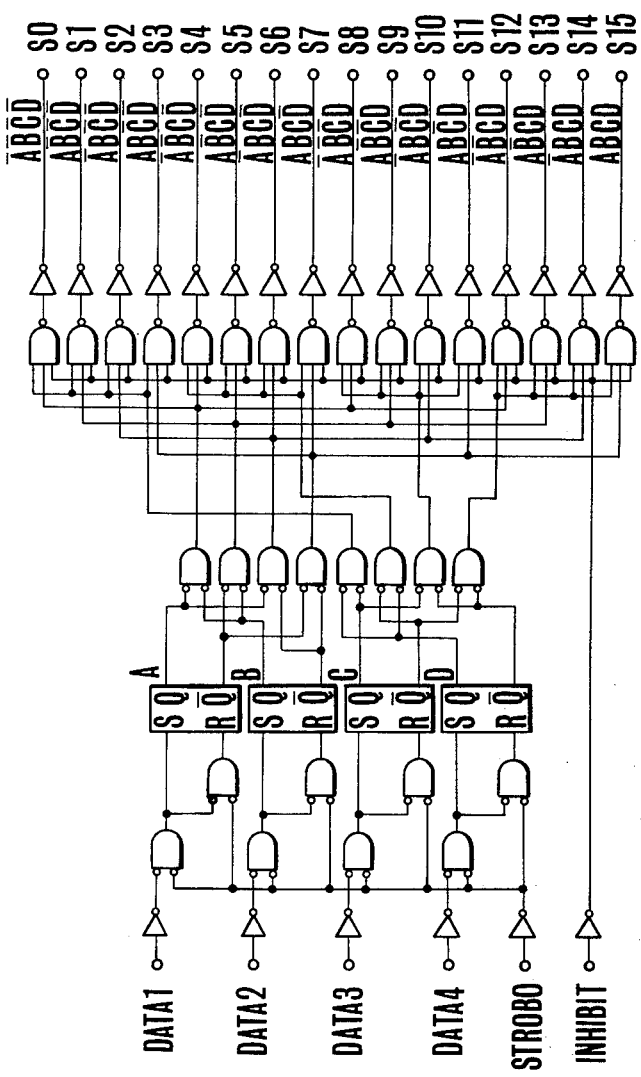
FIG. 73 shows a logic diagram of the I.C. circuit element MC14514.

The circuit arrangement for these theories is shown in FIG. 71. Here, a 4 bit latch - 16 line decover 600 is composed of integrated circuit element MC14514 (manufactured by MOTOROLA). A block diagram of the integrated circuit element MC14514 appears in FIG. 72 and a logic diagram in FIG. 73. The circuit decodes 4 bits from D1 to D4 and produces outputs at the 16 output lines S0 to S15.

In FIG. 71, the outputs Q1 to Q4 of the program selector 580 are applied to the terminals D1 to D4 of the decoder 600. In the same drawing, the AND gate AND27 detects the eighth step and ninth step in the first or third routine in the external light measuring mode for producing the performance control signal ⑧ of the program. Gate AND27 receives an input of the signal to show external light measuring mode obtained by giving CU signal and AO signal to the AND gate AND30. At the same time it receives the inversion signal of the Q5 output of said program counter 580 from the inverter INV12 and the signal of the outputs S8, S9 of said decoder 600 through OR gate OR9. It produces the signal 8 following the AND theory of the signal showing that the system is in the external light measuring mode and of the signal showing that the output of the program counter 580 is at the eighth step or ninth step.

An AND gate AND28 detects the 10th step of the first to fourth routines when the A-D converter 382 overflows and the system is not in a flash mode and produces the set signal 9 to directly set the carry Flip-Flop 540. The gate AND28 receives an input signal to show that the A-D converter 382 overflows when the system is not in a flash mode. This is done by CU signal and ADOF signal to AND gate AND29. At the same time it receives the inverse of the signal at the y5 output of said program selector 580 through the inverter INV12. It also receives the output S10 of said decoder 600. It produces the signal 9. It follows the AND theory of the ADOF signal when the system is not in the flash mode. The signal from the output 510 shows that the output of said program selector 580 is at the 10th step.

The AND gate AND25 applies an input to the J terminal of the Flip-Flop 590 to produce the signal AVFL for intermittently flashing the display aperture value of the digital display device 402. The AND gate AND26 applies an input to the J terminal of the Flip-Flop 588 to produce a signal TVFL to intermittently display the Shutter speed in the digital display device 402. The AND gate AND 24 receives a signal ASLC and a signal CU to show that aperture priority is selected when the system is not in the flash mode. The output is applied directly to the AND gate AND26 and the AND gate AND25 through the inverter INV13. This is done because operation in the aperture priority mode selects the shutter speed. Thus it serves to prevent the signal which produces flickering from reaching the J terminal of the Flip-Flop 590 for outputting the AVFL signal as said signal comes. By contrast, when not in the aperture priority mode that is in the shutter priority mode the operation produces the aperture value. Thus it serves to prevent the signal which directs flickering from reaching the J terminal of the Flip-Flop 588. The latter produces the TVFL signal.

The flicker signal comes from the OR gate OR11 and is applied to both of the AND gates AND25 and AND26. The OR gate output contains the two conditions to produce the signal which causes flickering.

One condition is applied through the AND gate AND22 to set the carry Flip-Flop 540. The AND gate AND22 receives the input of the set signal CA from the carry Flip-Flop 540.

The second condition appears through the AND gate AND23 to reset the carry Flip-Flop 540. The AND gate AND23 receives the input of reset signal CA from the carry Flip-Flop 540.

The AND gate AND22 has the S11, S14 outputs of said decoder 600 applied thereto through the OR gate OR10. At a same time has the Q5 output of said program selector 580 inputter therein through the inverter INV12. Therefore it is made for receiving the input of CA signal from the carry Flip-Flop 540 and producing output "1" at a time when the program step by said program counter 580 is B step and E step.

Also said AND gate AND23 has the S0 output of said decoder 600 and the Q5 output of said program selector 580 inputted therein. Therefore it is made for producing the output "1" when the input of CA signal is received from the carry Flip-Flop 540 and the program step by said program selector 580 is G step.

A detailed explanation will appear later to illustrate the condition for producing the carry signal CA from the carry Flip-Flop 540.

Now, each of said Flip-Flops 588 and 590 receives the clock pulse CP and the inverted timing pulse TB through the inverter INV14. That is, said two Flip-Flops 588, 590 are in synchronism with the rising edge of first clock pulse CP at the time of the timing pulse TB7.

Also each of said Flip-Flops 588, 590 receives the RSND signal at its K terminal. The RSND signal is such that since each routine being proceeded by the program processing output of the program counter 580 is as apparent from FIG. 70 at step L, common to eight routines. As the output of said program selector 580 comes to step M and further the CALE signal showing completing of operation is produced. Then the signal to direct the transfer of each of data obtained as the results of operation thereafter will be produced. The very signal just mentioned is the RSND signal.

The CALE signal and RSND signal are obtained through the logic set up of the theory circuit 598 as shown in FIG. 65.

The CALE signal is produced by the AND gate AND68 which receives the output of the AND gate AND20. The latter receives the Q5, Q4 outputs of said program counter 582 and the inverted output of the Q3 output of said program counter 582 through the inverter INV23. The CALE signal is high among the 4 words from step X to step R of the program step as being apparent from FIG. 70.

Also the RSND signal is emitted from the AND gate AND 9 which has the Q2, Q3 outputs of said program counter 582 applied thereto through the OR gate OR8 and the output of said AND gate AND20. That is the signal which is at high level among 8 words from X step to V step, i.e. the last step of the program step entered therein. Therefore the RSND signal will be produced as the signal set at high level among 6 words from Q step to V step, i.e., the last step of the program step as apparent from FIG. 70.

The AND condition signal of the output of the AND gate AND18, that is the Q3, Q0 output of said program counter 582 and the output of said AND gate AND20, is applied to the direct reset terminal RST of said program counter 582 through the OR gate OR7. At this time the output of said AND gate AND18 is set at high level for 1 word of step T of the program step shown in FIG. 70. However, since the program counter 582 is directly reset, as the output of the AND gate AND18 becomes goes high, the output of the AND gate AND18 goes low at a rising edge.

Similarly, since said RSND signal goes low at a moment when the program step step T, the RSND signal will be produced as the signal being at high level among 3 words virtually from Q step to S step.

Also, CALE signal is applied into the AND gate AND62, instituting the partial theory circuit. Since the AND gate AND62receives the input of the timing pulse TB5, it produces an output of "1" signal being synchronized with the timing pulse TB5 while the CALE signal is at high level. The CALE signal being in synchronism with the timing pulse TB5 is placed on BAS line 366 for 4 words through the OR GATE OR22. On the other hand the theory circuit 598 places the timing pulse TB4 unconditionally on the BAS line 366 from the OR gate OR22.

Therefore, a "0" signal will be placed for 4 bits being in synchronism with the timing pulse TB0 to TB3 on the BAS line 366, and "1" signal will be placed on the same in synchronism with the timing pulse TB4, and CALE signal will be placed on the same in synchronism with the timing pulse TB5, ADCE signal in synchronism with the timing pulse TB6, and INT signal in synchronism with the timing pulse TB7.

Details of the circuit for taking in the data selector 502 and fixed data ROM534 shown in FIG. 30. The circuit for the maximum aperture value AMAX of the lens device 2 used following the circuit set up diagram is shown in FIG. 75.

The fixed data ROM534 has 11 data, CSTO, CSTC, CSTD, CSTE, CSTF, TMIN, TMAX, AMAX, TSYN, CST1, CST2 housed in series and consists of six of said series data arranged in parallel. However, the data AMAX only relating to the maximum aperture value of the photographing lens device 2, is different in each of the six parallel data. It contains the data relating to the values of F11, F16, F22, F32, F45, F64 in F number. The fixed data ROM534 can basically be made of the integrated circuit element 1702A as shown in FIG. 68.

In such a data arrangement, the fixed data ROM534 receives the outputs of OP3 to OP0 of the instruction ROM504 at its A3-A6 input terminals, and has specific data of said series data designated. Therefore, by applying the counter pulses CT1 to CT4 terminals A0 to A2, respectively, six identical data except AMAX will be produced consecutively from the outer unit in synchronism with the timing pulses TB0 to TB7 from the output terminals Q0 to Q5 of said ROM534.

While the output of said Q0 to Q5 will be entered into the AND gates AND31 to AND36 respectively, said AND gate AND31 to AND36 will be selectively conductive by the maximum aperture value of the photographing lens device 2 used. The outputs of this AND gates AND31 to AND36 are integrated in the OR gate OR12, and the fixed data designated by the instruction ROM504 will be produced by the OR gate OR12.

On the other hand, data relating to the maximum aperture value AMAX of the photographing lens device 2 used are taken into the central control part 362 from the maximum aperture value setting mechanism 536 and are taken into the shift register 358 of 6 bits. The shift register 538 can be made by using 6 bits of the integrated circuit element CD4015 having its logic diagram shown in FIG. 62. The outputs of Q1 to Q6 of said shift register 538 are always applied to the input terminals D1 to D6 of the buffer register 602, and the content of said shift register 538 is taken in the buffer-register 602 and memorized in synchronism with the rising edge of the timing pulse TB0 being given to said buffer register 602 as a clock signal. That is, the data AMAX' being taken in the shift register 538 is in synchronism with TB1 to TB6. Therefore since the AMAX' is in a state being completely taken in said shift register 538 at a timing of TB7, conent of the shift register 538 is taken in the buffer register 602 and memorized in the up rising of TB0.

The Q1 to Q6 outputs of said buffer register 602 are applied to the AND gates AND31 to AND36 and make one of the AND gates AND31 to AND36 selectively conductive.

Here, the fixed data ROM534 receives the OP output of the instruction ROM504 at its CS terminal, and as apparent from the column OP4 of operand code shown in FIG. 69, outputs the data designated by the instruction ROM504 through Q0 to Q5 terminals only when said OP4 is "0".

Also, said buffer register 602 can be made by combining three of integrated circuit elements CD4013 (manufactured by RCA). And the integrated circuit element CD4013 is a D type Flip-Flop of dual type as being shown in the block diagram of FIG. 76.

When the fixed data housed in said fixed data ROM534 are designated as operand by the instruction ROM504 in the aforementioned set up, the fixed data designated against the signal line 10 will be produced consecutively from lower unit in synchronism with the timing pulses TB0 to TB7 from the wired OR gate OR13 receiving the output of said OR gate OR12.

On the other hand the output of the data selector 502 is applied to said wire OR gate OR13. The data selector 502 is 8 channel data selector consisting of integrated circuit element MC14512 (manufactured by MOTOR-OLA) having its logic diagram shown in FIG. 53. It is made so that the data applied to its X0 to X7 terminals are outputted selectively from Z terminal following the input signal from the terminals A, B, C. Each output of OP0, OP1, OP2 is inputted into each of the terminals A, B, C from the instruction ROM504, and as apparent from FIG. 69, each of the various data DR, DTSV, DTTV, DTAV, DTAO, DTAO, DTAC, BR, CR are selectively outputted the Z terminal by combination of the output OP0, OP, OP2. Also, this data selector 502 receives the input of the OP4 signal at its DIS terminal through the inverter INV14, and receives the input of the OP3 signal through the inverter INV15 at its INH terminal. However as apparent from the columns of said OP4, OP3 of the operand code shown in FIG. 69, said data selector 502 outputs out of the Z terminal the variable data inputter from the X0 to X7 terminals only when said OP4, OP3 are "1", and outputs the same at the signal line 10 through the wired OR gate OR13.

When the variable data selected by said data selector 502 are designated as operand at the instruction ROM504 through the aforementioned set up the following occurs. The variable data designated to the signal line 10 are produced consecutively from lower unit in synchronism with the timing pulses TB0 to TB7 from the wired OR gate OR13 receiving the Z terminal output of said data selector 502.

Also, the theoretical circuit 592 receives the inputs of MANAL signal, $\overline{\text{MNAL}}$ signal, BLB signal, $\overline{\text{SPDW}}$ signal, SPDW signal, $\overline{\text{ASLC}}$ signal from said condition signal memorizing circuit 548. At the same time it receives the inputs of $\overline{\text{AECG}}$ signal, WNUP signal, C signal from said condition register 574. The theory circuit 592 distinguishes the above mentioned various signals based on a certain logic and forms display control signal of the digital display device 402 against the output control part 364 and the control signal of the output control part 364.

The theory circuit 592 produces the WNUP signal to show completion of film windup, the display instruction signal EDSP for the warning signal, "EEEEEE", the display instruction signal BDSP for "bulb" display, the display instruction signal EFDS for "EF" to show completion of speedlight charging at a time of speedlight photographing mode, and the display instruction signal MDSP for "M" to show the necessity for manually setting the aperture of the lens device 2 are outputted.

The EDSP signal is generated when there is a handling error of a camera device. This output is based on the two states. One case occurs when the lens 2 is closed by the closing lever 64 in a state wherein the mark 12 is selected in the lens device 2 as has been mentioned above. In the other case the mark 12 is selected in the lens device 2 in the state of completing the windup of film and the AE lever 94 at the body 4 side is in a state of AE discharge in a state when the lever 64 does not close the lens 2.

That is, said EDSP signal is produced in a state satisfying the following theoretical equation:

$$\text{EDSP} = \text{SPDW} \cdot \overline{\text{MNAL}} + \overline{\text{SPDW}} \cdot \text{MNAL} \cdot \text{W-NUP} \cdot \overline{\text{AECG}} \quad (18).$$

Also BDSP signal is the signal produced when the bulb signal BLB is "1".

Also EFDS signal is the signal produced when CU signal is "1".

Also, the MDSP signal is produced in such two states that the closing of the lens device 2 by the diaphragm closing lever 64 is not done in a state wherein aperture value is set by the aperture setting ring 8 of the lens 2, or the diaphragm closing by the diaphragm closing 64 is done at a time of shutter priority mode. That is, MDSP signal is produced in a state that satisfies the following theoretical equation:

$$MDSP = \overline{SPDW} \; MNAL + SPDW \; MNAL \; \overline{ASLC} \qquad (19).$$

The theory circuit 592 has its logic diagram shown in FIG. 77. In said drawing, AND gates AND37, AND38, AND39 and the OR gate OR14 are theoretical set up to satisfy said equation (18), and EDSP signal is obtained from OR gate OR14. Also the AND gates AND40, AND41 and OR gate OR15 are theoretical set up to satisfy said equation (19), and MDSP signal is obtained from the OR gate OR15.

The output of said theory circuit 592 and the outputs TVF, AVF of the Flip-Flops 588, 590 are then given to the multiplexer 594. They are converted to a synchronized with the timing pulses TB0 to TB7.

FIG. 78 is a block diagram of the multiplexer 594 in FIG. 30. An integrated circuit element MC14512 having its detailed logic diagram shown in FIG. 53 is used for the multiplexer. Such multiplexer has the output terminals X0 to X7, and the X0 terminal is grounded, its X1 terminal receives the input of WNUP SIGNAL, its X2 terminal receives the input of AVFL signal, its X3 terminal receives the input of TVFL signal, its X4 terminal receives the input of EDSP signal, its X5 terminal receives the input of BDSP signal, its X6 terminal receives the input of EFDS signal, and its X7 terminal receives the input of MDSP signal. These input signals are applied in series to the signal line 11 from the Z terminal as the signal and synchronized with the timing pulses TB0 to TB7 from the counter pulses CT1, CT2, CT4 being applied to each of the terminals A, B, C.

As has been mentioned above the WNUP signal appears at the signal line 11 in synchronism with the timing pulse TB1. The AVFV signal is outputted at the same in synchronism with the timing pulse TB2, TVFL signal with the timing pulse TB3, EDSP signal with the timing pulse TB4, BDSP signal with the timing pulse TB5, EFDS signal with the timing pulse TB6, and MDSP signal with the timing pulse TB9.

Here, said multiplexer 594 receives the input of RSND signal at its INH terminal, and has the signal output from its Z terminal controlled while the RSND signal is produced.

Figure 79:
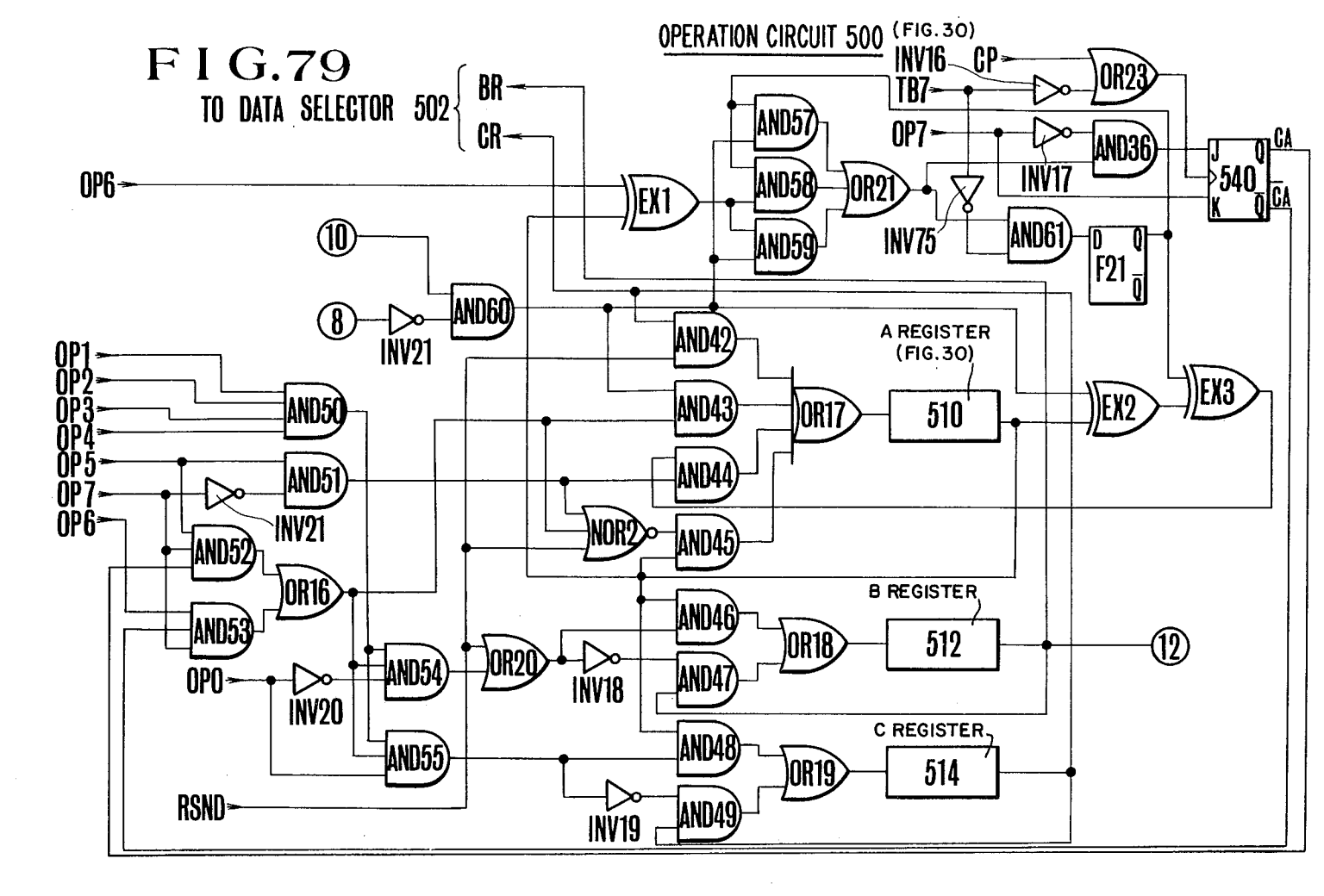

FIG. 79 is a logic diagram of the operation circuit 500 shown in FIG. 30. The AND gate AND45 in said drawing is a circulating gate for A register 510. The AND gate AND47 is a circulating gate for B register 512, while the AND gate AND49 is a circulating gate for C register 514, respectively. The A register 510, B register 512, C register 514 circulate the contents AR, BR, CR, respectively thereof, through each of said AND gates AND45, AND47, AND49.

The operation circuit 500 is controlled by the operation control instructions OP0, OP1, OP2, OP3, OP4, OP5, OP6, OP7, from the instruction ROM504. While the output of said instruction ROM504 is divided into the instruction codes OP7, OP6, OP5 and the operand codes OP4, OP3, OP2, OP1, OP0 as shown in FIG. 69, each of said codes is decoded to conduct the required operation and control the action in the operation circuit 500.

Also while operation circuit 500 takes in various fixed data and variable data through the data selector 502, these data are taken in the AND gate AND60 from the output signal line 10 of the circuit shown in FIG. 75. The AND gate AND60 takes in the signal of the output signal line 8 of the circuit shown in FIG. 71 through the inverter INV21. This is done for controlling the taking in of the data of designated operand only during the step unnecessary operation at a time of external light measuring mode so that virtually unnecessary operation will not be done. The output of said AND gate AND60 is applied to the AND gate AND43, the EXCLUSIVE OR gate EX2 and the AND gate AND57, AND59. The AND gate AND43 is used in directly taking the data of operand into the A register 510. The EXCLUSIVE OR gate EX2 and AND gates AND57, AND59 are used when the data AR of A register 510 and the data of operand are operated.

In FIG. 79, the EXCLUSIVE OR gates EX1, EX2, EX3 and the AND gates AND57, AND58, AND59, AND61, and OR gate OR21, the Flip-Flop F21 constitute an operating part. The structure of the operating part is a well known addition subtraction circuit which functions as an addition circuit when OP6, the input of the EXCLUSIVE OR gate EX1 is "0" and functions as a subtraction circuit when OP6 is "1". This is a set up following an instruction system in which addition is done when OP6 is "0" while the subtraction is done when OP6 is "1" as shown in the column for OP6 in FIG. 69. While the Flip-Flop F21 is a carry Flip-Flop to memorize the carry generated from the OR gate OR21 and is ordinarily to memorize the carry in operation, the carry generated in operation of the last unit that is the carry outputted from the OR gate OR21 with the timing of TB7 nis controlled by the AND gate AND61 which receives the timing pulse TB7 through the inverter INV15. The carry produced by the OR gate OR21 is applied to J terminal of the carry Flip-Flop 540 through the AND gate AND56. The carry Flip-Flop 540 has an inverted signal from the inverter INV16 of the timing pulse TB7 and the OR condition signal by the OR gate OR23 of the clock pulse CP being inputted as its clock input. Thus, the Flip-Flop 540 sets or resets in synchronism with the rising edge of the first clock pulse CP of the timing of TB7. That is, said carry Flip-Flop 540 is set by the carry generated in the timing pulse TB7 that is the carry generated in the last step of operation.

Because the instruction code OP7 becomes "1" when not in the operation mode, as apparent from FIG. 69, the ANd gate AND56 receiving the input of OP7 through the inverter INV17 has its output controlled.

As has been mentioned above the carry generated as a result of operation is detected and memorized by the carry Flip-Flop 540, then is produced as signal $\overline{CA}$ from its Q output and as CA signal from the $\overline{Q}$ output terminal.

Now, the operation result obtained by the addition subtraction circuit is outputted through the EXCLUSIVE OR gate EX3 and is given to the AND gate AND44. Since the output of said AND gate AND44 is given to the A register 510 through the OR gate OR17, if the AND gate AND44 is conducted through, said operation result will be introduced into and memorized by the A register 510. As has been mentioned the operation result is taken in the A register 510, as apparent from FIG. 69, at a time when the system is at operation mode and the instruction signal of the A register ON is issued. That is, when OP7 is "0", the AND gate AND45 for data circulation may become non-conductive while the AND gate AND44 for taking in the operation result may become conductive. Provided for that end are AND gate AND51, the inverter INV21, and NOR gate NOR2. Said AND gate AND51 receives the input of the inversion signal of OP5 and OP7 obtained through the inverter INV21. It is made to produce a "1" output only when OP7 is "0" and OP5 is "1", that is, when the output instruction from the instruction ROM504 is ADD or SUB. The "1" output of the AND gate AND51 is applied to the AND gate AND44 making said gate 44 conductive and is given to the AND gate AND45 after being inverted by the NOR gate NOR2, prohibiting the gate 45.

Operation results are introduced into A register 510 through the above mentioned set up.

The AND gate AND43 is a gate provided to take the fixed or variable data inputted through the AND gate AND60 into A register 510, and the other input terminals receive the output of the AND gates AND52 and AND53 through the OR gate OR16. Said AND gates AND52 and AND53 will not be conducted through unless at least OP7 is "1" that is at a time of data exchange mode as apparent from FIG. 69. The AND gate 53 also receives the output CA of the carry Flip-Flop 540 and the input of OP5, and, as apparent from FIG. 59, is to produce "1" output when OP5 is "1" and the carry CA is "1". Also the AND gates AND52 receives the $\overline{Q}$ output CA of said carry Flip-Flop 540 and the input of OP6, and as apparent from FIG. 69, produces "1" output when OP6 is "1" and the carry CA is "0". The output of the AND gate AND52 becomes "1" through the above mentioned set up when SWC instruction or SWU instruction is transmitted, and the output of the AND gate AND53 becomes "1" when SWN instruction or SWU instruction is transmitted.

If the output state of the carry Flip-Flop 540 matched with the condition outputted from the instruction ROM504 at a time of data exchange mode through the above mentioned set up, "1" output is produced from the OR gate OR16, making the AND gate AND43 conductive, thus the variable or fixed data of operand being introduced through the AND gate AND60 will be taken in and memorized by A register 510. Also at this time the "1" output of said OR gate OR16 is given to the AND gate AND45 as "0" signal through NOR gate NOR2, therefore the circulation of A register 510 by said gate AND45 will be prohibited.

On the other hand, while the output of A register 510 is applied to the AND gates AND46 and AND48, this is done to take in the data of operand into A register 510 when the data of operand is B register BR of C register CR at a time of data exchange mode and at a same time to shift the data which have been memorized so far in A register 510 to operand.

When B register 512 or C register 514 is selected as operand, as apparent from FIG. 69, the OR4, OP3, OP2, OP1 out of operand codes will all become "1". This will be detected by the AND gate AND50. On the other hand when OPO is "0" at this time, B register 512 is selected while C register 514 is selected when OPO is "1". Thus OPO is applied directly to the AND-gate AND55 and at the same time to the AND gate AND54 through the inverter INV20. Since the output of AND gate AND50 and of said OR gate OR16 are given to said AND gate AND54, B register 512 is designated asoperand in data exchange mode, the AND gate AND54 produces "1" output only when the condition for data exchange is satisfied, and said "1" output is applied to the AND gate AND46 through OR gate OR20. Therefore, the AND gate AND46 becomes conductive, thus the data of A register 510 will be taken into B register 512 through said AND gate AND46, OR gate OR18. Also since "1" output of OR gate OR20 is given to the AND gate AND47 through the inverter INV18 at the time, the AND gate AND47 for circulating the data BR of B register 512 will be prohibited. Also since the output of said AND gate AND50 and the output of said OR gate OR16 are given to said AND gate AND50 beside OPO signal, said AND gate AND55 produces "1" output. It applies the same to said AND gate AND48 only when C register 514 is designated as operand in data exchange mode and the condition for data exchange is satisfied. Therefore, the AND gate AND46 becomes conductive, thus the data of A register 510 will be taken in C register 514 through said AND gate AND48, OR gate OR19. Now, since the "1" output of the AND gate AND55 is applied to the AND gate AND49 through the inverter INV19 at this time, the AND gate AND49 for circulating the data CR of C register 514 will be prohibited.

Here, since said carry Flip-Flop 540 receives the input of OP7 at its K terminal, it is placed in reset state in synchronism with the rising edge of first clock-pulse CP of the time of the first timing pulse TB7 in data exchange mode. The instructed data exchange will be completed at a time as entering into the timing of said TB7.

The operation circuit 500 (FIG. 79) conducts the necessary operation or data exchange following the instruction from the instruction ROM504 through the above mentioned set up. The controlled aperture value for display in the digital display device 402 or the data relating the aperture value are obtained finally at the A register 510 regardless of the fact whether they are obtained as a result of operation or are originally set by activating said operation circuit 500 following each routine shown in FIG. 70, the control data relating to shutter speed for display or control will be obtained at B register 512 regardless of the fact whether it is obtained as a result of operation or is originally set, the control data to control the diaphragm closing step number of the lens device 2 is obtained at C register 514.

While the RSND signal is produced from the theory circuit 598 which receives the output from the program counter 582 as the operation by said operation circuit 500 is completed as mentioned above, the RSND signal is at a high level during the 3 words after the operation is completed.

The RSND signal is applied to the AND gate AND42, NOR gate NOR2, OR gate OR20 of the operation circuit 500 shown in FIG. 79, therefore the AND gates AND42, AND46 will become conducted, while AND gates AND45, AND47 will be prohibited. Therefore, the output of C register 514 is directly coupled with A register 510 through the AND gate AND42, OR gate OR17, and the output of A register 510 is directly coupled with B register 512 through the AND gate AND46, OR gate OR18. Therefore, the data AR, BR, CR of each of said registers A, B, C will be produced consecutively in the order of the content BR of B register 512, the content AR of A register 510, the content CR of C register 514, during 3 words wherein the signal of RSND is "1", from the signal line (12).

The output of the signal line (11) of the multiplexer 594 shown in FIG. 78 and the output of the output line (12) of the operation circuit shown in FIG. 79 will be given to the output theory circuit 596. The output theory circuit 596 has the logic diagram shown in FIG. 80. The output theory circuit 596 performs such role as placing the time controlled data and signal on the output BAS line 374.

The output theory circuit 596 has OR gate OR24 at its output terminal to the output BAS line 374, and the output of the signal line (11) and each of the outputs of AND gatesAND64, AND63 will be given to said OR gate. The output of the signal line (11) is the WNUP signal, the AVFL signal, the TVFL signal, the EDSP signal, the BDSP signal, the EFDS signal, the MDSP signal in synchronism with the timing pulses TB1 to TB7 from the multiplexer 594, and is, as it is, placed on the output BAS line 374 through the OR gate OR24. The output of this multiplexer 594 has its output controlled during 3 words during which RSND signal is at high level as has been mentioned before.

On the other hand when the RSND signal becomes to have high level, said high level signal makes the AND gate AND65 which receives the output of the signal line (12) from said operation circuit 500 conductive. While the output of the AND gate AND65 is given to the AND gate AND64, said AND gate AND64 receives the output of NAND gate NAND3 which has the signal BLB to show bulb mode inputted from the set condition memorizing circuit 548 and has the signal $\overline{CU}$ to show that the system is not at a speed-light photographing mode inputted from the condition register 574, therefore, the AND gate AND64 will be conductive unless the system is at speed-light photographing mode and the bulb is set as shutter speed. Therefore, the content BR, AR, CR of the B register 512, A reister 510, C register 514, respectively of the operation circuit 500 will be placed on the output BAS line 374 consecutively from the OR gate OR24 is synchronism with the timing pulse during 3 words during which RSND signal is "1", through said AND gate AND64.

On the other hand, when the system is not in a flash mode and the shutter is set on bulb, the output of said NAND gate NAND3 will become "0", therefore the AND gate AND64 is turned off. Therefore, the data outputted to the signal line (12) from the operation circuit 500 will not be placed on the output BAS line 374.

But in the bulb photographing mode as mentioned before the aperture value is controlled in fully opened state and the fully opened aperture value AVO of the lens device 2 is displayed at the digital display device 402.

Therefore while the data to control diaphragm step number may be all bit "0", the fully opened aperture value AVO of the lens device 2 must be transferred to the output control part 360 for display of the fully opened aperture value AVO. For that end the fully opened aperture value AVO of the lens device 2 used may be placed on the BAS line 374 in a same timing as the controlled aperture value that is the data AR of A register 510 are placed on the BAS line 3. The AND gate AND62 has the Q5 output of the program counter 582 and the S$_{11}$ output of the decoder 600 applied thereto. Therefore, this AND gate AND62 will produce a "1" only for such 1 word period during the same time as the data AR of A register 510 is produced from the operation circuit 500 to the output line (12). AND gate AND63 has the output of the NAND gate NAND3 applied thereto through the inverter INV 22, and at a same time has the output of said AND gate AND62 and (2) signal from the circuit shown in FIG. 37 that is DTAO given thereto. Therefore when bulb is selected other than in the flash mode, the fully opened aperture value data AVO of the lens device 2 used will be placed on the output BAS line 374 thorugh OR gate OR24 at the same timing that the data AR of A register 510 is outputted from the operation circuit 500.

Figures 80, 81:
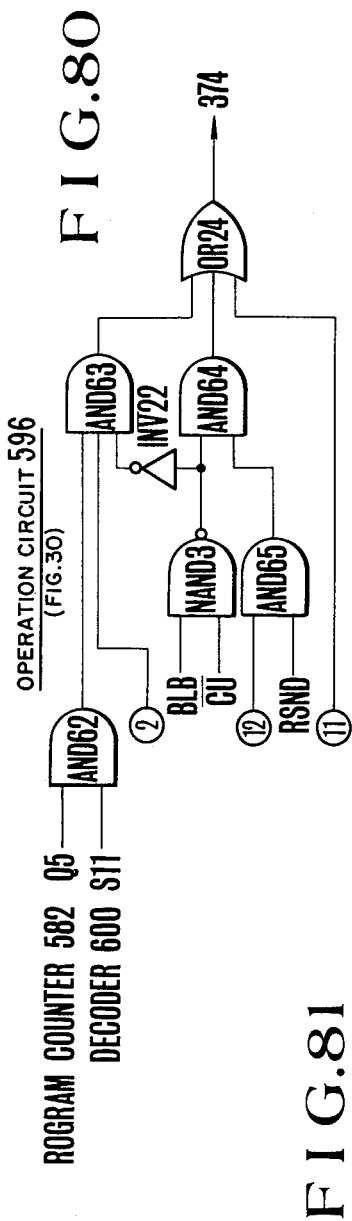
FIG. 80 shows a logic diagram of the operation circuit 596.
FIG. 81 shows a table for explaining the signal and the data of the BAS line, the input BAS line and the output BAS line.

FIG. 81 is a graph to show what has been explained about the signal and data placed on the BAS line 366, the input BAS line 370 and output BAS line 374.

That is, a "0" signal is placed on the BAS line 366 during the timing pulses TB0 to TB3, CALE signal is placed thereon in synchronism with the timing pulse TB5, the ADCF signal in synchronism with the timing pulse TB6, the INT signal in synchronism with the timing pulse TB7. These signals on BAS line 366 have an important role for determining the timing for data transfer at each part of the input control part 360, the central control portion 362, and the output control part 364.

The input BAS line 370 plays an important role in transferring various signals and data from the input control part 360 to the central control part 362 based on the timing pulses TB0 to TB7. As various signals are transferred it has the ADOF signal placed thereon in synchronism with the timing pulse TB$_1$, has AELK signal in synchronism with the timing pulse TB2, the AECG signal in synchronism with the timing pulse TB3, the WNUP signal in synchronism with the timing pulse TB4, the AO signal in synchronism with the timing pulse TB5, and the CU signal in synchronism with the timing pulse TB6. In the case of data (in this case A - D conversion data DD), data with an accuracy of ⅛ will be placed thereon consecutively from lower unit in synchronism with the timing pulses TB0 to TB7.

The output BAS line 374 plays an important role in transferring various signals and data from the central control part 362 to the output control part 364 based on the timing pulses TB0 to TB7. When transferring various signals, it has WNUP signal placed thereon in synchronism with the timing pulse TB1, and has TVFL signal placed thereon in synchronism with the timing pulse TB2, similarly the AVFL signal in synchronism with the timing pulse TB3, EDSP signal in synchronism with the timing pulse TB4, BDSP signal in synchronism with the timing pulse TB5, EFDS signal in synchronism with the timing pulse TB6, and MDSP signal in synchronism with the timing pulse TB7. And in the cases of data for example, shutter speed TV, aperture value AV, fully opened aperture value AVo, controlled diaphragm step number AVs, etc., the data with an accuracy of ⅛ step are placed thereon consecutively from lower unit in synchronism with the timing pulses TB0 to TB7.

The output control part 364 has two major functions. One is the display control function, and the other is the exposure control function.

Various condition signals and various data are applied to the output control part 364 from the central control part 362 through the output BAS line 374. Since these signals and data are applied on a time basis to the output BAS line 374, the time at which the signals and data are placed on the output BAS line 374 need to be found out in order to fined out what signals or data are placed on the output BAS line 374.

A synchronization circuit 600 which receives the signal input from the BAS line 366 is provided to obtain such time.

Figure 82:
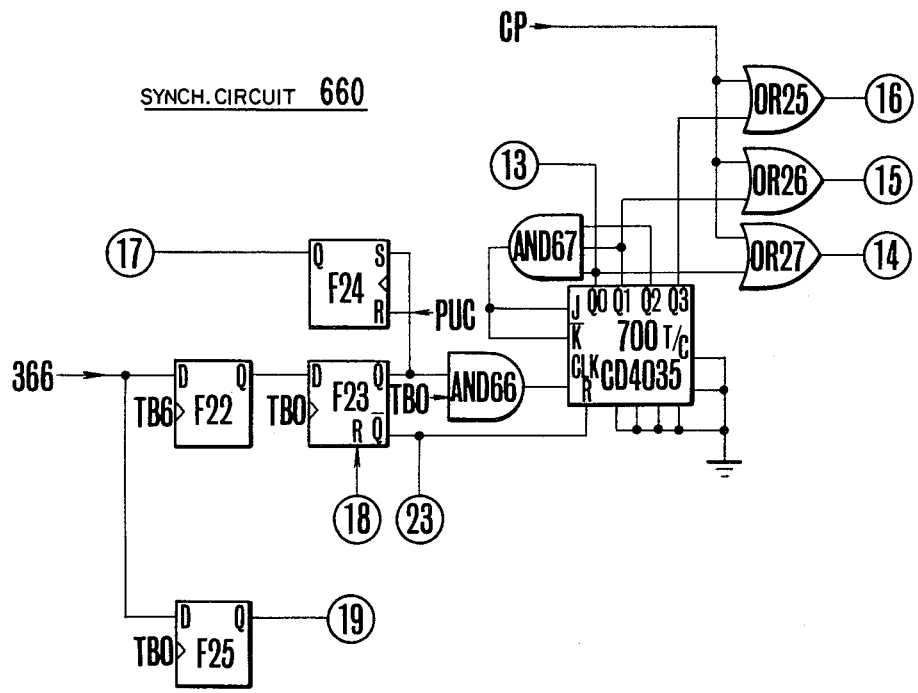
FIG. 82 shows a detailed circuit diagram of the synchronization circuit 660.

A detailed cirucit diagram of the synchronization cirucit 660 is shown in FIG. 82. A counter 700 may be formed by an integrated circuit element CD4035 having a logic diagram shown in FIG. 38.

Since the BAS line 366 is applied into the D terminal of the Flip-Flop F22 in synchronism with the timing pulse TB6, CALE signal placed on the BAS line 366 in synchronism with the timing pulse TB5 is detected at said Flip-Flop F22. The Q output of said Flip-Flop F22 is applied to the D terminal of the Flip-Flop 23 which is synchronized with the timing pulse TB0. The Q output of said Flip-Flop F23 will be applied to the clock terminal CLK of said ring counter 700 through the AND gate AND66 which has the timing pulse TB0 inputted therein. The ring couter 700 returns its Q0, Q3 outputs to J and $\overline{K}$ terminals through the AND gate AND67. Also, the Q0 output of said ring counter 700 is outputted at the signal line (13) and at a same time is outputted at the signal line (14) through the OR gate OR27 which receives the input of the clock pulse CP. The Q1 output is produced at the signal line (15) through the OR gate OR26 which receives the input of the clock pulse CP. The Q3 output appears at the signal line (16) through the OR gate OR25 which receives the input of the clock pulse CP.

Also the Q output of said Flip-Flop F23 is entered into the S terminal of the Flip-Flop F23, while Q output of the same is outputted at the signal line (17). Power up clear signal PUC is given to the R terminal of said Flip-Flop F24.

Also direct reset signal is inputted from the signal line (18) explained later to the direct reset terminal R of the Flip-Flop F23.

Explanations will be made on the function of the set up mentioned above following FIG. 83.

Now, when a CALE signal which is synchronized with the timing pulse TB5 is placed on the BAS line 366, the Flip-Flop F22 which is synchronized with the timing pulse TB6 is set and its Q output becomes "1". Since the CALE signal output is for 4 words, the Flip-Flop F22 continues "1" output during the 4 words.

Because the Q output of said Flip-Flop F22 appears in the D terminal of the Flip-Flop F23 which is synchrnozed with the timing pulse TB0, the Flip-Flop F23 is set in synchronism with the rising edge of next timing pulse TB0, and its Q output becomes "1". Since said Flip-Flop F22 is at set state during the 4 words, said Flip-Flop F23 also continues set state for the 4 words similarly.

Because the Q output of said Flip-Flop F23 is applied to the AND gate AND66 which has the timing pulse TB0 entered therein, the signal output synchronized with TB0 will be issued from said AND gate AND66 for 4 words after said Flip-Flop F23 is set.

Figure 83:
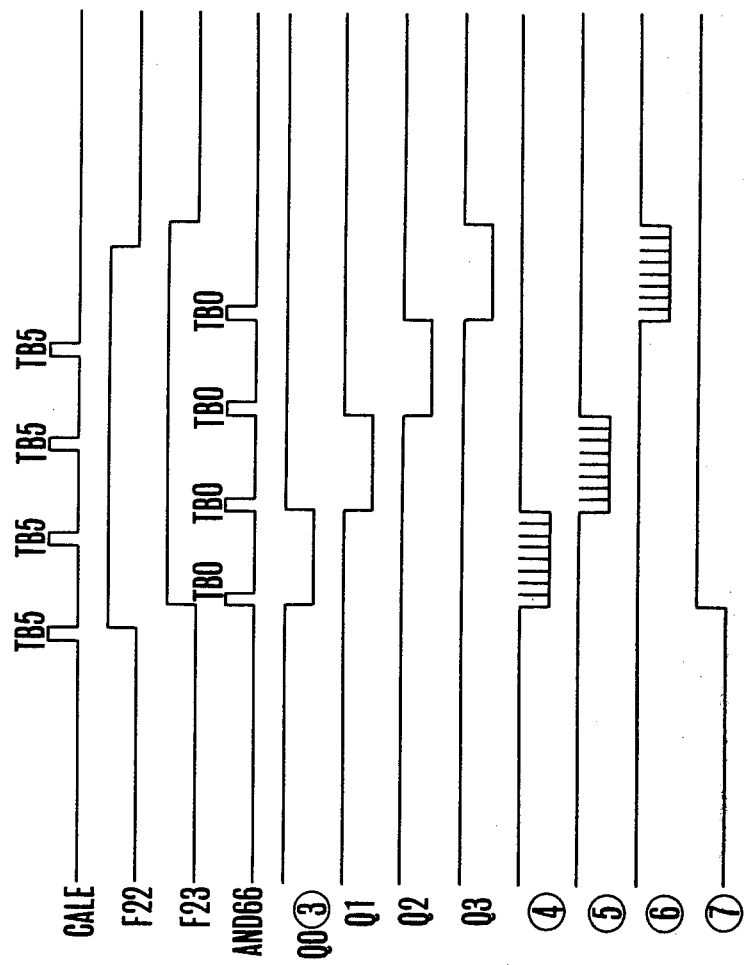
FIG. 83 shows an output timing chart of the synchronization circuit shown in FIG. 82.

The output of said AND gate AND66 is applied to the clock terminal CLK of the ring counter 700. Hence the ring counter 700 produces such outputs as shown in FIG. 83 from Q0, Q1, Q2, Q3 output terminals in synchronism with rising edge of the timing pulse TB0. Also, the Q0, Q1, Q2 outputs of said ring counter 700 are applied to the AND gate AND67, and the output of said AND gate AND gate AND67 is applied to the J and K terminal for issuing count output from Q0 terminal when starting to count. Also the output polarity of said ring counter 700 is ordinarily "1" and is "0" at the time of count output because the output polarity is obtained by grounding T/C terminal.

Therefore a signal output has a "0" level only for next on word period after CALE signal is first detected will be produced at the signal line (13).

Also pulse outputs having rising characteristics at each rising edge of the time pulses TB0 to TB7 will be outputted from the OR gates OR14, OR15, OR16 as shown in FIG. 83 from the signal lines (25), (26), (27), respectively. Here, it is apparent from the relationship among the transmission times of various signals and date mentioned that the down-rising output of the signal line (14) corresponds to the word time during which various signals are placed on the output BAS line 366. The falling output of the signal line (15) corresponds to the word time during which the shutter speed date TV is placed on the output BAS line. The dropping output of the signal line (16) corresponds to the word time during which control aperture step number date AVs is placed on the output BAS line 366.

On the other hand, while the Flip-Flop F24 is set by the output of the Flip-Flop F23, the output signal from the Q terminal of the Flip-Flop F24 to the signal line (17) is used to prevent the action of the camera mechanism after shutter release from being done unless the first operation is completed. This Flip-Flop F24 receives the power up clear signal PUC at its reset terminal R. Also this BAS line 366 is applied to the D terminal of the Flip-Flop F25 which is synchronized with the timing pulse TB0. The Flip-flop F25 is used for detection of INT signal placed on the BAS line 366 during the period of the timing pulse TB7. That is, the signal showing that the A - D converter of the input control part 360 is in integration of inputted analog date, and its Q output is placed on the signal line (19).

The Flip-Flop F23 of the synchronizing circuit 660 receives the input of the direct reset signal from the signal line (18) at its direct reset terminal R. This serves for line (18) at its direct reset terminal R. This serves for preventing the setting action of the Flip-Flop F23 so that the taking in of data, etc. into the output control part 364 will not occur at any time except the time before shutter release is done and the time during which a self-timer is in action after shutter release is done. This is to prevent the hindrance to proper exposure control action by entering other data receiving the effect of diaphragm closing and mirror up particularly when TTL light measuring is done, after shutter release is done and each mechanism of the camera device starts its action.

The various signals and data placed on the outputs BAS line 366 are separated on the basis of time domain judgement by the output from the synchronization circuit 660 and the timing pulses TB0 to TB7, and are entered into corresponding functional parts of said output control part 364.

The various signals in the BAS output line 366 will be separated, based on the timing TB0 to TB7, by the demultiplexer 610 and are accumulated at the output control register 622.

Figure 84:
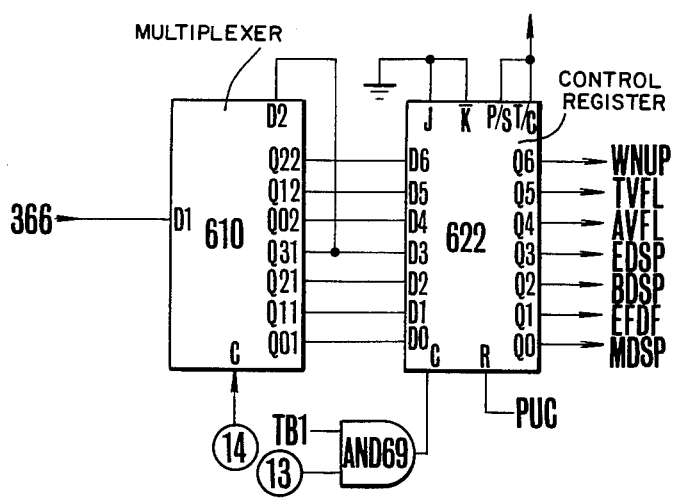
FIG. 84 shows a detailed circuit arrangement including the multiplexer 610 and the output control register 622.

The set up containing the demultiplexer 610 and the output control register 622 appears in FIG. 84. The integrated circuit element CD4015 having its logic diagram shown in FIG. 62 is used as the demultiplexer 610. Two of the integrated circuit elements CD4035 having its logic diagram shown in FIG. 38 are used as the output control register 622.

Here, the demultiplexer 610 receives the input of the output of signal line (14) of the circuit 660 shown in FIG. 82 at its clock terminal C. The output control register 622 has the AND condition signal of the timing pulse $TB_1$ and the output of the signal line (13) of the synchronization circuit 660 shown in FIG. 82 at its clock terminal C through and AND gate AND69. That is as has been explained, each signal WNUP, AVFL, EDSP, BDSP, EFDS, MASP is inputted in the output BAS line 374 as shown in FIG. 81 in synchronism with the timing pulses TB1 to TB7 in the word time next to that when signal CALE, which is synchronized with the timing pulse TB5, is placed on the BAS line 366. Therefore the demultiplexer 610 takes in said various signals the output of the signal line (14) as timing pulse during said word time. As the output of the signal line (13) changes from a low level to a high level and the AND gate AND69 conducts the signal output being synchronized with the timing pulse TB1. Therefore each output of Q01, Q11, Q21, Q31, Q02, Q12, Q22 of said demultiplexer 610 is taken in and accumulated at the output control register 622 from the D0 to D6 terminals of said register. As a reset each signal of MDSP, EFDS, BDSP, EDSP, AVFL, TVFL, WNUP is outputted from each output terminal of Q0 of Q6 of said output control register 622.

On the other hand, each of the data of shutter speed TV, aperture value AV, control diaphragm step number AVs being placed on the output BAS line 374 will have different handling between the data for control of each mechanism of camera device and the data for display.

The data used for display in the output BAS line 374 are the shutter speed data TV and aperture value data AV. These signals are rounded off to the next higher integer by counting fractions of 0.5 and over as a whole number and disregarding the rest through the display control circuit 652. They are converted to a shape suitable to display of the digital display device 402. After being adjusted to a degree reducing the intervals between data taking in for eliminating flickering to prevent the flickering of the digital display device by the variation in sudden change in data, the display aperture value is taken in the aperture value display register 648. The display shutter speed TVDS is taken in the shutter speed display register 650 respectively based on the word time during which each of the data is placed on the output BAS line 374 and is memorized.

Figure 85:
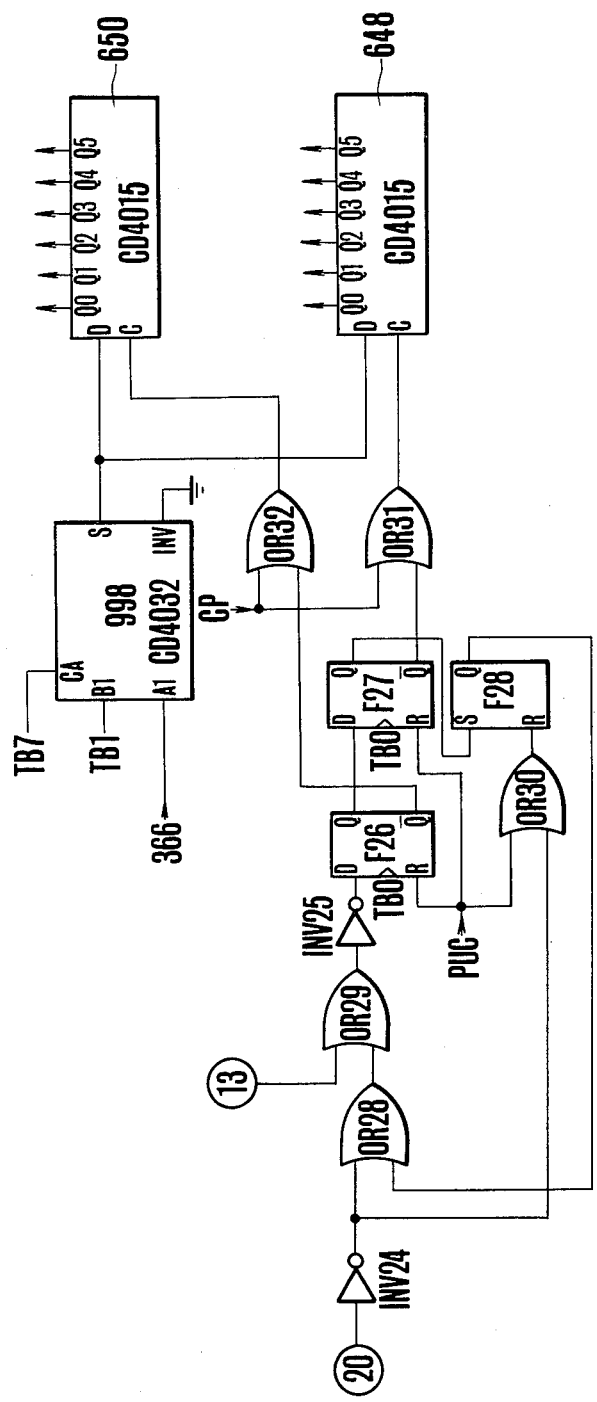
FIG. 85 shows a detailed logic arrangement of the circuit for taking the data for display.

Detailed logic set up diagram for the data take in circuit for such display is shown in FIG. 85.

Figure 86:
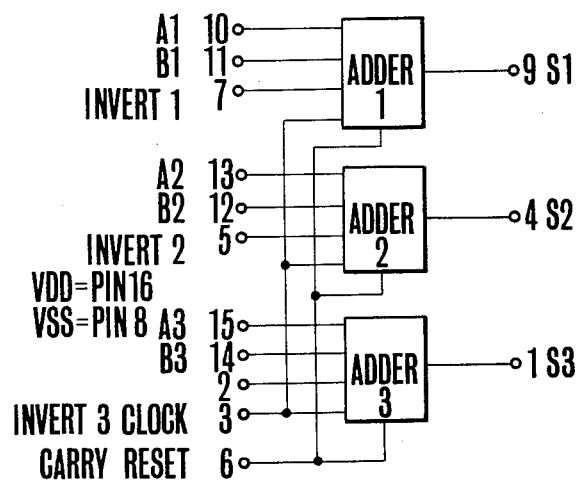
FIG. 86 shows a block diagram of the I.C. circuit element CD4032.
Figure 87:
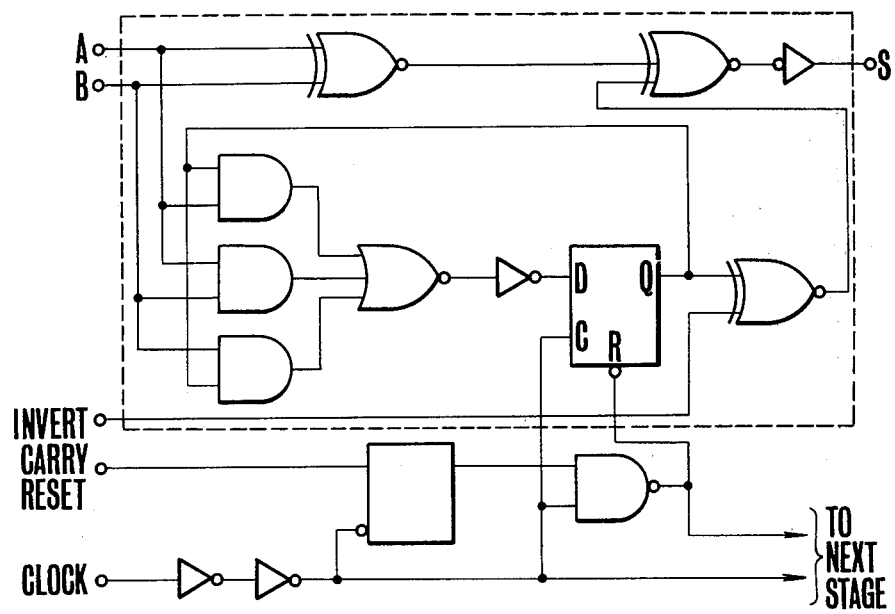
FIG. 87 shows a logic diagram of the I.C. circuit element CD4032.

Here a circuit 998 serves for rounding off the data from the output BAS line 374 by counting fractions of 0.5 and over as a whole number and disregarding the rest. It is formed of the integrated circuit element CD4032 (manufactured by RCA). Said integrated circuit element CD 4032 is constituted three pieces of series adders whose block diagram shown in FIG. 86 and whose logic diagram is shown in FIG. 87. FIG. 85 shows only one piece thereof. The rounding off circuit 998 receives the output data of the output BAS line 374 at its $A_1$ terminal, and receives the input of the timing pulse $TB_1$ at $B_1$ terminal. Also it receives the input of the timing pulse TB7 at the carry terminal CA.

When the data are applied in the $A_1$ terminal from the output BAS line 374 in such a set up, the bit of ¼ step accuracy bit is applied to the timing of $TB_1$, and the timing pulse $TB_1$ is applied to the $B_1$ terminal with same timing. That is, "1" is added only to the bit of ¼ step accuracy, and if "1" is placed at said bit with ¼ step accuracy, carry will reach the bit with ½ step accuracy and carry will be done. When "0" is placed at the bit with ¼ step accuracy of data, a carry will not be applied to the bit with ½ step accuracy. Therefore, as long as the output data from the S terminal of said rounding off curciut 998 are observed for viewing the upper units than the bit with ½ step accuracy, said output data will become data with ½ step accuracy having rounding off by counting fractions of 0.5 and over as a whole number and disregarding the rest with the bit with ¼ accuracy.

As explained above the data converted to the data with ½ step accuracy suitable to dislay and appearing at its S terminal in said rounding off circuit 998 are applied to the D terminal at each of the aperture value display register 648 and the shutter speed display register 650. Also the judgement as to what the data being rounded off in the rounding off circuit 998 and converted to have ½ step accuracy is related needs to be done by timewise judgement. Therefore each of said registers 648, 650 takes in data corresponding thereto respectively following the control pulse inputted in the clock terminal C thereof, respectively. Also said rounding off circuit 998 is reset by receiving the input of the timing pulse TB7 at its carry terminal CA.

Figure 88:
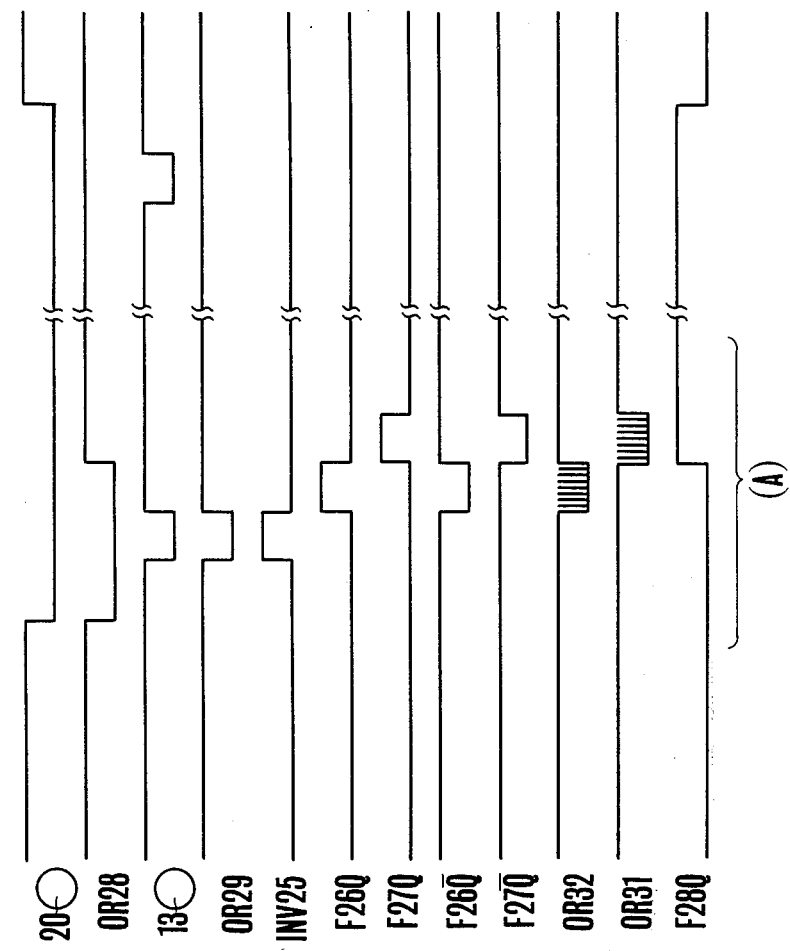
FIG. 88 shows an operation timing chart of the circuit shown in FIG. 85.

The aperture display register 648 receives the Q output of the Flip-Flop F27 and the clock pulse CP through the OR gate OR31 at its clock terminal. The shutter speed display register 650 receives the Q output of the Flip-Flop F26 and the input of OR condition of the clock pulse CP through the OR gate OR32 at its clock terminal C. The Q output of said Flip-Flop F26 becomes the D input of the Flip-Flop F27, while the output of the OR gate OR29 is received through the inverter INV25 at the D input of said Flip-Flop F26. On the other hand, the Q output of said Flip-Flop F27 is applied to the terminal S of the Flip-flop F28, while the Q output is applied to the OR gate OR28. Said OR gate OR28 receives 2H2 ON-OFF signal from the signal line (20) connected with signal source explained later through the inverter INV24 on the other hand. The output signal of the OR gate OR28 is applied to said OR gate OR29. Said OR gate OR29 on the other hand receives the signal output from the signal line (13) which is the Q0 terminal output of the ring counter 700 shown in FIG. 82. Also the ON-OFF signal of 2 Hz from said signal line (20) is also applied to the reset terminal R of the Flip-Flop F28 through the OR gate OR30. Power clear signal PUC is also applied to the reset terminal R of the Flip-Flop F28 through the OR gate OR30. On the other hand, power clear signal PUC is inputted also in each directly reset terminal R of said Flip-Flop F26, F27. The operation of this arrangement is shown on the timing chart shown in FIG. 88. Now, when the 2 Hz signal being sent from the signal line (20) is high, the output of the inverter INV24 becomes low. Since the Flip-Flop F28 in this state is in reset state and its Q output is "0", the output of the OR gate OR28 is "0". Therefore the OR gate OR29 can output the QO output of the ring counter 700 being inputted from the signal line (13), that is the signal which is ordinarily "1" and becomes "0" only during next one word of the CALE signal. Since the output of said OR gate OR29 appears at the D terminal of the Flip-Flop F26 which is synchronized with the timing pulse TBO through the inverter INV25, the Flip-Flop F26 is set only during the period of next word after the "1" from said inverter INV25 for the period of one word. The length of the period during which the Flip-Flop F26 is set corresponds to the same during which the shutter speed data TV is placed on the output BAS line 374. Thus, the display shutter speed TBDS from said rounding off circuit 650 by applying the clock pulse for data taking into the shutter speed display register 650 through the OR gate OR32 which receives the Q output of said Flip-Flop F26 and the input of the clock pulse CP. On the other hand, since the Q output of said Flip-Flop F26 is applied to the D terminal of the Flip-Flop F26 being synchronized with the timing pulse TBO, the Flip-Flop F27 is placed in set state only during the period of one word next to the one word during which said Flip-Flop F26 is set. Therefore since the length of period during which said Flip-Flop F26 is set corresponds to the length of the period during which the aperture value data AV is placed on the output BAS line 374, the display aperture value AVDS from said rounding off circuit 998 is taken in and memorized at said register 648. This is done by giving the clock pulse for date taking in to the aperture value display register 648 through the OR gate OR31 which receives the $\overline{Q}$ output of said Flip-Flop F27 and the input of the clock pulse CP.

Also since the Q output of said Flip-Flop F27 is applied to the set terminal of the Flip-Flop F28, the Flip-Flop F28 is also set along with the setting of the Flip-Flop F27 and the Q output thereof becomes "1". Because the Q output appears at the OR gate OR28 making its output "L", the output of the OR gate OR28 becomes "L" and is given to the OR gate OR29. The signal from the signal line (13) does not pass through OR gate OR29 and both Flip-Flops F26, F27 retain their reset state. Therefore renewal of taking in of corresponding data will not be done in the shutter speed display register 650 and the aperture value display register 648.

Because the Flip-Flop F28 has the inversion signal of the $2H_z$ signal from the signal line (20) by the inverter INV24 entered therein through the OR gate OR30, it is reset as the $2H_z$ signal goes to a low level. On the other hand, since the $2H_z$ signal going low gives a "1" signal to the OR gate OR28 through the inverter INV24, it makes its output "1", and it maintains the condition in which the signal from the signal line (13) can not be accepted.

Next, since the output of said Flip-Flop F28 becomes "0" when the $2H_z$ signal from the signal line (20) goes high, it is placed in a state in which the signal from the signal line (13) can not be accepted. Therefore new display shutter speed TVDS will be received and memorized at the shutter speed display register 650 while new display aperture value AVDS will be received and memorized at the aperture value display register 648 in a method being similar to that mentioned above.

Since both shutter speed and aperture value will have then data for display taken in every $2H_z$ by the above mentioned set up, tickering or error in reading out by variation in delicate data within the digital display device 402 can be prevented. Thus, a very effective method of data receipt or display can be provided for the digital display system.

As has been mentioned above the display aperture value AVDS and display shutter speed TVDS which are taken in as the data with $\frac{1}{2}$ step accuracy with $2H_z$ interval into the aperture value display register 648. The shutter speed display register 650, after being rounded off, will be displayed at the digital display device 402 through the next display control circuit 624 and the display driver 656.

The display control circuit 624 is not merely for display of the aperture value or shutter speed. Instead it is used for display of signs and flickering control as shown in FIG. 10 corresponding to the operating mode and working state of the camera device. Therefore various signals, TVFL, AVFG, EDSP, BDSP, EFDS, MDSP, etc. being taken in and accumulated at said output control register 622 from the output BAS line 374 will have bearings.

Figure 89:
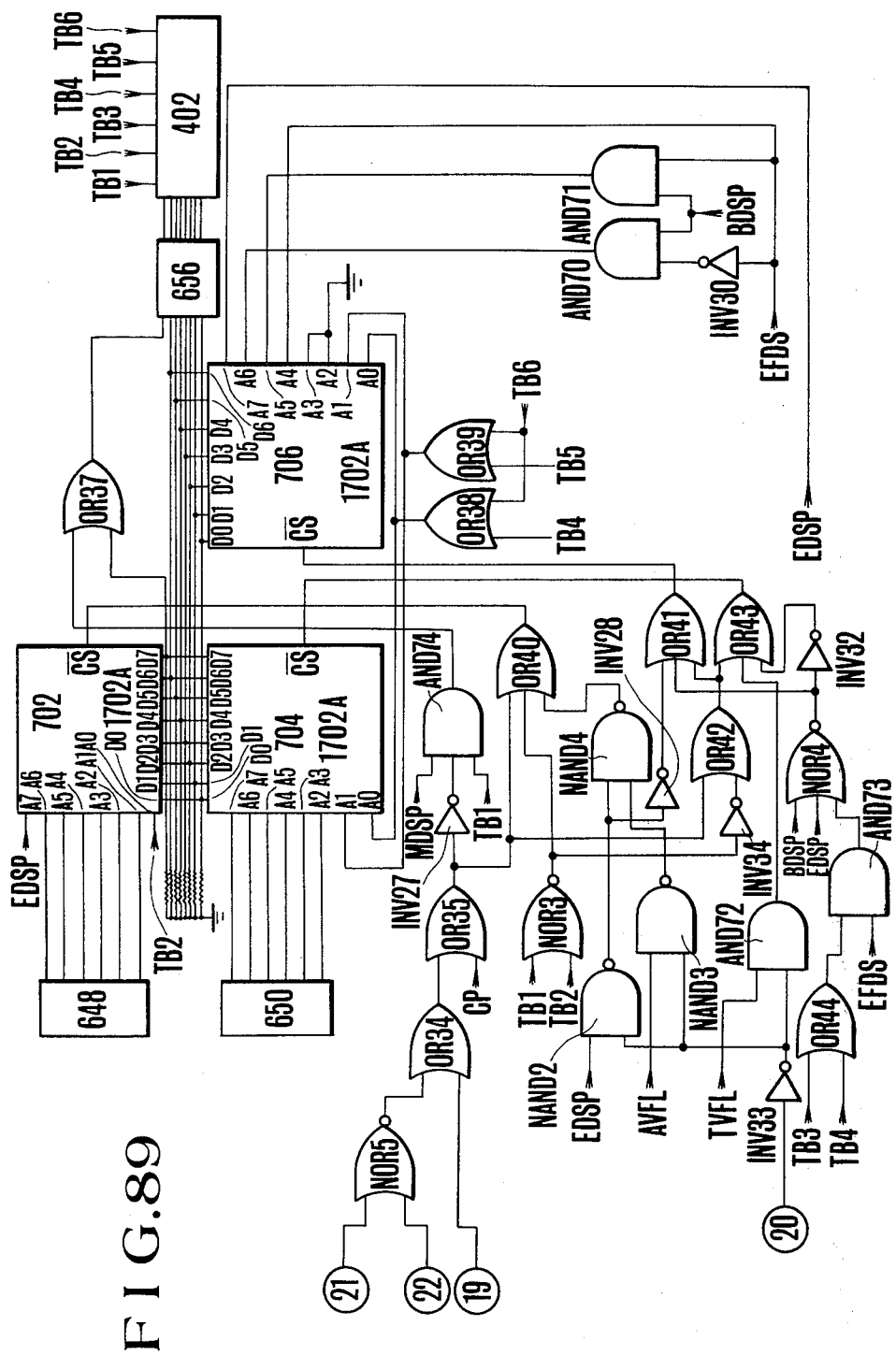
FIG. 89 shows a detailed block diagram of the display control circuit 624.

The display control circuit 624 appears in a detailed block diagram in FIG. 89. Here 702 is a decoder ROM for aperture value display and is to conduct the display of aperture value and such signs as "oP", "cL", "oo", "EE", etc. for the second display part 250 of the display device within the finder shown in FIG. 9, while 704 is a decoder ROM for shutter speed display to display the shutter speed for a first display part 244, and 706 shows a decoder ROM for sign display to conduct display of such signs as "EEEE", "buLB", "bEF", "EF", etc. for the first display part 244.

Figure 90:
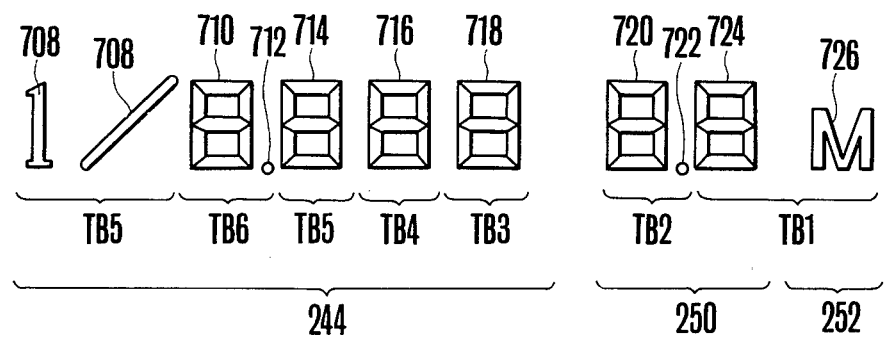
FIG. 90 shows a plane view of the digital display device 402.

While the digital display device 402 has dynamic driving given thereto based on timing pulse TB1 to TB6 mentioned before, the details of this will be explained following the plan of the digital display device shown in FIG. 90.

In said drawing, the first display portion 244 consists of a display element 708 for fraction display, four 7 segment display elements 710, 714 for displaying shutter speed and signs, and a decimal point display element 712. A 7 segment display element 718 forms a display driven with the timing of the timing pulse TB3, and a 7 segment display element 716 is display driven with the timing of the timing pulse TB4. The 7 segment display element 714 and the fraction display element 708 are driven with the timing of the timing pulse TB5, and the 7 segment display element 710 and the decimal point element 712 are driven with the timing of the timing pulse TB6.

Also the second display portion 250 in the same drawing consists of 7 segment display elements 720, 724 and a decimal point display element 722 a third display part 252 consists of a display element 726 for displaying "M". The 7 segment display elements 724 and the "M" display element 726 are display driven with the timing of the timing pulse TB1. The 7 segment display element 720 and the decimal point display element 722 are display driven with the timing of the timing pulse TB2.

Therefore, this digital display device 402 can receive dynamic drive by time sharing display signals synchronized with the timing pulses TB0 to TB7 in 7 lines and in parallel with each of said 7 segment display element 710, 714, 716, 718, 720, 724 by display signals synchronized to each of the timing pulses TB1, TB2, TB5, TB6, respectively in 1 line to the "M" display element 726, the decimal point display elements 722, 712 and the fraction display element 708. A R7A-122-9 (manufactured by BOW RAR) may be used for the indicator 402.

The aperture value display decoder ROM702 consists of integrated circuit element 1072A whose block diagram appears in FIG. 68. Its input terminal AO receives the input of the timing pulse TB2. The input of the aperture value display register 648 is received at the input terminals A1 to A6 thereof, the input of EDSP signal from said output control register 622 is received by the input terminal A7 thereof. Also the output of the NOR gate NOR3 which receives the inputs of the timing pulses. TB1, TB2 is applied to the $\overline{CS}$ terminal thereof through the OR gate OR40.

The aperture value display decoder ROM702 has its output restrained except at least with the timing of TB1, TB2. Therefore the input at its A0 terminal will be "0" with the timing of TB1, and the A0 terminal input thereof with the timing of TB2 will be "1". Thus, the output of 8 lines for display driving of the 7 segment display element 724, 7 segment display element 720, and the decimal point display element 722 of the digital display device 402 will be done from the output terminals D0 to D7 with of the timing pulses TB1, TB2, corresponding to the input data from the aperture value display register 648.

Now the output at 7 lines, D0 to D7 of said decoder ROM702 will be used for segment selection of said 7 segment display elements 720, 724. The output of 1 line, D7 of said decoder ROM702 will be used for selected driving of said decimal point display element.

The shutter speed display decoder ROM704 consists of integrated circuit element 1702A whose block diagram appears in FIG. 68. The output of the OR gate OR38 which receives the inputs of the timing pulses TB4, TB6 is received at the input terminal A0 thereof. The output of the OR gate OR39 which receives the inputs of the timing pulses TB5, TB6 is received at the input terminal A1. Also the output of the shutter speed display register 650 is received at the input terminals A2 to A7 thereof. The output of the NOR gate NOR3 which receives the inputs of the timing pulses TB1, TB2 is received at the $\overline{CS}$ terminal thereof through the inverter INV34, OR GATE OR 42 and OR gate OR43. Therefore, the shutter speed display decoder ROM704 has its output restrained at least in the timing of TB1 and TB2. Therefore, the output of the decoder ROM704 will have meaning at the times TB3 to TB6. When the timing pulses TB4, TB5, TB6 are not entered, that is at TB3, the inputs at the A0, A1 terminals thereof will both become "0". When the timing pulse TB4 is entered at the A0 terminal only thereof become "1", also when the timing pulse TB5 is inputted the input at the A1 terminal only thereof will become "1", while when the timing pulse TB6 is inputted, the inputs at both A0 and A1 terminals thereof become "1". Thus corresponding to the output from the shutter speed display register 650, outputs of 8 lines for display driving of the 7 segment display element 718, 7 segment display element 716, 7 segment display element 714, fraction display element 708, 7 segment display element 710 and decimal point display element 712 of the digital display device 402 will be issued from the output terminals D0 to D7 with each of the timings of the timing pulses TB3 to TB6. Also the 7 line outputs, D0 to D6 of the decoder ROM704 will be used for segment selection for said 7 segment display elements 710, 714, 716, 718. The 1 line output D7 of said decoder ROM702 will be used for selected driving of said fraction display element 708 and said decimal point display element 722.

The above mentioned display decoder ROM706 consists of integrated circuit elements 1702A shown in the block diagram of FIG. 68. The inputs of the timing pulses TB4, TB6 are received at the input terminal A0 thereof through the OR gate OR 38. The inputs of the timing pulses TB5, TB6 are received at the input terminal A1 thereof through the OR gate OR39. Also the signals to direct the display of "EF", "bEF", "buLb", "EEE" are applied respectively to the input terminals A4 to A6. Also, the output of the NOR gate NOR3 which receives the inputs of the timing pulses TB1, TB2 is applied to the $\overline{CS}$ terminal thereof through the inverter INV34, OR gate OR41. Therefore, the shutter speed display decoder ROM706 has its output restrained at least under the timings of TB1, TB2. Thus the output of said decoder ROM706 will be significant at the time of TB3 to TB6, and now when the timing pulses TB4, TB5, TB6 are all not inputted that is at the timing of TB3, both inputs at A0, A1 terminals thereof become "0". When the timing pulse TB4 is applied the A0 terminal input only thereof will become "1". When the timing pulse TB5 is inputted, the A1 terminal input only thereof become "1". When the timing pulse TB6 is entered, the inputs at both A0, A1 terminals thereof become "1". Thus said decoder ROM706 conducts the output of 7 lines for display driving of the 7 segment display element 718, 7 segment display element 716, 7 segment display element 714, 7 segment display element 710 respectively of the digital display device 402 from the output terminals D0 to D6 with each of the timings of the timing pulses TB3 to TB6, corresponding to the inputs at A4 to A7 terminals thereof. The 7 line outputs, D0 to D6 of said decoder ROM706 will be used for segment selection for said 7 segment display elements, 710, 714, 716, 718.

Now each of the outputs D0 to D6 of each of the decoder ROMs 702, 704, 706 is integrated respectively and is applied to the display driving circuit 656 as a 7 line signal as a whole. Also each of the outputs D7 of said decoder Roms 702, 704 is united to one and is given to said display driving circuit 656 through the OR gate OR37. As for the indication driving circuit 656, two of 75491 (manufactured by TI) may be used.

On the other hand, the signal to display the "M" sign display element 726 can be obtained outputting MDSP signal by the AND gate AND74 in synchronism with the timing pulse TB1. The output of the AND gate AND74 is applied to the display driving circuit 656 together with each of D7 outputs of the decoder ROMs 702, 704 through the OR gate OR37.

Also the decoder ROMs, 702, 704, 706 have their outputs restrained by various factors. Especially each of the outputs of the decoder ROMs 704 and 706 is produced in synchronism with the timing pulses TB3 to TB6, either one thereof needs to be selected for output. Also, when the display data for shutter speed needs to be flickered or flashed the output of the decoder ROM704 needs to be controlled at a certain frequency. When the display data for aperture value needs to be flickered, the output of the decoder ROM702 needs to be controlled at a certain cycle. Further, when the display "EE EEEE" for error warning needs to be flickered, the output of the decoder ROMs 702, 706 need to be controlled with a certain cycle. When the input analog data are integrated in the A-D converter at the input control part 360, that is when INT signal is inputted there is such fear that the emittance of light by the digital display device 402 within a finder adversely affects the TTL light measuring system, therefore it is necessary to control the outputs of all decoder ROMs 702, 704, 706 to make the digital display device 402 inactive. When the camera mechanism is performing an exposure there is such fear that emittance of light by the digital display device 402 within a finder adversely affects the exposure. To prevent meaningless consumption of battery by unnecessary action of the digital display device 402 during the operation of a self-timer of when photographing is done with long exposure time, it is necessary to conduct output control of all decoder ROMs, 702, 704, 706 to make the digital display device inactive.

In FIG. 89, while signal input is made to the NOR gate NOR5 from the signal line (21), the signal which becomes "7" before the exposure control mechanism of the camera device starts action will be applied from the signal line (21). The signal which becomes "1" after the exposure control mechanism of the camera device completes action will be inputted from the signal line (22). Therefore the signal output which becomes "1" when the exposure control mechanism of the camera device is in action will appear at the NOR gate NOR5. Said output of the NOR gate NOR5 is applied to the OR gate OR34. On the other hand the INT signal showing that integration is in progress will be inputted from the signal line (10) into said OR gate. Therefore, the output of said OR gate OR34 performs a function as a blanking signal to eliminate all of the displays by the digital display device 402. Since the output of said OR gate OR34 is inverted from the OR gate OR35 by the inverter INV27 and is given to the AND gate AND74 as "0" signal, the AND gate AND74 will have its output controlled. Thus the selection display signal for the indication "M" will be blanked.

On the other hand, since the output of said OR gate OR35 is given to the $\overline{CS}$ terminal of the decoder ROM702 through the OR gate OR40, and to the $\overline{CS}$ terminal of the decoder ROM704 through the OR gates OR42, OR43, further to the $\overline{CS}$ terminal of the decoder ROM706 through the OR gates OR42, OR43. Therefore each of the outputs of said decoder ROMs 702, 704, 706, will be blanked. Hence the display of the digital display device 402 will be controlled.

Now, the block pulse CP is given to the OR gate OR35, and at a time when the output of said OR gate OR34 is "0" a signal synchronized with the clock pulse CP is always produced. The signal being synchronized with the clock pulse CP will be used for blanking so that unnecessary data display will not occur at the digital display device 402 when the output content of each of the decoder ROMs 702, 704, 706 varies.

Now, when the digital display portion 402 serves to display of shutter speed at the first display part 244, and to conduct the display of aperture value or such signs as "CL", "oP", "oo", etc. at its second display part 250, and also if necessary to conduct "M" display at its third display part 252, BDSP signal, EDSP signal, EFDS signal are naturally "0". Therefore, a blanking signal is impressed on the $\overline{CS}$ terminal of the decoder ROM 702 at a time other than TB1 and TB2 as mentioned above and blanking signal is impressed on the CS signal of the decoder RPM704 with the timing of TB1 and TB2 as has been mentioned above. On the other hand, the output signal of the AND gate AND73 which receives the input of BDSP signal, EDSP signal and EFDS signal is inputted in the $\overline{CS}$ terminal of said decoder ROM706, thus the output of the NOR gate NOR5 what has its output becoming "1" is applied as an blanking signal through the OR gate OR41. This controls the output of this decoder ROM76.

Therefore, the digital display device 402 displays the shutter speed at its first display part 244 based on the output from the decoder ROMs 702, 704 and forms a display of aperture value or of such signs as "cL", "oP", "oo", etc. at its second display part 250, and if necessary forms an "M" display at its third display part 252.

While it has been already mentioned that "1" is the AVFL signal for causing flickering of the display of the aperture value when the aperture value obtained as a result of operation exceeds the limit controllable by the lens device 2 in such display state. Here, the AVFG signal passes to the NAND gate NAND3 which receives a 2H$_z$ ON-OFF signal through the inverter INV33. Therefore, the 2H$_z$ ON-OFF signal is produced by the NAND gate NAND3 and is applied to the NAND gate NAND4. On the other hand, while the NAND gate NAND4 receives the input of the NAND gate NAND2, since the EDSP signal out of the inputs to said NAND gate NAND3 is "0", the output thereof is "L", therefore the NAND gate NAND4 conducts output of ON-OFF signal of 2H$_z$. The output of said NAND gate NAND4 is applied to the $\overline{CS}$ terminal of the decoder ROM702 and places blanking with 2H$_z$ on the output of said ROM. Therefore, the aperture value display made at the second display part 250 of the digital display device 402 by said decoder ROM702 will be flickered at 2H$_z$.

Also, as explained, when the shutter speed obtained as a result of operation exceeds the limit which can be controlled with the body 4, "1" is outputted as TVFG signal to flicker the display of shutter speed. The TVFL signal is passed to the AND gate AND72 to which the 2H$_z$ ON-OFF signal passes through the inverter INV33 from the signal line (20) on which the 2H$_z$ ON-OFF signal is placed, therefore the ON-OFF signal of 2H$_z$ will be outputted from this AND gate AND72. The output of said AND gate AND72 is inputted in the $\overline{CS}$ terminal of the decoder ROM704 through the OR gate OR43, placing the blanking with 2H$_z$ on the output of said ROM. Therefore, the shutter speed display displayed at first display part 244 of the digital display device 402 is flickered with said decoder ROM704.

Next, while it has been mentioned before that "1" signal is outputted as EFDS signal from the central control part when the charging completion signal is given to the input control part 360 in a speedlight photographing mode. At this time "EF" showing the shutter speed controlled and charging completion is displayed at the first display part as shown in FIG. 10 (c) (d).

Also the shutter speed controlled is displayed by the fraction display element 708, the 7 segment display elements 710, 714 and the decimal point display element 712. The decoder ROM704 and the timing pulses TB5, TB6 are related. Also "EF" to show charging completion is displayed by the 7 segment display elements 716, 718, wherein the decoder ROM706 and the timing pulses TB3, TB4 are related.

Now, when a "1" EFDS signal is applied to the A4 terminal of the decoder ROM706 shown in FIG. 89, and the signal outputted from the decoder ROM706 to between the timing pulses TB3, TB4 is made "EF" display at the 7 segment display elements 716, 718 at the first display part.

On the other hand, the signal for the display of the shutter speed will be made to the decoder ROM704 from the shutter speed display register 650. Also, since the shutter speed at this time is slower than the shutter speed synchronized with speedlight (for example 1/60 second), it will not exceed the scope of display by the 7 segment display elements 710 and 714 at the first display part.

Since EFDS signal is applied to the AND gate AND73 in such state, said AND gate AND73 receives the input of the timing pulses TB3, TB4 through the OR gate OR44, therefore the AND gate AND73 produces a "1" output at timing pulses TB3, TB4. Since said "1" output is inputted in the NOR gate NOR4 making its output "0", blanking will occur only for the timing of TB3, TB4 on the decoder ROM704 which has the output of said NOR gate NOR4 inputted in the $\overline{CS}$ terminal through the OR gate OR43 after being inverted through the inverter INV32. Also the decoder ROM706 which has the output of said NOR gate NOR4 inputted in the $\overline{CS}$ terminal through the OR gate OR41 will be blanked during the period of time other than TB3, TB4 that is for the timing of TB5, TB6. Therefore, in a speedlight photographing mode the display of shutter speed and "EE" will be made on the first display part 244 of the digital display device. On the other hand, at the second display part 250 of said digital display device 402, the output of aperture value data will be made from the aperture value display register 648 unless the speedlight is at total light emitting mode. The signal output of the display aperture value will be made from the decoder ROM702 following said data, and the aperture value display will be made. Also an "M" display will be produced as MDSP signal becomes "1" at the third display portion 252 of the digital display device 402.

While it has been explained before that when bulb is selected as shutter speed, a "1" BDSP signal is produced at this time display of "BuLb" will be made at the first display part as shown in FIG. 10 (b). While this "1" is applied to the AND gates AND70, AND71, the AND gate AND70 has EFDS signal applied therein through the inverter INV30, while said AND gate AND71 has EFDS signal directly inputted therein. Therefore, as long as the EFDS signal is "0". The output of the AND gate AND70 will become "1" and is applied to the input terminal A6 of the decoder ROM706. As a result the decoder ROM706 forms the signal for the display of "buLb" at the first display part 244 of the digital display part 402. Since a BDSP signal is entered in the NOR gate NOR4 in that state, making its output "0", the decoder ROM704, which has the output of said NOR gate NOR4 applied to the $\overline{CS}$ terminal through the OR gate OR43 after being inverted through the inverter INV32, will be blanked. The decoder ROM706, which has the output of said NOR gate NOR4 inputted in the $\overline{CS}$ terminal through the OR gate OR41, will produce the signal output for displaying "buLb". Therefore the first display part 244 of the digital display device 402 will make the display of "buLb" in a bulb photographing mode. On the other hand the fully opened aperture value of the lens device 2 used will be displayed at the second display portion 250 of the digital display device 402, following the output signal from the aperture display register 648 as long as MDSP signal is not "1", and if MDSP signal is "1", the display of aperture value will not be made. Instead the display of "M" will occur at the third display part 252. Also this is as shown in FIG. 10 (b).

While it has been already explained above that when bulb is selected as shutter speed a "1" signal is outputted as EFDS signal and as BDSP signal, respectively, the display of "bEF" will be made at the first display part as shown in FIG. 10 (c), (d). When a "1" is applied as the EFDS signal and BDSP signal, the output of the AND gate AND71 which receives both inputs will become "1" and is inputted in the A5 terminal of the decoder ROM706. As a result signal output will be made from said decoder ROM706 to display "buLb" at the first display part 244 of the digital display device 402. Since BDSP signal is entered in the NOR gate NOR4 under such state, making its output "0", the decoder ROM704, which has the output of the NOR gate NOR4 inputted in the $\overline{CS}$ terminal through the OR gate OR43 after being inverted through the inverted INV32, will be blanked. The decoder ROM706, which has the output of the NOR gate NOR4 inputted in the CS terminal through the OR gate OR41, will display "bEF". Thus the display of "bEF" will be made at the first display part 244 of the digital display device 402 in speedlight photographing mode and under bulb photographing mode. On the other hand the output of aperture value data will be made at the second display portion 250 of the digital display device 402 from the aperture value display register 648 as long as the speedlight is not under total light emitting mode. The signal output for display of the aperture value will be made from the decoder ROM702 following said data. Thus the aperture value is displayed. Also "M" appears at the third display part 252 of the digital display device 402 as long as MDSP signal becomes "1".

Also when "1" signal is inputted as EDSP signal, the flickering display of "EEEE EE" will be made at the first and second display parts 244, 250 of the digital display device.

An EDSP signal "1" is applied to the A7 terminal of the decoder ROM702 for display of the signal "EE". At the same time EDSP signal is entered in the A7 input terminal of the decoder ROM706 to make the signal output for displaying "EEEE". On the other hand since said EDSP signal is given to the NAND gate NAND2 which has the ON-OFF signal given thereto through the inverter INV33 from the signal line (20) having the $2H_z$ ON-OFF signal placed thereon, the ON-OFF signal of $2H_z$ is passed from said NAND gate NAND2 and is applied to the NAND gate NAND4. On the other hand, while said NAND gate NAND4 receives the input of the NAND gate NAND3, the output of said NAND gate NAND3 is "1" as long as the AVFL out of the inputs thereinto is "0", therefore said NAND gate NAND4 makes $2H_z$ ON-OFF signal output. The signal is inputted in the $\overline{CS}$ terminal of the decoder ROM702 through the OR gate OR40, placing the blanking over the output of said ROM702 with $2H_z$. Therefore, the "EE" display placed at the second display part of the digital display device 402 by said decoder ROM702 will be flickered with $2H_z$. Also the $2H_z$ ON-OFF signal which is the output of the NAND gate NAND2, is inverted through the inverted INV28 and has phase matched with that of the ON-OFF signal of $2H_z$ which is the output of said NAND gate NAND4, then is inputted in the $\overline{CS}$ terminal of the decoder ROM706, placing the $2H_z$ blanking at the output of said ROM706. Therefore the "EEEE" display placed at the first display portion 244 of the digital display device 402 by said decoder ROM706 will flicker at $2H_z$. On the other hand since said EDSP signal is inputted in the NOR gate NOR4, NOR gate NOR4 will produce a "0" output. The decoder ROM704, which has the "0" output of the NOR gate NOR4 inputted in its $\overline{CS}$ terminal through the OR gate OR 43 after being inverted through the inverted INV32, will have its output completely controlled. As has been mentioned above when an EDSP signal "1" is applied an "EEE . . . EE" display flickering at $2H_z$ intervals will be seen at the digital display device 402.

The data for control being placed on the output BAS line 374 are the data TV for shutter speed control and the data AVs for control of diaphragm closing step number. The shutter speed control data TV is placed on the output BAS line 374 in the next one word period after the CALE signal is placed on the BAS line 366 as the data of ⅛ step accuracy being synchronized with the timing pulses TB0 to TB7 as mentioned above. Also said diaphragm closing step number control data AVs is, as mentioned before, placed on the output BAS line 374 in one word period which is the third word after the CALE signal is placed on the BAS line 366 as the data with ⅛ step accuracy and synchronized with the timing pulses TB0 to TB7. That is, the shutter speed control data TV is synchronized with the output of the output signal line (15) of the synchronization circuit 660 shown in FIG. 82. The diaphragm closing step number control data AVs is synchronized with the output of the signal line (16). That is, while the shutter speed control data TV may be taken in from the output BAS line 374 in synchronism with the output of said signal line (15). Since the shutter speed control data TV corresponds to APEX value, that is the logarithmically compressed value of reciprocal of actual shutter time, some operation step will be needed to obtain the data corresponding to actual shutter time from the shutter speed data TV corresponding to APEX value. That is, in order to make the shutter speed data as the signal with such size as corresponding to actual shutter time, it is necessary to substract the shutter time control data from the APEX value of the reference shutter speed. The data obtained from said subtraction corresponds to the step number corresponding to the APEX value of controlled shutter time. The actual time can be obtained by exponentially expanding thus obtained data based on the standard shutter speed. As has been mentioned above in order to obtain actual time from such shutter speed as corresponding to APEX it is necessary to subtract the shutter speed data TV from the standard shutter speed, and an operation circuit 612 is provided for that end.

As has been mentioned above the controlled shutter speed data TVs obtained through the operation circuit 612 is inputted in the shutter time control registers 614 and 626. Each of the registers 614, 626 separates said shutter time control data TV from the output BAS line 374 and takes in and accumulates the same based on the control signal to designate the taking in time of shutter speed data from said synchronization circuit 660. Here, the shutter time control register 614 is provided for memorizing the interger part of said shutter time data TV, while said shutter control register 626 is provided for memorizing the fraction part of said shutter time data TVs.

On the other hand, the diaphragm closing step number control data AVs may be taken in from the output BAS line 374 in synchronism with the output of said signal line (16). The diaphragm closing step number control data AVs is separated from the output BAS line 374 and is taken in and memorized at the diaphragm closing step number control register 628 based on the control signal to designate the taking in time of said data AVs from said synchronization circuit 660.

Figure 91:
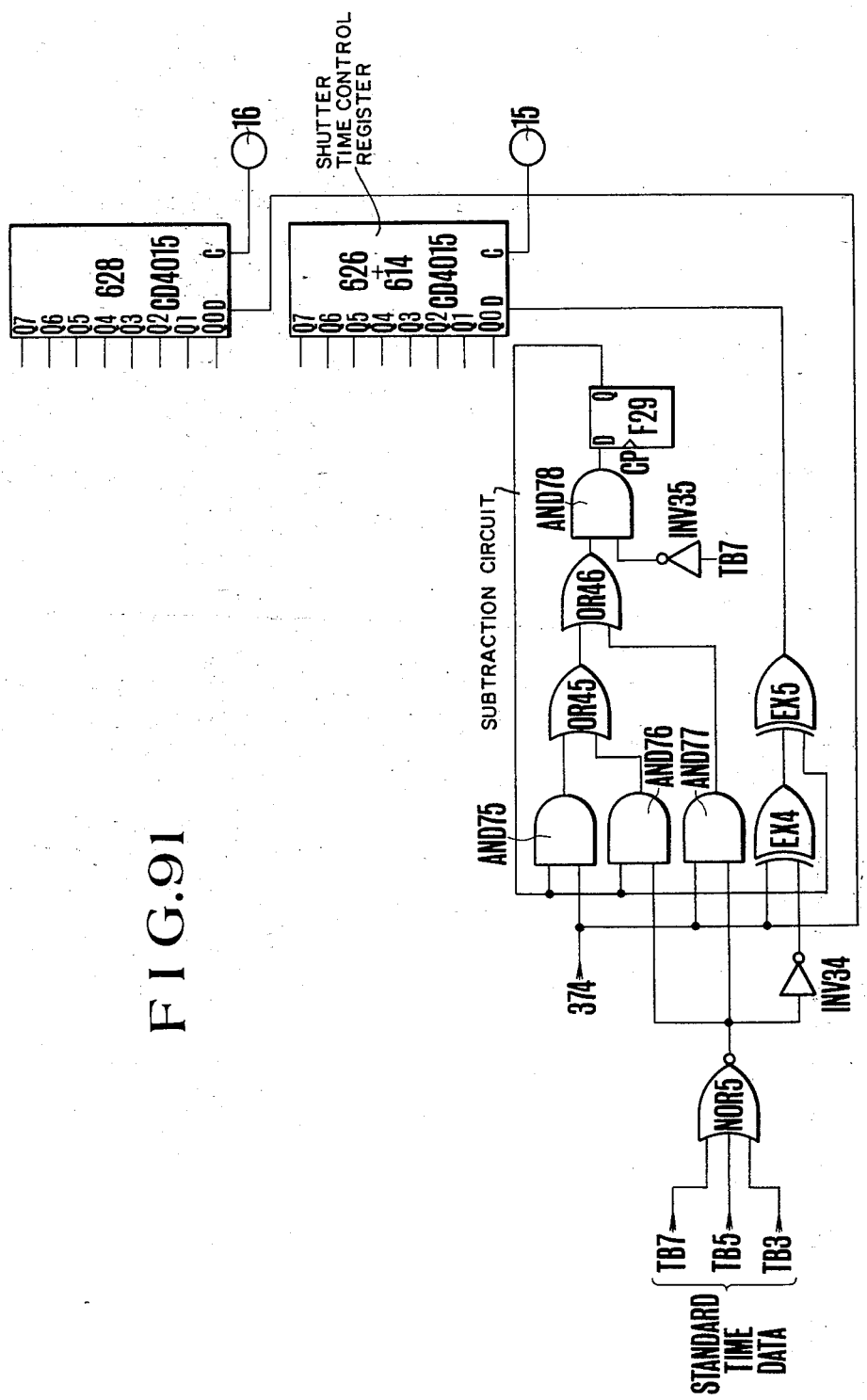
FIG. 91 shows a detailed logic diagram for taking the data for control.

A detailed logic diagram of the set up to take in the above mentioned data for control data TV and diaphragm closing step number control data AVS appears in FIG. 91.

As is apparent from FIG. 91 the shutter time control registers 614 and 626 are concentrated in the integrated circuit element CD4015 which used the output of the signal line (15) shown in FIG. 82. The diaphragm closing step number control register 628 is made of the integrated circuit element CD4015 which uses the output of the signal line (16) shown in FIG. 82 as clock terminal C input.

The integrated circuit element CD4015 has the detailed logic diagram shown in FIG. 62.

In the set up shown in FIG. 91, a well known subtraction circuit is made of AND gates AND 75, AND76, AND77, AND78, OR gates OR45, OR46, EXCLUSIVE OR gates EX4, EX5, inverter INV35, Flip-Flop F29, NOR gate NOR5. The data being applied in the output BAS line 374 in synchronism with the timing pulses TB0 to TB7 are subtracted from the data inputted in the NOR gate NOR5 in synchronism with the timing pulses TB0 to TB7. The result thereof is then transmitted from the EXCLUSIVE OR gate EX5 in synchronism with the timing pulses TB0 to TB7. Here, the timing pulse TB9 is inputted in the AND gate AND78 through the inverter INV35 to prevent the carry generated at the last stage of operation for preventing the jumping in of the carry into the operation in the next TB0 to TB7.

An APEX equivalent value of shutter time which constitutes the standard for shutter time control will be entered in the NOR gate NOR5, since the maximum speed of 1/2000 second is used as the standard shutter time in this example. A binary code datum corresponding to the shutter time for 1/2000 second is passed to the NOR gate NOR5. The datum is, as will be shown later also, "10101000", thus when this datum is synchronized with the timing pulses TB0 to TB7, "1" input will be given to said NOR gate NOR5 with the timing pulses TB7, TB5, TB3. To realize such set up, in this example, the input with the timing pulses of TB3, TB5, TB7 is made to said NOR gate NOR5.

While the output data from the EXCLUSIVE OR gate EX5 of the subtraction circuit having this set up will be given to the input terminal D of the shutter time control registers 614+626, it is not unknown whether said data are actually corresponding to the controlled shutter time TV or not. Therefore in this example said shutter time control registers 614+626 distinguish the shutter time control data TVs of the outputs of said subtraction circuit 612. They receive and accumulate the same by passing the signal from the output signal line (15) of said synchronization circuit 660 in the clock terminal of said registers 614+626 in same word time as that the data TV on the shutter speed is placed on the output BAS line 374.

The shutter time control data TVs are outputted in parallel from upper unit to lower unit out of each terminal of Q0 to Q7 of said shutter time control registers 614+626 through the above mentioned procedure. The Q0 to Q4 outputs thereof correspond to integer part while Q5 to Q7 correspond to fraction part.

On the other hand, while the diaphragm closing step number control register 628 receives the output BAS line 374 at the input terminal D, the signal outputted from the output signal line (16) of said synchronization circuit 660 is inputted in the clock terminal of said register with same word time as that the diaphragm closing step number control data AVs are placed on the output BAS line 374. Therefore, the register 628 distinguishes the diaphragm closing step number control data AVs out of the data of said output BAS line 374 and take in and accumulate the same. The diaphragm closing step number control data AVs will be entitled in parallel from upper unit to lower unit out of each output terminal of Q0 to Q7 of said diaphragm closing step number control register 628 through the above mentioned procedure.

As mentioned above the exposure control action at the mechanism part 358 of this camera system is based on the shutter time control data TV accumulated at the shutter time control registers 614+626 and the diaphragm closing step number control data AVs accumulated at the diaphragm closing step number control register 628.

The camera mechanish part 358 operates as follows.

As explained this camera system has its action controlled through the three electromagnetic mechanical conversion means. They are the shutter release means 396, the diaphragm control means 398 and the shutter speed control means 400 provided at the mechanical part 358, now explanations will be made on the action of each control means mentioned.

Major portions of the mechanism of this camera system do not differ from conventional camera mechanism.

The shutter release means 396 is an electro-magnetic solenoid shown in German Patent Application Laid-Open No. 2, 461, 151. It is linked with a trigger mechanism which runs the mechanical sequence of the camera device by being electrified for a certain period of time, and by power supply in pulse shape to this electro-magnetic solenoid such mechanical sequence mechanisms as start to running of AE lever 94 for presetting the aperture value from the body 4 side, diaphragm closing driving of the lens device 2, flip up of a mirror, start of leading screen of a focal plane shutter.

The diaphragm closing control means 398 is an electro-magnetic solenoid shown in German Patent Application Laid-Open No. 2, 461, 151 to bias the clamping mechanism of the AE lever 94 to clamp releasing side by being electrified, and by power supply to said electro-magnetic solenoid said AE lever 94 can make running action in a clamp released state, and is clamped by suspension of power supply. In such a mechanism before the camera mechanism starts running of mechanical sequence, said diaphragm control means 398 is electrified to retain the clamping mechanism of the AE lever 94 at a clamp releasing side to place the AE lever 94 in a state wherein it can start running along with the start of running of mechanical sequence of the camera mechanism.

When the AE lever 94 starts running following the mechanical sequence the amount of its run is detected and the clamping mechanism of the AE lever 94 is returned to the clamping position by suspending the power supply to the diaphragm control means 398 as said amount of run reaches a prescribed value to clamp said AE lever 94. The aperture value of the lens device 2 can be preset as mentioned above, and this has been explained before.

Also the shutter speed control means 400 is an electro-magnetic solenoid shown in German Patent Application Laid-Open No. 2, 461, 151, to control the start of running of the follower screen of a focal plane shutter by being electrified. By power supplied to this electromagnetic solenoid said shutter follower screen will be placed in a state wherein its running is restrained while the restraining of the running of said shutter follower screen is released by suspension of power supply. In this set up at the start of the running of the mechanical sequence of said camera mechanism said shutter speed control means 400 is electrified to restrain the running of the shutter following screen. After the shutter follower screen runs, time counting is started and as the time counted thereby reaches a prescribed value the power supply to said shutter speed control means 400 is stopped. This releases the restraint from the running of the shutter follower screen to have the shutter follower screen start running, thus the control of exposure time can be effected.

Also when the running of the shutter follower screen is completed the mechanical sequence mechanism returns the mirror and the diaphragm closure driving lever 98, etc.

Said shutter release means 396, diaphragm control means 398, shutter speed control means 400 need to have their operation timing and functioning time precisely controlled. To that end the signal for precise sequence control obtained, under various conditions will be needed, and a control signal generation circuit 646 is provided for that purpose. Driving control signal will be given from said control signal generation circuit 646 to said shutter release means 396, diaphragm control means 398 and shutter speed control means 400 with such timing as having proper exposure control action and for proper length of time control timing as well as time are made based on the operating time of a self-timer and the timing by which the AE lever 94 runs through the diaphragm closing step numbers accumulated in the diaphragm closing step number control register 628. It is also based on the timing at which the actual time corresponding to the shutter time data accumulated at the shutter time control registers 614, 626 passes, and the time to compensate the mechanical sequence mechanism, etc.

The output data of said shutter time control register 626 and the output data of said diaphragm closing step number control register 628 are applied to the data selecter 632 and are given to the down counter 642 selectively based on the instruction from said control signal generation circuit 646.

On the other hand, the output data of the shutter time control register 614 and the output data of a constant generation circuit 616 provided to generate such constant data as corresponding to the time for various timewise control are applied to the select-gate 618 and are given selectively to the frequency dividing circuit 620 based on the instruction from said control signal generation circuit 646.

Also the down counter 642 has the pulse signal FPC which is inputted along with the running of the AE lever 94 and the output pulse signal of said frequency dividing circuit 620 inputted in the clock terminal thereof through the select-gate 640, and the data inputted from said data selector 632 are subtraction counted based on the pulses being inputted through said select gate 640. Then the carry generated as a result of such subtraction count is given to said control signal generation circuit 646.

Now, when diaphragm closing step number control is done in such set up the diaphragm closing step number control data AVs is passed from said diaphragm closing step number control register 628 to the down counter 642 through said data selector 632. On the other hand, the pulse signal FPC corresponding to the amount of run by the AE lever 94 is passed through the select gate 640 to the clock terminal of the down counter 642.

Now, when the AE lever 94 the diaphragm closing step number control data AVs are subtracted by said pulse signal FPC in the down counter 642. When a carry is produced from said down counter 642 through such procedure, said carry is to show that the number of input pulses of the pulse signal FP matches with said diaphragm closing step number control data AVs. It also is to show that the position to which the AE lever 94 runs at the time is the preset position for the diaphragm closing step number of the lens device 2. Therefore, the control signal generation means 646 in which said carry is inputted clamps said AE lever 94 through said diaphragm control means 398. Thus the diaphragm closing step number of the lens device 2 can be preset to the same value as that of said diaphragm closing step number control data AVs.

When shutter time control is performed, the data for below the decimal point out of the shutter time control data TV will be given from the shutter time control registor 626 to the counter 640 through said data selector. Said down counter 642 adds "1" to said data below the decimal point making it as the data being eight folded, then said data are taken in. On the other hand the output pulse of said frequency dividing circuit 620 is inputted in the clock terminal of said down counter 642 through said select gate 640. At this time the frequency dividing circuit 620 takes the data for integer postion out of the shutter time control data TV through the select gate 618 out of said shutter time control registor 614, then frequency divide and pulse output the same by the pulse signal of ⅛ of the standard time. The data taken in said down counter 642 are subtracted based on the output pulse of said frequency dividing circuit 620. When carry is outputted from said down counter 642 through the above mentioned procedure the carry shows that the output pulse number of said frequency dividing circuit 620 matches with the data relating to the shutter time control below the decimal point. It also serves to show that the actual time corresponds to said shutter time control data.

Therefore, the control signal generation means 646 in which said carry is inputted starts the running of the shutter follower screen through said shutter speed control means 400. The shutter time can be controlled to such actual time as corresponding to said shutter time control data TV.

The shutter time control data TV is given in the data with ⅛ step accuracy, and said data are now represented by $$TV = P + \alpha/8 \qquad (18)$$

wherein P, $\alpha$ therein are integer values. Said data corresponds to the actual exposure time represented by the following equation against the standard time Y:

$$TR = Y \times 2^{(P=\alpha/8)} \qquad (19)$$

However, the digital circuit to operate $2^{(X+\alpha/8)}$ will become very complicated circuit. Hence, this example, it is proximated by the following equation:

$$2\,P+\alpha/8 \div 2\,P(1+\alpha/8) \qquad (20)$$

Therefore actual exposure time TR will be represented by $$TR = Y \times 2\,P \times (1+\alpha/8) \qquad (21)$$

Also, since said equation can be replaced by the equation:

$$TR = Y/8 \times 2^P \times (8+\alpha) \qquad (22)$$

actual exposure time TR for shutter time can be obtained by making such frequency dividing pulse as $Y/8 \times 2^P$ by frequency dividing P step of the pulse signal Y/8 being ⅛ of the standard time Y by the frequency dividing circuit 620 and by subtraction counting the data, 8+$\alpha$ being taken in the down counter 642.

Now, the data to specify self timer time, the data to compensate the action delay in mechanical sequency and to determine the function time of said shutter release means 396, and the data to generate the On-Off signal of 2H$_z$which has been explained before produced out of said constant generation circuit 616 and each one of them is frequency divided and is converted to actual time. The data is then given to said control signal generation circuit 646 and is used as the standard for the output control signal against said shutter release means 396, diaphragm control means 398, and shutter speed control means 400.

The output control part 364 operates as follows:

The control state of a camera device is divided into eight states in the camera system of this example.

This is done because the function of the camera device consists of various sequences and the function of electric control circuit needs to correspond to such sequence.

Figure 92:
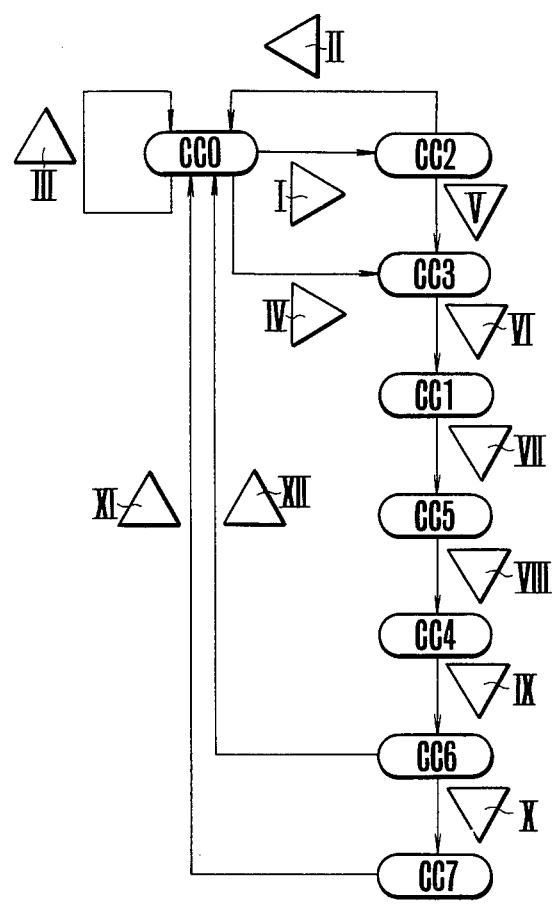
FIG. 92 shows a flow chart for explaining the operation of the output control part.

The signal CC0 to CC7 specify the eight control states in this camera system. An explanation will be given on the function of the camera device corresponding to each of the signals CC0 to CC7 in FIG. 92.

The state of the CC0 signal is a cycle to repeat the light measured by the input control part 360 or taking in the analog data and A-D conversion, operation by the central control part 362, and the display of various data by the output control part 364. The CC0 signal will be retained in the loop of (III) until the shutter release button 18 is pressed. A photographer can confirm the display of various data by the digital display device 402 within the finder 13 in this state and can perform change of set data, etc. The CC0 signal is retained unless EDSP signal is "1" or the first CALE signal after a power switch is put is outputted.

The state of the CC2 signal is a cycle corresponding to the time during which the self timer is in operation. While the display of various data by the digital display device 402 is stopped, the light measuring by the input control part 60 or taking in of analog data and A-D conversion and the operation by the central control part 362 will be repeated. During said period LED lamp 32 is flickered to notify a photographer that the self-timer is in action. The state of CC0 signal to the state of CC2 signal is shifted when the shutter release button 18 is pressed and the SR signal becomes "1" when SELF signal is "1" (I). Also, in the state of the CC2 signal as SELF signal becomes "0" or EDSP signal becomes "1", the camera device is returned from the state of CC2 signal to the state of CC0 signal (II).

The states of the signals CC3-CC6 are shifted completely in parallel with the shifting of mechanical sequence of the camera device mechanism part 358, and the shifting is done to the state of CC3 signal. Power to the diaphragm control means 398 is then started and the clamp mechanism of the AE lever 94 is biased to clamp releasing side, placing in a state to allow the AE lever 94 to run.

Here, the state of said CC3 signal is obtained by shifting from the state of CC2 signal when the state of CC2 signal in which a self-timer is in action (V), or by directly shifting from the state of CC0 signal when SELF signal is "0" at a time when the shutter release button 18 is pressed.

Also said state of CC3 signal is retained for a predetermined period of time, then shifting is made to the state of $CC_1$ signal.

At this state of the CC1 signal the shutter release means 396 of the camera device mechanical part 358 is electrified and a trigger mechanism for starting the running of mechanical sequence is activated. This state of CC1 signal is also retained for a predetermined length of time and is shifted to the next state of CC5 signal (VII), then the mechanical sequence of the camera device starts running by the action of said trigger mechanism.

Said state produced by the CC5 signal is a diaphragm control cycle and such actions as mirror up, running of AE lever 94, etc. are done by the mechanical sequence. In the state of CC5 signal, substraction counting of said diaphragm closing step number control data AVs by the pulse signal FPC outputted corresponding to the amount of run made by the AE lever 94 shifting from this state of CC5 signal to the state of CC4 signal (VIII) occurs when the number of pulses of the pulse signal FP matches with the data AVs or if it does not match after an elapse of a predetermined period of time. At this time power to said diaphragm control means 398 is stopped and the AE lever 94 is clamped and its running is controlled. That is in said state of CC5 signal, diaphragm presetting is made from the body 4 side of the lens device 2.

And the shifting to the state of CC4 signal, after said state of CC5 signal is completed upon an elapse of a predetermined period of time occurs when the pulse number of the pulse signal FPC does not match with said data AVs. The same is applied to a case when diaphragm presetting is manually made at the lens device 2 side or a case when the aperture value AMAX of the minimum aperture is automatically selected.

Also when this state of the CC5 signal is reached power supply to the shutter speed control means 400 is started to control the running of the shutter rear screen.

Also at this state of the CC5 signal, the presetting of aperture and the diaphragm closing action of the lens 2 by the diaphragm driving lever 98 are performed in parallel.

Next upon shifting from the CC5 signal to the state of CC4 signal the shutter leading screen starts running by the progress of mechanical sequence. Since the exposure onto a film surface is not done immediately by said start of running of shutter leading screen and there is a mechanical delay time, said state of CC4 signal is set for a purpose of compensation of said time also.

Next while CTST signal is entered by the start of the shutter leading screen, said state of CC4 signal is shifted to the state of CC6 signal (IX).

The state of CC6 signal is a shutter speed control cycle and the counting of actual time based on the shutter time control data TVs and the standard time Y is made after entering into the state of CC6 signal. After an elapse of such period of time as corresponding of the shutter time control data TVs the state of CC6 signal is shifted to the state of CC7 signal (X).

In said state produced by the CC7 signal power supply to the shutter speed control means 400 which is previously electrified is stopped and the shutter follower screen is started so as to stop the exposure on the film surface. Also after the running of the shutter follower screen is completed the mechanical sequence conducts the quick return of the mirror and the diaphragm driving lever.

Here, when the BDSP signal is "1", as long as the signal SR from the switch SW2 which is linked with the shutter release button 18 is "1", the state of CC6 signal is retained. When the SR signal becomes "0", return to the state of CC0 signal from the state of CC6 signal is made (XII). This is a function provided in view of the fact that the release button 18 is used for directly controlling shutter speed in manual manner in bulb photographing mode.

Also the state of CC7 signal is a state wherein so-called post display is made, that is data which constitute the basis for the exposure control already performed can be confirmed within the finder 13 after photographing is completed. Upon entering into said state of CC7 signal the action control for the digital display device 402 is released and the display of various photographing information is done. The photographing information relates to the exposure control already performed. Also the state of CC7 signal is a state existing when the signal SR is "1" as the state of CC6 signal is shifted to the state of CC7 signal that is as the shutter release button 18 is kept pressed. When the signal SR becomes "0", the state of CC0 signal is immediately resumed (XI).

Also when the film wind up is performed by the motor drive device mentioned before or by manual action even if the shutter release button 18 is kept being pressed in the state of CC7 signal, the system is returned from the state of CC7 signal to the state of CCo signal. This is an important function to retain the shutter release button 18 is a pressed state when continuous photographing is done by the motor drive device.

As mentioned above in the camera system of this example the output control part 364 is placed in the eight control states of said CC0 signal to CC7 signal.

The sequence of each of the signals CC0 to CC7 mentioned above and the state of power supply state to the electro-magnetic solenoids of the shutter release means 396, the diaphragm control means 398. The shutter control means 400 in the state of each of said signals will be shown in the schematic sequence diagram of FIG. 93.

Figure 93:
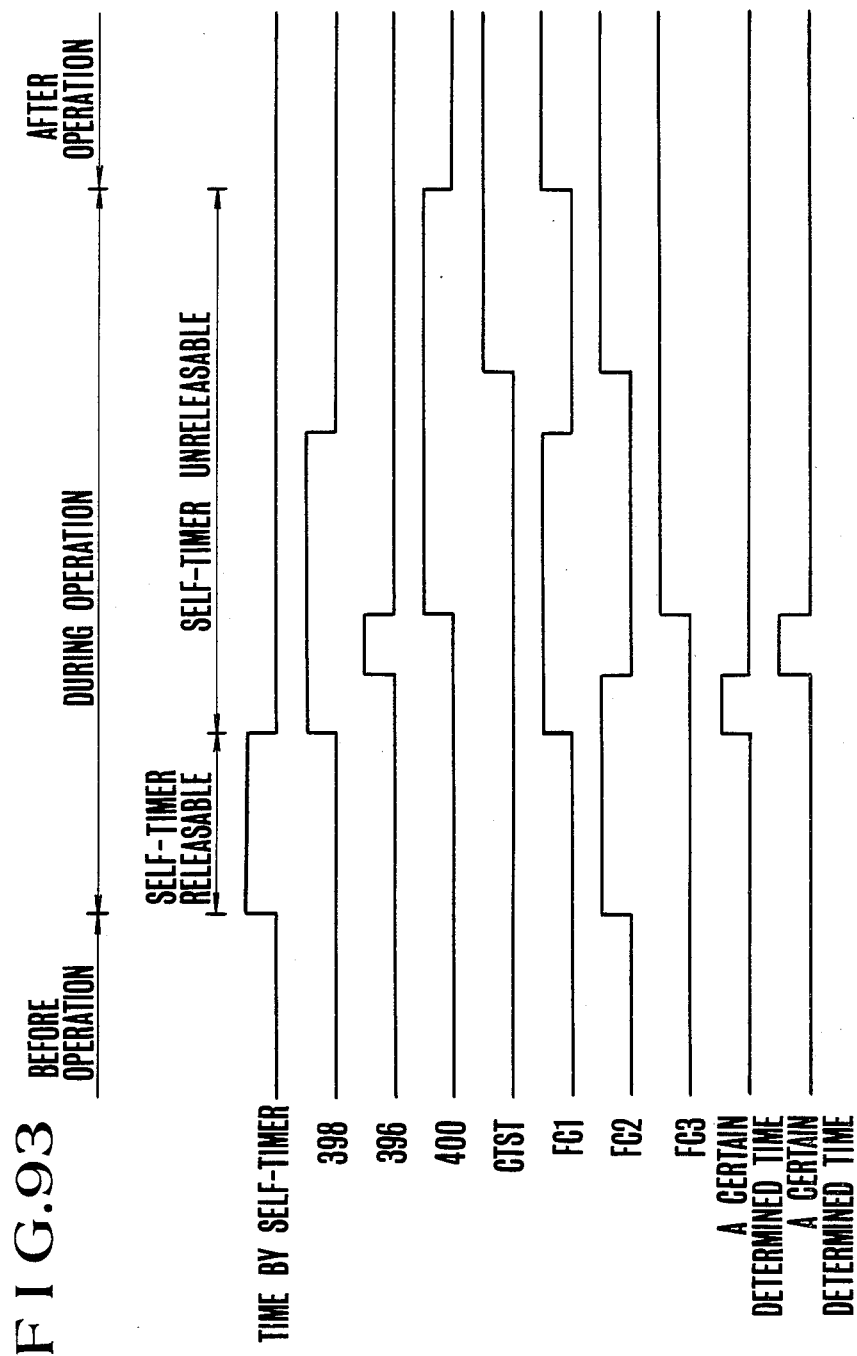
FIG. 93 shows a sequence explanation chart based upon the flow chart shown in FIG. 91.

In FIG. 93, "FC1", "FC2", "FC3" are signals which constitute the basis to obtain said signals CC0 to CC7.

Now, before explaining the control signal generation circuit 646 and the CC0 to CC7 signals, the function which constitutes the basis for control based on the diaphragm closing step number data AVs and the shutter time control data TV and the function for obtaining other sequential control signals will be explained.

Figure 94:
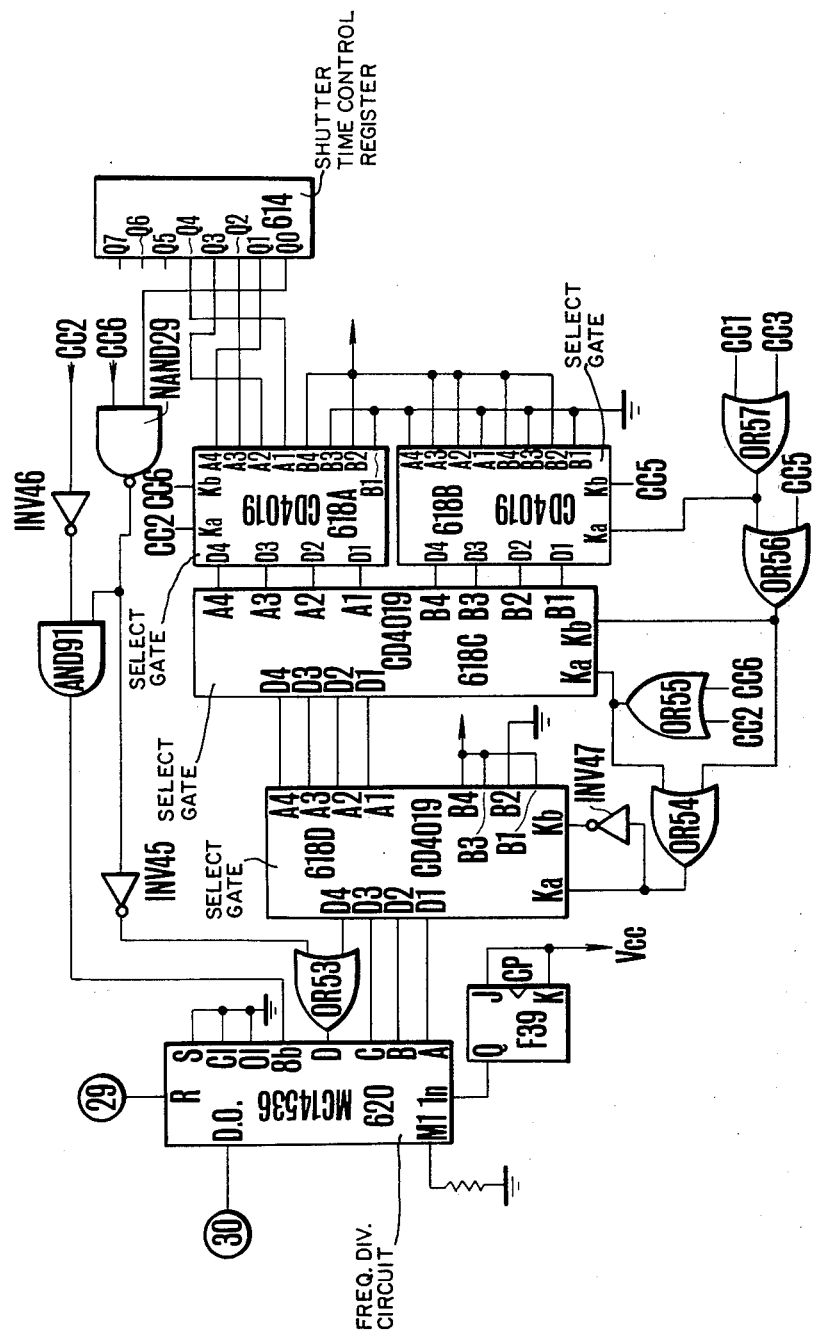
FIG. 94 shows a detailed composition of the shutter time control register 614, the constant generating circuit 616, the select gate 618 and the frequency dividing circuit 620.
Figure 95:
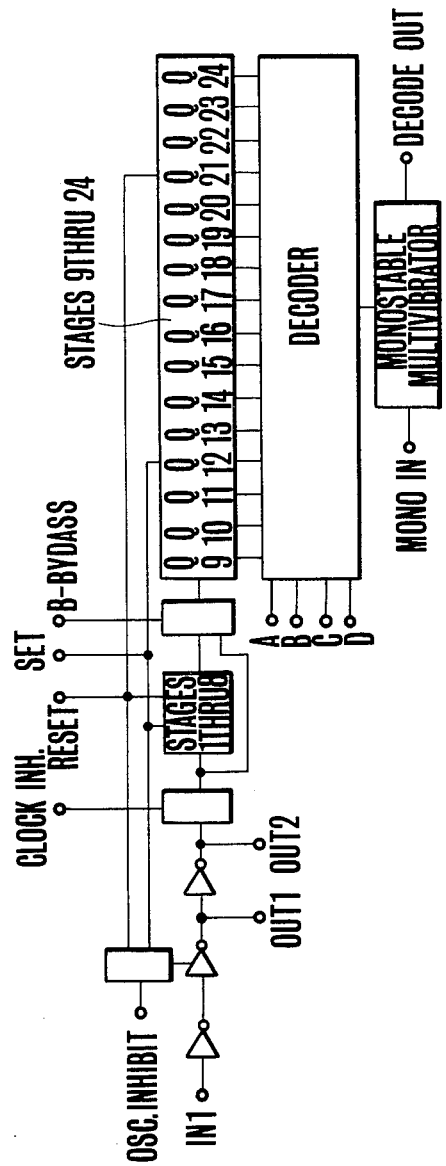
FIG. 95 shows a block diagram of the I.C. circuit element MC14536.

FIG. 94 illustrates details of the shutter time control register 614, the constant generation circuit 616, the select-gate 618, the frequency dividing circuit 620. What are shown by 618A to 618D in said drawing are select-gates consisting of integrated circuit element CD4019 having its detailed logic diagram shown in FIG. 66, and four of the same constitute the select-gate 618 shown in FIG. 30. Also the frequency dividing circuit 620 consists of integrated circuit elements MC14536 (manufactured by MOTOROLA). Also said integrated circuit element MC14536 is a programmable timer having its block diagram shown in FIG. 95. The programmable timer can divide a frequency up to 24 steps as a whole and is so made as frequency dividing the pulse signal inputted from In terminal and outputting the same from DO terminal based on the 4 bits data inputted from each of the terminals A, B, C, D and the signal inputted from the terminal 8b. Said input data from each of the terminals A, B, C, D are to conduct frequency dividing up to the 16th step, while said terminal 8b is to conduct frequency dividing for further 8 steps. In FIG. 94, the Flip-Flop F39 is to frequency divide the clock-pulse and to input its Q output into the In terminal of said frequency dividing circuit 620. While the pulse signal of 64 KHz is used as clock pulse in the system of this example, the ON pulse of 32 KHz will be impressed to the In terminal of said frequency dividing circuit 620 through the above mentioned set up.

The pulse of 32 KHz constitutes the basis for making the ⅛ time of the standard time Y explained previous. The frequency dividing circuit 620 is made so that when the inputs in its input terminals A, B, C, D are all "0" and the input in the terminal 8b is "1", the pulse signal of 16 KHz that is the pulse signal with such cycle as corresponding to Y/8 which is obtained by multiplying the standard time of 1/2000 second by ⅛ times, is emitted from the DO terminal of the same. That is, this frequency dividing circuit 620 frequency divide the pulse signal of 16 KHz based on the input data from the input terminals A, B, C, D and the input signal into the terminal 8b and to output the same from its D, O terminals to the signal line (30). And said frequency dividing circuit 620 has a reset terminal R and is reset following the input signal from the signal line (20) explained later.

The select-gate 618A has the lower 4 bits of the integer part of the shutter time control data inputted in its terminals A1 to A4 from Q1 to Q4 of the shutter time control registers 614. It has the data to obtain the self time of 8 seconds that is the data "1010" inputted in the terminals B1 to B4, also has CC6 signal explained later inputted in the terminal Ka and has the input of CC2 signal, explained later, at the terminal Kb.

That is, said select-gate 618A outputs the data relating to selftime from its terminals D1 to D4 at the time of CC2 signal, and outputs the lower 4 bits of integer part of the shutter time control data TV at the time of CC6 signal.

Also the select-gate 618B has the fixed data to designate the time of CC3 and CC4 signals, explained later, inputted in its terminals A1 to A4 it also has the fixed data to designate a certain time as the time of CC5 signal, explained later, applied to its terminals B1 to B4. Also the time of 2 m sec. is used as said time of CC3 and CC4 signals, thus the data of "0110" are inputted in said terminals A1 to A4.

Also the time of 30 m sec. is used as the time of said CC5 signal in view of the running time of the AE lever 94, etc., thus the data, "1010" are applied to the terminals B1 to B4.

Also said select-gate 618B receives the inputs of the signals CC1, CC3 through the OR gate OR57 at the terminal Ka, and receives the input of CC5 signal at the terminal Kb. That is, this select-gate 618B outputs the data relating to the time of 2 m sec. from its terminals D1 to D4 at the time of the signals CC1 to CC3, and outputs the data relating to 30 m sec. from its terminals D1 to D4 at the time of CC5 signal.

Also the select-gate 618C has the D1 to D4 outputs of said select-gate 618A inputted in its terminals A1 to A4 and has the D1 to D4 outputs of said select-gate 618B inputted at its terminals B1 to B4 it also has the CC2 signal and CC6 signal inputted through the OR gate OR55 in the Ka terminal and has the CC1 signal, CC3 signal and CC5 signal inputted through the OR gates OR56, OR57 at the terminal Kb.

That is, said select gate 618C produces the D1 to D4 terminal outputs of said select-gate 618A from its D1 to D4 terminals at the time of CC2, CC6 signals and outputs the D1 to D4 terminal outputs of said select-gate 618B from its terminals D1 to D4 at the time of CC1, CC3, CC5 signals.

Also the select-gate 618D has the D1 to D4 outputs of said select-gate 618C appearing at its terminals A1 to A4, and has the data to make the signal of 2 Hz that is the data "1101" inputted in its terminals B1 to B4. It also has the signals CC1, CC2, CC3, CC5, CC6 inputted in its terminal Ka through the OR gates OR54, OR55, OR56, OR57 at its Ka terminal, and has the inverted signal of the input at said terminal Ka through the inverter INV47 inputted in its terminal Kb.

That is, this select-gate 618D is to output the D1 to D4 terminal outputs of said select-gate 618C from its terminals D1 to D4 at the time of each of signals CC1, CC2, CC3, CC5, CC6, and to transmit the data relating to said 2 Hz signal from its D1 to D4 terminals at the other times than above that is at the time of each of signals CC0, CC4, CC7.

The D1 to D4 outputs of said select-gate 618D are applied to each of the terminals A to D of said frequency dividing circuit 620.

On the other hand, the Q0 terminal output of said shutter time control registor 614 that is the highest bit of the shutter time control data TV is applied to the terminal D of said frequency dividing circuit 620 through the inverter INV45, or the OR gate OR53 from the NAND gate NAND29 which receives the input of CC6 signal.

Also the output of said NAND gate NAND29 is applied to the terminal 8b of said frequency dividing circuit 620 through the AND gate AND91 which has CC2 signal inputted therein through the inverted INV46.

In the afore mentioned set up explanations will be made on the state of A to D inputs of the frequency dividing circuit 620 and the input at the terminal 8b for every state of each of CC0 to CC7.

During the signals CC0, CC4, CC7, since the input in the terminal Kb of the select-gate 618D becomes "1" the input in the terminal of the frequency dividing circuit 620 also becomes "1". Each input at each of the input terminals A, B, C, D of the frequency dividing circuit 620 and at the terminal 8b becomes "1", "0", "1", "1", "1", respectively. That is, a pulse output frequency dividing the pulse of 16 KHz by "110" steps and producing a pulse output of 2 Hz will be made from the terminals D, 0 of said frequency dividing circuit 620.

During the CC2 signal, since the inputs in the terminals B1 to B4 of the select-gate 618A are inputted in the terminals A, B, C, D of the frequency dividing circuit 620 through the select-gates 618C, 618D and the input in the terminal 8b becomes "0", each input in each of the input terminals, A, B, C, D at the frequency dividing circuit 620 and in the terminal 8b becomes "0", "1", "0", "1", "0", respective. This is a pulse output frequency dividing the pulse of 16 KHz by "1010" steps plus 8 steps. That is a 16 second cycle pulse output of 16 second cycle will be made to the signal line (2) from the D0 terminal of said frequency dividing circuit 620.

Said pulse of 16 seconds cycle used the time when said pulse first up-rises from "0" to "1" that is the time when 8 seconds elapse after frequency dividing is started as the time when self-timer time is completed.

Next in the time of signals CC3 and CC1, the inputs at the terminals A1 to A4 of the select-gate 618 are inputted in the terminals A, B, C, D of the frequency dividing circuit 620 through the select-gates 618C, 618D and the input at the terminal 8b of the frequency dividing circuit 620 becomes "1". Hence input at the input terminals A, B, C, D of the frequency dividing circuit 620 and the input terminal 8b becomes "0", "1","1", "0", "1", respectively. Therefore, a pulse output as frequency dividing the pulse of 16 KHz by "0110" steps that is the pulse output of 4 m sec. cycle will be made to the signal line (3) from the DO terminal of the frequency dividing circuit 620. Said pulse of 4 m sec. cycle uses the time when said pulse first up-rises from "0" to "1", that is the time when 2 m sec. elapse from the frequency dividing is started as the time when the signals CC3 or CC1 are completed.

During the CC5 signal, the inputs at the terminals B1 to B4 of the select-gate 618B are inputted in the terminals, A, B, C, D of the frequency dividing circuit 620 through the select-gates 618C, 618D also the input in the terminal 8b of the frequency dividing circuit 620 becomes "1". Thus input at the input terminals A, B, C, D of the frequency dividing circuit 620 and at the terminal 8b becomes "0", "1", "0", "1", "1", respectively. Therefore, a pulse output frequency dividing the pulse of 16 KHZ by "1010" steps that is the pulse output of 64 M sec. cycle will be made to the signal line (30) from the terminal DO of said frequency dividing circuit 620. Said pulse of 64 m sec. cycle uses the time when said pulse first up-rises from "0" to "1" that is the time when 32 m sec. elapse after frequency dividing is started as the time of completion of CC5 signal.

In the time of CC6 signal, the inputs at the terminals A1 to A4 of the select-gate 618A that is the lower 4 bits of integer part of the shutter time control data TV are inputted in the terminals A, B, C, D of the frequency dividing circuit 620 through the select-gates 618C, 618D. Also when the highest bit of integer part of the shutter time control data TV is "0", the input at the terminal 8b of the frequency dividing circuit 620 becomes "1". When the highest bit of integer part of the shutter time control data TV is "1", the input at the terminal D of the frequency dividing circuit 620 becomes "1" and the input at the terminal 8b becomes "0".

Therefore, a pulse signal corresponding to the above mentioned $Y/8 \times 2^P$ of the equation (22), is obtained by frequency dividing the pulse signal of 16 KHz based on the shutter time control data TV is outputted from the terminal DO of the frequency dividing circuit 620.

Also the pulse signal is used to down count data corresponding to the above mention $8+\alpha$ in the equation (22) at a later stage. The fact that the actual time of shutter time has elapsed is detected by the time when said down counting is completed.

Figure 96:
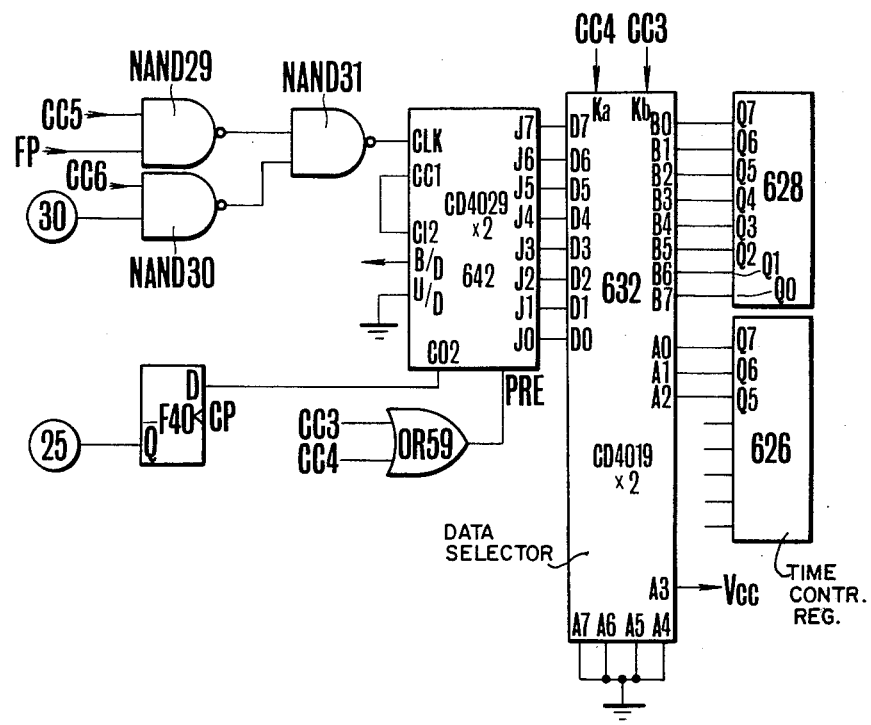
FIG. 96 shows details of the shutter time control register 626, the diaphragm closing step number control register 628, the data selector 632, the down counter 642 and the select gate 640.

FIG. 96 shows details of the shutter time control register 626, the diaphragm closing step number control register 628, the data selector 632, the down counter 642, the select-gate 640 in FIG. 30. The data selector 632 in said drawing consists of a select gate which employs two of integrated circuit elements CD4019 having its detailed logic diagram shown in FIG. 66 arranged in parallel. It has the outputs at the terminals Q0 to Q7 of the diaphragm closing control register 628 inputted in its terminals B7 to B0, also has the outputs at the terminals Q5 to Q7 of the shutter time control data TV that is the 3 bits portion below decimal point of the shutter time control data TV inputted in its terminals A2 to A0. Also said data selector 632 has "1" signal inputted in ins terminal A3, and has the terminals A4 to A7 grounded. That is, said data selector 632 receives the input of the data $8+\alpha$ shown in the equation (22) at the terminals A0 to A3, and receives the input of the diaphragm closing step number control data AV. Also, said data selector 632 has CC4 signal inputted in its terminal Ka and has CC3 signal at the terminal Kb. Therefore, in the time of CC3 said data selector 632 produces the diaphragm closing step number control data from its terminals D0 to D7, while outputs the data $8+\alpha$ of the equation (22) from its terminals D0 to D7.

The outputs at D0 to D7 of said data-selector 632 are applied to J0 to J7 of the down counter 642. At a time when CC3 signal or CC4 signal is applied through OR gate OR59 in the PRE terminal, said down counter 642 takes in and memorizes the output data of the terminals D0 to D7 of said data-selector 632.

Now, this down counter 642 is made by using two of the integrated circuit elements CD4029 having its detailed logic diagram shown in FIG. 34. It subtraction counts the data inputted from said terminals J0 to J7 and memorized based on the input CLK at its clock terminal, and outputs the signal to show that from the terminal C02 when carry (borrow) is generated as a result. Said output signal at C0 terminal is ordinarily "7" and becomes "0" when carry is generated. This signal is inputted in the terminal D of the Flip-Flop F40 being synchronized with the clock pulse CP, therefore when subtraction counting by said down counter 642 is completed the signal synchronized with the clock pulse CP is outputted at the signal line (25).

On the other hand, said down counter 642 receives the input of the signal FPC at its clock terminal CLK through the NAND gates NAND31, NAND29 in the time of CC5 signal. It also receives the DO terminal output of the frequency dividing circuit 620 that is the signal output of the signal line (30) through the NAND gates NAND31, NAND30 in the time of CC6. Therefore, the function of this down counter 642 will be explained based on the sequency shown in FIG. 93.

Said down counter 642 taken in the output data of the diaphragm closing step number control registor 628 from J0 to J7 terminal through the data selector 632 in the time of CC3 signal. Then as shifted to the time of CC5 signal, FPC signal is inputted through NAND gates NAND30, NAND31 and the diaphragm closing step number control data AVs memorized in the time of CC3 signal are down counted, and, as a result, when the subtraction counting is completed, the output signal at C02 terminal is shifted from "1" to "0". At this time the AE lever 94 will have run to such position as presetting the amount of diaphragm closing corresponding to the diaphragm closing step number control data AVs. Of course, the amount of run at this time has suitable amount of compensation given thereto considering the mechanical delay time until the clamping of the AE 94 by the diaphragm control means 398 is done. The fact that the output signal at the C02 terminal becomes "0" at this time is detected by the Flip-Flop F40, and such signal output is made as being sybchronized with the clock pulse CP to show that the AE lever 94 runs to such position as corresponding to the diaphragm closing step number control data AVs.

Figure 97:
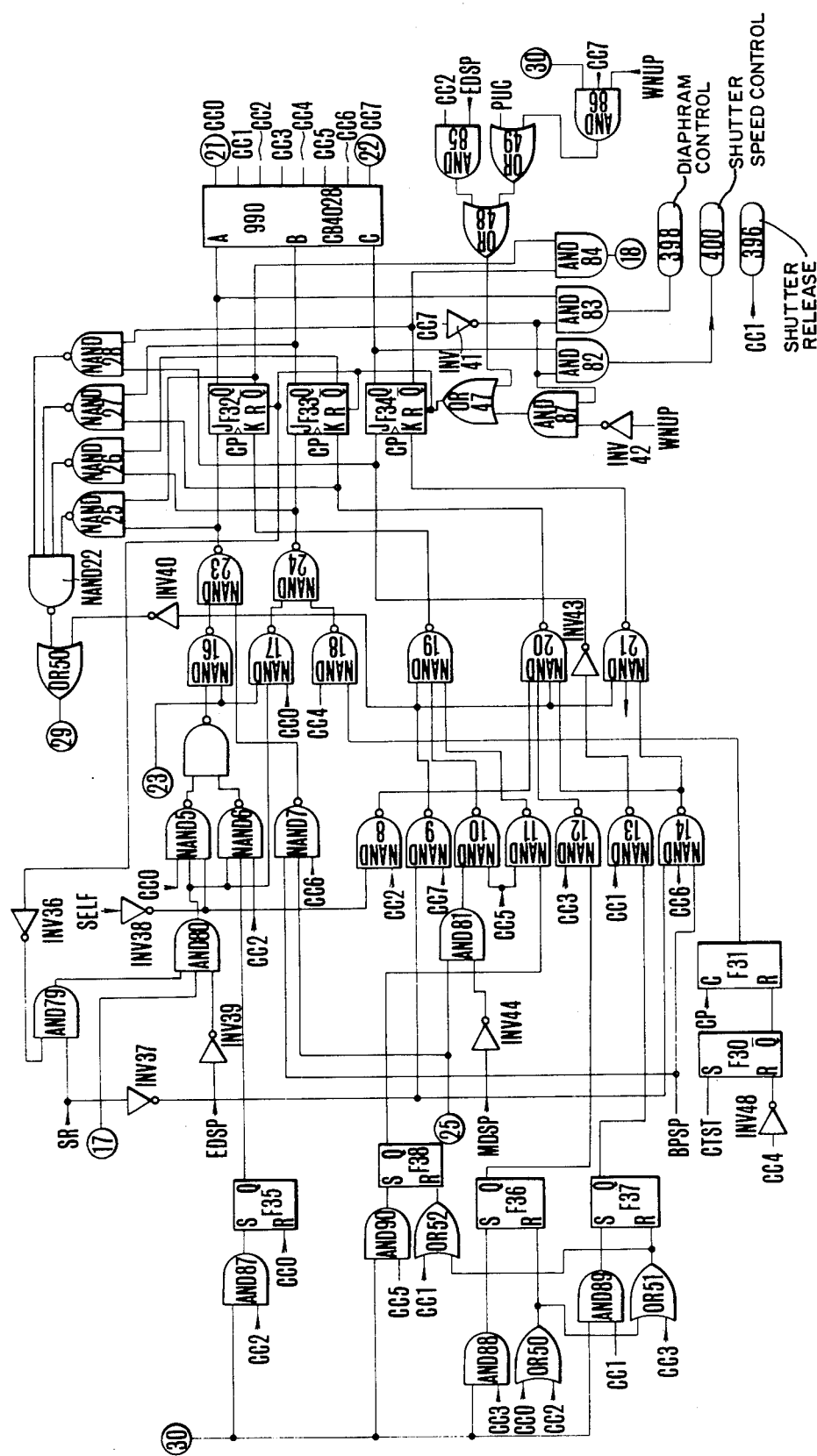
FIG. 97 shows details of the control signal generating circuit 646.

Also said down counter 642 takes in from the terminals J0 to J3 through the data selector 632 such data as placing "1" at the bit corresponding to the lowest bit of integer part in addition to the output data at the terminals Q5 to Q7 of the shutter time control registor 626 that is the data below decimal point of the shutter time control data TV, virtually as integer data that is as the data, $8+\alpha$, multiplying 8 times in the time of CC4 signal. Then, as shifted in the time of CC5 signal while the D0 terminal signal output of the frequency dividing circuit 620 will be inputted into the clock terminal CLK from the signal line (30) through the NAND gates NAND30, NAND31, such pulse output having pulse cycle of $Y/8 \times 2^P$ as frequency dividing the pulse signal of 16 KHz, the obtained by multiplying the standard time Y by $\frac{1}{8}$ time will be made at the signal line (30) in the time of CC6, as has been explained above. Therefore, the $8+\alpha$ memorized at the time of CC4 signal is down counted following the pulse signal with the cycle of $Y/8 \times 2^P$, and as a result as the subtraction counting is completed the C02 terminal output signal is shifted from "1" to "0". At this time, such length of time as $Y/8 \times 2^P \times (8+\alpha)$ has elapsed after entering into the time of CC6, and approximate actual time corresponding to the shutter time control date TV $(=P+\alpha/8)$ is obtained. The fact that the output signal at C02 terminal becomes "0" is detected by the Flip-Flop F40 and such signal output as synchronized with the clock pulse CP will be made to show the fact that such actual time as corresponding to the shutter time control data TV has elapsed after entering into the state of CC6 signal. FIG. 97 shows a detailed circuit diagram of the above mentioned control signal generation circuit 646 and constitutes a theory circuit to obtain the above mentioned control signals CC0 to CC7. What is shown as 990 in said drawing is a decoder made of integrated circuit element having its detailed logic diagram shown in FIG. 35, and is to decode FC1, FC2, FC3 which represents each Q output of the Flip-Flops F32, F33, F34 and outputs the same as the signals CC0 to CC7. Here each of said signals FC1, FC2, FC3 is shown in FIG. 93 and is outputted from the Q output terminals of the Flip-Flops F32, F33, F34. These Flip-Flops F32, F33, F34 are synchronized with the clock pulse CP.

Now the setting condition for the Flip-Flop F32 is represented by SFC1, the resetting condition of the same by RFC1, and the setting condition for the Flip-Flop F33 is represented by SFC2, the resetting condition of the same by RFC2, while the setting condition for the Flip-Flop F34 by SFC3, the resetting condition therefore by RFC3, and the direct resetting condition for all of said Flip-Flops F32, F33, F34 is represented by FDR.

The fact that said condition FDR is satisfied means that the Flip-Flops F32, F33, F34 are reset without any relationship with the clock pulse CP. Therefore "1" output is made from the decoder 990 as the CC0 signal. That is the system will be placed in or returned to the state of CC0 signal.

Said condition FDR is satisfied when the power up clear signal PUC is inputted, or at the state of CC2 signal that is the EDSP signal becomes "1" during the action of self-timer, or at the state as not being in the state of CC7 signal and that the wind up of film is not completed and WNUP signal is "0", or when the wind up is completed and the WNUP signal becomes "1", further such time as corresponding to 2Hz has elapsed in the state of CC7 signal.

Now, the FDR is satified when CCP signal is "1", and the WNUP signal is "1", further the 2Hz signal is "1", because film wind up is completed in a state wherein the shutter release button 18 is kept pressed and then after an elapse of such period of time that next operation result is taken into a register for display the system enters into next control state, and it is an important condition for conducting continuous photographing in a state wherein the shutter release button 18 is kept pressed, using a motor driving device.

And AND gates AND85, AND86, AND87, OR gates OR47, OR48, OR49 and the inverter INV42 relate to satisfy said condition FDR.

The fact that the condition for CC2 signal is satisfied means that the Flip-Flop F33 is placed in a set state and the Flip-Flops F32, F34 are placed in reset state, and for that end the condition SFC2 needs to be satified.

That is, in order to create the state of CC2 signal, it is necessary that the condition SFC2 is satisified as the shutter release button 18 is pressed and the SR signal becomes "1" when the EDSP signal is "0" under the state of CC0 signal and the condition FDR is not satisfied, and the signal from the signal line (17) is "1", That is the operation at the central control part 362 is completed and the signal from the signal line (23) is "1", that is when the transfer of data from the central control part 362 to the output control part 364 is not done.

When the SELF signal is "0" at this time for having the condition SFC1 also satisfied simultaneously, the system will be shifted from the state of CC0 signal to the state of CC3 signal without going through the state of CC2 signal.

When the SECF signal becomes "0" and the SR signal becomes "0" under the state of said CC2 signal, the condition RFC2 is satisfied as the self-timer photographing is regarded as completed and the system will be returned to the state of CC0.

On the other hand, under the state of CC2 signal, when the signal of the signal line (30) becomes "1", that is "1" output is made from the DO terminal of the frequency dividing circuit 620 and the signal of the signal line (23) is "1", the condition SFC1 is satisfied and the system is shifted to the state of CC3 signal.

The system is shifted from the state of CC3 signal to the state of CC1 signal when the signal of the signal line (30) becomes "1", that is when 2 m sec. have elapsed thereby satisfying the condition RFC2.

The shifting from the state of the CC1 signal to the state of the CC5 signal is made when the signal of said signal line (30) becomes "1", that is 2 m sec. have elapsed, thereby satisfying the condition RFC2.

The shifting from the state of the CC1 signal to the state of th CC5 signal is made when the signal of said signal line (30) becomes "1", that is 2 m sec. have elapsed, thereby satisfying the condition SFC3.

The shifting from the state of CC5 signal to the state of CC4 signal is made when MDSP signal is "0" and the signal of signal line (25) becomes "1", that is when the AE lever 94 runs as much as such amount as corresponding to the diaphragm closing step number control data AVs or when the signal of said signal line (30) becomes "1" that is 30 m sec. have elapsed, thereby satisfying the condition RFC1.

The shifting from the state of CC4 signal to the state of CC6 signal is made when the shutter leading screen starts running and CTST signal becomes "1", satisfying the condition of SFC2.

The shifting from the state of CC6 signal to the state of signal CC7 is made when BDSP signal is "0" and the output of signal line (25) becomes "1", that is counting of actual time corresponding to the shutter time control data is completed, thereby satisfying the condition SFC1.

When BDSP signal is "1" and SR signal becomes "0" under the state of CC6 signal, the conditions RFC2 and RFC4 are satisfied and the system is returned to the state of CC0 signal.

Also when the SR signal becomes "0" under the state of CC7 signal the conditions RFC1, RFC2 and RFC4 are satisfied and the system is returned to the state of CC0 signal.

Now, what is related to SFC1 is a logic set up by AND gates AND79, AND80, AND87, NAND gates NAND5, NAND6. NAND7 NAND16, NAND23, inverters INV36, INV37, INV38, INV39, and Flip-Flop F35.

Also what is related to RFC1 is a logic set up by AND gates AND81, AND90, NAND gates NAND8, NAND9, NAND10, NAND11, NAND19, inverter INV44, Flip-Flop F31, OR gates OR50, OR51, OR52.

Also what is related to SFC2 is logic set up by NAND gates NAND17, NAND18, NAND24, Flip-Flops F30, F31 and inverter INV48.

Also what is related to RFC2 is a logic set by NAND gate NAND gate NAND12, NAND20, NAND8, NAND9, Flip-Flop F36, AND gates AND81, AND88, OR gates OR50, inverters INV37, INV38, INV44.

Also what is related to SFC3 is NAND gate NAND13, AND gate AND89, OR gate OR51, inverter INV43 and Flip-Flop F37.

Also what is related to RFC3 is a logic circuit by NAND gates NAND9, NAND14, NAND21 and inverter INV37.

And said control signal generation circuit 646 gives the direct reset signal to the direct reset terminal R of the freguency dividing circuit 620 through the signal line (29).

the condition for the output "1" being done at said signal line (20) is that it is made when the SR signal becomes "0" under the state of CC7 signal and during the one bit of the first clock pulse CP after the conditions SFC1, SFC2, RFC2, SFC3 are satisfied, wherein the content of the above mentioned frequency dividing circuit 620 is totally cleared by said direct reset signal.

What is related to making "1" output at said signal line (29), is a logic set up made by NAND gates, NAND9, NAND22, NAND25, NAND26, NAND27, NAND28, inverters INV37, INV40 and OR gate OR50.

While power supply signals are given by said control signal generation circuit 646 to the shutter release means 397, the diaphragm control means 398, and the shutter speed control means 400, the power supply signal is given to the shutter release means 396 at the time of CC1 signal, and power supply signal is given to the diaphragm control means 398 at the time of CC3, CC1 and CC5 signals, while power supply signal is given to the shutter speed control means 400 at the time of CC5, CC4 and CC6.

To realize said actions, CC1 signal is given directly to the shutter release means 396, and the inverted signal by the inverter INV41 of FC1 signal and CC7 signals are given to the diaphragm control means 398 through the AND gate AND82, while the FC3 signal and the output signal of the inverter INV41 are given to the shutter speed control means 400 through the AND gate AND82.

Also direct reset signal is given by said control signal generation circuit 646 through the signal line (18) to the direct reset teminal R of the Flip-Flop F23 shown in FIG. 82.

This is done to prohibit that new operation data are inputted to the output control part 364 from the central control part 362 during exposure control action, and said signal will become "1" when the AND condition for each $\bar{Q}$ output of the Flip-Flops F32, F34 is satisfied through the AND gate AND84.

Figure 98:
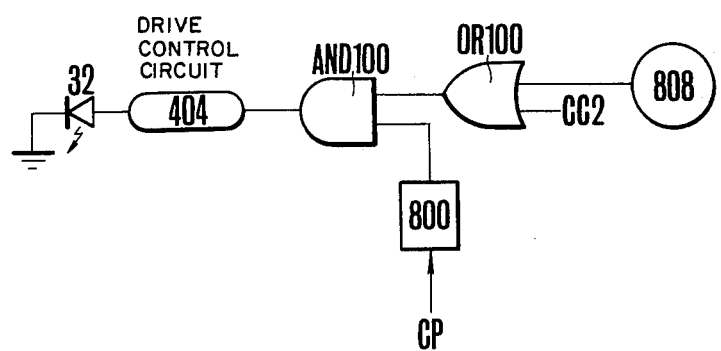
FIG. 98 shows the circuit of the drive control circuit for the LED display device.

To provide further explanations, while control signal is issued from said control signal generation circuit 646 to the driving circuit 404 to flicker the LED display device 32 which shows that a self timer is in action and a power source is normal, the set up of the driving control circuit of said LED display device 32 is shown in FIG. 98.

What is shown as 800 in the drawing is a frequency dividing circuit of 15 steps, which frequency divides the clock pulse CP of 64 KHz by 15 steps to generate ON-OFF signal of 2 Hz. Said 2 Hz signal is given to the AND gate AND100.

Also what is shown as 808 is a well-known battery check circuit being so made as outputting "1" signal when the balance in the battery is sufficient as the battery is checked.

The output of said battery check circuit 808 is given to said AND gate AND100 through OR gate OR100 together with said CC2 signal and the output signal of said AND gate AND100 is given to the LED driving circuit 404.

When the CC2 signal for the self-timer in action is "1" or the balance of battery is sufficient as a result of battery check in such set up as mentioned above, ON-OFF signal of 2 Hz is given to said LED driving circuit 404, thus the LED display device 32 makes flickering display.

While the explanations given so far are not necessarily sufficient, the set up of the camera system of this example is as mentioned above.

The reference table of FIG. 99 shows in what form each of the data is used in operation. In this table, binary codes of 8 bits with ⅛ step accuracy corresponding to each APEX series of object brightness BV, film sensitivity SV, shutter speed TV, aperture value AV, fully opened aperture value AVo, the aperture value of most closed diaphragm AMAX, exposure EV, and the set aperture value from the speedlight side are corresponded and binary codes of 8 bits with ⅛ step accuracy are similarly corresponded as the coverted digital values against the analog data when A - D is made at the input control part.

Also the vignetting error ROM528 shown in FIG. 37 is to output the binary code data for such vignetting error AVc as shown in FIG. 100 against the given fully opened aperture value AVo.

Figure 101:
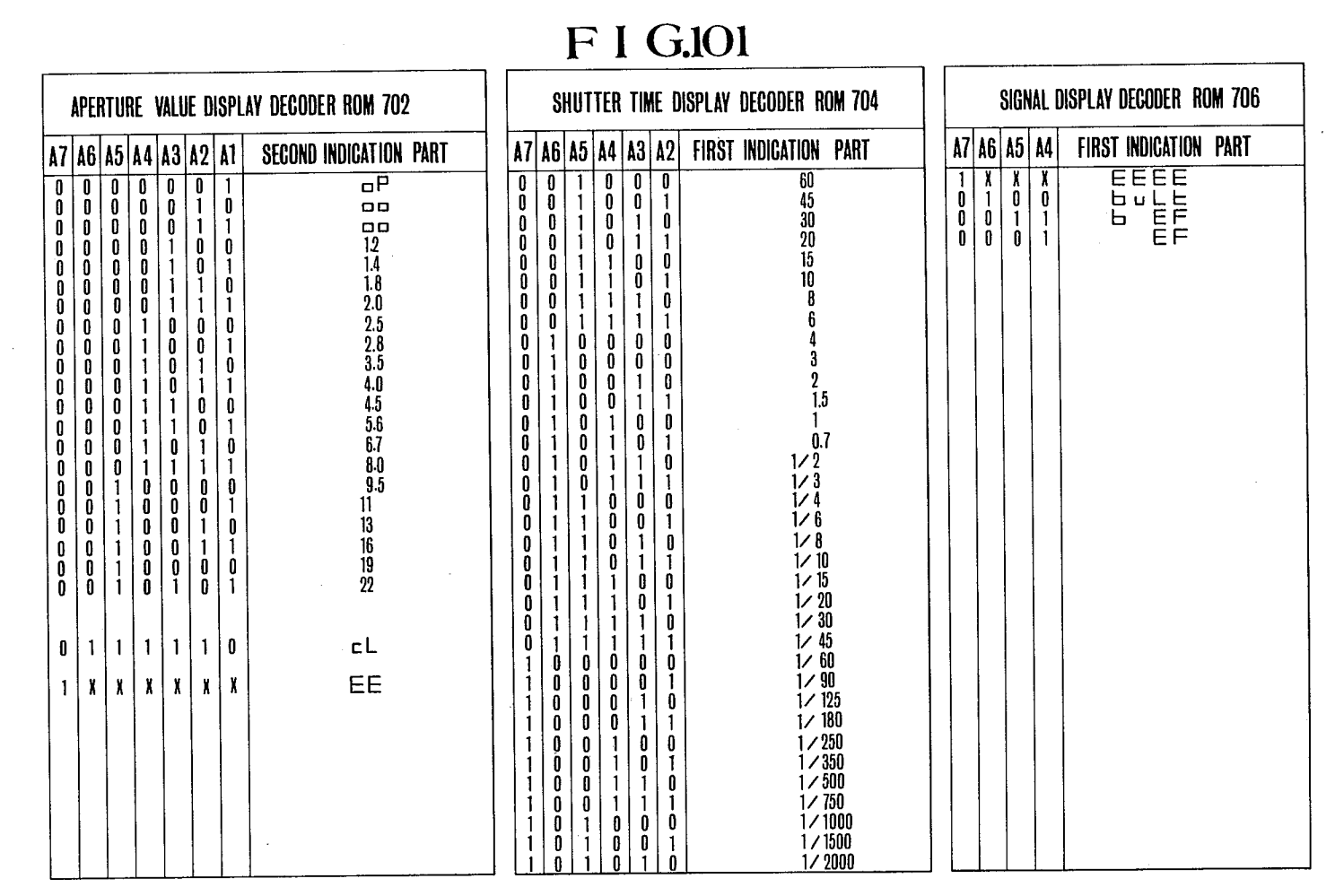

A reference table for the binary code for each input of the aperture value display decoder ROM702, the shutter speed display decoder ROM704, the sign display decoder ROM706 shown in FIG. 89 is shown in FIG. 101.

In the system of this example, data are handled in such binary codes as shown each of the reference tables of FIG. 99, FIG. 100, FIG. 101, and each operation routine shown in FIG. 70 is all made based on such binary data as shown in said reference tables.

Thus, it is deemed that ones with ordinary skill in the art can easily understand the portions in this specification where explanations are not sufficient or as to what actions will be made by the operation circuit shown in the block diagram of FIG. 79, following the operation instructions shown in FIG. 69 by referring to each operation routine shown in FIG. 70 and FIG. 99, 100, 101 and in addition to all other drawings attached.

While the camera system of the present invention provides a number of advantages in picture taking, etc., they will be listed below:

1. While exposure control mechanism in a conventional camera device is made of chiefly by analogic electric circuits and mechanical linking mechanisms, the camera system to which the present invention is applied can have its circuits digitallized and large scale integration of circuits can be done therefore a compact set up with little erroneous operations can be obtained, and it is suitable for application to a camera device with limitation in its housing space.

2. While an automatic exposure control function used conventionally in a camera device of TTL light measuring system has such case that the intention of a photographer can not be sufficiently satisfied because either one system out of aperture value priority of shutter time priority can be selected, in the camera system of the present invention the aperture priority and shutter time priority can be freely selected by change over of a switch, thus the application field for automatic exposure photographing is widened.

3. While a technique to concentratedly display various information within a finder of a camera device has been well known, in the camera system of the present invention is so made that information necessary for photographing is displayed within a finder digitally and in a very efficient manner, thus a photographer can obtain various information in photographing through a finder so that most proper camera operation can be done based on said information.

4. Since any one of the modes of automatic exposure photographing, manual exposure photographing, speed-light photographing, external light measuring photographing can be freely selected in a camera system of the present invention, the photographing mode needed by a photographer can be most properly selected.

5. While an ordinary camera device employs such set up conventionally that shutter speed is selected and set by a shutter dial and aperture value is selected and set by a diaphragm ring, respectively, in a camera system of the present invention, shutter speed and aperture value can be set by a common dial, therefore its handling characteristics can be greatly enhanced.

6. Since all controls in a camera device to which a camera system of the present invention is applied can be electrically done for example a shutter which constituted heretofore a mechanical closing and opening mechanism can be replaced with an electric switch, therefore the adjustment of shutter button pressing power for shutter release can be done with very simple set up, thus the hand shakings at a time of shutter button pressing can be sufficiently overcome.

7. A camera system of the present invention is so made that when self time or exposure time is converted to actual time the time data corresponding to APEX value can be converted to actual time data in a very simple circuit set up and actual time is obtained by a standard time clock with electric generation type, therefore very accurate self time and exposure time can be obtained.

8. Since self time is digitally controlled in a camera system of the present invention the setting of self time can be freely and variable done, further self times does not have to be set every time shutter release is done, thus troublesome handling for self time setting will become unnecessary. Also since mechanical spring mechanism as in a conventional system is not used there will be no operating noise and setting is easy, further the extent for setting time can be made wide.

Also since display of action can be made with electric display means such advantage can be secured that the action state of the system system can be viewed from a distance. 9. Since exposure time is digitally controlled in a camera system of the present invention, the setting range for exposure time can be widened, particularly a mechanical governor is not used for a low speed shutter, long shutter time can be set freely without being restricted by mechanical arrangement, further action noise accompanying to the action of a low speed shutter can be eliminated. Also exposure time can be obtained with very high level of accuracy by using such oscillator with high level of accuracy as a crystal oscillator, thus accurate exposure can be made.

10. Compensation of vignetting error for the amount of light measured by TTL system generated near fully opened side of a lens device is not done by a mechanical linking system in a camera system of the present invention, instead said system is so made as selecting plural number of vignetting error data which have been momorized beforehand based on be fully opened aperture value of a photographing lens device used, therefore, mechanical errors can be minimized.

11. In a camera system of the present invention, unless a shutter release is done, light measuring and operation therefor will be repeated and every time aperture value and exposure time are obtained as the results of operation said values are memorized in registers, and displayed within a finder, thus not only a photographer can learn the information concerning photographing beforehand, but the aperture value and exposure time actually obtained in photographing can be obtained always for new conditions and new object, even when the set condition is changed, therefore photographing condition for an object can be freely selected. Also since the direction of error in the set aperture value of exposure time against appropriate exposure is displayed in a finder, a not only photographer can adjust the appropriate exposures in an accurate manner, but such effect as high key or low key, etc. can be assumed.

12. Since the control in a camera system of the present invention is made in such manner that as long as a shutter release is done, light measuring and A - D conversion are done repeatedly and the result of said A - D conversion is memorized in a registor every time the conversion is completed, and A - D conversion data memorized in the registor can be easily retained, thus AE locking mechanism, which has been constituted conventionally by mechanical clamping mechanisms or analogical capacitors, etc., can be obtained with very simple circuit set up, further it has such special feature that since it has such set up as memorizing and retaining the A - D conversion data of amount of light measured such conditions as the set aperture value, the set shutter speed value, and the film sensitivity etc. which contitute the basis for operation can be freely changed, thus extent of freedom at a time of AE locking can be largely widened compared to that in a conventional AE locking system in which the result of operation based on the amount of light measured is retained.

13. A camera system in the present invention employs such set up that the digital display within a finder is put out when a camera device is in an exposure control action including a self-timer action for greatly reducing power consumption of a battery power souce, thus a camera device can be operated in a stable manner for a long time, also economy in use is improved.

14. While in such set up as conduction digital information display by LED display device within a finder there is such fear that light emittance by said LED display device within a finder badly affects the light measuring information as TTL light measuring is done, such set up is used in a camera system of the present invention as taking in the light measuring information within a certain length of time with very quick cycle and putting out the LED display in between, therefore the LED display device is put out in every prescribed period of time with very quick cycle. Therefore, there will be no such troubles as flickering of display, etc. yet the bad effect which may be given to TTL light measuring by the LED display device is eliminated, thus allowing very accurate light measuring.

15. While frequent changes in the display data in digital display cause tackering or flickering in display, etc. making it difficult to read out or distinquish the same, and sometimes there may be a fear for erroneous read out, a camera system of the present invention has such set up that the renewal of digital display is done with such degree of cycle as can be distinquished by a photographer without relationship with the cycle of change in the data to be displayed, thus read out of digital display simple and a risk of erroneous readout is reduced.

16. While as digital data with comparatively high level of accuracy are used as the data for operation and control in exercising exposure control, even if data with similarly high level of accuracy are used in digital display of data, it may cause unnecessary confusion for a photographer, and there is a fear for lowering photographing efficiency, in a camera system of the present invention although digital data with comparatively high level of accuracy are used as the data for operation and control, in digital display of data the accuracy is reduced by conducting rounding off by counting a fraction of 0.5 or over as a whole number and disregarding the rest, etc., that is the data are rounded off for data display, thus the efficiency in reading out data is enhanced allowing smooth photographing action.

17. While there is a necessity to manually set aperture value at a camera device side as an automatic light adjusting speedlight is used in speedlight photographing, the aperture at a camera device side can be automatically controlled from a speedlight side in a camera system of the present invention, thus speedlight photographing can be made quite efficient.

18. Also while shutter speed at a camera device side needs to be manually matched with the shutter speed synchronized with the speedlight or lower shutter speed when speedlight photographing is done in a conventional system, resulting in such fear as having erroneous handling in speedlight photographing, in a camera system of the present invention such signal is issued from a speedlight side in speedlight photographing as controlling the shutter speed at camera side to the shutter speed synchronized with the speedlight, allowing automatic control of the shutter speed of camera device to the shutter speed synchronized with the speedlight. Such set up may be also possible that such control will not be applied only when a shutter speed at lower side than that synchronized with the speedlight is selected at a camera device side, thus the extent of freedom in automatic speedlight photographing is enlarged.

19. While various conditions or data need to be set manually based on the result of light measuring when photographing is done based on the result of external light measuring for example spot light measuring or incident light measuring in a conventional automatic exposure control camera of TTL light measuring type, automatic exposure control based on the result of light measuring can be done when external light measuring is done in a camera system of the present invention, thus field of application of automatic exposure control is greatly enhanced.

As has been listed above numbers of advantages which can be obtained as a camera system of the present invention is employed and mechanical and electrical problem incidental to exposure control can be consolidatedly eliminated, thus it has great practical value.

Said technical thought of a camera system of the present invention is not limited to the above mentioned example instead there may be various modifications thereof and it is quite natural as a camera system of the present invention intends to establish an efficient total system in a photographic system.

Now, while explanations were not made in the above example, various additonal function or modifications which are conceivable for making a camera system of the present invention to have further usefulness will be explained below.

A. While power source is supplied to all functional parts during operation of a camera device in the above example, there may be parts not requiring power supply depending on the functioning state of a camera. For example, while a camera device is doing exposure control action a part actually requiring power supply is an output control part only, but an input control part, and a central control part do not need power supply. Therefore, such set up may be employed that when a camera device is in exposure control action that is between the sequences CC3, CC1, CC5, CC6, CC7 signals shown in FIG. 93, power supply to an input control part and a central control part is stopped for saving power.

B. While the above example has such set up that when a self setting is released as a camera device is in a state of self timer action, the system is returned to a state of waiting for shutter button, on the other hand it may have such set up that exposure control is done at a same time when a self setting is released. This can be effectively applied to a case when photographing needs to be done immediately during operation of a self timer, thus a photograher can respond at once to shutter changes. Such set up can be realized by replacing the output of NAND gate NAND8 in the circuit shown in FIG. 97 with the input of NAND gate NAND15.

C. While the above example has such set up that the brightness of a digital display device is always controlled to a constant value, the reading out of display may become easier as the brightness of display is changed depending on the brightness of object field of view, as long as such digital display is done within a finder. That is the brightness of display may be increased for bright object field of view, while the brightness of display may be reduced for dark object field of views. Such control may be effected by controlling the voltage for driving a digital display device or changing the duty of pulse voltage based on the light measuring information.

D. While the above example has such set up that newal of data of a digital display device is done with a certain time interval, for example when brightness in object field of view suddenly changes there is a possibility that extremely by deviation is generated between the control state of a camera device and display content by a display device. A set up may be employed to renew the display data in a display device without relationship with the renewal cycle of display data of a display device when extremely big deviation takes place between display data and control data.

E. While the operating time of a self timer in the above example is a predetermined contant time, such set up may be employed as making the operating time of a self timer variable so that a photographer can select free self time. Such set up may be realized easily by inputting variable data in the input at B1 to B4 of the digital selector shown in FIG. 94 through a digital switch, etc.

F. While the above example has such set up that even when an automatic light adjusting speedlight is used film sensitivity is set at a speedlight side in speedlight photographing mode and control data for controlled aperture value are inputted in a camera device, such set up may also be used that controlled aperture value is operated at a camera device side following film sensitivity set at a camera side based on the control data being sent from a speedlight side to a camera device side, as far as film sensitivity is concerned. Such set up may be easily realized by adding such routine as adding film sensitivity to operation routines at a time of speedlight photographing.

While a camera system of the present invention can employ various kinds of modified embodiments as have been mentioned above, there will be no specific explanations made here as to the scope or extent which can be easily presumed by extended thought for obtaining a realistic system allowing reasonable and efficient picture taking, but those having ordinary skill in the cast can have good understanding on this matter.

What is claimed is:

1. A digital exposure parameter indicating device for a camera comprising:
   (a) a digital signal source for generating a digital data signal corresponding to the digital exposure parameter in the form of a binary number;
   (b) first means for generating a signal representing the lowest step of the exposure parameter;
   (c) adder circuit means connected to said digital signal souce and to said first means for adding the signal from the first means representing the lowest step of the exposure parameter to a first bit of the digital data signal;
   (d) a decoder connected to the adder circuit means for converting a binary number composed of bits from an order next to the first bit to a most significant bit of the added digital data signal into a decimal number; and
   (e) indicating means connected to said decoder for indicating the digital exposure parameter as a decimal number in response to the output signal of said decoder.

2. A digital exposure parameter indicating device according to claim 1, wherein said digital signal source includes:
   (a) timing pulse generating means which produces a plurality of timing pulses in sequence;
   (b) a single data output line;
   (c) a digital data plate provided with a pattern composed of a plurality of conductive marks which represent the exposure parameter;
   (d) scanning means coupled to said pulse generating means and said plate for receiving said timing pulses and scanning the marks of said digital data plate one after another in synchronism with each timing pulse;
   (e) means coupled to said scanning means for supplying the output digital signals of said scanning means corresponding to the states of said marks one after another to said single data output line;
   (f) light sensitive means for producing an electrical signal corresponding to the brightness of an object to be photographed;
   (g) analog-to-digital converter means connected to said light sensitive means for producing a digital signal in the form of a binary number corresponding to the electrical signal from the light sensitive means; and
   (h) calculating means coupled to the converter means and said output line for producing a digital signal in the form of a binary number corresponding to a digital signal from said single data output line representing a binary number and to the digital signal from said analog-to-digital coverter.

* * * * *

UNITED STATES PATENT OFFICE
CERTIFICATE OF CORRECTION

Patent No. 4,304,472                    Dated    December 8, 1981

Inventor(s)   Nobuhiko Shinoda, et al

It is certified that error appears in the above-identified patent and that said Letters Patent are hereby corrected as shown below:

ON THE TITLE PAGE, Item (75) should read

-- [75] Inventors:

Nobuhiko Shinoda, Tokyo; Nobuaki Sakurada, Yokohama; Masaharu Kawamura, Hino; Tadashi Ito; Fumio Ito, both of Yokohama; Hiroyashu Murakami, Tokyo, all of Japan.   --.

Signed and Sealed this

Seventh Day of December 1982

[SEAL]

*Attest:*

*Attesting Officer*

GERALD J. MOSSINGHOFF

*Commissioner of Patents and Trademarks*